United States Patent [19]

Heinsen et al.

[11] 4,158,285

[45] Jun. 19, 1979

[54] INTERACTIVE WRISTWATCH CALCULATOR

[75] Inventors: Edward A. Heinsen, Cupertino; André F. Marion, Palo Alto; Thomas E. Osborne, San Francisco, all of Calif.

[73] Assignee: Hewlett-Packard Company, Palo Alto, Calif.

[21] Appl. No.: 656,751

[22] Filed: Feb. 9, 1976

[51] Int. Cl.[2] .......... G04C 3/00; G06F 7/38

[52] U.S. Cl. .......... 58/23 R; 58/4 A; 58/39.5; 58/152 R; 364/569; 340/365 S

[58] Field of Search .......... 58/23 R, 4 R, 4 A, 50 R, 58/85.5, 152 R; 235/92 T, 152, 156; 340/365 S; 364/569, 705

[56] References Cited

U.S. PATENT DOCUMENTS

| | | | |
|---|---|---|---|
| 3,803,834 | 4/1974 | Reese | 58/152 R |
| 3,813,533 | 5/1974 | Cone et al. | 235/156 |
| 3,816,730 | 6/1974 | Yamamoto et al. | 235/156 |
| 3,855,459 | 12/1974 | Hakara | 235/154 |
| 3,867,619 | 2/1975 | Arauchi | 235/156 |
| 3,955,355 | 5/1976 | Luce | 58/50 R |
| 3,973,110 | 8/1976 | Rode et al. | 235/152 |
| 4,022,014 | 5/1977 | Lowdenslager | 58/23 R |
| 4,041,295 | 8/1977 | Ido et al. | 235/156 |
| 4,047,010 | 9/1977 | Perotto et al. | 235/156 |
| 4,078,376 | 3/1978 | Freeman | 58/38 R |

*Primary Examiner*—Robert K. Schaffer
*Assistant Examiner*—Vit W. Miska
*Attorney, Agent, or Firm*—Patrick J. Barrett

[57] ABSTRACT

An apparatus is disclosed comprising an electronic wristwatch and a multifunction electronic calculator in a single wrist mountable case having a common display and keyboard. The watch portion of the watch/calculator includes time of day, calendar, stopwatch and alarm functions. Each of these functions can be controlled from the keyboard on the watch/calculator. The electronic calculator portion of the watch/calculator performs the four standard arithmetic functions: add, subtract, multiply and divide; and has an extra storage register. The calculator portion can perform calculations with scalar quantities entered via the keyboard or stored in the calculator as well as calculations with time interval and real time data from the watch portion. During the time that calculations are not being performed the calculator goes into a sleep or inactive mode in order to minimize the amount of battery power used by the watch/calculator.

66 Claims, 111 Drawing Figures

106
142
116
AIBC
496
RS1
353
361
DRS
416
2P/2N
220
PRS(79)
(210)
221
POINTER
215-218
AX 211-214
203
200
201
202
208
209
210
P/5N
IHP (494)
ARITH
A10
191
192
193
194
195
196
198
199
159
160
161
162
163
164
165
166
167
P/N

140

| | | | |
|---|---|---|---|
| FIG. 5A | FIG. 5B | FIG. 5C | FIG. 5D |
| FIG. 5E | FIG. 5F | FIG. 5G | FIG. 5H |
| FIG. 5I | FIG. 5J | FIG. 5K | FIG. 5L |
| FIG. 5M | FIG. 5N | FIG. 5P | FIG. 5R |

FIGURE 5S

| | | | | |
|---|---|---|---|---|
| | | P | N | P/N |
| | | B | A | INV |
| F F 1 | $\overline{BA}$ | W | X | A / A |
| | AA | Y | X | W / C |
| | AC | Y | X | W / X |
| | | | | |
| | | | | |
| | | N | P | P / N |
| F F 2 | | A | B | INV |
| | BC | X | E | D / C |
| | AB | X | E | D / C |
| | BB | X | E | W / U |
| | XTB | X | E | X / B |
| | CTX | X | E | X / B |
| ATC | ASA | X | E | X / B |
| | BSA | X | C | A / A |
| | ATA | X | E | C / Z |
| CTAD, CTLA, BTAD | | X | E | C / Z |
| | WAD | X | E | X / B |
| | SUB | X | E | E / X |
| | PRC | X | E | C / Z |
| IB6,7,8,9, E4 | | X | E | Y / E |

| CELLS CHANGE EFFECTS | a | b | x | d | e | f |
|---|---|---|---|---|---|---|
| A01, C01, *C3 | G | F | A | A | A | A |
| | | | | | | |
| SC | Y | E | G | H | X | C |

| REGISTOR | a | b | c | |
|---|---|---|---|---|
| A52, A51, 50, F01 | D | C | | |
| A49, MSP | Y | E | | |
| I0-I9 | C | B | | |
| D48, M48, B44 | | | T | T |

| | a | b | c | d |
|---|---|---|---|---|
| TA | Y | E | C | B |
| TB | Y | E | A | A |

| | | | |
|---|---|---|---|
| FIG. 12A' | FIG. 12B' | FIG. 12C' | FIG. 12D' |
| FIG. 12E' | FIG. 12F' | FIG. 12G' | FIG. 12H' |
| FIG. 12I' | FIG. 12J' | FIG. 12K' | FIG. 12L' |
| FIG. 12M' | FIG. 12N' | FIG. 12P' | FIG. 12R' |
| | FIG. 12S' | FIG. 12T' | FIG. 12U' |

FIGURE 12V'

OPERATORS (+, -, x, ÷) AND EQUALS FLOWCHART

DYNAMIC STOPWATCH OPERATION FLOWCHART

INTERACTIVE WRISTWATCH CALCULATOR

BACKGROUND OF THE INVENTION

Numerous electronic watches are available which use high stability oscillators as time standards and display time information in a digital fashion. One of the difficulties encountered with many currently available digital watches is the complex routine that must be followed in order to set or change the time indicated on the watch. In some watches, a button for actuating up counters must be used in a particular sequence to cause each of the time registers to be set to the desired value. Other watches use a plurality of buttons, magnetic wands, and other accessory devices to achieve similar results. These various complex measures necessary for the setting of time make it difficult to easily change the time in the watch when crossing time zones or for setting an alarm.

Electronic calculators of various sorts have been available for some time, however, present electronic calculators perform computations only with scalar quantities, that is, values that are not changing with time. While a number of calculators have been provided with displays which are extinguished after a certain period of time in order to conserve power, the calculator circuitry itself usually remains in an operational state thus continuing to consume power at a relatively high level even though no information is being displayed and no calculations are being made.

At least one previous patent, U.S. Pat. No. 3,803,834, has disclosed the combination of an electronic watch and a calculator in a single case. This combination, however, makes no provision for computations using time varying quantities in combination with scalar quantities, nor does it provide for control of the clock portion via the calculator. The calculator and the watch in the aforementioned reference operate entirely separately and only share a common display and keyboard.

SUMMARY OF THE INVENTION

The preferred embodiment of the present invention comprises an electronic wristwatch with an integral electronic calculator. Both portions of the watch/calculator share a common display and a common keyboard. The watch is set by entering a time via the keyboard using digit keys and a colon key, to indicate that the numbers represent a time; and then by commanding the watch to be set to a new time via a time-set command key. The watch portion also includes an alarm register which can be set via the keyboard and which can be armed or disarmed via the keyboard. In the watch portion a single register keeps track of both time of day and date information, although the date information can be displayed and set separately from the time of day information. Dates may be set from the watch/calculator keyboard using the digit keys and a slash key to indicate separation between day, month and year digits. Finally, there is also a stopwatch in the watch/calculator which may be set to count upward from a given starting point by pressing a start button or may be set to count down from a time entered from the keyboard and produce an alarm when the time period set is up. In addition, a split may be stored from the stopwatch while it is running.

The calculator portion of the watch/calculator includes circuitry for performing the four basic arithmetic functions: add, subtract, multiply and divide, and, in addition, includes an auxiliary storage register. The calculator can perform these arithmetic functions with scalar quantities in the form of decimal numbers as well as with combinations of scalar quantities and time quantities, that is, numbers whose values are changing with time. For example, in order to change the time indicated by the wristwatch when the wearer crosses a time zone boundary he may simply add or subtract an hour from the clock register in the watch without disturbing the absolute setting or time calibration of the clock register by using the calculator portion to add or subtract the hour to the contents of the clock register. Furthermore, real time can be multiplied or divided by scalar quantities to provide an indication of a time variable quantity such as distance traveled or speed.

Time quantities can be entered either in decimal notation as a number of hours, minutes or seconds and fractions thereof or in terms of hours, minutes and seconds separated by colons or in terms of day, month and year separated by slashes. The watch/calculator can convert between formats to enable manipulation of the data, no matter what form it is entered in. Since time information must be obtained from the clock register when calculations are performed on real time data, a circuit is provided to catch any update pulses from the watch time standard during the time a calculation is being performed and to thereafter update the information in the clock register to maintain time calibration.

In order to conserve power, the calculator is provided with an inactive or sleep mode in which power is removed from most of the calculator circuitry except when calculations are actually being made. The keyboard is activated during the sleep period and is disabled while the calculator portion is active or awake.

BRIEF DESCRIPTION OF THE DRAWINGS

FIGS. 2A through 2H illustrate the display of the watch/calculator of FIG. 1 in various modes of operation.

FIGS. 10A' through 10L' show details of components in the detailed schematic diagram of FIGS. 10A through 10M.

FIGS. 12A' through 12U' show a detailed schematic diagram of the remainder of the circuit of FIGS. 11A and 11B.

DESCRIPTION OF THE PREFERRED EMBODIMENT

Figure 1:
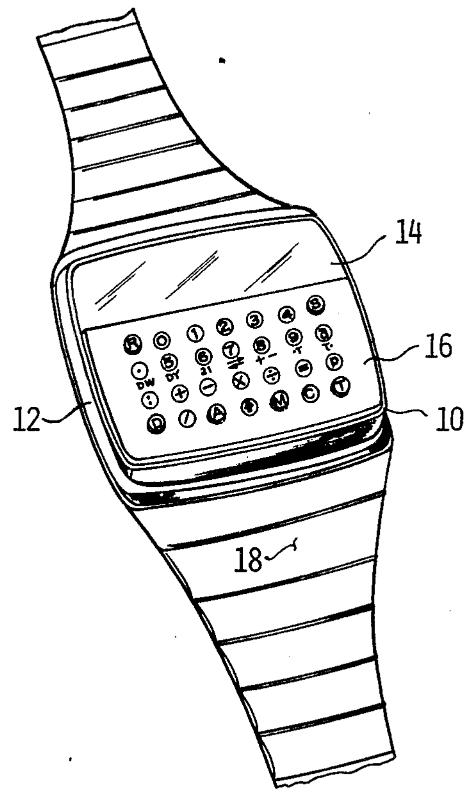
FIG. 1 is a pictorial representation of a watch/calculator.

FIG. 1 shows a pictorial view of a watch/calculator 10 having a case 12 with a display 14 and a keyboard 16. Attached to case 12 is a wristband 18 for holding the watch/calculator on a user's wrist. As will be explained in greater detail below, the keyboard allows the user to activate display 14 to show time and date information, to change the time or date, and to make calculations with time and scaler quantities.

FUNCTIONAL DESCRIPTION

The preferred embodiment of the watch/calculator will first be described from a functional point of view to illustrate how the user may operate the watch/calculator along with how it will respond.

Calculator Portion

The calculator portion of the watch/calculator uses so-called algebraic logic so that key sequences for solving a problem proceed much as one writes the problem on paper. The first operand is entered and this entry is terminated by pressing one of the four operator keys ($+,-,\times,\div$). The second operand is then entered and the calculation is performed and displayed by pressing the equals key.

This operation uses three logical elements: 1 a first operand register to hold the first entry (X register); 2 an operator memory, since the function is not performed immediately but must be stored and then recalled and performed when the equals key is pressed (F register); and 3 a second operand register for the second entry (Y register). It should be understood that the labels "X", "Y" and "F" are used here for convenience, and that one or more hardware registers in the subsequent description may perform the described function.

Initially when the calculator portion is cleared, a zero from the X register is displayed. The first entry, whether it be a keyed-in number or the recall of one of the other registers in either the watch or calculator portion, labeled T, D, A, S, or M, goes into the X register. If the entry is a register recall, it is automatically terminated and may be overwritten by another register recall or a keyed-in entry; that is, it is not necessary to press the clear key to change an entry if it is terminated. Register recalls, results of previous operations, and error conditions are all terminated entries. Likewise, a keyed-in entry which has not been terminated can be overwritten by a register recall, but not by another keyed-in entry without first being terminated or first pressing the clear key. The foregoing discussion of termination and overwriting of entries applies to both the X and Y registers.

When one of the four arithmetic operator keys is pressed, the entry is first terminated (if it was not already), the operator ($+,-,\times,\div$) is stored in the F register, and the X register contents are copied into the Y register. At this point, pressing the clear key will return the calculator to its initial state, clearing both the X register and the F register. If another operator is pressed immediately after the first operator, the second overwrites the first. Thus, in a sequence of operator key depressions with no other intervening key strokes, only the last operator is remembered. Thus, if the wrong operator key is pressed, it is not necessary to use the clear key which would also destroy the X register entry. All that is necessary is to press the correct operator key.

Now the second operand is entered, and since one of the operator keys was just pressed, the calculator circuitry knows that the entry must go into the Y register. This entry will overwrite the copy of the X register data which was placed in the Y register when the operator key was pressed. After this second entry is commenced, a single depression of the clear key will act as a clear entry, clearing only the Y register, leaving the X and F registers intact. This puts the calculator circuitry in the same state as it was immediately after the operator key was pressed. At this point, a new operator key may be pressed, overwriting the old one or a new second operand may be entered if the original second operand entry was in error.

After the second operand is entered, the equals key is pressed. This causes the result X(F)Y to be computed and stored in the X register. The contents of the F and Y registers are preserved. After an equals operation, a new entry will be placed in the X register, so a new calculation can be commenced without using the clear key.

The operation of the clear key may be summarized as follows: if any entry has been made, the clear entry only function is performed when the clear key is depressed. If no entry has been made (i.e. immediately after $+,-,\times,\div$, or $=$), the clear all function is performed when the clear key is depressed, clearing both operand registers and the operator register.

The sequence of events described above permits several special features in the operation of the calculator portion. As was previously mentioned, when an operator key is pressed, the data in the X register is copied into the Y register. This permits automatic squaring and doubling since the second operand is identical to the first operand and does not need to be explicitly entered. For example, the key sequence $6 \times =$ will result in 36, the square of 6. The sequence $24 + =$ will give 48.

The fact that the result of each calculation is placed in the X register permits the use of this result as the first operand in the next operation without re-entering it. Furthermore, if another operator key is pressed after entry of the second operand, in place of the equals key, an automatic equals operation will be performed prior to entry of this operator key. For example, one could evaluate the expression $(6-2)\times 3\div 5$ with the key sequence $6-2=\times 3=\div 5=$. Since an operator after entry of the second operand performs an automatic equals, however, the intermediate equals operations are unnecessary. The shorter sequence $6-2\times 3\div 5=$ will work equally well. Thus, efficient chain operations can be performed.

Recall that after an equals operation, the operator and second operand of the calculation are preserved. This permits two useful features, the first of which is repeat operations upon an accumulating result. For example, one could compute the fourth power of three with the sequence $3 \times = = =$. The calculator portion can be used as a totalizer by hitting $0+1$ and then striking the equals key each time a count is to be registered. The second feature provided by the equals operation may be called an automatic constant, and is similar to the repeat operations feature except that the first operand is changed for each operation rather than being left to accumulate. If one wished to compute the amount of 6% salts tax on each of three items priced $1.69, $2.45, and $7.24, the following sequence would be used: $1.69\times 0.06=$(first answer), $2.45=$ (second answer), $7.24=$ (third answer).

The following is a summary of what happens when an operator key is pressed:

1. If the previous entry is a keyed-in number, it is terminated.
2. If the previous entry was the second operand, it is stored in the Y register and an automatic equals operation is performed (see below).
3. If the previous entry was the first operand, it is stored in the X register.
4. The operator $(+,-,\times,\div)$ is stored in the F register.
5. The data in the X register is copied into the Y register.
6. The following entry (if there is one) will be the second operand and will go into the Y register.

When the equals key is pressed:

1. The arithmetic operation X(F)Y is performed and the result placed in the X register.
2. The operator (F register) and the second operand (Y register) are left undisturbed.
3. The following entry (if there is one) will be the first operand and will go into the X register.

Data Entry and Display

The calculator portion of the preferred embodiment of the present invention permits keyboard entry of three intrinisically different kinds of data: decimal, time, and date. This is accomplished through the use of three keys: the decimal point (.), the colon (:), and the slash (/).

Decimal numbers are entered in the same way as on most present calculators. Up to seven digits plus decimal point and sign may be entered, as illustrated in FIG. 2A. The calculator assumes a number is decimal even though the decimal point has not been explicitly entered, unless and until a colon or slash is entered via the keyboard. The range for which decimal numbers can be entered from the keyboard is .0000001 to 9999999. Display of results, however, covers a greater range as will be described shortly. Entry of leading zeroes or multiple decimal points will be ignored, and when the display is full, further entries ae also ignored.

The colon is used to enter time interval data as illustrated in FIGS. 2B and 2C. The range of time entry is 0.01 seconds (00:00.01) to 99999 hours, 59 minutes (99999:59). Because of the length of the display, this is split into three ranges. If more than five digits are entered first, the number is clearly out of range for time entry, and therefore is assumed to be decimal; any depression of the colon key will be ignored. If from three to five digits are entered and the colon key is pressed, the display format will be HHHHH:MM where H stands for hours digits and M stands for minutes digits. Leading zeroes will be blanked. The minutes are then entered after the colon. If the colon key is the first key pressed, or if one or two digits are entered prior to pressing the colon key, the display may be either HH:MM:SS (Where S stands for seconds digits) or MM:SS.CC (where C stands for hundredths of seconds digits). In these two ranges all leading zeroes will be displayed. After the colon, the next field of information is entered and then either the colon or the decimal point is pressed. If the colon is pressed, the first two fields are assumed to be HH:MM; if the decimal point is pressed, they are taken to be MM:SS. If the entry is terminated prior to pressing the second colon or decimal point, the HH:MM:SS format is assumed.

Digit entry in fields after a colon is slightly different from the normal sequential entry of decimal numbers. Digits (including the first digit) are entered in the right side of the two digit field. As other digits take their place, they shift to the left digit and then disappear if there is a further digit entry. In this way, only the last two digits pressed after a colon are significant and retained in the display: for example, the same results will be obtained with the key sequence: 5 2 6 3 9 4 2 as with the sequence: 4 2. This permits easy error correction without clearing and re-entering the whole number. After pressing the decimal point in the MM:SS.CC mode, normal sequential entry resumes In this mode, when the display is full, further entries are ignored; in the other two modes, even though the display is full, entry can continue in the last field as described above. After the entry is terminated, the minutes and seconds digits must be less than 60, otherwise the display flashes, indicating an error. Fields in which no entry is made are assumed to be zero.

The following examples illustrate time interval entry:

| TIME TO BE ENTERED | | | KEY | TERMINATED |
|---|---|---|---|---|
| HOURS | MINUTES | SECONDS | SEQUENCE | DISPLAY |
| 12345 | 12 | — | 12345:12 | 12345:12 |
| 100 | — | — | 100: | 100:00 |
| 12 | — | — | 12: | 12:00:00 |
| 12 | 34 | 55 | 12:34:55 | 12:34:55 |
| 12 | 34 | — | 12:34 | 12:34:00 |
| — | 23 | 45 | :23:45 or 23:45. | 23:45.00 |
| — | 23 | — | :23 or 23:. | 23:00.00 |
| — | — | 10 | ::10 or :10. | 00:10.00 |
| — | — | 5.6 | :5.6 | 00:05.60 |
| — | 2 | 1.52 | 2:1.52 | 02:01.52 |

Entry of dates is accomplished with the slash key. If more than two digits are entered prior to pressing the slash, the number is considered out of range and must be either a time or decimal entry, so the slash is ignored. If two or fewer digits are entered and the slash is pressed, the digits are assumed to be the number of the month (assuming the month, day, year date format), and the slash is entered in the display as a dash, as shown in FIG. 2D. Then the day is entered; the slash is pressed again; and the year is entered. Digits in the day and year fields enter the display like digits after the colon as described above for time interval entries, so that only the last two digits to be entered are significant. A single leading zero is blanked, if present. If no digits are entered in a given field, it is assumed to be zero although this is treated as an error in the month and day fields. When the entry is terminated, if the month or day fields are zero, or if the month field is greater than 12, or if the day field is greater than 31, the display will flash, indicating an error. If the day is greater than the number of days in the month, but not greater than 31, the date will be automatically adjusted, for example, when terminated, 2/30/75 will become 3/2/75.

The following examples illustrate the entry of detes:

| DATE TO BE ENTERED | KEY SEQUENCE | DISPLAY |
|---|---|---|
| January 1, 1976 | 1/1/76 | 1-1-76 |
| January 1, 1976 | 01/01/76 | 1-1-76 |
| November 23, 1981 | 11/23/81 | 11-23-81 |
| February 29, 1977 | 2/29/77 | 3-1-77 |

In addition to previously mentioned erroneous entries, entries such as colons or slashes after a decimal point, colons after a slash, slashes after a colon, etc. are also ignored.

Display

In order to conserve battery power, the display automatically turns off after a fixed period of time. Since the watch function will be used most often, and because only a quick glance is necessary to see the time, whenever the watch register is displayed it will remain on between two and three seconds only. Any other display, except the stopwatch, will be visible between six and seven seconds. When displaying the stopwatch, the display will remain on continuously.

Decimal numbers are displayed as one would expect. The display has nine full digit positions so that a fixed point decimal number with seven digits, a decimal point, and (if required) a leading minus sign can be displayed. As mentioned previously, the range for keyboard entry is from .0000001 to 9999999., however the display uses scientific notation to present results from $10^{-99}$ to $9.999 \times 10^{99}$. If a result is greater than or equal to $10^7$ or less than $10^{-4}$, the display will automatically shift to scientific notation. In this way a maximum of seven and a minimum of four significant digits are always visible. In scientific notation, illustrated in FIG. 2E, the display accommodates four mantissa digits plus decimal point and sign and two exponent digits plus sign. On overflow, the largest possible number is displayed, and in addition, the display flashes. Trailing zeroes are blanked in fixed point display and in the mantissa of scientific notation display.

Time interval results in the range from zero to 59 min., 59.55 sec. are displayed in the format MM:SS.CC. A leading minus sign indicates a negative time interval number. Leading zeroes are not blanked. In the range from one hour to 99 hrs., 59 min., 59 sec. the display format is HH:MM:SS. Once again, a leading minus may be present and leading zeroes are not blanked. Above 100 hrs. up to 99999 hrs., 59 min. the format is HHHHH:MM. A leading minus sign may be present, but in this range leading zeroes are blanked. On overflow, the largest possible time interval is displayed and the display flashes.

Although only three types of data can be directly entered via the keyboard, there is a fourth type which is displayed. Time of day data cannot be entered, but is created when time interval data is stored into the watch or alarm register, or when the "a" or "p" key is used. Time of day is displayed in a slightly different way from the HH:MM:SS time interval format. First, all the digits are shifted left one position since there is no negative time of day and thus no need for the leading minus. Second, the second colon is blanked. A blank in the last digit indicates AM, a decimal point indicates PM. Thus, eleven PM would be displayed as shown in FIG. 2F, whereas eleven AM would not show the trailing decimal point.

The watch/calculator has both a twelve and a twenty-four hour mode for time of day display. The twenty-four hour mode display is the same as twelve hour mode except that there is no PM indicator. When power is turned on after replacing the battery used to power the watch and calculator circuitry, the watch/calculator wakes up in the twelve hour mode. Whichever mode the watch/calculator is in, it can be changed to the other by pressing the prefix key (↑) and the decimal point key (.). To prevent inadvertant change, however, this sequence will be ignored unless time of day data is being displayed at the time of the change.

As mentioned previously, the display format for dates is MM-DD-YY where M stands for the month digits; D stands for the day digits; and Y stands for the last two digits of the year. This is fine for twentieth century dates, but the watch/calculator can handle dates from Jan. 1, 1900 to Dec. 31, 2099. Twenty-first century dates are displayed similarly to twentieth century dates except that a decimal point in the last position serves as a twenty-first century indicator as shown for the date Dec. 26, 2076 in FIG. 2G. A single leading zero is blanked in either case, and the date digits start in the leftmost digit display position since a leading minus sign is not used in dates.

The watch/calculator also provides the day, month, year mode of date display for those who prefer it. As above, whenever the processor battery is replaced, the watch/calculator comes up in the month, day, year mode. Whichever mode the watch/calculator is in, the other mode may be selected by pressing the prefix key (↑) and the decimal point key (.). As before, to prevent accidental change, this sequence will be ignored unless date data is being displayed. Entry and display of dates is the same in day, month, year mode as in month, day, year mode except that the month and day fields are interchanged.

Other Functions

In order to enter negative decimal numbers and negative time intervals, a change sign key is provided. This function is accessed by pressing the prefix key (↑) and the divide key (÷). If the display shows time of day or date data, change sign is ignored. If this function is used during digit entry, the entry is not terminated; digit entry continues. If a result is a decimal zero or time interval zero, change sign will also be ignored.

For the entry of times in the twelve hour mode, "a" and "p" keys are provided for AM and PM. The depression of either key after the entry of time interval information terminates the entry; and converts it to time-of-day type data. If the "p" key is depressed, the trailing decimal point indicating PM is lit. In twenty-four hour mode, both of these keys serve the identical function of converting time interval data to time-of-day type data and terminating the entry.

For entering dates in the twenty-first century, the prefix key (↑) and the minus key (−) are used. If one wishes to enter a twenty-first century date, it is keyed in exactly as a twentieth century date, and as the very last step prefix (↑) and minus (−) keys are pressed. This will terminate the entry and convert the date to twenty-first century. Attempting to use this function on decimal data or an already terminated date entry will be ignored.

Since all four types of data can be used in arithmetic calculations, some rules have been made defining which type a result is, given the types of the operands and operators. These rules are summarized in the following Operand/Operator Matrix. In the table, D stands for date data, I stands for time interval data, d stands for decimal data, T stands for time of-day-data, and E stands for error. A decimal number used in time computations is assumed to be a decimal number of hours. A decimal number used in date computations is a decimal number of days. Date data is interpreted as a number of days from a base date (i.e. Jan. 1, 1900 is day zero, Jan. 2, 1900 is day one, etc.).

OPERAND/OPERATOR MATRIX first operand / second operand

| + | d | I | T | D |
|---|---|---|---|---|
| d | d | I | T | D |
| I | I | I | T | E |
| T | T | T | E | E |
| D | D | E | E | E |

first operand / second operand

| − | d | I | T | D |
|---|---|---|---|---|
| d | d | I | I | E |
| I | I | I | I | E |
| T | T | T | I | E |
| D | D | E | E | d |

first operand / second operand

| × | d | I | T | D |
|---|---|---|---|---|
| d | d | d | E | E |
| I | d | d | E | E |
| T | E | E | E | E |
| D | E | E | E | E |

first operand / second operand

| ÷ | d | I | T | D |
|---|---|---|---|---|
| d | d | d | E | E |
| I | d | d | E | E |
| T | E | E | E | E |
| D | E | E | E | E |

Determining most of the entries in the table is simply a matter of ascertaining the correct units. Note, however, that a date plus or minus a decimal number (number of days) will give a date result (today's date plus twenty-four days gives the date twenty-four days from now), and a date minus a date gives a decimal number (the number of days between the two dates). Also note that if an operation causes date overflow or underflow, the largest date (12-31-99.) or smallest date (1-01-00) will be displayed and the display will flash.

The Watch Function

The watch/calculator has a peripheral register, the watch register, similar to a memory register, which always contains, once it is set properly, the current time of day. One can recall and view the time of day at any time merely by pressing the time (T) key. The watch/calculator knows that the watch register is a special memory register and therefore continuously updates the display as the seconds tick off. The display format is exactly the same as the time of day format previously described.

To set the watch to the correct time, the user simply enters the time into the display, presses the prefix key (↑) and the time key (T). Immediately after pressing the time key, the value will be loaded into the watch register and the seconds will begin to increment. When a time interval is stored into the watch or alarm register, it is interpreted as in twenty-four hour clock format, that is 0:00:00 is midnight (12AM), 12:00:00 is noon (12PM) and 23:59:59 is 11:59:59 PM. Times outside this range are treated modulo 24, that is, 24 hours is successively subtracted (or added, for negative times) until a time interval between 0:00:00 and 23:59:59 is obtained and this value is used. As explained above, the "a" key and "p" key serve the primary function of converting time interval data to time-of-day data, which in the watch/calculator is also modulo 24. However in the twelve hour display mode, these keys may also be used for twelve hour time-of-day data entry. If the watch/calculator is in the twelve hour mode and at the end of a time interval entry, the "a" key is pressed, the time interval entry is checked to see if the hours digits are equal to 12. If they are, 12 hours is subtracted internally so the entry is 12 AM, displayed without the trailing decimal point. All other values are simply converted to time-of-day, modulo 24. If, under these circumstances the "p" key is pressed and the value is between one hour and less than twelve hours, 12 hours is added internally so that the time-of-day is displayed with the trailing decimal point.

Travelers often change time zones and to facilitate corresponding changes in the displayed time without making it necessary to reset the watch each time, a special key sequence is provided:

T + (entry) ↑ T or

T − (entry) ↑ T or (entry) + T ↑ T.

The entry will typically be a time interval, but a decimal number of hours may be used (e.g. T + 3 ↑ T); a date will clearly cause an error. When the final T key is pressed, the given operation is performed and the result, modulo 24 hours, is loaded in the watch and displayed. To insure that no time is lost in this operation, the equals key must not be used. The sequence T + (entry) = ↑ T will usually cause loss of a second or two in the watch. If the result causes an increment or decrement past midnight, the date register will be automatically adjusted. For example, if T + 48 ↑ T is performed, the time will remain the same, but the date register will now contain the date two days from now.

The current time of day may be used as an operand in many arithmetic operations. It is important to remember that the value of time of day used in the operation is the actual time of day when the equals key is pressed, that is, when the operation is actually performed, not the time of day when the T key is pressed. In other words, the sequence T + 3 = will give a different answer than the sequence T+3(10 minute wait)=. The same holds true if the stopwatch register is running and is used in a calculation. The value used is the value when the calculation is actually performed.

The Date Function

The watch/calculator uses a portion of the clock register as a special memory register to keep the current date. To recall the date, the user simply presses the date (D) key. The date is displayed in the format described previously. To set the date, the user makes the appropriate date entry in the calculator, presses the prefix key (↑) and the date key (D). The date register works in conjunction with the watch register such that each time the watch increments past midnight, the date is incremented accordingly. The watch/calculator has an automatic 200 year calendar (Jan. 1, 1900 to Dec. 31, 2099) which takes care of leap years and different length months automatically, so the only time the date needs to be reset is when the processor battery is changed.

The Alarm Function

The alarm register contains a fixed time of day. When the alarm is armed, this time of day is constantly compared to the value in the watch register. When the two become equal, the alarm buzzer sounds. To recall and view the time of day in the alarm register, the user simply presses the alarm key (A). This display is the same time-of-day format described previously, except that the trailing digit position may contain, in addition to a decimal point PM indicator, a dash to indicate that the alarm is armed, as shown in FIG. 2H. When the alarm is triggered and the buzzer sounds, the alarm automatically is disarmed and the dash will disappear. To set the alarm, the user enters the appropriate time exactly as in setting the watch, then presses the prefix key (↑) and the alarm key (A). When the alarm is loaded, it is automatically armed. To toggle the armed/-disarmed state of the alarm, the user first displays the alarm by pressing A, then presses ↑ A. It should be mentioned that the alarm is a 24 hour alarm internally (it will, of course, be displayed in whichever mode is selected, either 12 or 24 hour mode), so that if the alarm is set for 5 PM (5:00 00.) and the watch reads 5 AM (5:00 00), the alarm will not trigger. The alarm cannot be set for a specific date; it triggers the first time a match between the stored time and real time occurs.

Even though the stopwatch can be used as a timer as will be described shortly, it is sometimes desirable to use the alarm in this manner. The key sequence for doing this is T+(entry) ↑ A or (entry)+T ↑ A.

To set the alarm to go off ten minutes from now, one would perform the sequence T+:10 ↑ A. The ten minute interval begins at the moment the A key is pressed. The sequence T−entry ↑ A can also be used. This sequence is identical to that described for the watch offset; however, the result is loaded into the alarm register only and the date is not affected.

The Stopwatch and Timer

The watch also has a special register which serves as both a stopwatch and timer. To display the contents of the stopwatch, the user presses the stopwatch key (S). Since this register may be continually changing, the display is constantly updated, the same as when watch information is displayed. To load the stopwatch, the user enters the desired time interval in the watch/calculator, presses the prefix key (↑) and the stopwatch key (S). The desired time interval must be less than 100 hours. Attempting to load date or decimal data into the stopwatch will flash an error, except for decimal zero, which is allowed in order to easily clear the register. The stopwatch is displayed in the time interval format previously described. If the stopwatch holds a number less than one hour, the display is in the MM:SS.CC format; if the stopwatch contents are greater than or equal to one hour, the format is HH:MM:SS.

When the stopwatch register contents are being displayed, pressing the stopwatch button again will start it running. If the stopwatch is displayed and running, pressing the stopwatch key again will stop it. Pressing the S key when the stopwatch is not being displayed simply recalls it, without modifying the run/stop state of the register. In other words, when the stopwatch is displayed, the run/stop state may be toggled by pressing the stopwatch key.

If the stopwatch is initially loaded with zero when started, it will increment every hundredth second. If loaded with some nonzero time interval when started, the stopwatch will count down or decrement. When it reaches zero, the buzzer will sound, and the stopwatch will then immediately begin to increment from zero. This is the timer mode. Since the same circuitry is used for both the watch and stopwatch, the stopwatch will count modulo 24 hours when incrementing. When decrementing, however, it can be set to any time interval less than 100 hours and it will count down to zero properly.

An important feature connected with the stopwatch is dynamic, or updated, calculations. This is accessed with the key sequence S×(decimal entry)= or S÷(decimal entry)=.

If the stopwatch is running and one of the above sequences is executed, when the equals key is released, the operation will be performed once each second and the display will be updated appropriately. The display will remain on in this mode. Upon exit from this mode it may be necessary to hold a key down for up to one second until the calculator recognizes it. These functions can be used for displaying updated distance traveled information, for example, by multiplying speed (rate of travel) times updated time.

The Memory Register

Many of the registers described previously were special purpose in that they are either constantly changing or are used for particular operations, usually with a certain type of data. The watch/calculator also has a general purpose memory register which can be used to store any type of data. To recall the contents of this memory, the user simply presses the memory key (M). When the prefix key (↑) and the memory key (M) are pressed in sequence, any previous uncompleted operation is performed and the result is stored in the memory register. If watch or stopwatch information is stored in the memory, it is converted to fixed time of day or fixed time interval data at the instant the M key is pressed. This does not disturb the normal operation of the watch or stopwatch. This feature is especially useful for storing a "split" from the stopwatch.

It should be noted that a special automatic equals feature can be used with any of the registers (M,A,D,T,S). If the "store" key and any register key is pressed when the equals operation would normally be expected, the operation will be performed automatically prior to storing the value in the register. For example, the sequence 3+4→M will show 7 in the display and also stored in the M register. The time zone change feature and use of the alarm as a timer are both further examples of this automatic equals feature.

Special Functions

Beyond the functions and features already described, the watch/calculator has some preprogrammed functions and conversions which further increase the utility of the machine.

The date function provides the month, day and year, but it is often desirable to known the day of the week also. A function has been provided to provide this information. With any date in the display, the user presses the prefix key (↑) and the colon key (:), and the data will be converted to a decimal number from one through seven indicating the day of the week where Monday is one, Tuesday is two, etc., and Sunday is seven. Performing this function on time or decimal data will be ignored.

Sometimes it is also useful to know the number of the day of the year. This function is accessed, with a date in the display, by pressing the prefix key (↑) and the plus key (+). The date is converted to a decimal number from one to 366 corresponding to the day of the year.

A change sign function has been implemented primarily for negative time interval and decimal entries. This is accessed using the prefix (↑), divide (÷) key sequence. When used, if the display contains decimal or time interval data, the sign changes. Otherwise the sequence is ignored.

In computations involving time it is often necessary to convert from hours, minutes, seconds format to a decimal number of hours and vice versa. These two functions are also provided. Time of day or time interval data is converted to decimal hours by pressing the prefix (↑) and "p" keys. Performing the function on decimal data will be ignored. A decimal number representing a time of day is converted to a time interval by pressing the prefix (↑) and equals (=) keys.

Once in a while, when evaluating an expression, it is more convenient to compute the value of the second operand in a subtraction or division before the first operand. It then becomes necessary to use the M register or write down this intermediate result. To solve this problem, an exchange function has been provided in the watch/calculator which switches the first and second operands in the calculator. This function is called by pressing prefix (↑) and times (x) keys. For example, if one wishes to subtract two from three, but the entry has been 2−3, it is merely necessary to press ↑ x to reverse the operands, and then equals to complete the operation. This feature is also useful for viewing the second operand, which otherwise could not be directly displayed.

Since the display turns itself off after a given period of time, there is a need to be able to view what the display contains without destroying the data, that is, a display turn-on function. This is accomplished by pressing the display read key (R). The R key is also used as a stopwatch clear when the stopwatch is displayed and stopped. This key will not disturb the stopwatch in any way when it is not displayed, but when thhe stopwatch is displayed and running, pressing the R key will take a split. In this case, the stopwatch continues to run undisturbed, even through the display freezes at the value displayed when the key was pressed. To view the running contents of the stopwatch again, the user presses the S key.

Error Conditions

Even though an error has occurred and the display is flashing, the data in the display is still usable. Any entry is terminated, and the keyboard is active; thus all key depressions are executed just as they normally would be. In general, the key or function which caused the error is not executed and the calculator is in the state in which it was prior to pressing the key which caused the error. In the case of overflow, however, the function has of course already been executed. The following is a list of error conditions for the watch/calculator:

1. Overflow/underflow—on overflow the largest representable number is displayed and flashed. Depending on type, this will be ±9.999 99, ±99999:59, or 12-31-99.; on decimal or time underflow, zero is substituted and the display does not flash. On date underflow, 1-01-00 is flashed.
2. Division by zero—the operation is not performed; the zero blinks.
3. Hours or minutes greater than 59; display blinks.
4. Month equal to zero or greater than 12, day equal to zero or greater than 31; display blinks.
5. Attempt to store wrong data or out of range data into T, D, A, or S registers; display blinks.
6. Arithmetic operations with incompatible operands. Refer to result type table previously described; display blinks.
7. A special error can occur with the key sequence T+(or −)(entry) ↑ T. If the result causes time interval overflow (±99999:59), the operation will be performed, but the display will blink. The display may be restored to its previous state by repeating the sequence, causing overflow to occur in the opposite direction.

| Summary of Key Sequences | |
|---|---|
| 0 through 9, ., :, / | digit entry |
| S | recall, start/stop stopwatch |
| ↑T, ↑D, ↑M, ↑S | store into register |
| ↑A | store into, toggle arm/disarm alarm register |
| C | clear all, clear entry |
| ↑ · | month, day, year/day, month, year mode toggle (only when date displayed) |
| ↑ · | 12/24 hour mode toggle (only when time of day displayed) |
| ↑ ÷ | change sign |
| ↑ − | 21st century function |
| a, p | AM/PM function |
| ↑ × | exchange first and second operand |
| ↑ + | date to day of year; |
| ↑ = | decimal hours to hours, minutes, seconds |
| ↑ : | date to day of week |
| R | display recall, clear stopwatch (only during stopwatch display), split |
| ↑ p | hours, minutes, seconds to decimal hours |

SYSTEM ARCHITECTURE

Figure 3:
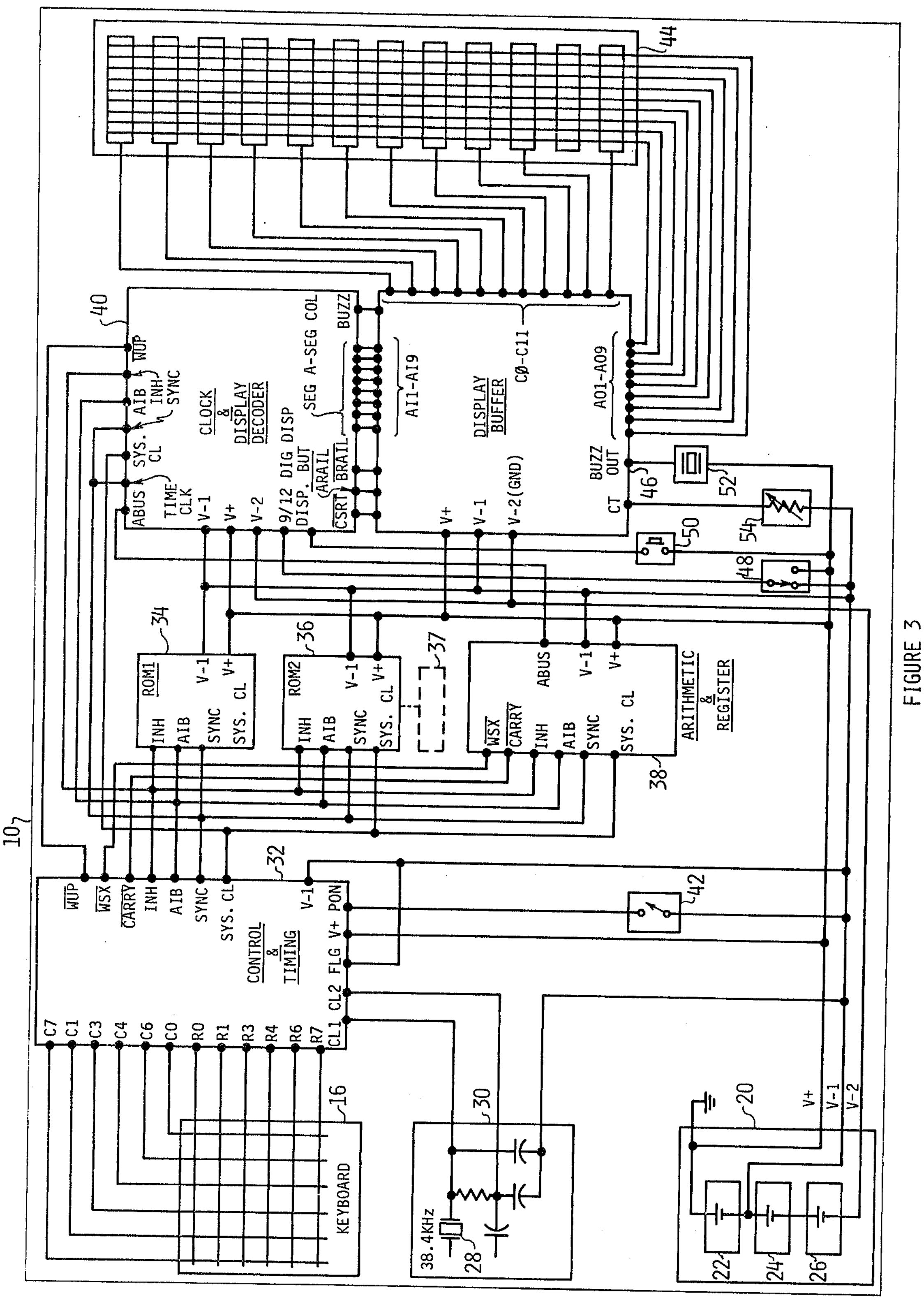
FIG. 3 is a block diagram of the preferred embodiment of the present invention.

FIG. 3 shows a block diagram of the system architecture of watch/calculator 10. A power supply 20 includes three series connected batteries each having a nominal voltage of one and a half volts. The system in general runs off only one of the batteries, battery 22. The other two batteries, batteries 24 and 26, are used for the LED display, since the display has a higher current drain than the other parts of the circuitry maximizing the life of battery 22. The user can replace batteries 24 and 26 without removing power from the watch and calculator circuitry, thereby allowing that circuitry to continue functioning while display batteries are changed, saving the user the bother of resetting the time and data after every battery change.

The frequency standard for the watch and calculator circuitry is a free-running oscillator using a crystal 28 having a frequency of 38.4 KHz. The oscillator, except for tuning elements 30, including crystal 28, is part of a control and timing (C&T) chip 32. The oscillator is a standard amplifier with a crystal-pi type feedback network 30.

Keyboard 16 is connected to C&T chip 32 which scans the switch contacts connected in rows and columns in a manner well known in the art. The scanning is performed, however, only when the watch and calculator circuits are in an inactive or "sleep" mode, which will be described in greater detail later. When a key is depressed, a coincident signal will be present on one of the row inputs R0, R1, R3, R4, R6, R7 and on one of the column inputs C0, C1, C3, C4, C6, C7 to the C&T chip 32, indicating which key was depressed. A code identifying that key is stored in a key register on the C&T chip which gives the location of that key. The depression of a key also causes the watch and calculator circuitry to become active or "wake up". The code stored in response to the key actuation is used as an address for instructions stored in one of the Read Only Memories (ROMs) 34 and 36 connected to the C&T chip. The ROMs receive an address, specified by the code in the key register, on an Address/Instruction Bus (AIB) line causing it to go to a particular location in one of the ROMs. In response, an instruction is issued on the same AIB line by the ROM addressed during a different part of the operating cycle of the watch/calculator.

The C&T chip also performs the function of generating all the timing signals for the rest of the calculator circuitry. Using the oscillator output signal, it generates a system clock and a signal on a line labeled SYNC to synchronize the entire system. The C&T chip generates an inhibit signal on an INH line which stops the various circuits during the sleep mode, and it has a $\overline{\text{CARRY}}$ input to generate branching addresses in response to a "no carry" signal from an Arithmetic and Register (A&R) chip 38. There is a word select signal on a $\overline{\text{WSX}}$ line which tells A&R chip 38 what portion of the words in the A, B and C registers it should act on. Also the C&T chip receives a wake-up signal on a $\overline{\text{WUP}}$ line from a Clock and Display (C&D) chip 40 to wake up the watch and calculator circuitry. In addition there is a power-on switch 42 for initialization connected to the C&T chip.

The A&R chip has all the registers used for data manipulation, with the exception of display registers which will be described later. These data manipulation registers include A, B, C, D, M and F registers as well as a decimal adder/subtracter. Data is transferred on a line labeled ABUS which connects the A&R chip to the C&D chip. The A, B, C, D, M and F registers on the A&R chip are used for data manipulation according to instructions on the AIB line during the time the calculator is in the "awake" mode. A carry signal is produced by the A&R chip when there is an arithmetic overflow, and it is sent on the $\overline{\text{CARRY}}$ line to tell the C&T chip whether to perform a branch operation.

The ROMs used in the preferred embodiment each store 1024 words, and additional ROMs can be added as indicated by block 37 drawn in dashed lines. A more detailed description of the ROMs, including the programs stored on them, is given in a later section.

Data transferred to the C&D chip is stored in registers for display in display 44 connected to the C&D chip by display buffer 46.

The C&D chip includes a clock register, a stopwatch register, a calendar register, an alarm register, and a display decoder. Although the calculator functions are performed by the C&T, ROM and A&R chips, the time-keeping functions are, for the most part, performed by the C&D chip. Time and date information is entered through the keyboard via the C&T and A&R chips in the same manner that numerical information for the calculator circuitry is entered, but it is then stored in one of the clock, stopwatch, data or alarm registers, depending on the instruction keys that are actuated. The clock signal on a TIME CLK line is used for timing the stopwatch, alarm, date and clock circuits. The calculator circuits could be run at any frequency, but the clock counting circuits must run on a signal of 800 Hz. The calculator circuits can thus run at some higher frequency and a divider on the C&T chip counts down the system clock signal so that the clock circuits receive a signal at 800 Hz. In the preferred embodiment a system clock signal of 38.4 KHz is divided by 48 to give 800 Hz.

The C&D chip is essentially a stand-alone chip. Data from the A&R chip is stored in the clock or stopwatch register. The clock register and the calendar register are contained in a single register 48 bits long that is incremented once every second to keep the time and date information current. The stopwatch register can be incremented or decremented every hundredth of a second according to instructions on the AIB line. On the C&D chip, one incrementor is used for both the clock and the stopwatch registers, but the increment signals are slightly skewed in time so that the registers are not incremented simultaneously.

The alarm register stores a number representing a time at which the alarm is to ring, and this stored number is continuously compared to the time in the clock register. When the numbers are the same, an alarm signal is generated. However, the alarm signal is gated by alarm armed signal that is generated by depressing the alarm key, labeled "A", on the keyboard. The gated alarm signal, called "buzzer", appears on the C&D chip BUZZ output terminal. The audible alarm signal is produced by using some of the clock signals on the C&D chip to modulate the 800 Hz clock signal. This signal is applied to a piezoelectric buzzer 52 in the watch/calculator case by the Display Buffer chip to make a "beeping" tone. The alarm armed signal is canceled automatically every time the buzzer is activated.

The rest of the C&D chip has a display register and decoder on it. The display register contains the information from one of the other registers on either the A&R or C&D chip. That display register is then decoded into a 9 segment display signal: the standard 7 segments of the character 8, a decimal point and a colon. The display signal appears on the SEG A through SEG COL outputs from the C&D chip.

The cooperation of A&R chip with the C&D chip in handling time information can be illustrated with the command to display a time quantity. To initiate the command the user will push the time button, labeled "T" in FIG. 1. The C&T chip will detect and identify the depression of that button and issue an appropriate address to a ROM. The ROM will then, in turn, issue a series of instructions to the rest of the circuitry. One of the instructions is to take the data from the clock register into the A register of the A&R chip. In the clock register, the time data is stored as a number of hours, minutes and seconds in 24 hour format. For the display, it must be formated such that it is shown in either the 12 or 24 hour mode, as selected by the user. In addition, colons are inserted to separate the hours, minutes and seconds. This punctuation is inserted by shifting the data and inserting a code that will later be interpreted as a colon. Also, if the watch/calculator is in the 12 hour mode, an AM or PM indicator code is inserted. That data in the A register is then again transferred out on the ABUS to the display register in the C&D chip. The information in the display register is then decoded and is made available on the SEG A–SEG COL lines.

At this point the calculator circuitry has finished its task, and it goes into the sleep mode. However, it is still desirable to display current time, without waking up the calculator circuitry every second. To accomplish this the time data comes directly from the clock register into the display register in the C&D chip to allow the C&T, ROM and A&R chips to remain in the sleep mode. However, there are some restrictions on the transfer of data from the clock register to the display register since the display register cannot do any formating itself; it just takes what is in the clock register and decodes it. The clock register on the other hand just contains time data; it does not contain colons or AM and PM indicators. In order to properly transfer the data from the clock register to the display register itself, the digit positions in the display register that have colons and AM or PM indicators are skipped and only the minutes and seconds positions are filled. The hours position is also not changed in this process. Thus only 4 digits in the display register are updated by information in the clock register without waking up the calculator circuitry.

Then, once every hour on the hour, a wake-up signal on the $\overline{\text{WUP}}$ line will activate the calculator circuitry and, in essence, simulate the depression of a key. One reason this is done is because the C&D chip does not store information telling whether the watch/calculator has been set in the 12 hour mode or the 24 hour mode. When the wake-up signal activates the calculator circuitry, that circuitry remembers that the watch/calculator is still in the time display mode and it again takes the time from the C&D chip clock register into the A register through the ABUS, formats it according to the selected display mode and sends the formated, updated information to the display register. Then, as before, the calculator circuitry will return to the sleep mode, while the minutes and seconds information is updated in the display register.

A similar process is performed for the stopwatch function. When the stopwatch button on the keyboard, labeled "S" in FIG. 1, is depressed, the C&T chip decodes it as a stopwatch button and sends the appropriate address to the ROM chips. The ROM chips in turn respond with a sequence of instructions for the calculator circuitry. One of those instructions is to take the contents from the stopwatch register, put it into the A register, and format it. The format depends upon whether the contents of the stopwatch register are more or less than one hour. For less than one hour, the format is minutes, colon, seconds, decimal point and then hundredths of seconds for a 9 digit display. For more than one hour, the format would be hours, colon, minutes, colon, seconds. In this way the most significant digits are always shown. As before, the formated display is transferred from the A register to the display register, and the calculator circuitry goes into the sleep mode. The display register communicates directly with the stopwatch, register, updating the hundredths of seconds, the seconds and the minutes or the hours. The decision to change the format of the displayed data when the stopwatch goes past one hour is made by the stopwatch register circuitry, so that a wake-up signal is issued to cause a format change for the stopwatch.

The formating on the display is also controlled by a 9/12 digit display switch 48. If the switch is in the 12 digit display position all the digits of the stopwatch would be displayed at all times: hours, colon, minutes, colon, seconds, decimal point, hundredths of seconds. Thus there would be no need for a format change in the stopwatch display when the stopwatch passes the one hour mark in the 12 digit display mode.

Another signal input on the C&D chip is the input for a display pushbutton, DISP. BUT. In order to conserve battery power, the C&D chip includes a timer to automatically turn off the display after predetermined amount of time. Thus it is necessary to have a display button 50 to allow the user to activate the display. When time quantities are being displayed, the display will turn off after approximately three seconds, and when calculator information is being displayed, it will turn off after approximately seven seconds. The stopwatch is an exception: since a user typically wants a continuous output from a stopwatch, the display remains on in the stopwatch mode until the user turns off the display with another key.

The C&D chip also generates other clock signals to drive a cathode driver in the Display Buffer: $\overline{\text{A RAIL}}$, $\overline{\text{B RAIL}}$ and $\overline{\text{C SRT}}$. Those three clock signals, along with the segment signals on SEG A–SEG COL are also sent to the Display Buffer chip. Basically the Display Buffer chip takes the low level segment signals from the C&D chip and amplifies them to drive Light Emitting Diode (LED) anodes in the display. The LED cathodes are scanned in sequential order determined by the signals on $\overline{\text{C SRT}}$, $\overline{\text{A RAIL}}$ and $\overline{\text{B RAIL}}$. The LED's are thereby segment multiplexed by turning on the cathodes for one digit at a time and scanning the anodes for that digit. A shift register in the Display Buffer chip keeps track of which cathode is to be turned on to minimize the number of connections between the rest of the circuitry and the display. One other external component used in conjunction with the Display Buffer chip is a display current trimmer 54. Through this single resistor the current through each one of the cathodes is controlled. There is a constant current sources for the LEDs in the Display Buffer chip so that there is a uniform intensity at a fixed point and the level of the intensity is controlled by the display current trimmer.

CONTROL AND TIMING CIRCUIT

Figure 4A:
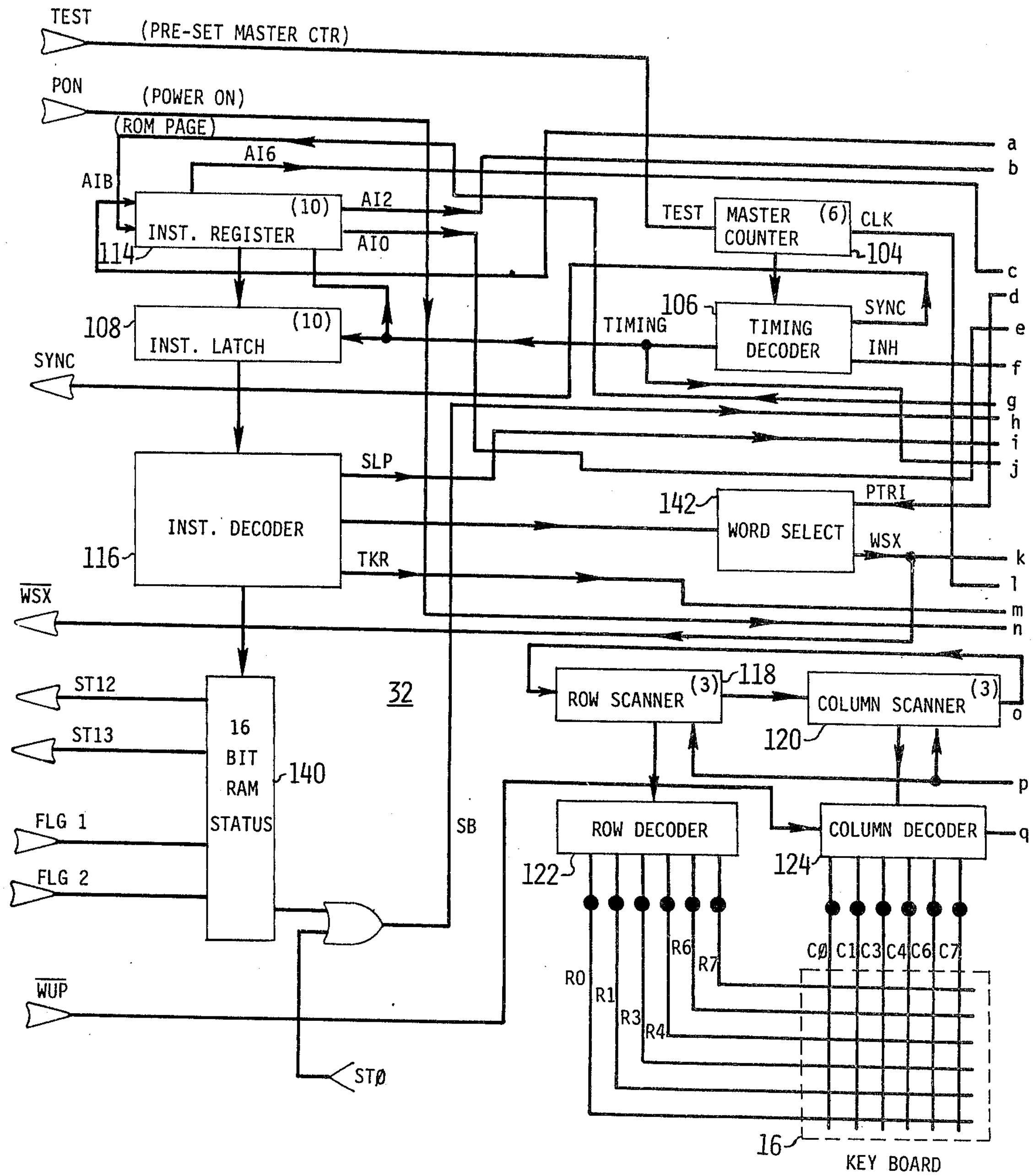
FIGS. 4A and 4B show a block diagram of a control and timing circuit.
Figure 4B:
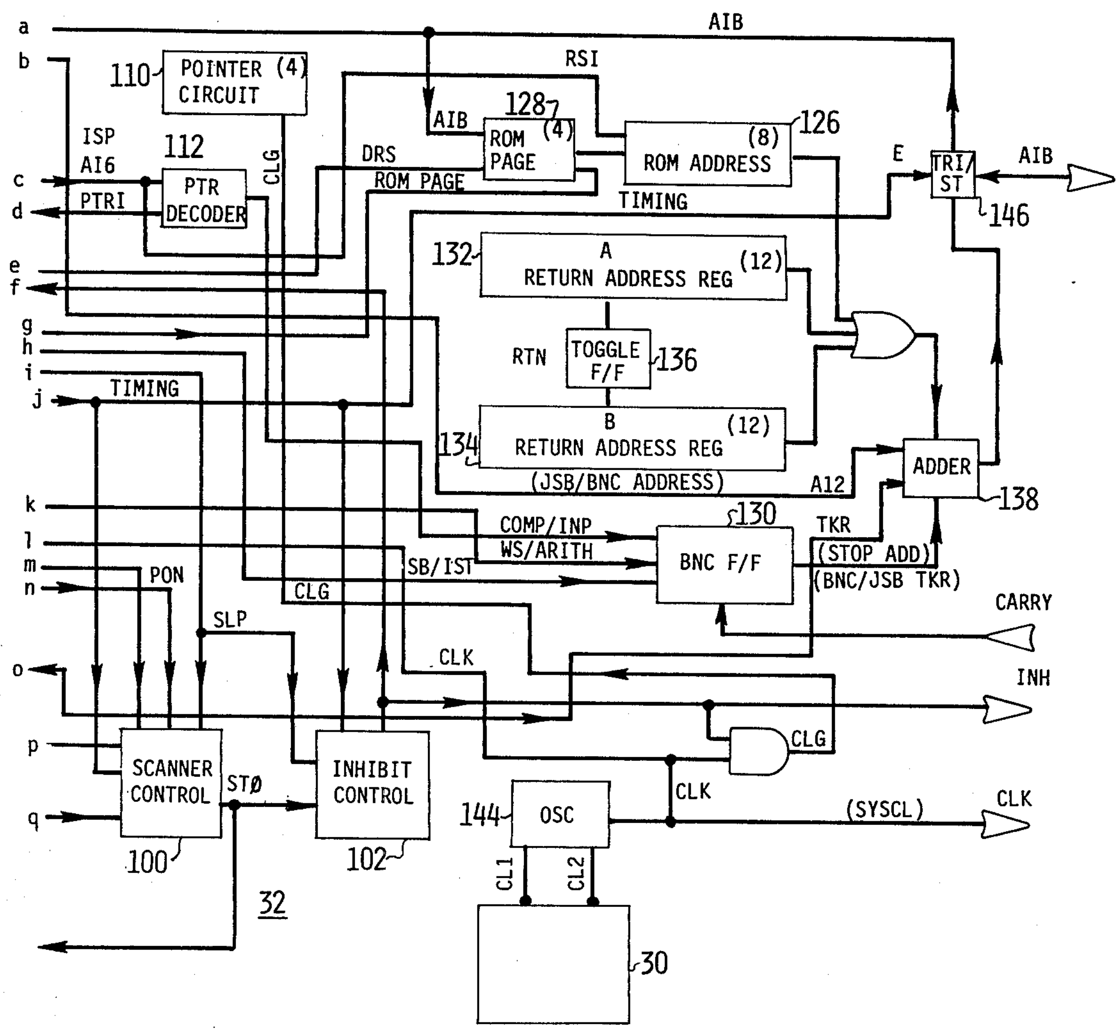
Figure 5A:
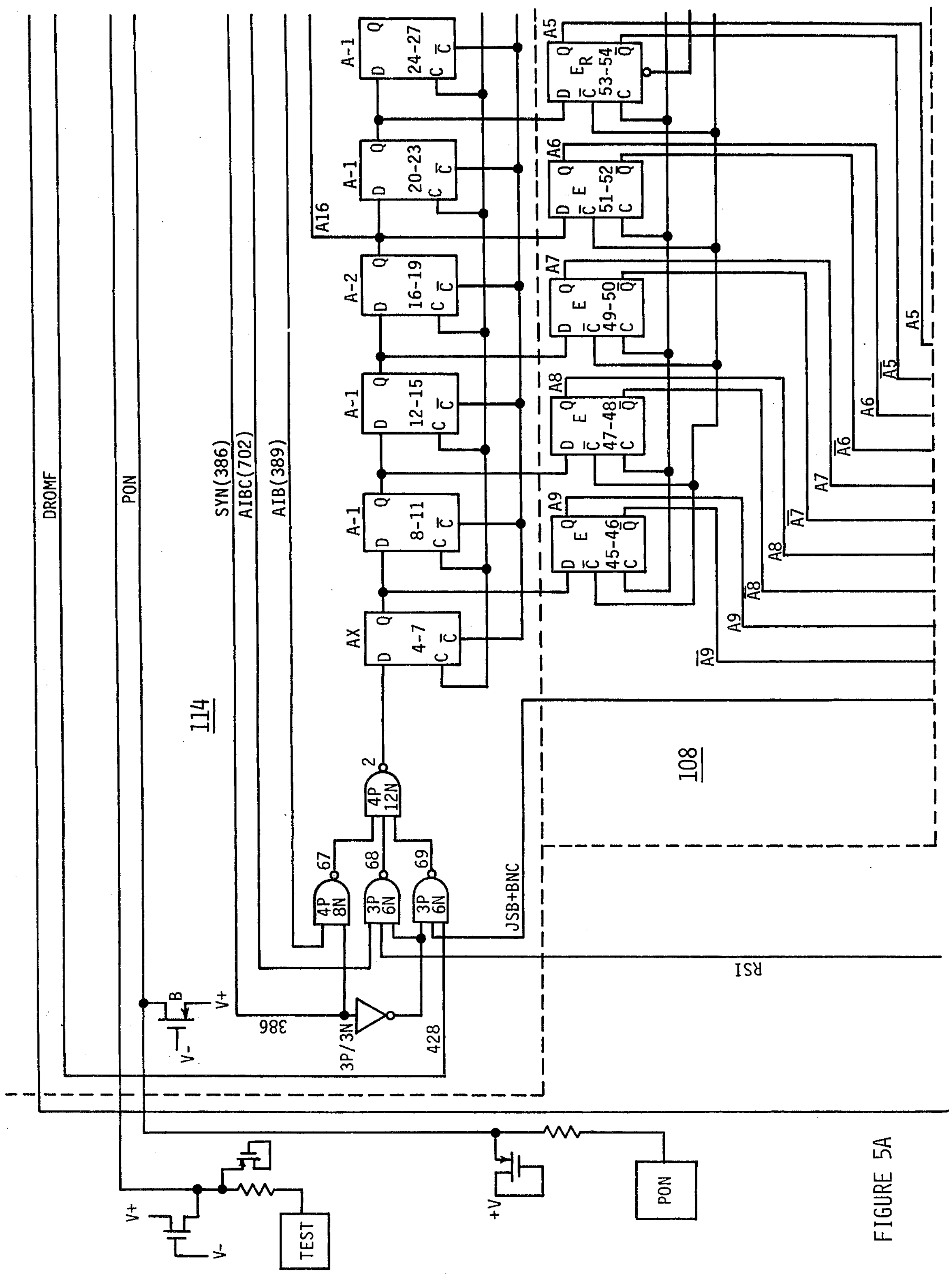
FIGS. 5A through 5R show a detailed schematic diagram of the circuit of FIGS. 4A and 4B.
Figure 5B:
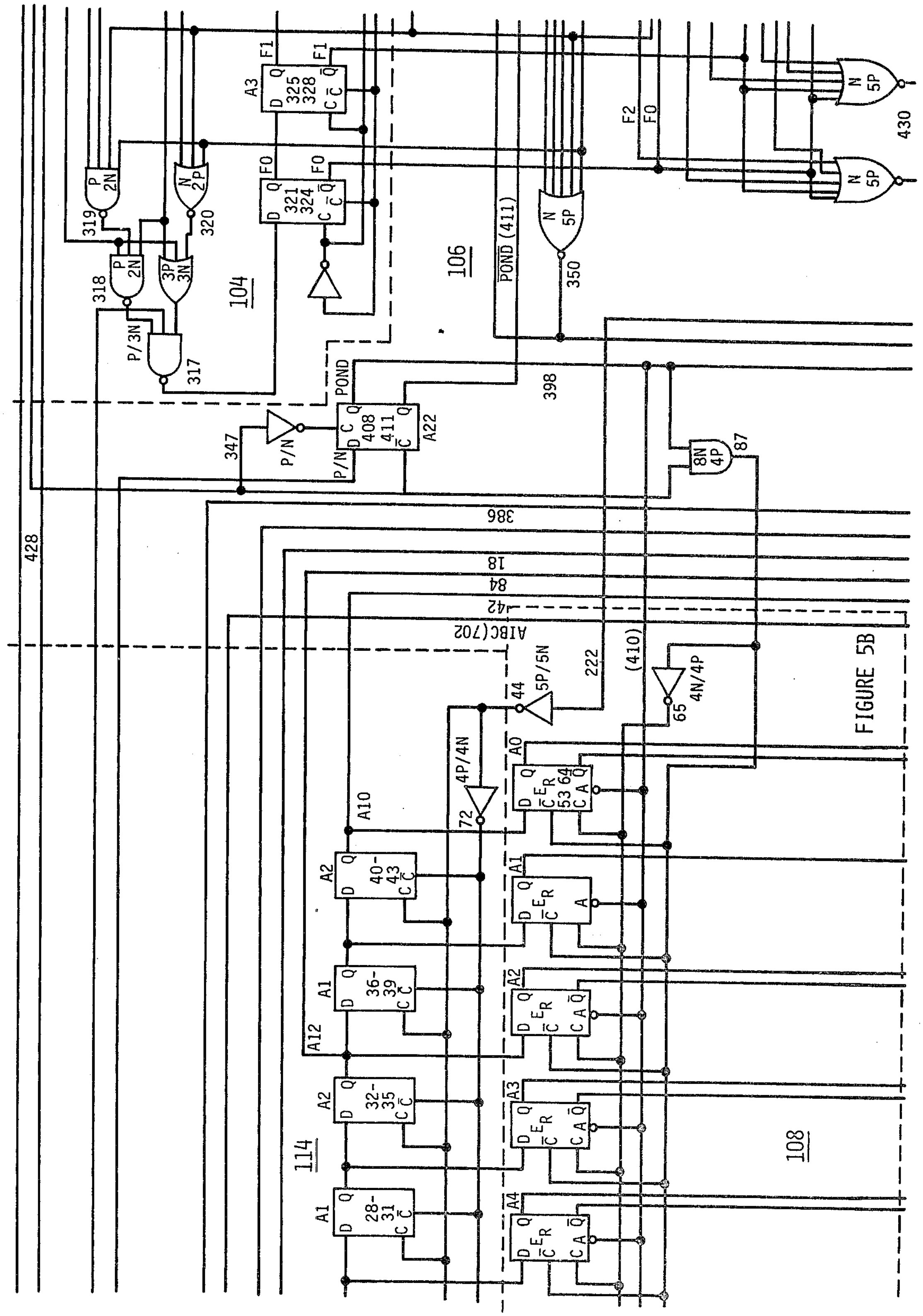
FIG. 5S is a figure map showing how the detailed schematic diagrams of FIGS. 5A through 5R fit together.
FIGS. 5T through 5V show details of components in the detailed schematic diagram of FIGS. 5A through 5R.
Figure 5C:
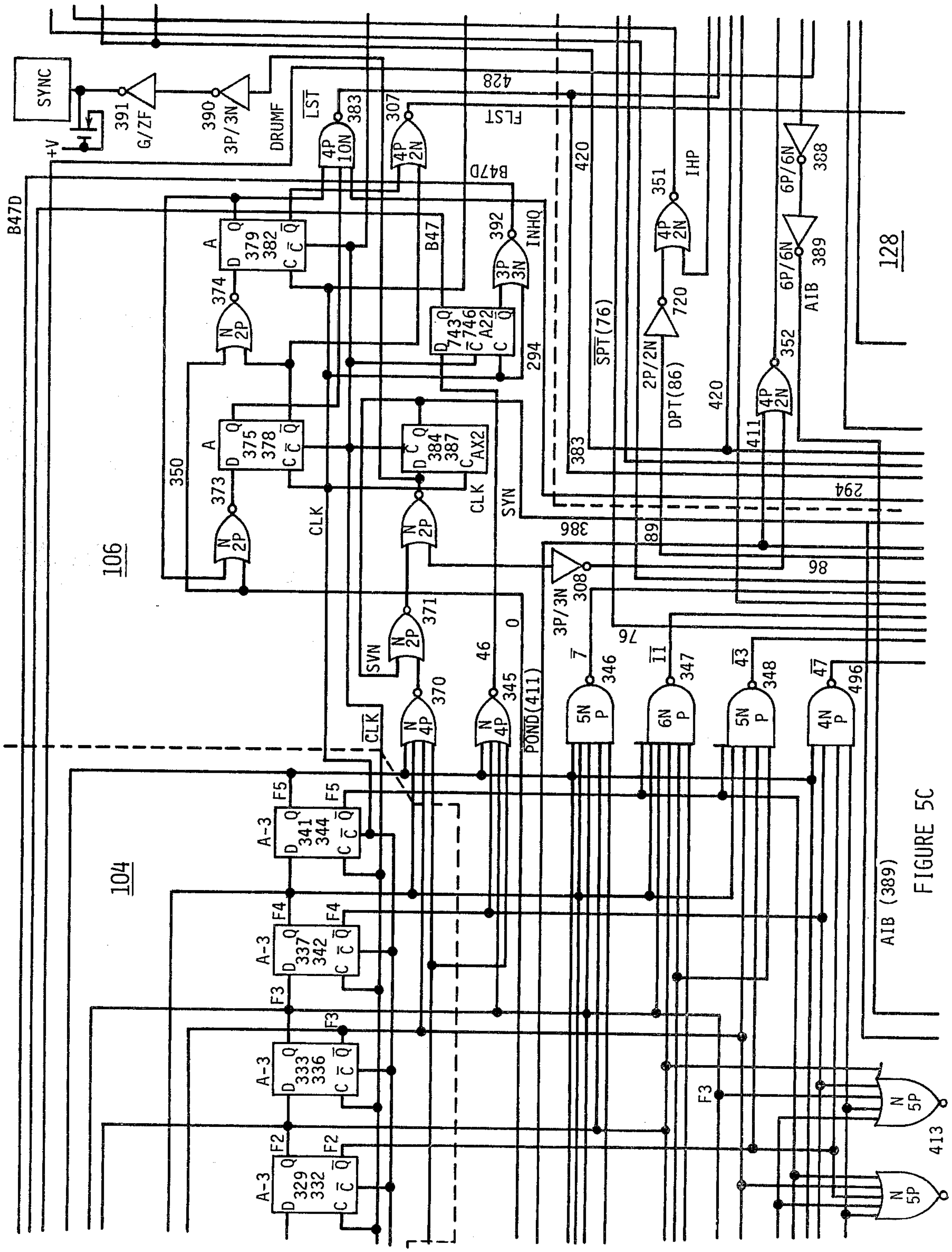
Figure 5D:
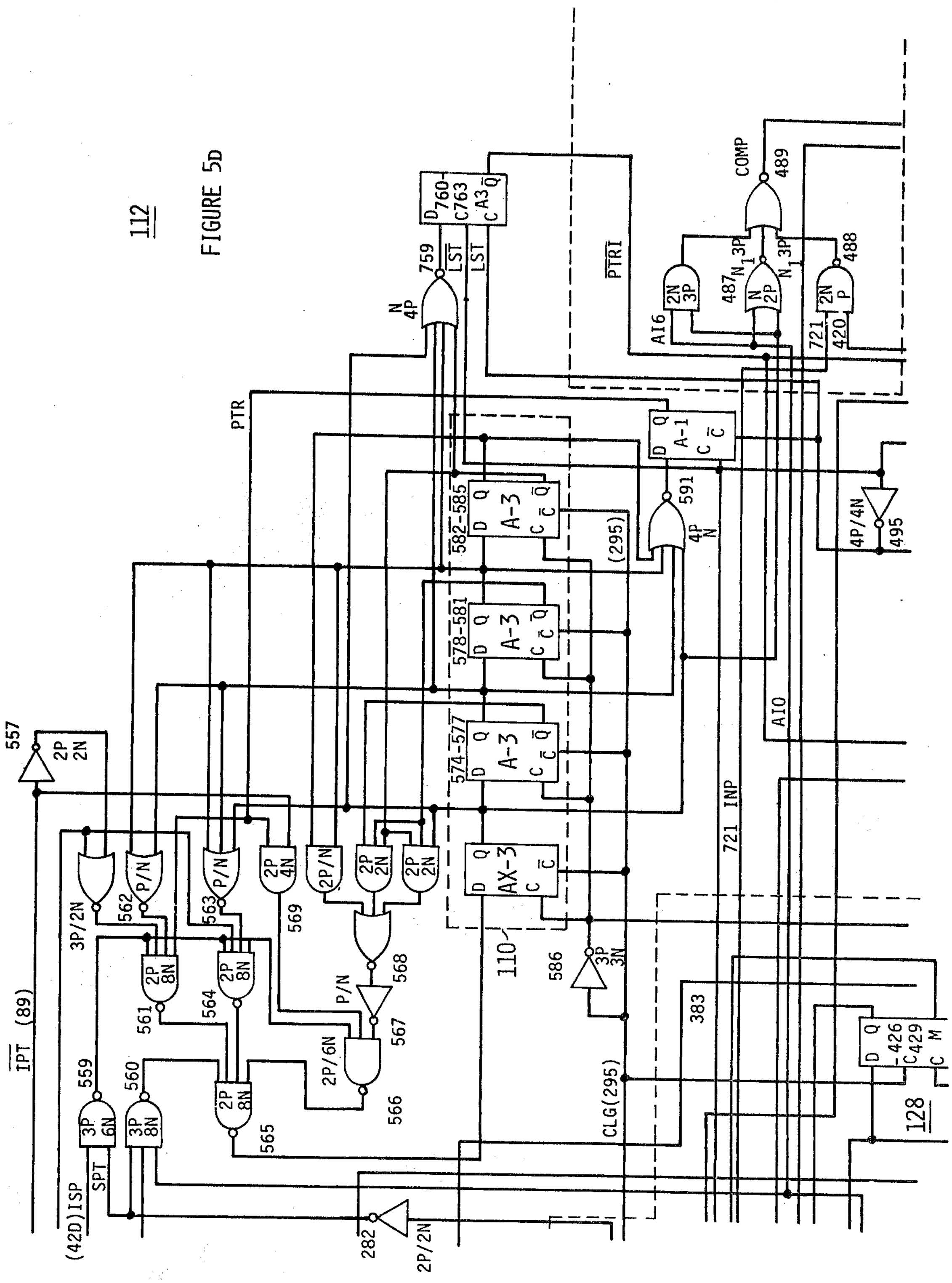
Figure 5E:
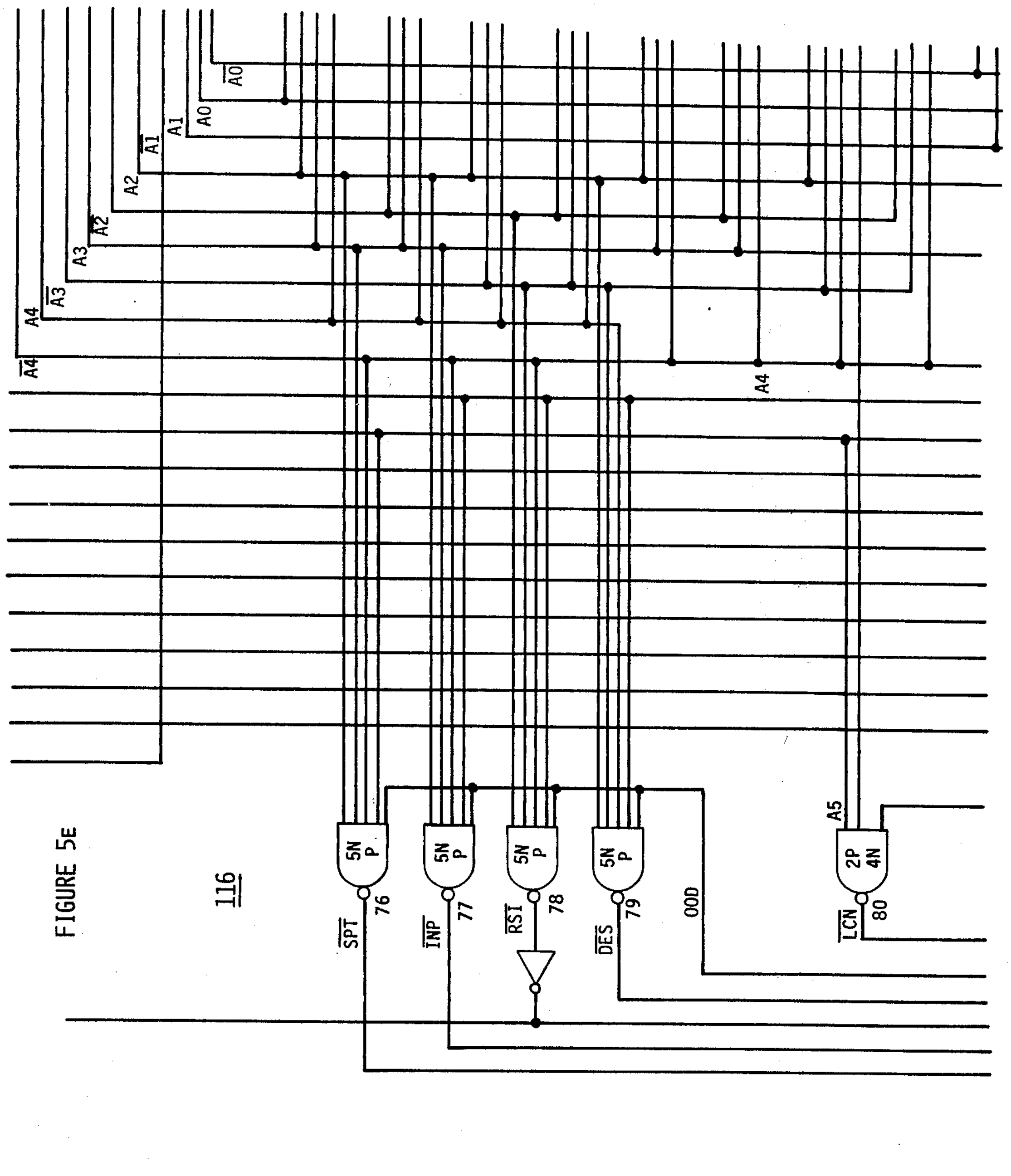
Figure 5F:
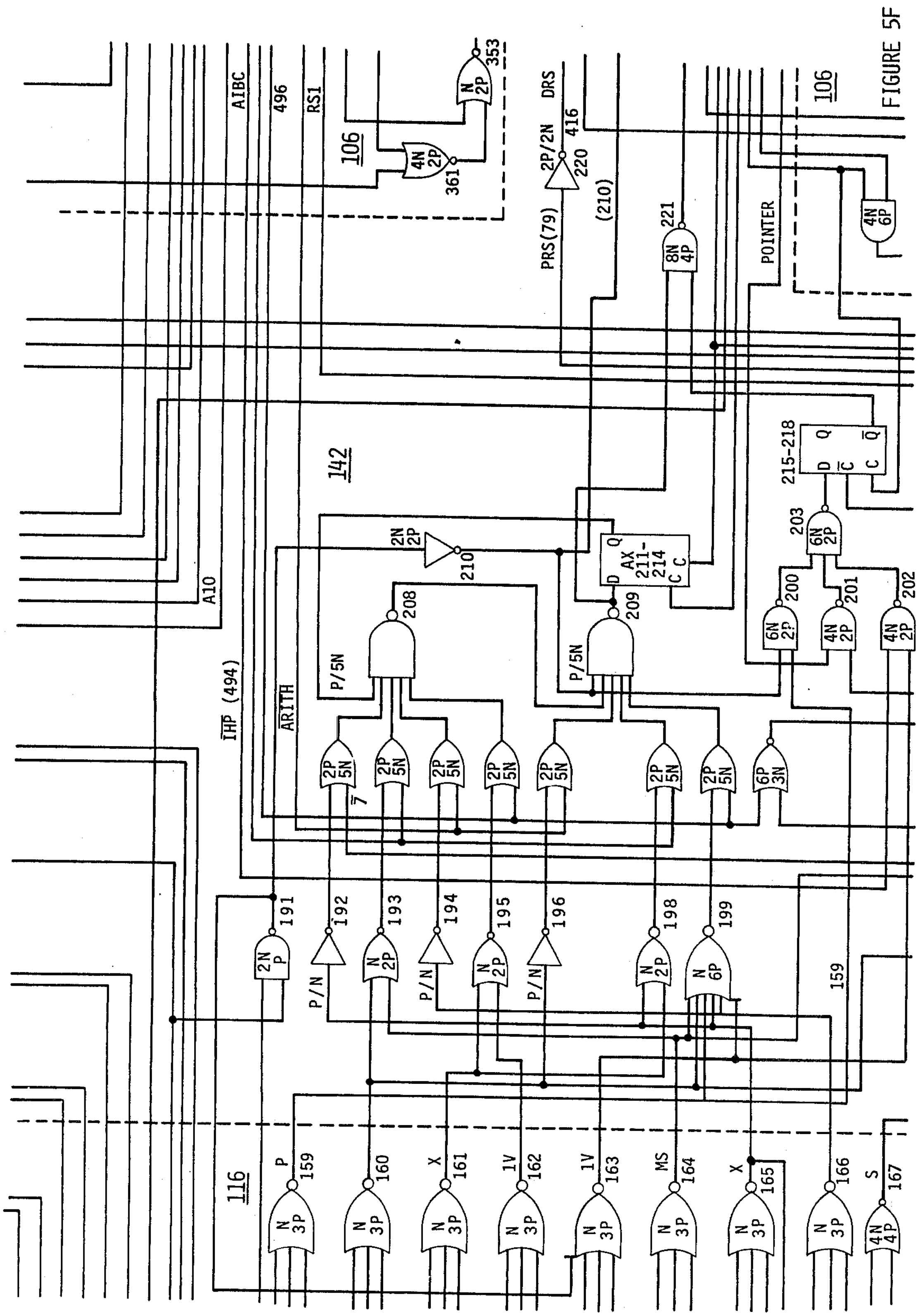
Figure 5G:
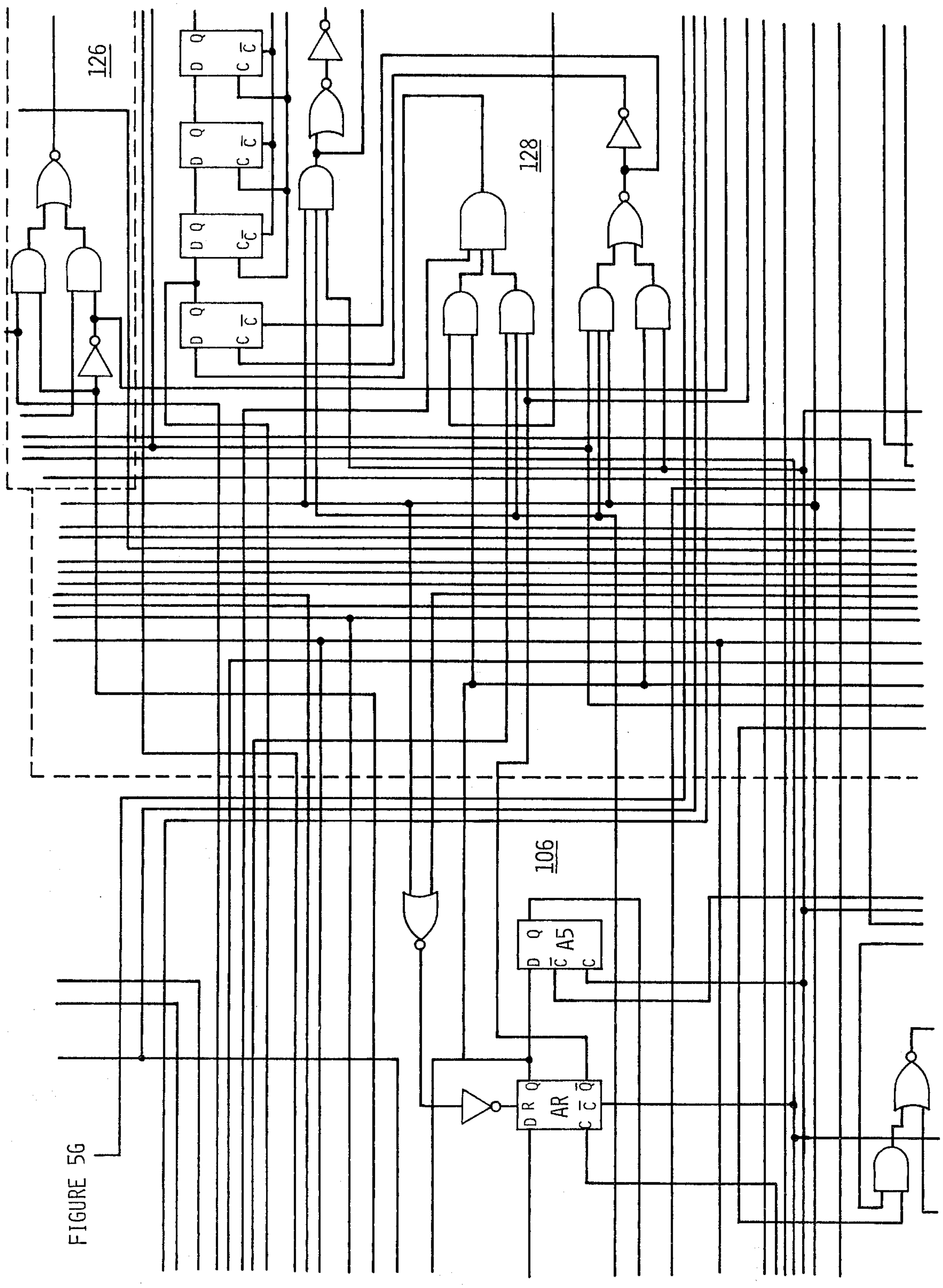
Figure 5H:
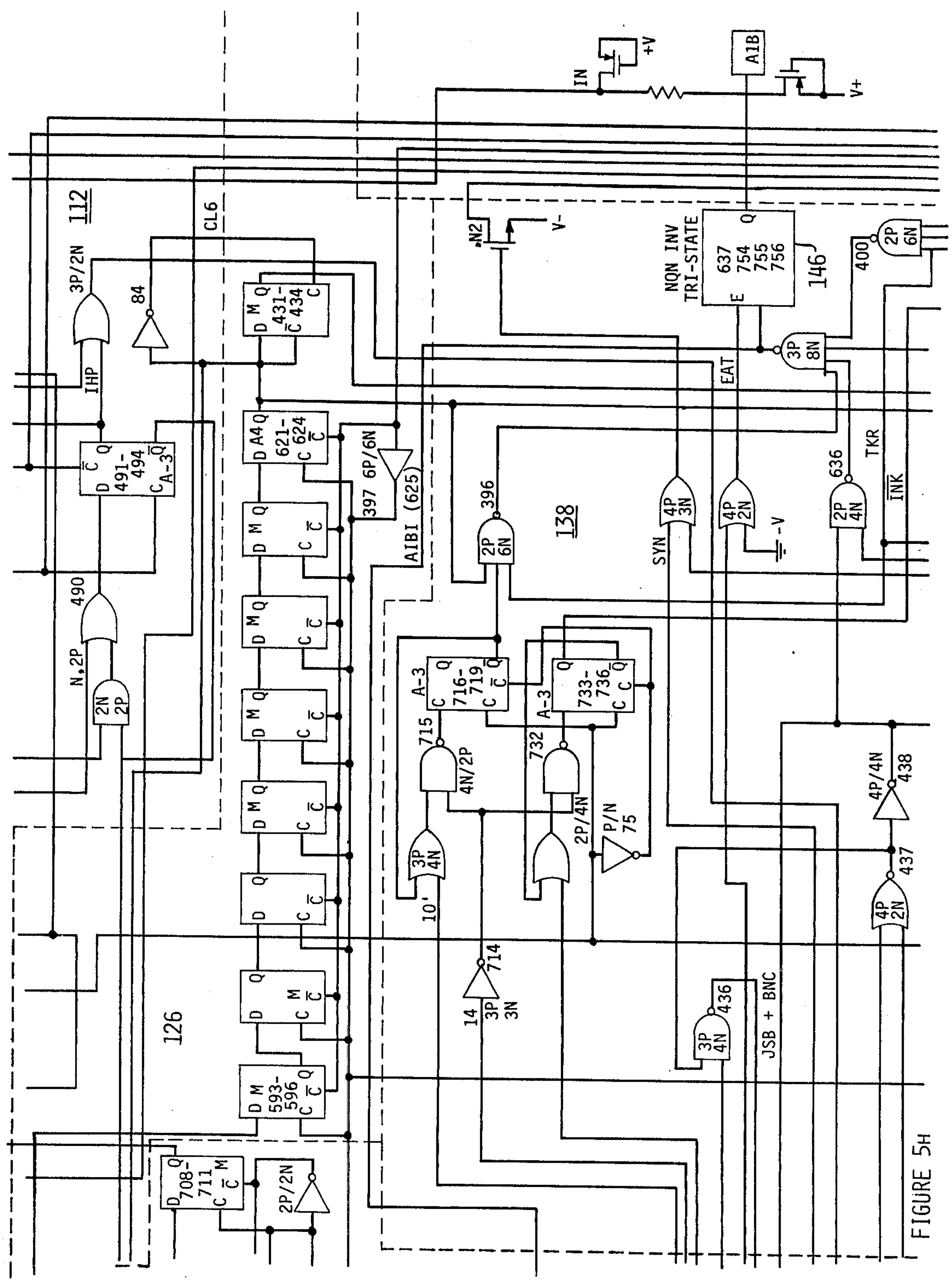
Figure 5I:
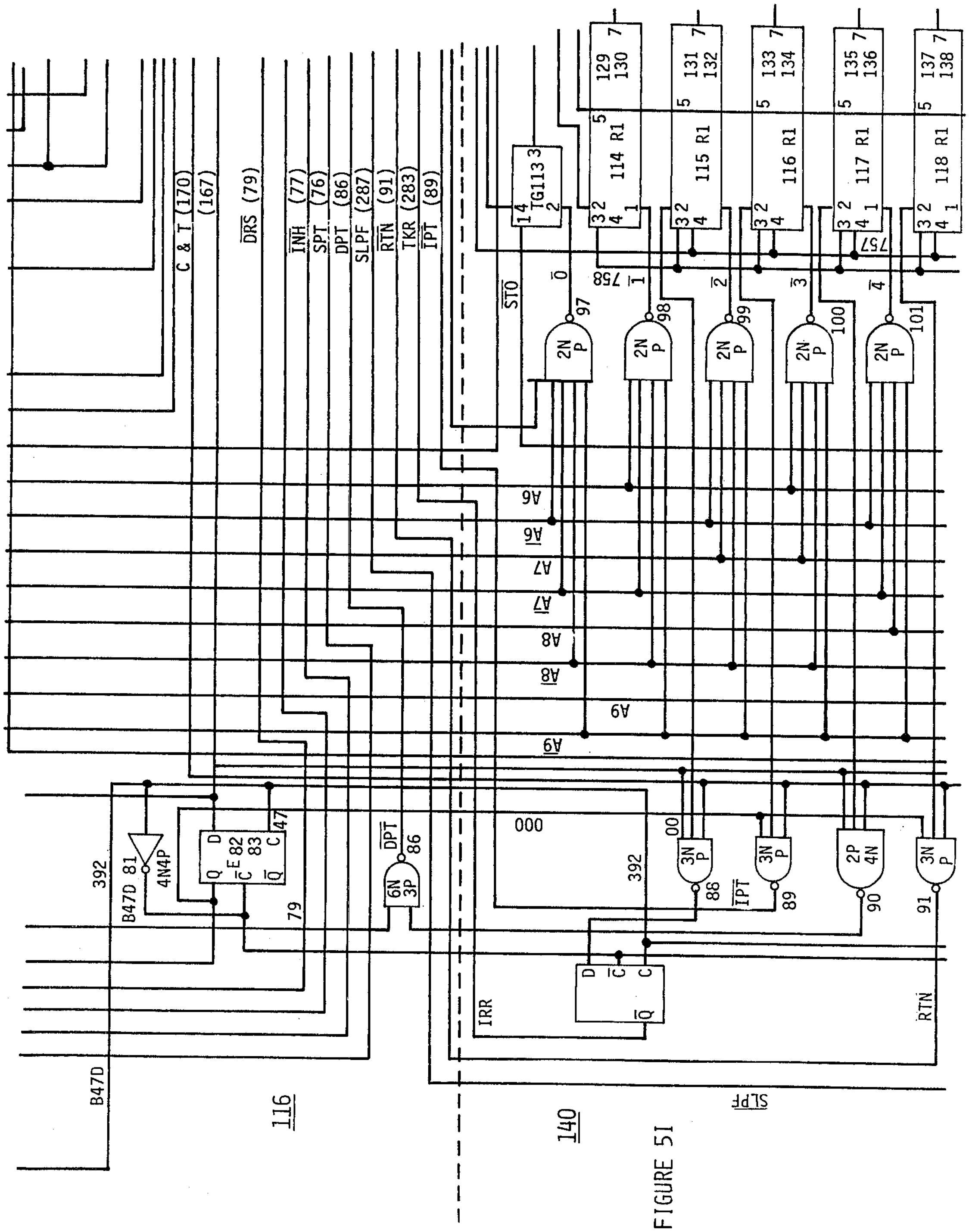
Figure 5J:
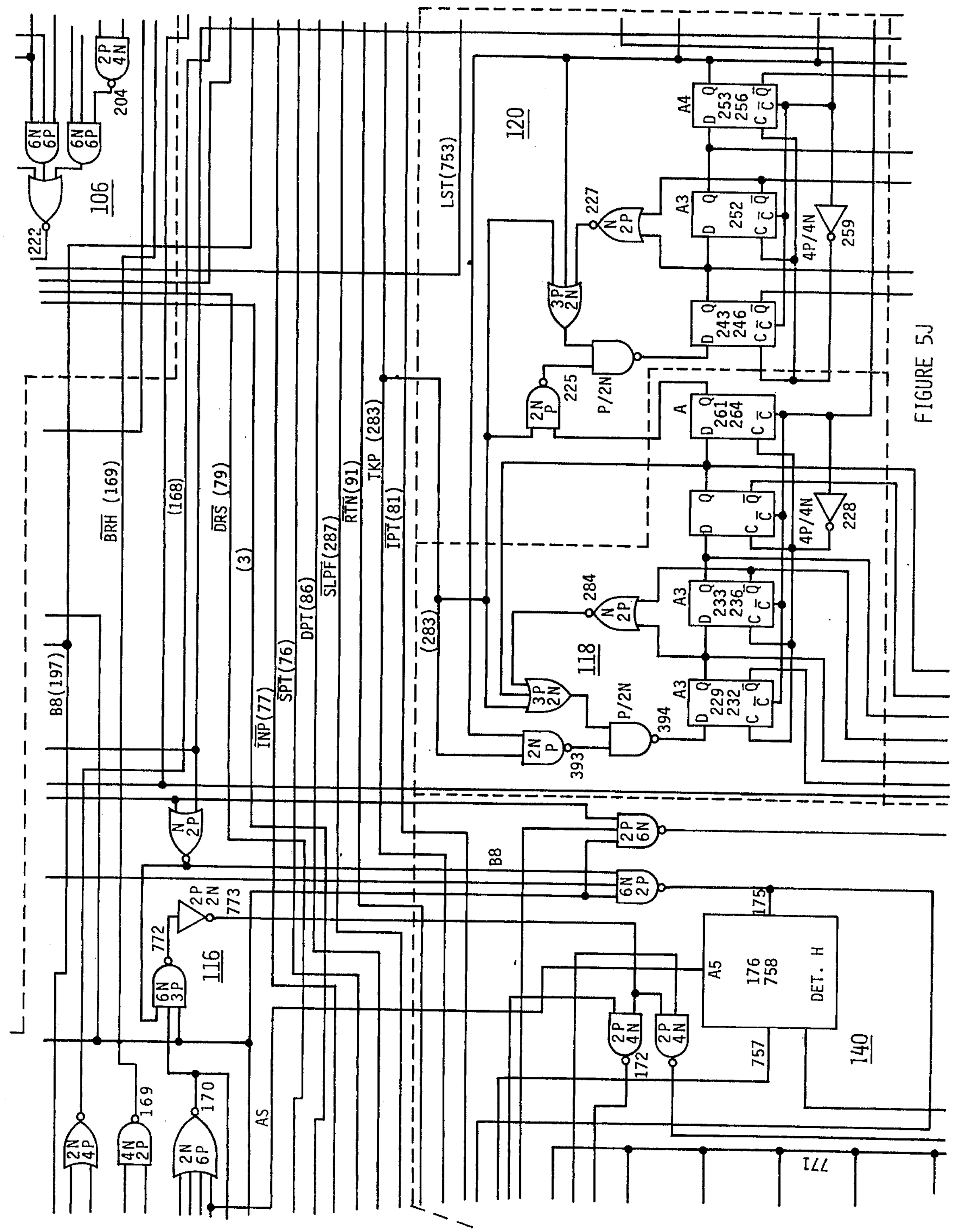
Figure 5K:
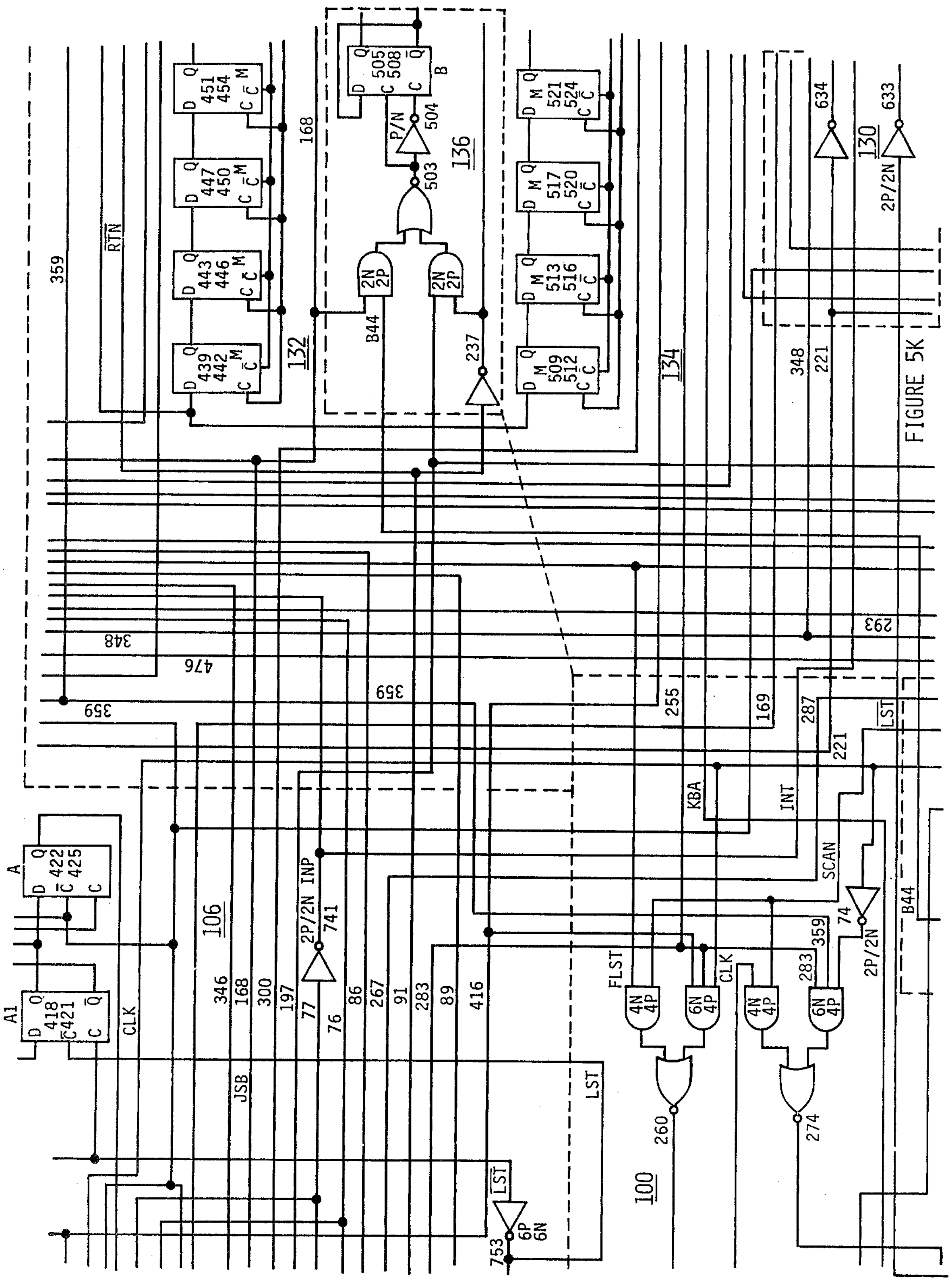
Figure 5L:
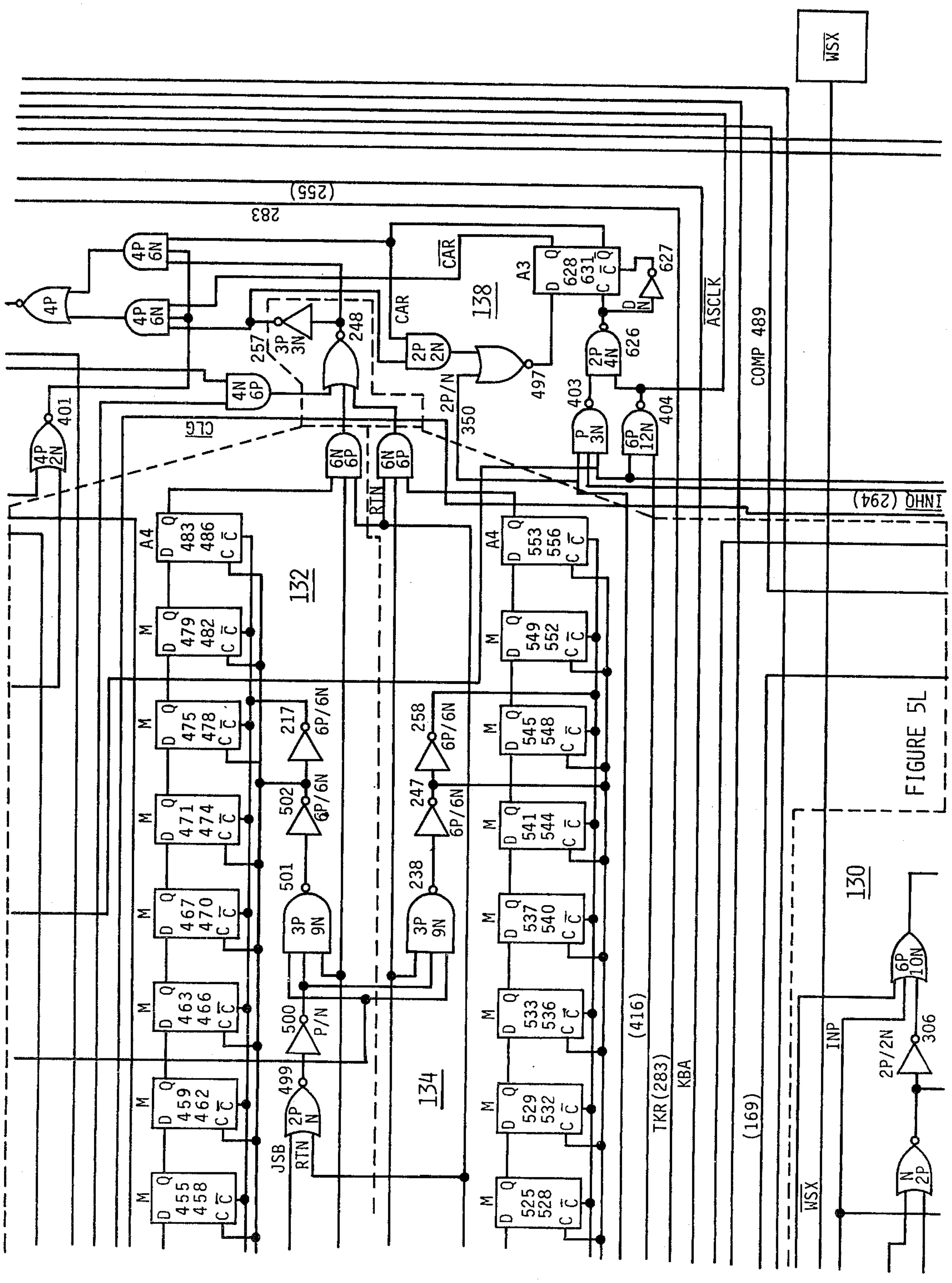
Figure 5M:
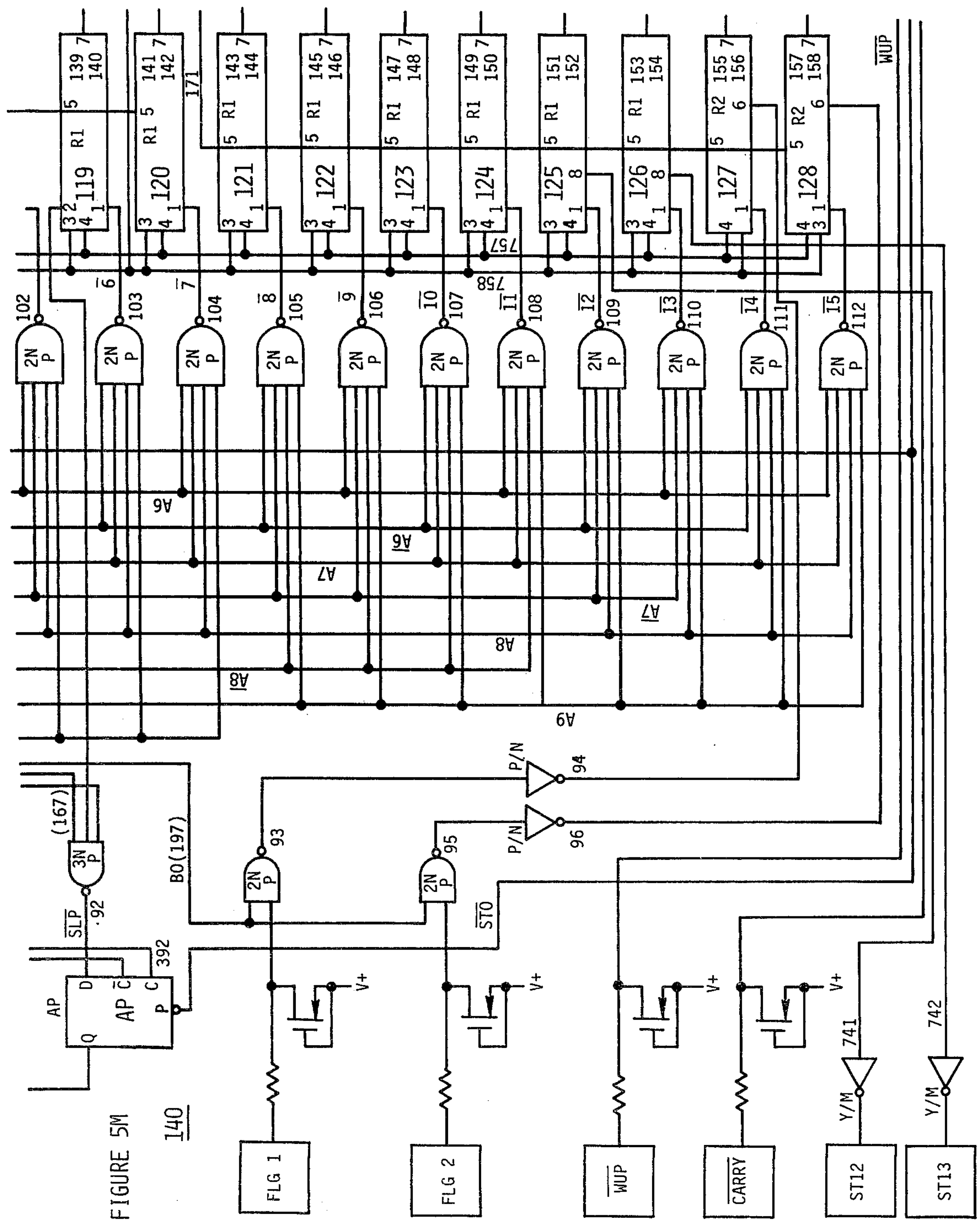
Figure 5N:
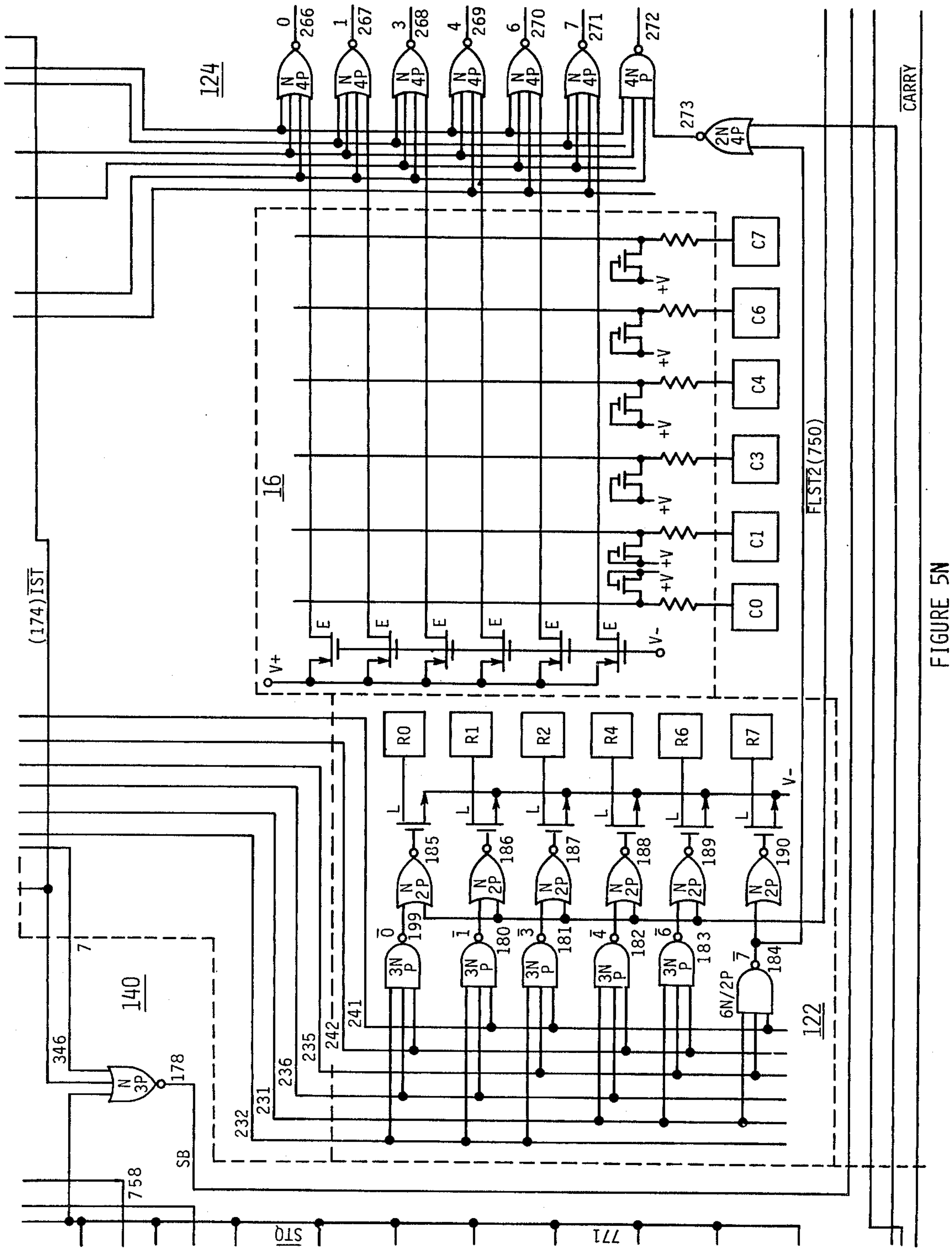
Figure 5P:
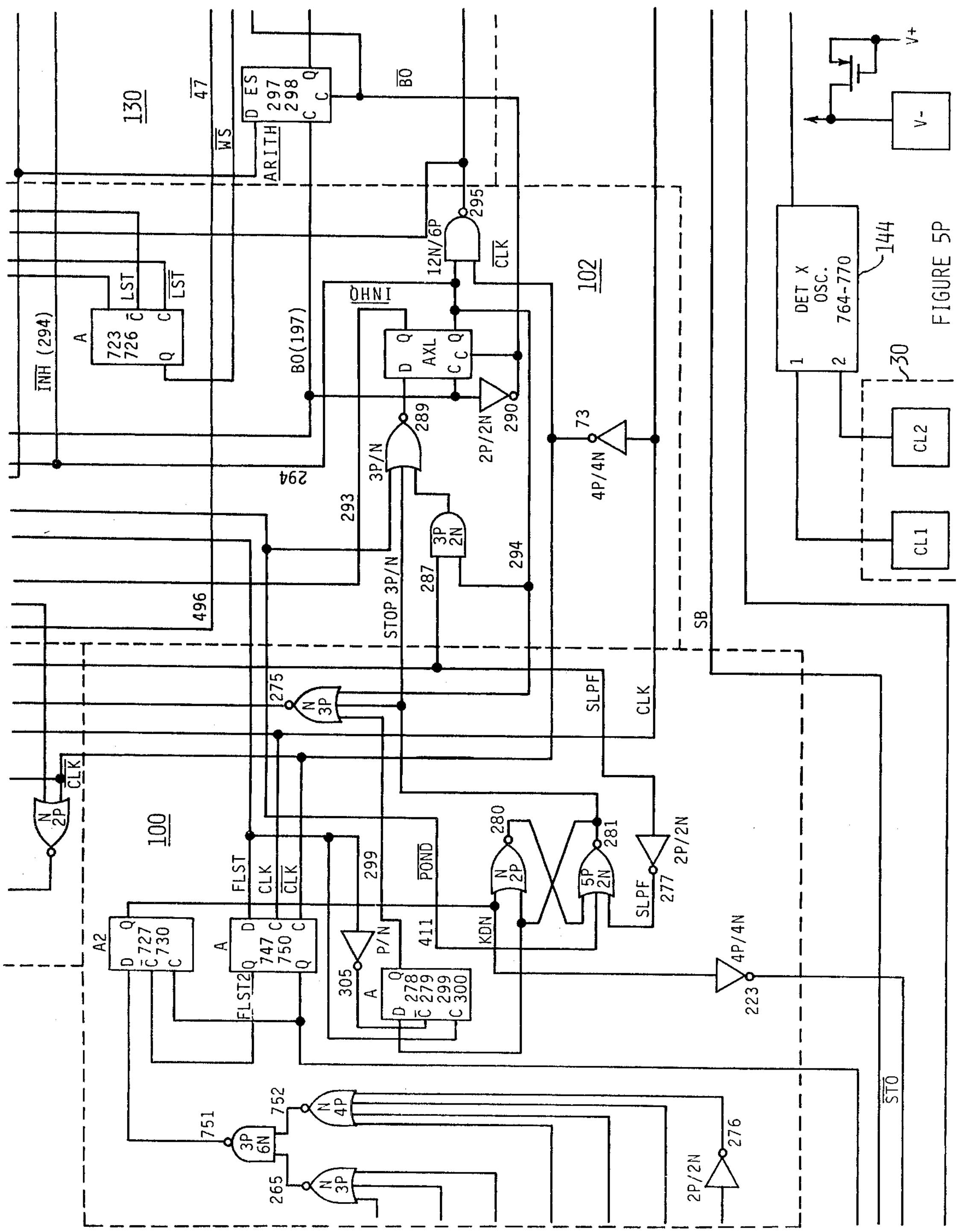
Figure 5R:
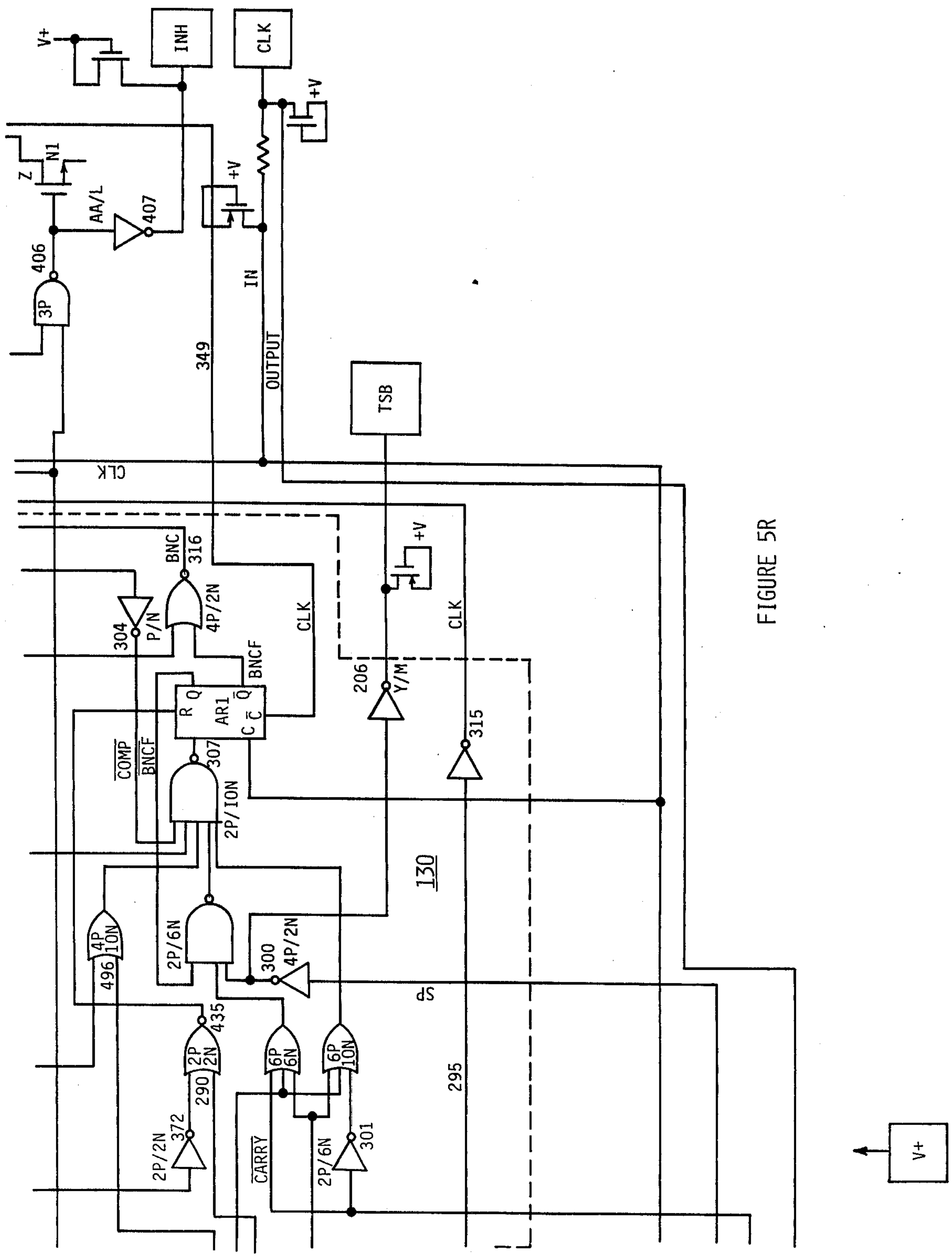
Figure 5T:
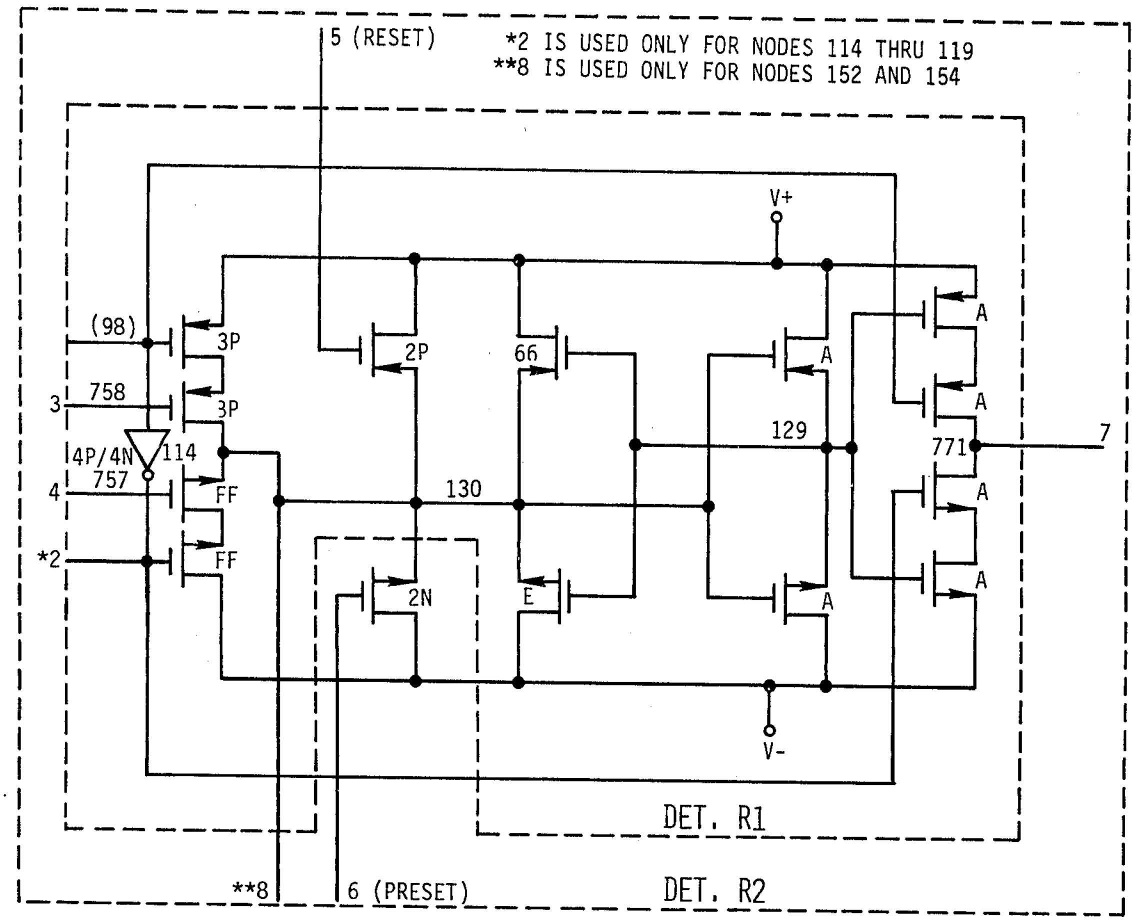
Figure 5U:
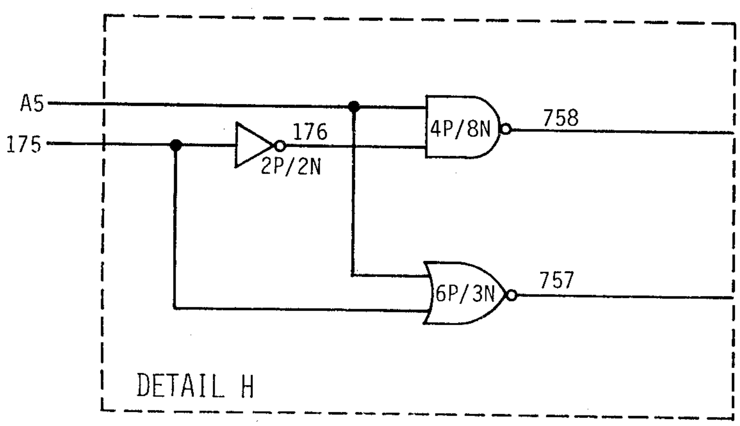
Figure 5V:
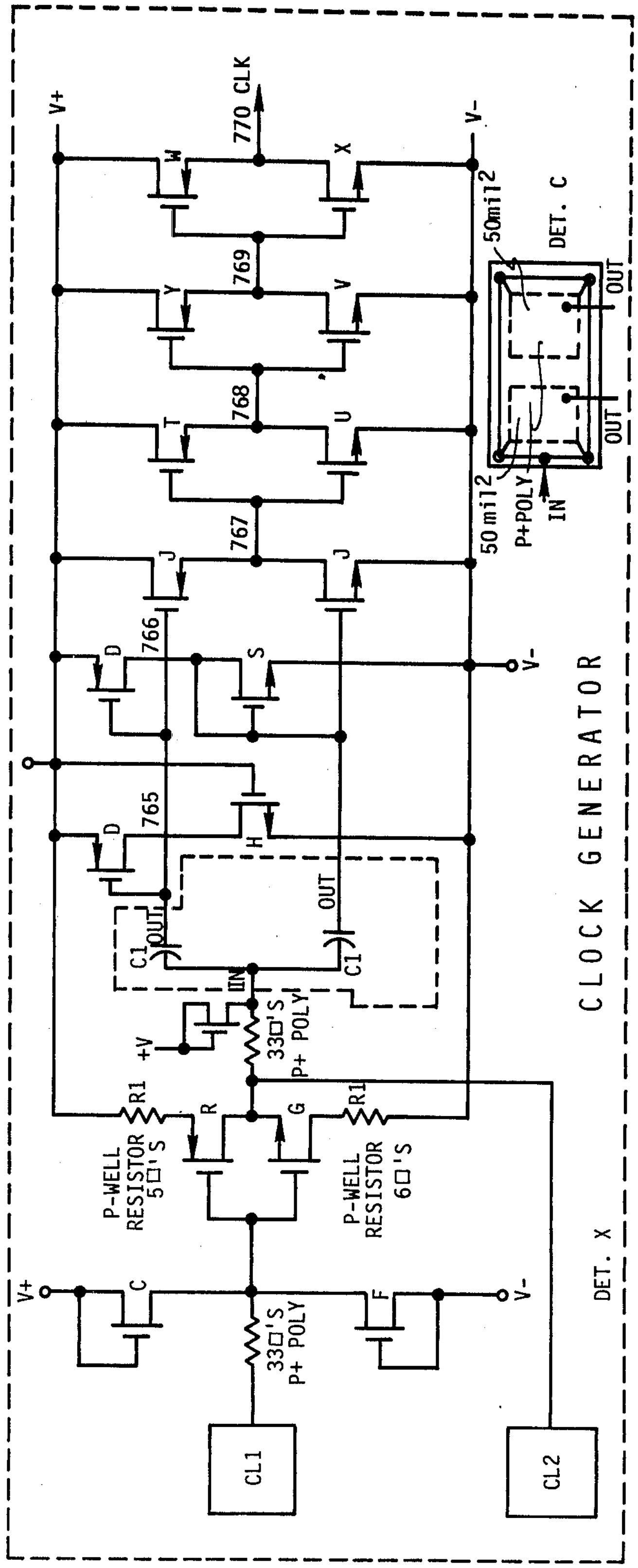

FIGS. 4A and B show a block diagram of the Control and Timing Circuit (C&T chip) and more detailed schematic diagrams are shown in FIGS. 5A through 5V.

As mentioned above, there is a switch 42 in the watch/calculator case which must be activated to reset the watch/calculator after power is applied when battery 22 is replaced. The switch is connected to the PON input to C&T chip 32 to give a power-on signal for initializing the watch/calculator circuitry. The PON input is connected to a scanner control 100 which controls the keyboard scanner. The power-on signal will stop the keyboard scanner and at the same time it will release an inhibit control 102 to make the total system active. This control signal appears on the line labeled INH. When the signal on INH is low, the system is idle. When the signal is high, it causes the watch/calculator circuits to be active.

However, during the time switch 42 is closed, there are certain portions of the circuitry that are still not active. A few circuits are active, such as a master counter 104 and a timing decoder 106 which produce a synchronizing signal on the SYNC line connected to all of the chips. Because that switch 42 is closed, an instruction latch 108 prevents any instructions received from the ROM from being acted upon. At the same time a pointer counter 110 and pointer decoder 112 are maintained inactive.

During the time switch 42 is closed, the C&T chip sends out a "zero" starting ROM address continually. As soon as switch 42 is released the starting address sent to ROM will, initially, still be all zeroes. The C&T chip will now be enabled to respond to information sent back from the ROM in response to this starting address. Once the circuits are in the active mode, the following sequence of events occurs. During the time defined by a pulse on the SYNC line, the C&T chip receives a ROM instruction on the AIB line in an instruction register 114. In response to timing decoder 106 this instruction is parallel loaded into the instruction latch. The information in the instruction latch is sent in parallel into an instruction decoder 116 which decodes the instruction. Then the instruction decoder gates the instruction with the proper signal from the timing decoder and sends it to the particular circuit that will perform the instruction. The instruction is only acted upon when validated by the timing decoder, as explained in greater detail below.

When the total system is active, the scanner control is not active, and therefore the keyboard is not being scanned. So at the end of a power-on subroutine which starts at address "zero" in the ROM, the ROM will issue a sleep instruction and upon receiving the sleep instruction most of the circuits will become inactive or asleep. However, during the sleep period the keyboard scanner comprising a row scanner 118, a column scanner 120, a row decoder 122 and a column decoder 124 will become active and will scan the keyboard until a key is depressed. As soon as the keyboard scanner detects a key depression, it will stop and wake up the rest of the system, by making the signal on a line INH become high. Row and column information from the row and column scanners represents the code of the depressed key.

The ROM is addressed during a portion of the timing cycle of the system called AT (Address Time). A ROM address comprises an 8-bit address and a 4-bit page number for a total of 12 bits. The page number tells which ROM chip the information is on and the address tells where on the chip. There are seven modifying instructions for the ROM address. The first type of modifying instruction is to increment the previous address by one so that instructions from consecutive addresses are accessed. This increment is performed by adder 138. The second type is called ROM select immediate page, RSI. The 8-bit address used comes from the ROM address register and 4-bit page number comes from the instruction register where it was previously stored during the sync time by the RSI instruction. This whole address is incremented by one, before sending it to the ROM. The third type is DRS, delayed ROM select page. The DRS operation is always followed by either a JSB or BNC instruction, discussed below. The 4-bit page number is taken from the DRS instruction and stored in the ROM page register during execution of the DRS instruction. The page number substitution is made in the following word during the execution of JSB or BNC. At the same time the 8-bit address, from the last 8 bits of either the JSB or BNC instruction, is tapped from the instruction register. The fourth type of modifying instruction is jump subroutine (JSB). The jump address, i.e. the new location in ROM that is to be addressed, is from the instruction register which is stored previously from the JSB instruction, and the 4-bit page number is the previous page number that comes from a ROM page register 128. The fifth type is a branch no carry (BNC), a conditional branch instruction. It is controlled by a branch no carry flip-flop (BNCFF) 130 and if the BNCFF output is zero then a branch is permissible. If the output is one, then the system returns to the first type of modifying instruction, that is, increment the previous address. The BNC address is from the instruction register in which the address was stored previously by the BNC instruction, and the page is from the ROM page register. The sixth type of instruction is return (RTN), which comes from one of the 12-bit return address registers 132 and 134. The last type instruction is TKR (Take Key to ROM). The address consists of 6 bits from the row and column scanners and two zero bits; the page number is from the ROM page register.

Data in the instruction register is used for various instructions discussed above as follows. As an example, consider the DRS instruction. Information about a new ROM page is tapped out of the instruction register at AIO and only the last 4 bits of information are gated into the ROM page register during the execution of the DRS instruction. The AI2 tap on the instruction register gives the 8 bits of an address for JSB and BNC. The AI6 tap is used for setting the pointer and only 4 bits are required to set that. This tap is also used for RSI and INP (Is Pointer at digit N?). For example, if it is desired to inquire whether the pointer is at digit 5, the code of digit 5 is stored in the last 4 bits in the instruction register, from AI6 to AI9, and at the proper time this code is compared with the 4-bit pointer counter 110. If the numbers match, the pointer is at the correct position. If they do not, then the pointer is not at digit 5.

As mentioned above, there are two return address registers 132 and 130 and these permit two levels of subroutines. The present address is stored during the jump subroutine instruction in one of the return address registers. At the next jump subroutine the present address will be stored in the other return address register controlled by a toggle flip-flop 136. When the first return instruction is issued, the address from the second return address register will be sent to the ROM, incremented by one. On the next return instruction, the address from the first return address register, incremented by one, will be sent to ROM.

The BNC flip-flop, as previously mentioned, controls branching operations and there are three conditions it controls. The first condition is a check of whether the pointer is at a designated location, i.e. a check of whether INP is matched or not. Thus, if one inquires if the pointer is at digit 5 and it is, the BNCFF would be set to one. The second condition is the detection of a carry from the A&R chip during the arithmetic operation. This also will set BNCFF to one. The third condition, IST, is a check for one of the 16 status bits, 15 in RAM 140 and one from the scanner control. If the inquiry is whether status bit N is set to 1 and the answer is yes, then the BNCFF will also set to 1. If it is not, BNCFF will be 0. When BNCFF is set to 1 during the time of execution of a branch, then the branch will not be executed. Branch will be executed only when BNCFF is 0.

A word select instruction, as with other instructions, is stored in the instruction register during the sync time and is then decoded. When this instruction is decoded two things are combined to generate word select. One is the instruction itself; the other one is the output of the timing decoder to give the waveform of the word select, i.e. to specify the bits in a word covered by the word select. The word select is generated in a word select circuit 142. The word select can also be controlled by the pointer. When a word select at the point instruction is given, instead of using timing decode, the pointer signal is gated with the instruction to generate the word select.

The 16 status bits referred to above are used for various status indicators in the system. For instance, status bit 0 is used in detecting whether there is a key being depressed. When it is 1, there is a key being depressed; when it is zero, no key is depressed. The other bits indicate other particular conditions or states of the system. These status bits are set with individual instructions and can thus be used to check various conditions in the execution of programs stored in ROM.

Also on the C&T chip, an oscillator circuit 144 is connected to tuning elements 30 to provide a system clock signal as discussed above.

The AIB line, used for bidirectional communication among various of the circuits in the watch/calculator, is connected to a tri-state gate 146 which permits the transmission and reception of information over one line. The operation of such a gate is described in greater detail below.

The keyboard scanner and the sleep mode of the watch/calculator combine to provide 2 key rollover for the keyboard. When the system is in the sleep mode, the keyboard scanner will stop scanning when it detects a depressed key and any further key depressions, while the first key is depressed, will have no effect on the system. When the first key is released, operations will be performed in response to it and the calculator will go to sleep. Then the keyboard scanner will start scanning again and pick up the next key depressed, repeating the process.

READ ONLY MEMORY

Figure 6:
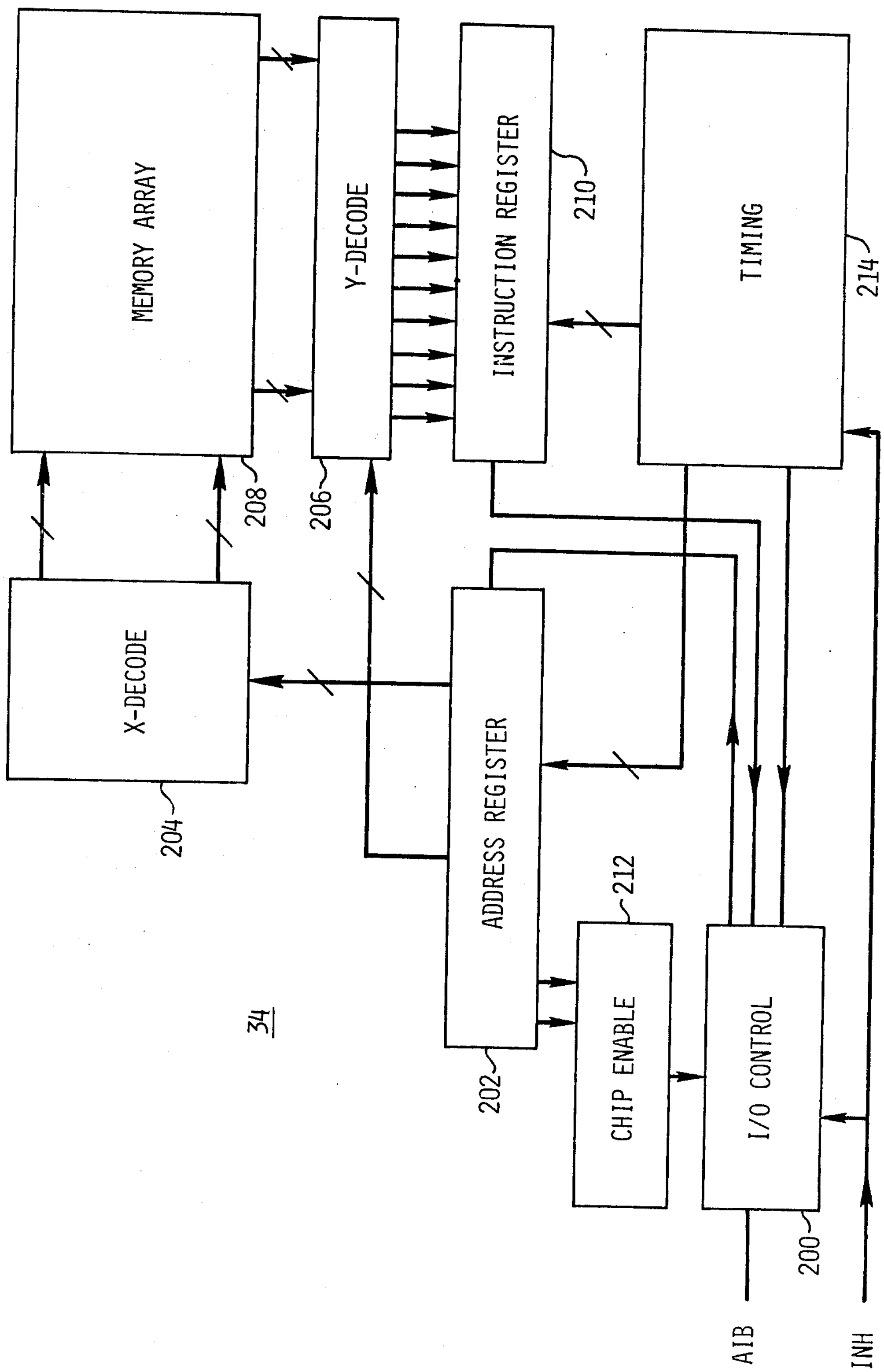
FIG. 6 is a block diagram of a Read Only Memory.
Figure 7A:
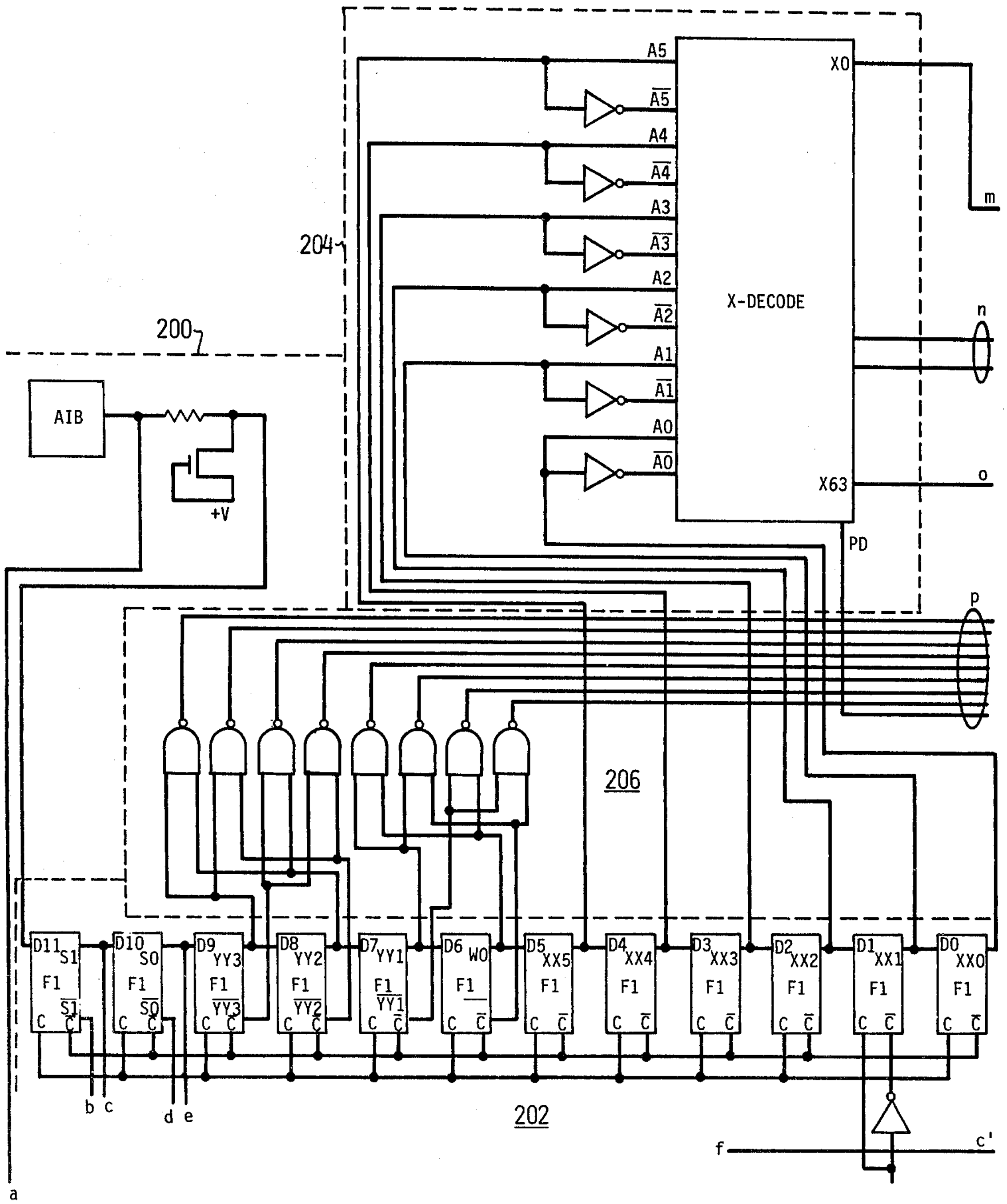
FIGS. 7A through 7E show a detailed schematic diagram of the circuit of FIG. 6.
Figure 7B:
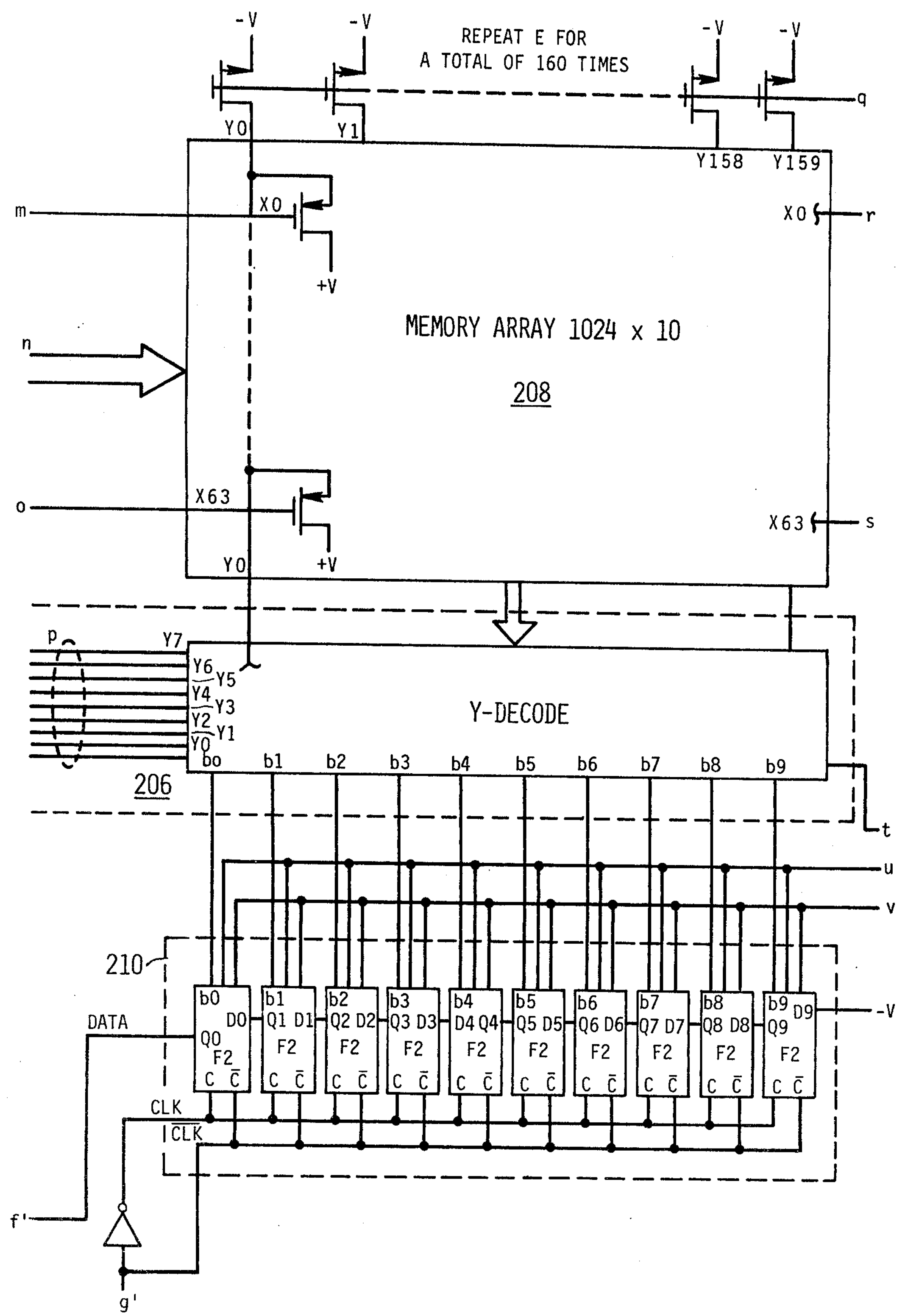
Figure 7C:
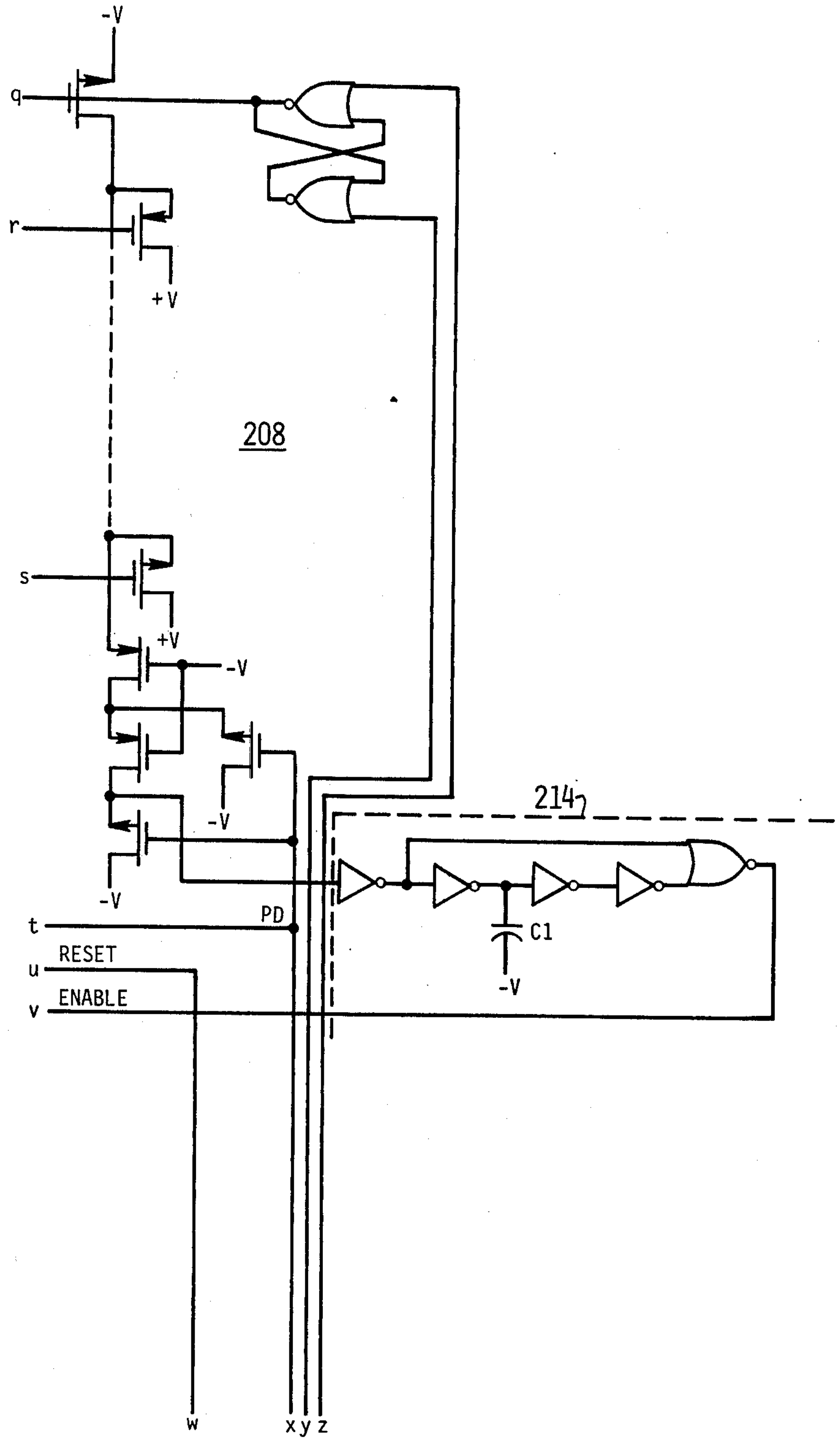
Figure 7D:
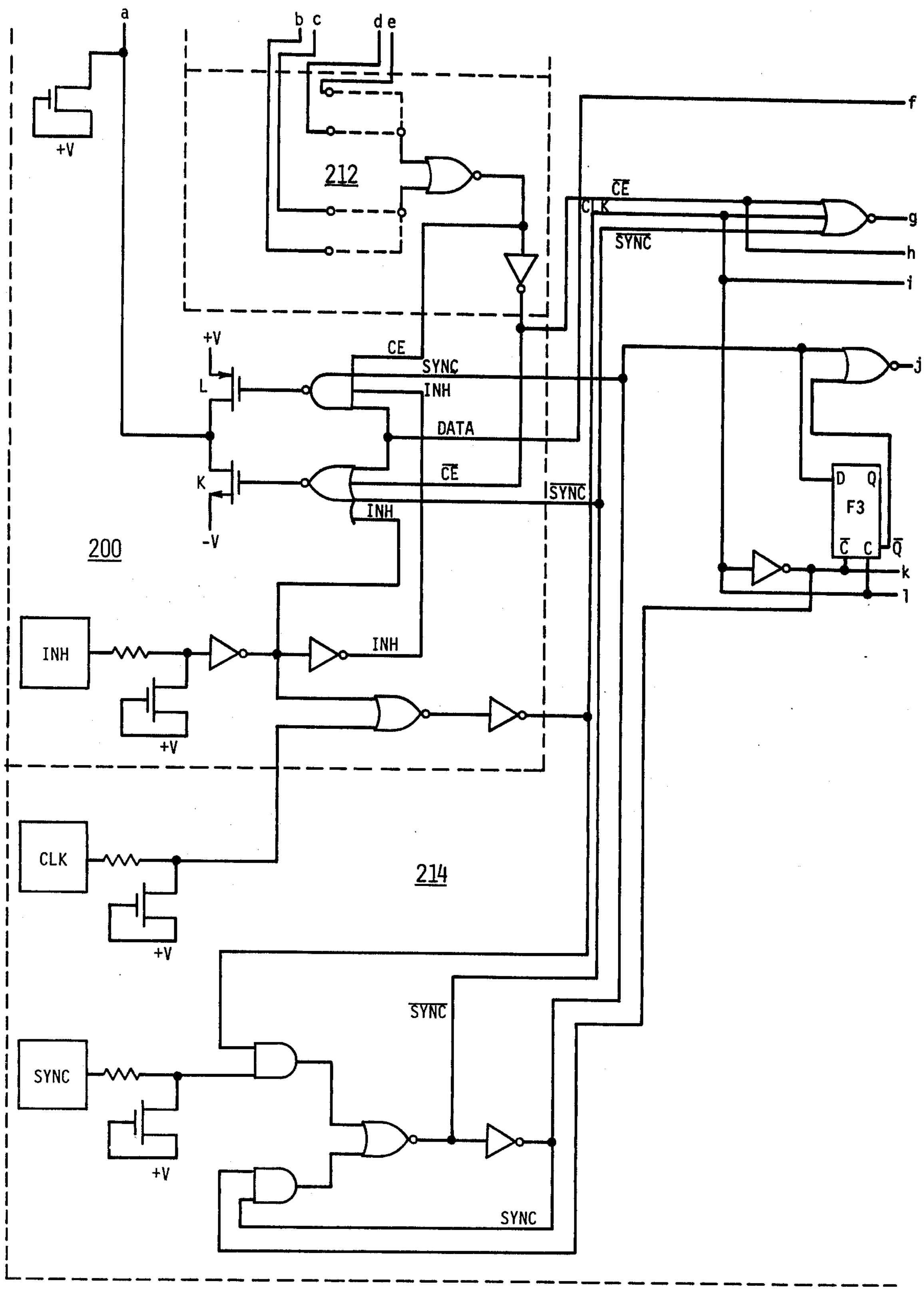
Figure 7E:
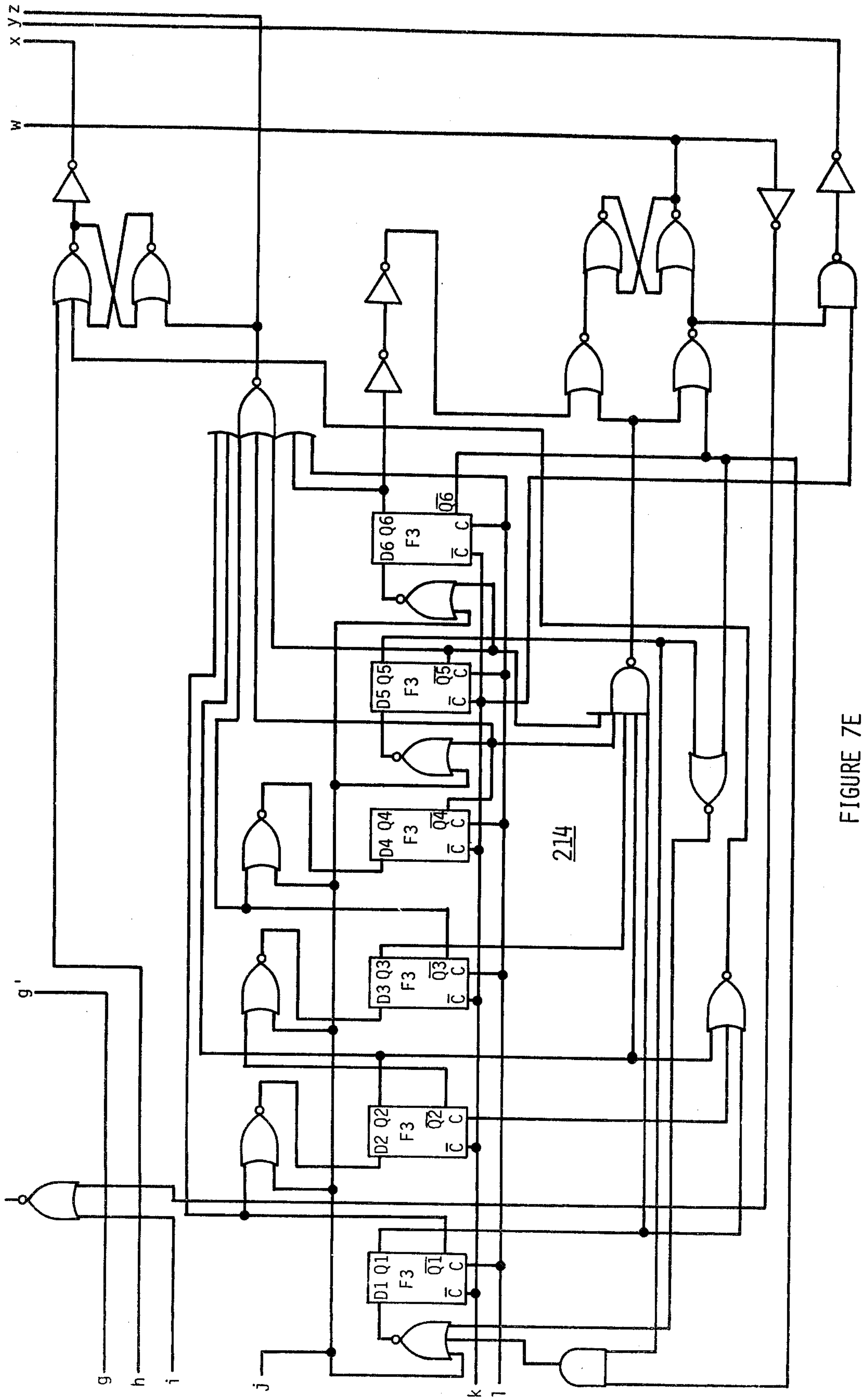
Figure 7F:
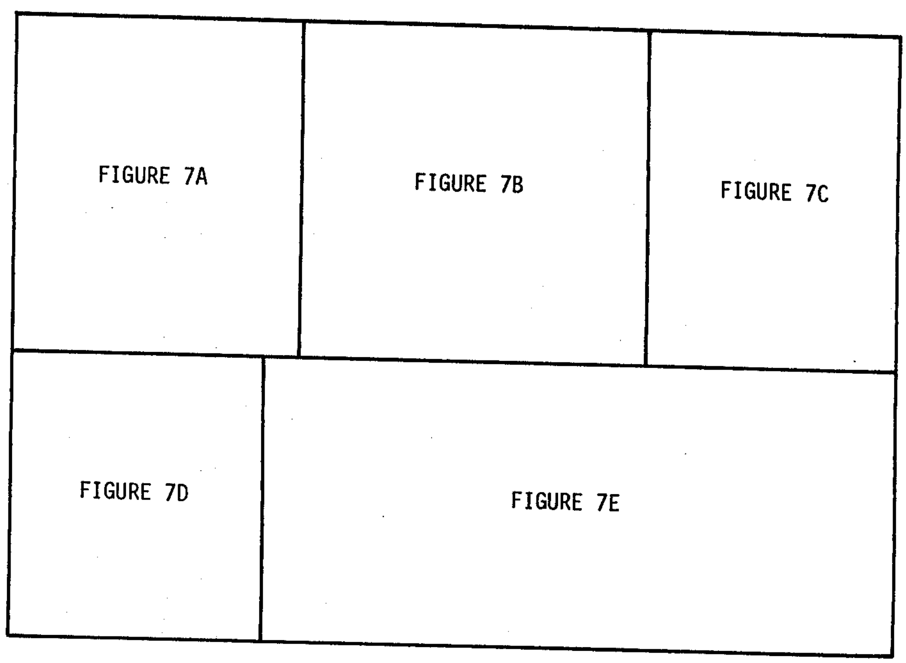
FIG. 7F is a figure map showing how the detailed schematic diagrams of FIGS. 7A through 7E fit together.
Figure 8A:
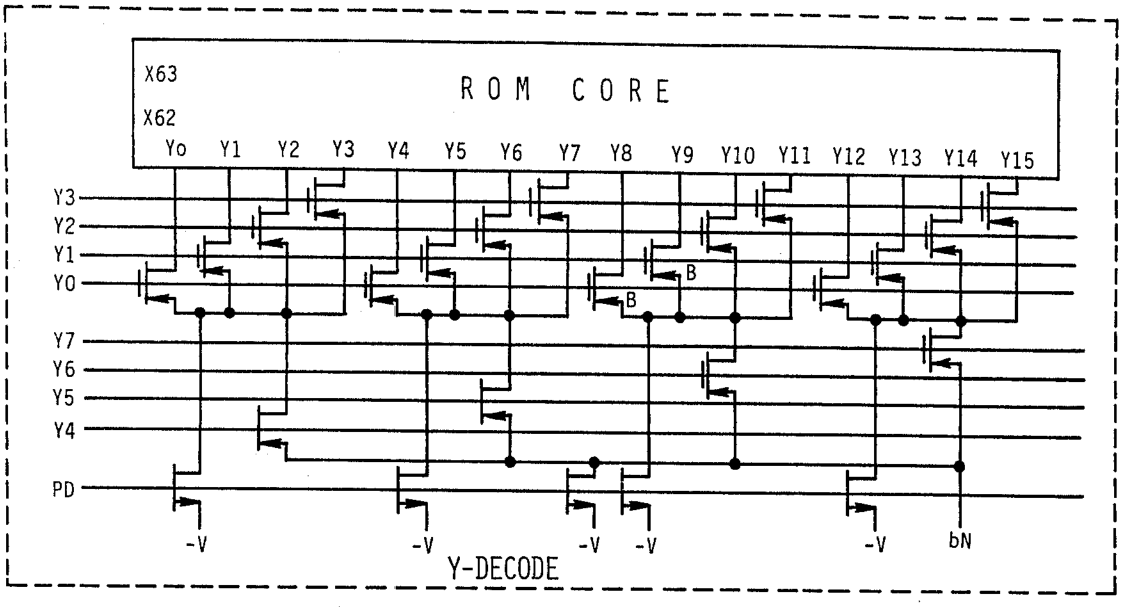
FIGS. 8A and 8B show detailed schematics of portions of the circuit of FIGS. 7A through 7E.
Figure 8B:
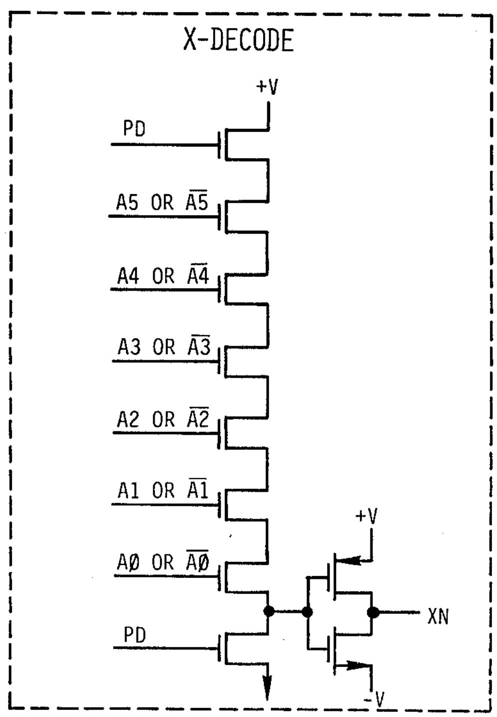

FIG. 6 shows a block diagram of one of the ROM chips 34 and 36 and FIGS. 7A–E and 8A and B show detailed schematic diagrams thereof. Each of the ROM chips communicates with the rest of the system by the AIB line. It receives addresses from the C&T chip, which pass through an I/O control circuit 200 and go into an address register 202. The data from the address register goes into an X decode circuit 204 and a Y decode circuit 206 which access a memory array 208. The resulting output of the memory array is put into an instruction register 210. The coding for the X decode circuit is shown in Appendix 1 and an example of one cell of the X decode circuit is shown in FIG. 8B. The ROM program, that is, the coding of the instructions in the memory array for the preferred embodiment, is given in Appendix 2.

During sync time, that is, when the signal on the SYNC line is high, the contents of the instruction register are sent out onto the AIB line. There is a possibility of a plurality of ROMs in the illustrated embodiment and each ROM is selected by means of a chip enable circuit 212. The chip enable circuit takes the two most significant bits of the address on the AIB line, that is, the last two address bits to come in; and by means of a hard wire mask, one out of the possible chips is selected. Each chip, in turn, contains 4 pages. The number of ROM chips will depend, of course, on the amount of programming necessary to carry out the desired functions in the watch/calculator. The whole chip is controlled by a timing generator circuit 214. It is necessary for a ROM chip to know when to receive an address and when to send out the corresponding instruction. The timing generator circuit contains a counter with some associated decoding circuitry. The counter is set up by the signal on the SYNC line, i.e. it detects one edge of the synchronize signal and thereafter produces all the timing signals needed in the chip. There is one other signal input, INH. When the chip is inhibited by means of a signal on this line, an output drive in the I/O control is made open circuit so that other chips can use the AIB line with no interference from this chip.

In addition, when there is an inhibit signal, AC power is removed from the memory array. AC power is used to scan the memory array when the chip is operating by precharging all memory nodes including the X decode lines via the PD inputs, at various times, and then conditionally discharging them. When the chip is inhibited, the memory array is not being precharged and so no current is flowing through the memory array.

ARITHMETIC AND REGISTER CIRCUIT

To aid the reader in understanding the operation of the A&R chip in the preferred embodiment of the present invention, it will be briefly compared with the A&R circuit in a calculator described in U.S. Pat. No. 3,863,060 issued to Rodé, et al. One of the primary differences in the instant embodiment is that the word is 48 bits long instead of 56. Another salient difference is that the addresses and the instructions are multiplexed on the AIB line instead of having a separate address (Ia) line and instruction (Is) line. The watch/calculator has a two-way data bus called ABUS which is similar to the line called BCD in the referenced patent. Another notable difference is that some chips (including the A&R) in the watch/calculator can be put into a sleep mode to save power. This is accomplished through a line INH which, when it is in one sense allows the A&R chip to work normally, and when it is in the other sense, it causes the system clock to be shut off to almost all the circuit. There is a word select line (WSX) which performs much the same function as a similarly labeled line in the referenced patent, that is, the signal on it selects different parts of the data word to operate on.

Figure 9A:
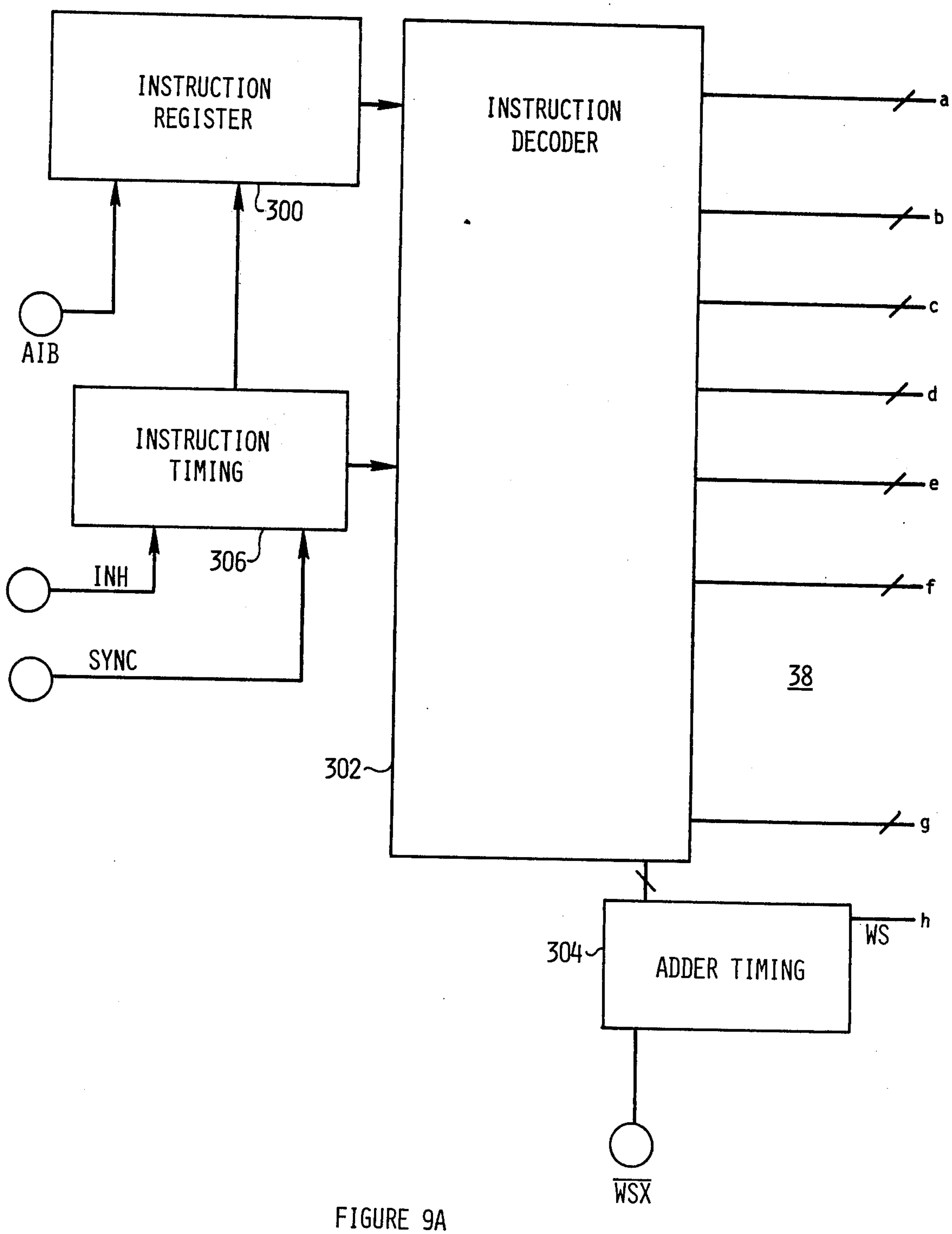
FIGS. 9A and 9B show a block diagram of an arithmetic and register circuit.
Figure 9B:
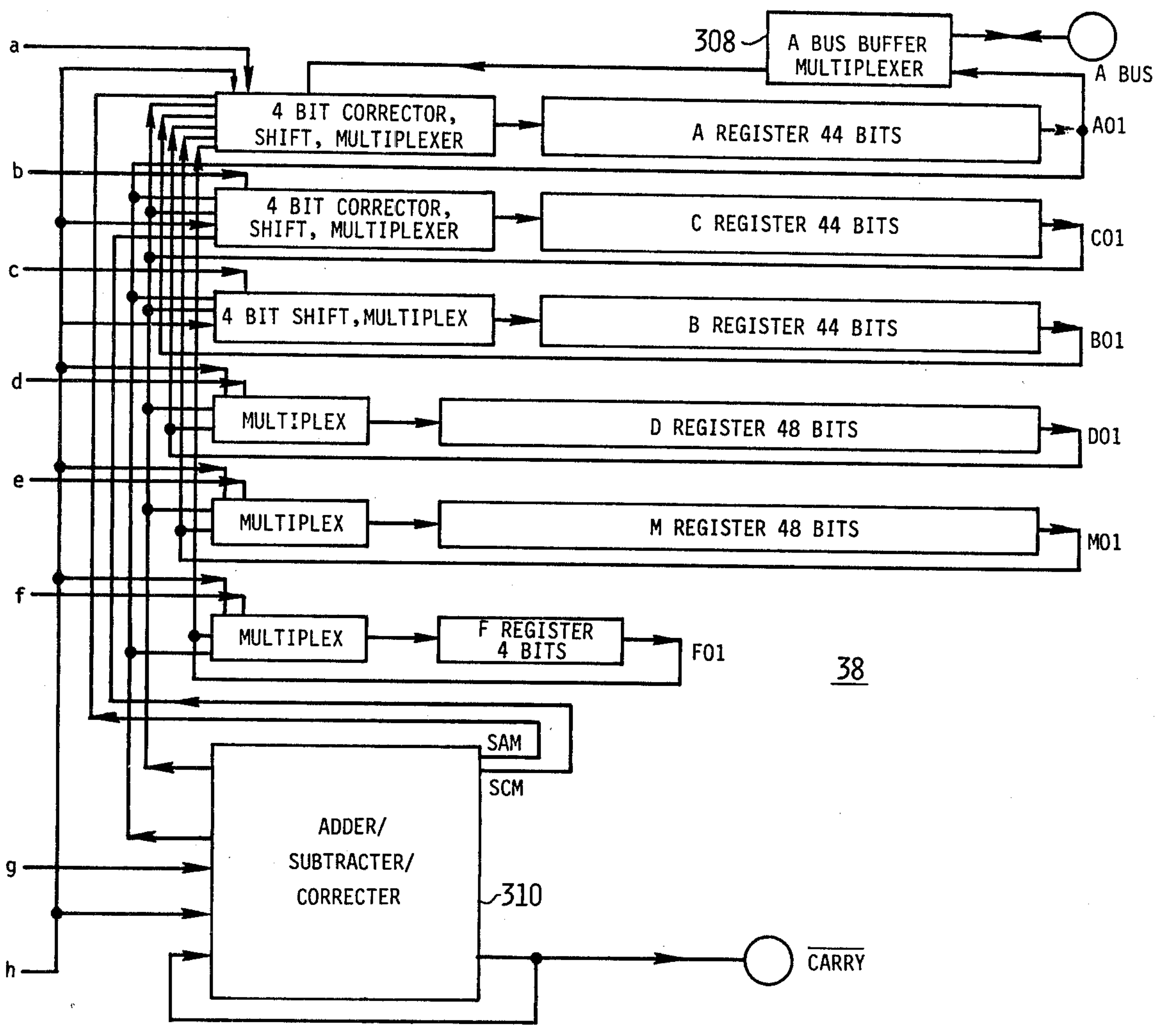
Figure 10A:
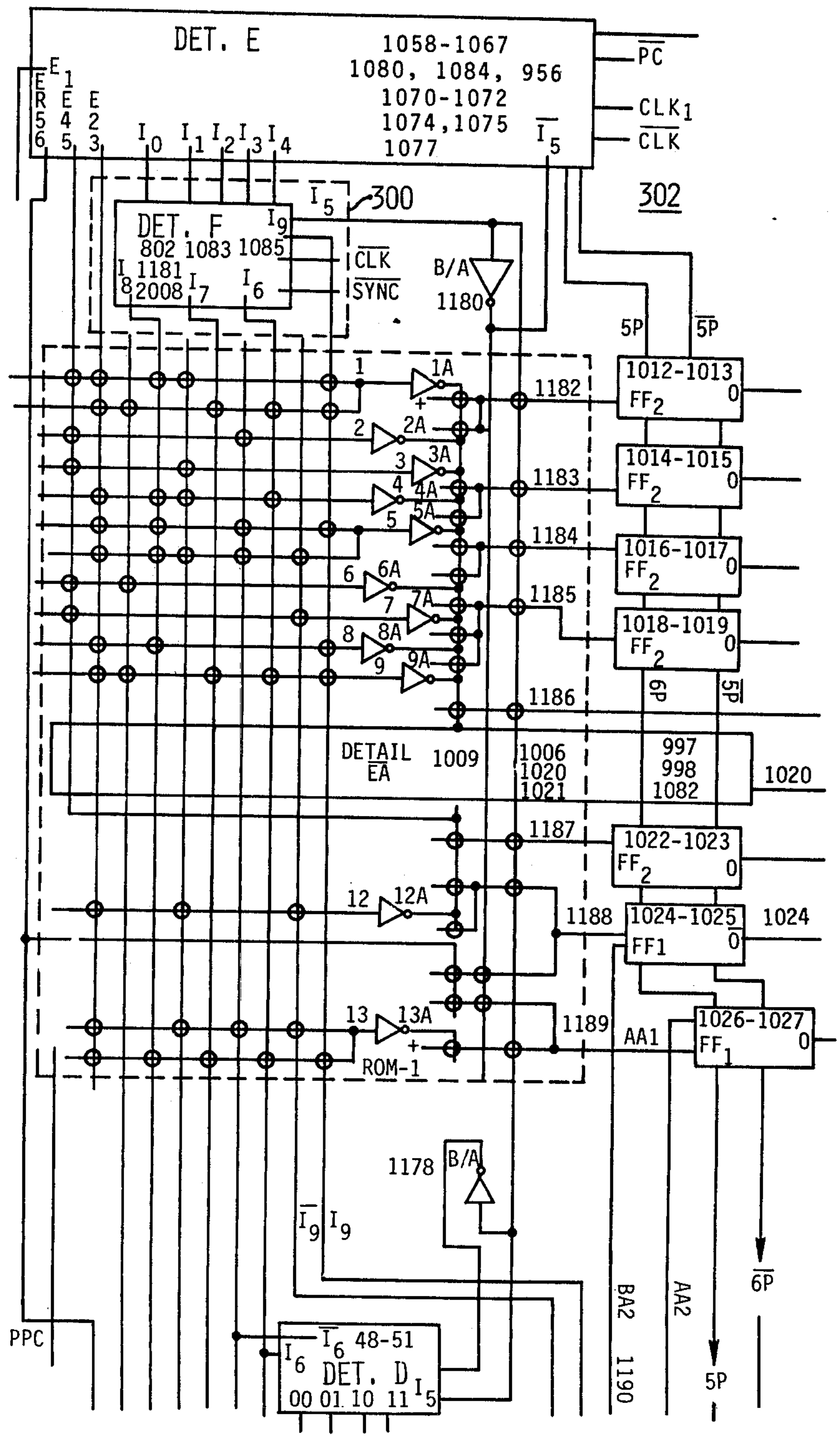
FIGS. 10A through 10M show a detailed schematic diagram of the circuit of FIGS. 9A and 9B.
Figure 10A:
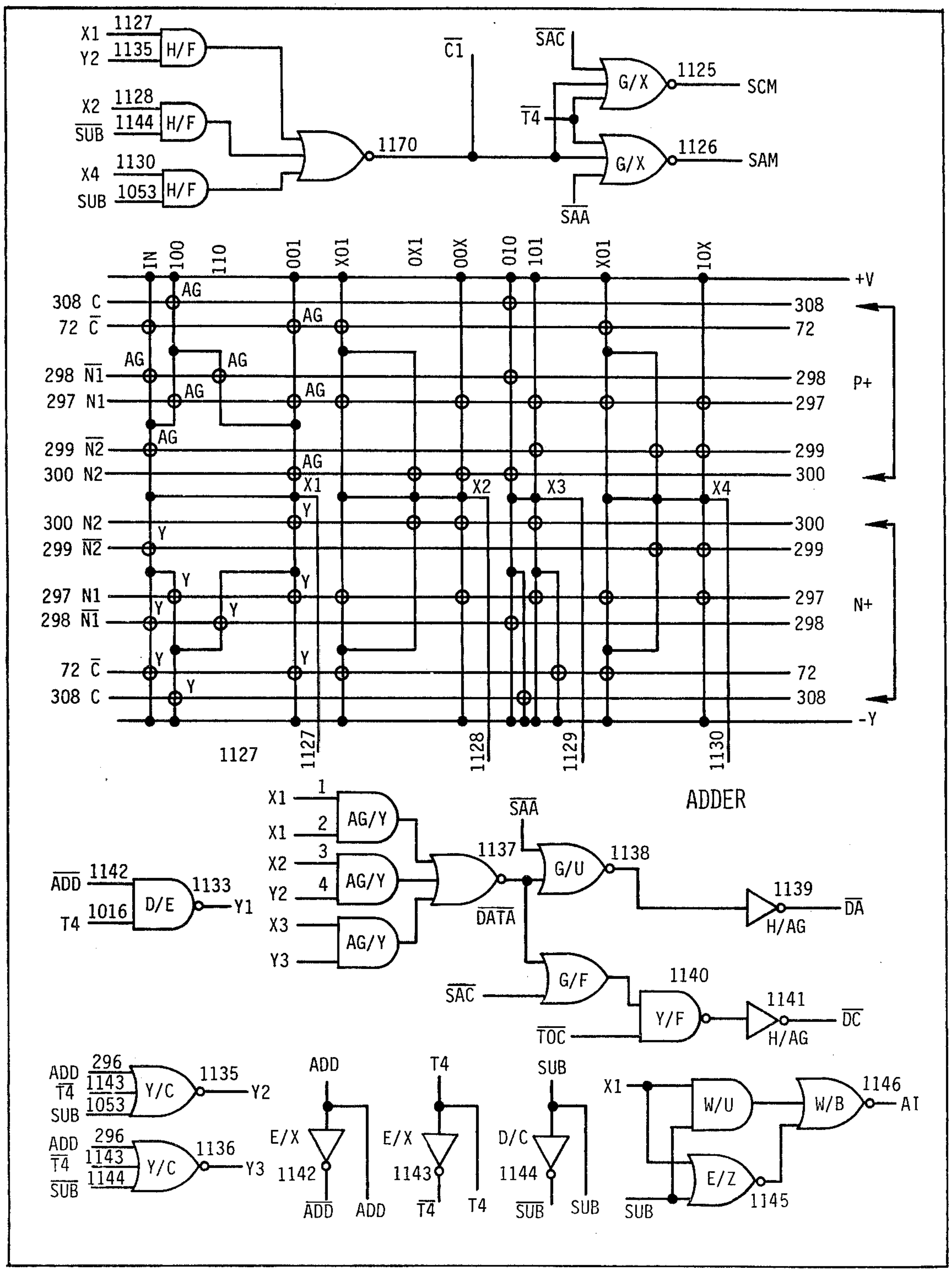
Figure 10B:
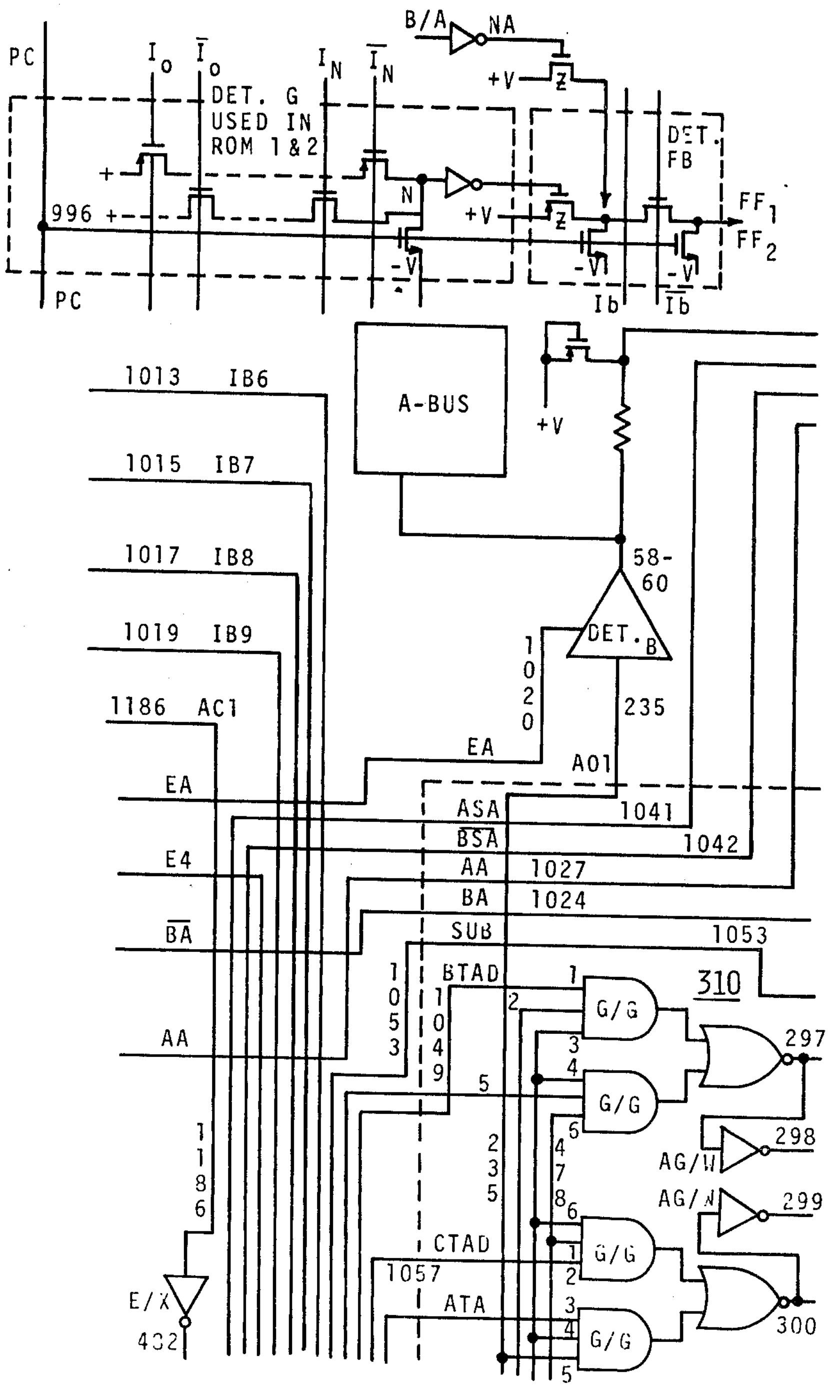
Figure 10B:
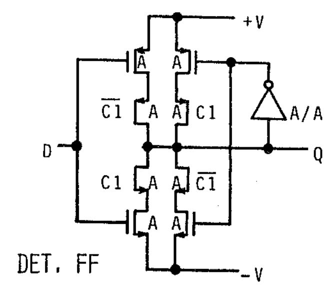
Figure 10B:
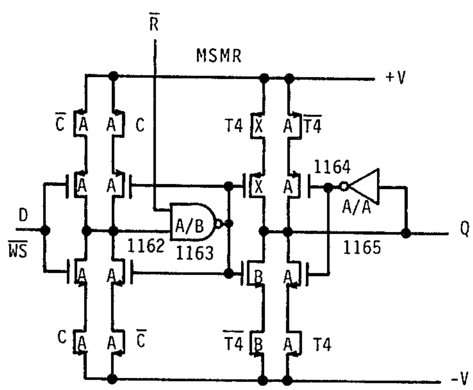
Figure 10B:
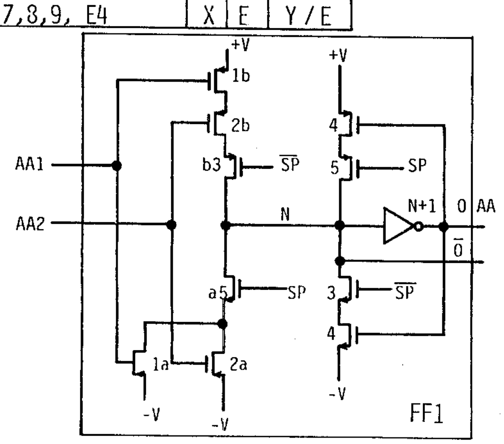
Figure 10B:
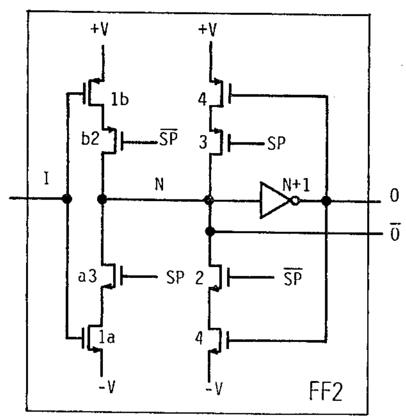
Figure 10C:
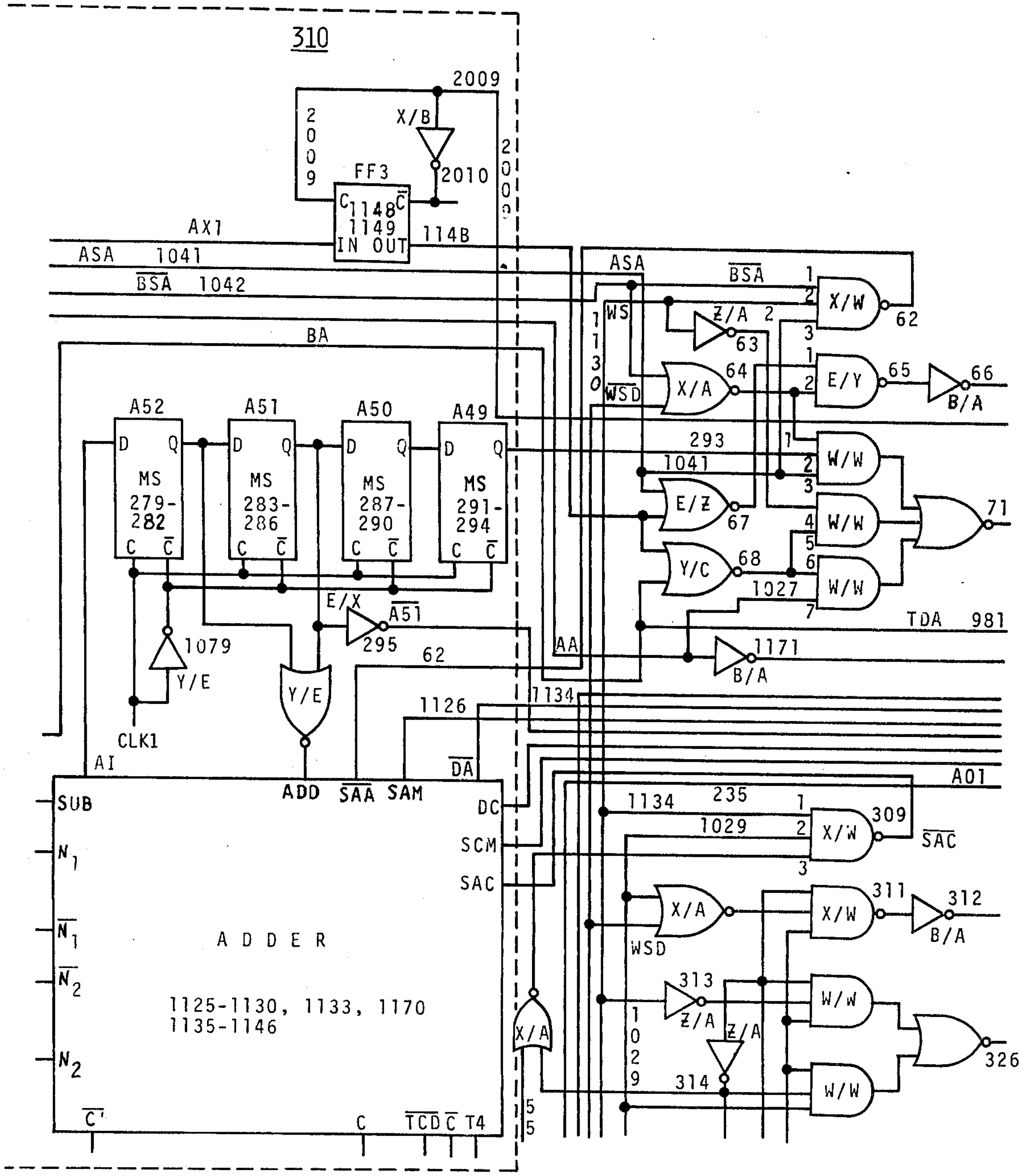
Figure 10C:
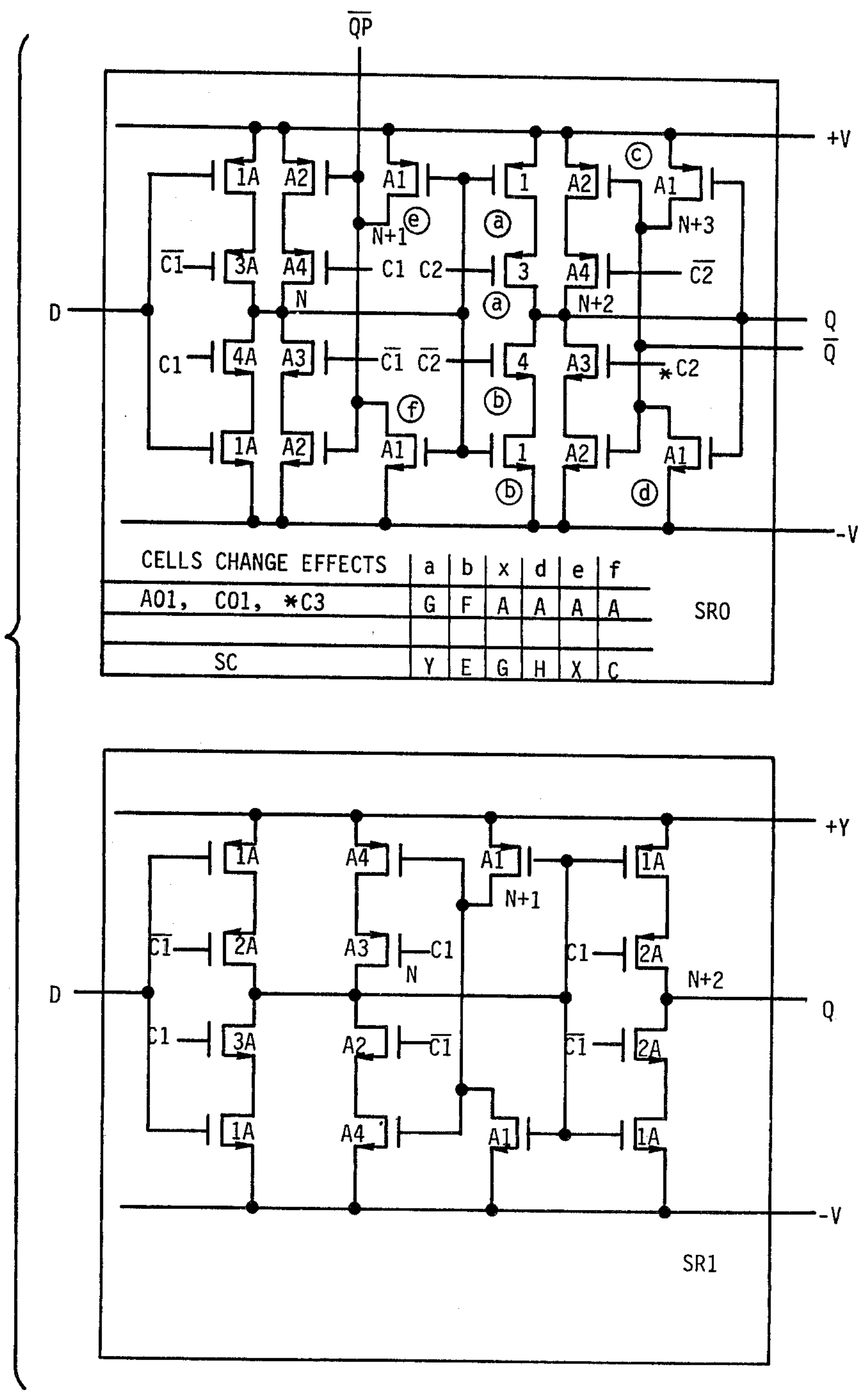
Figure 10D:
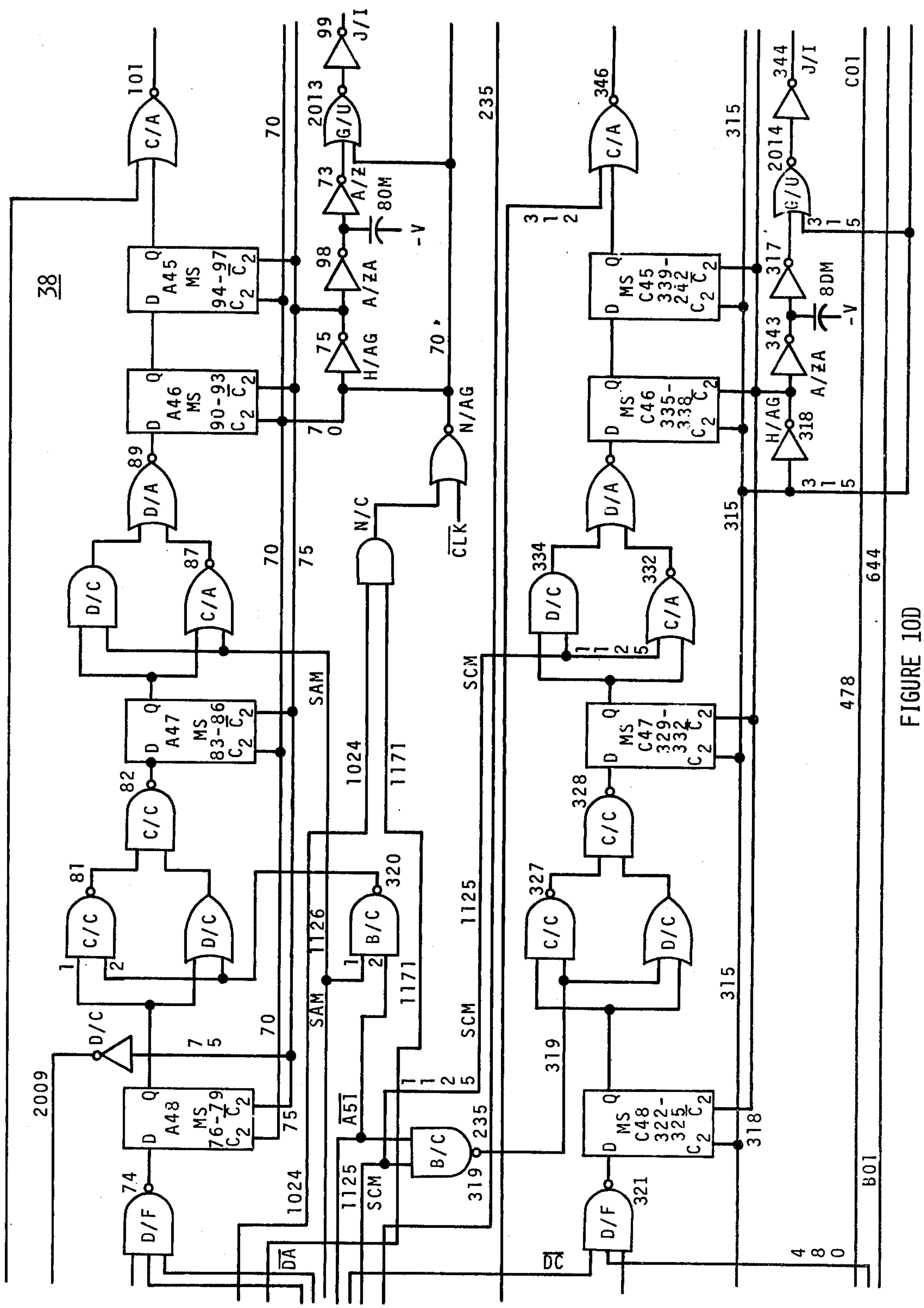
Figure 10D:
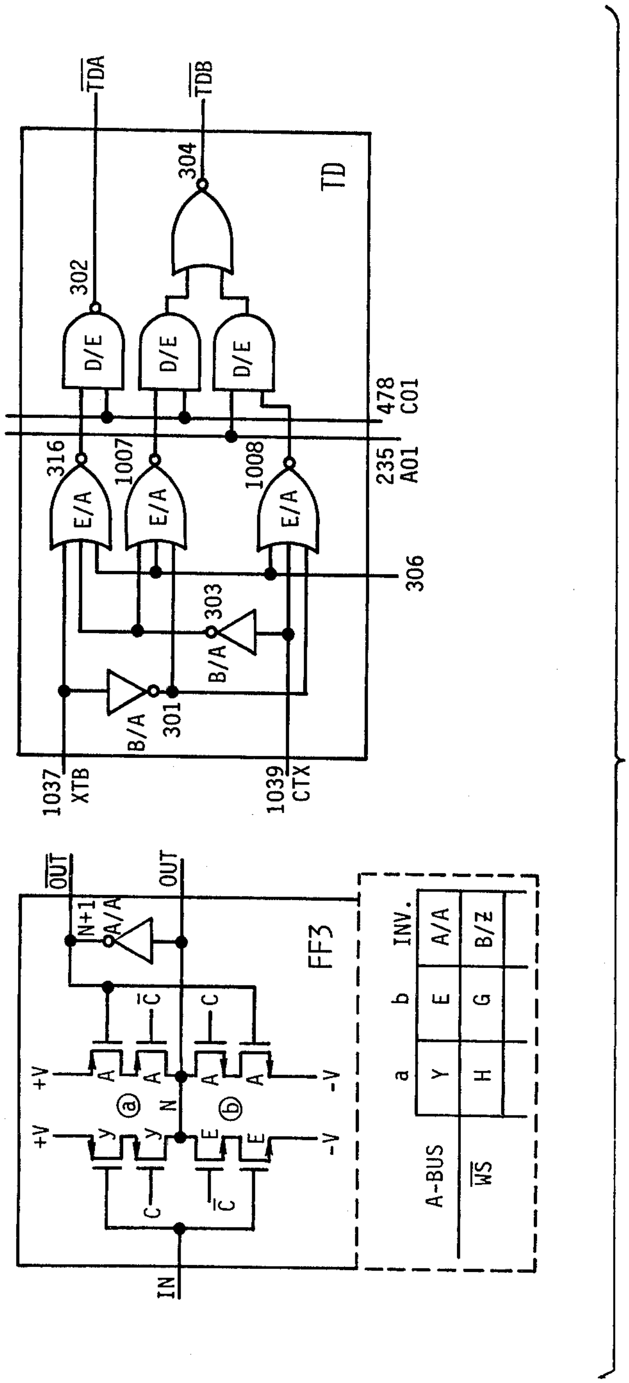
Figure 10E:
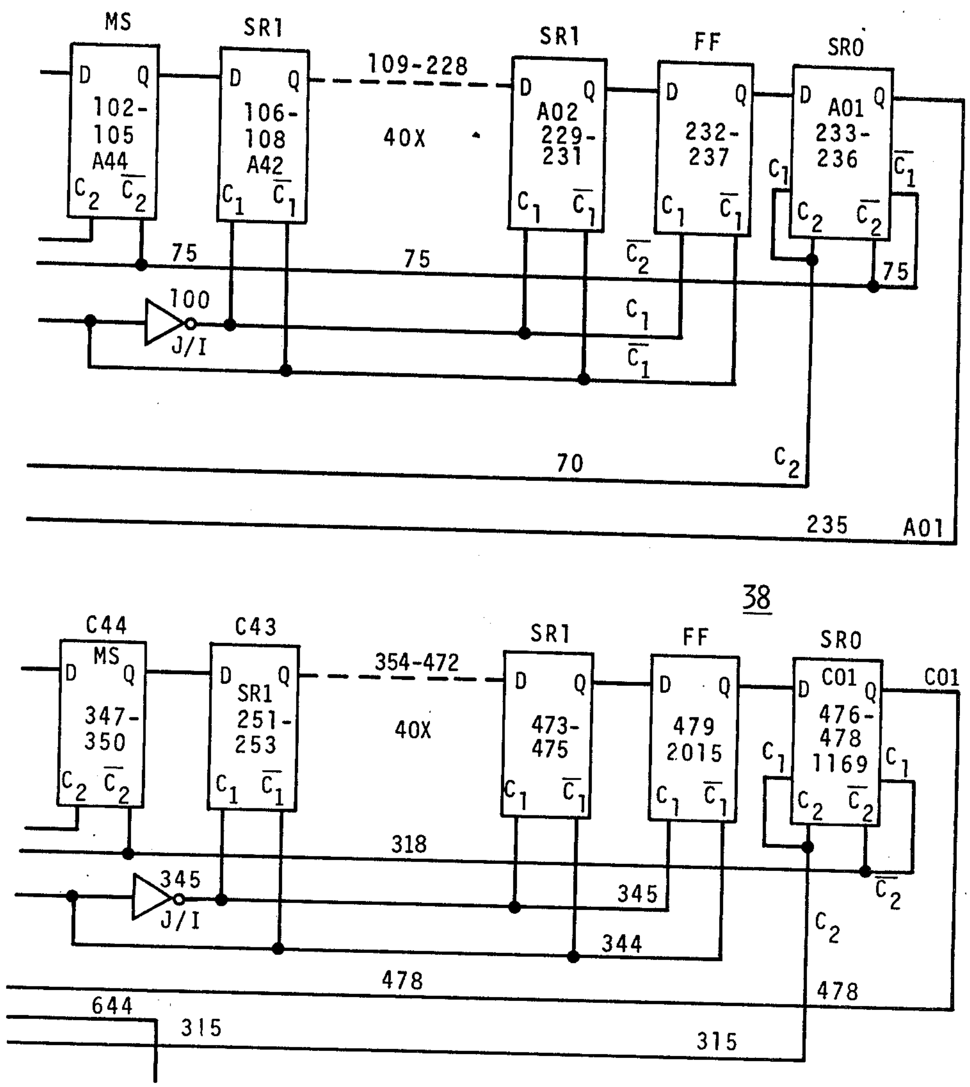
Figure 10E:
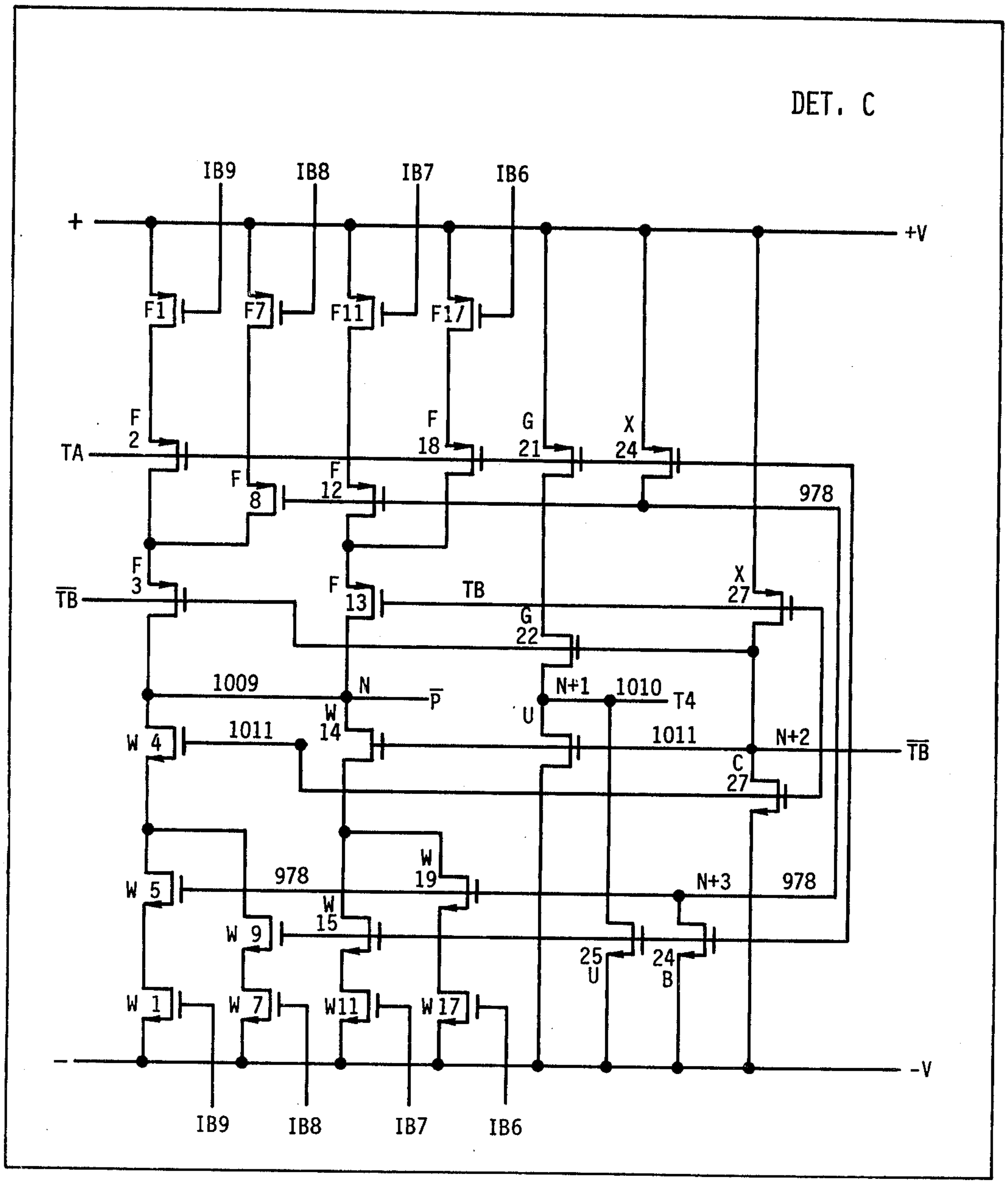
Figure 10F:
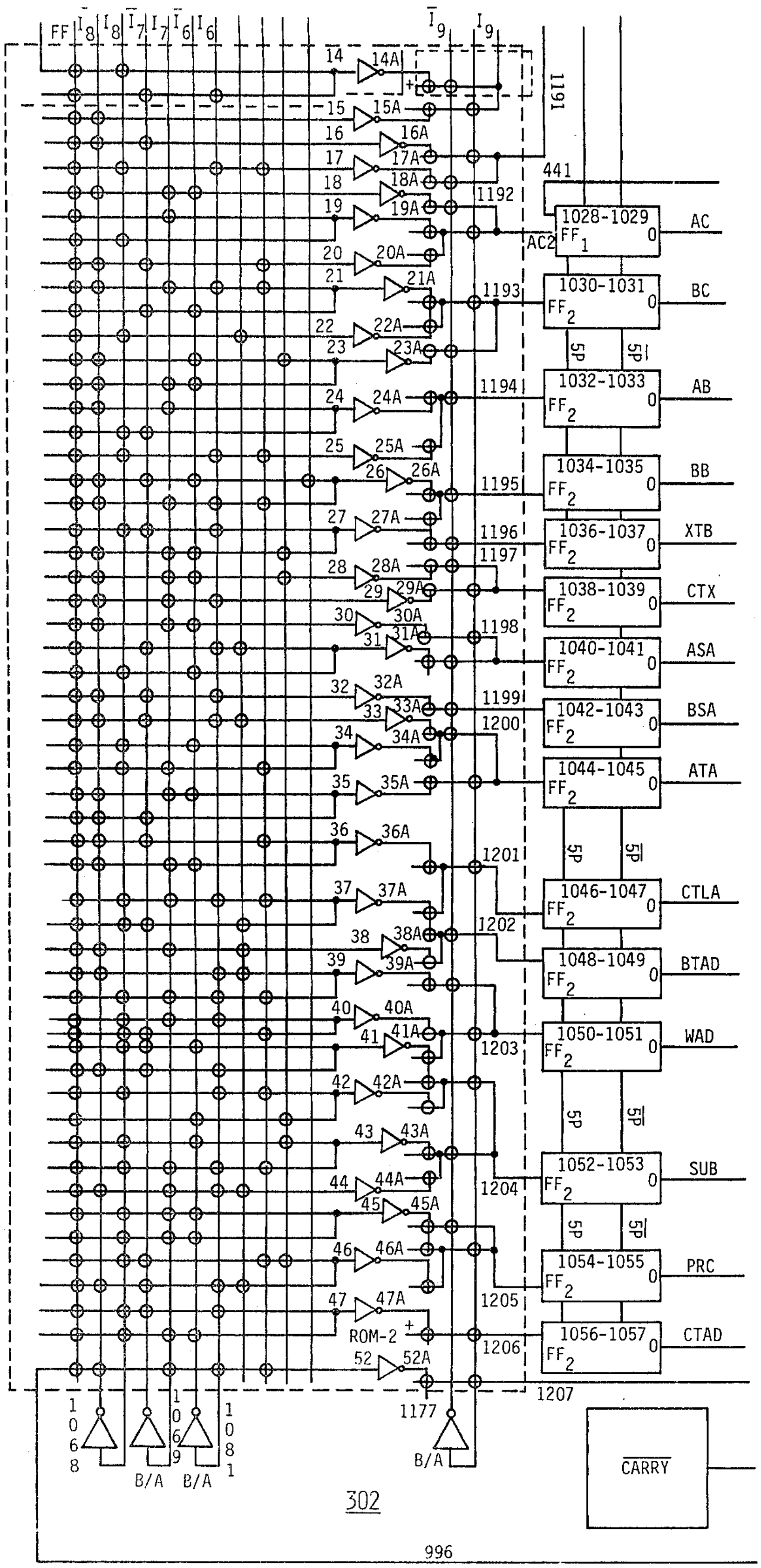
Figure 10F:
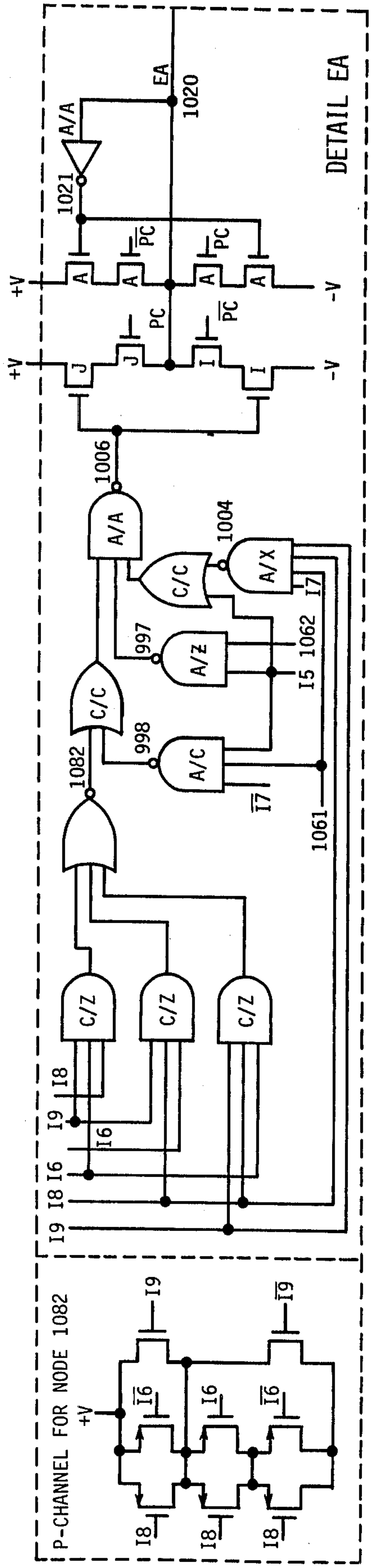
Figure 10G:
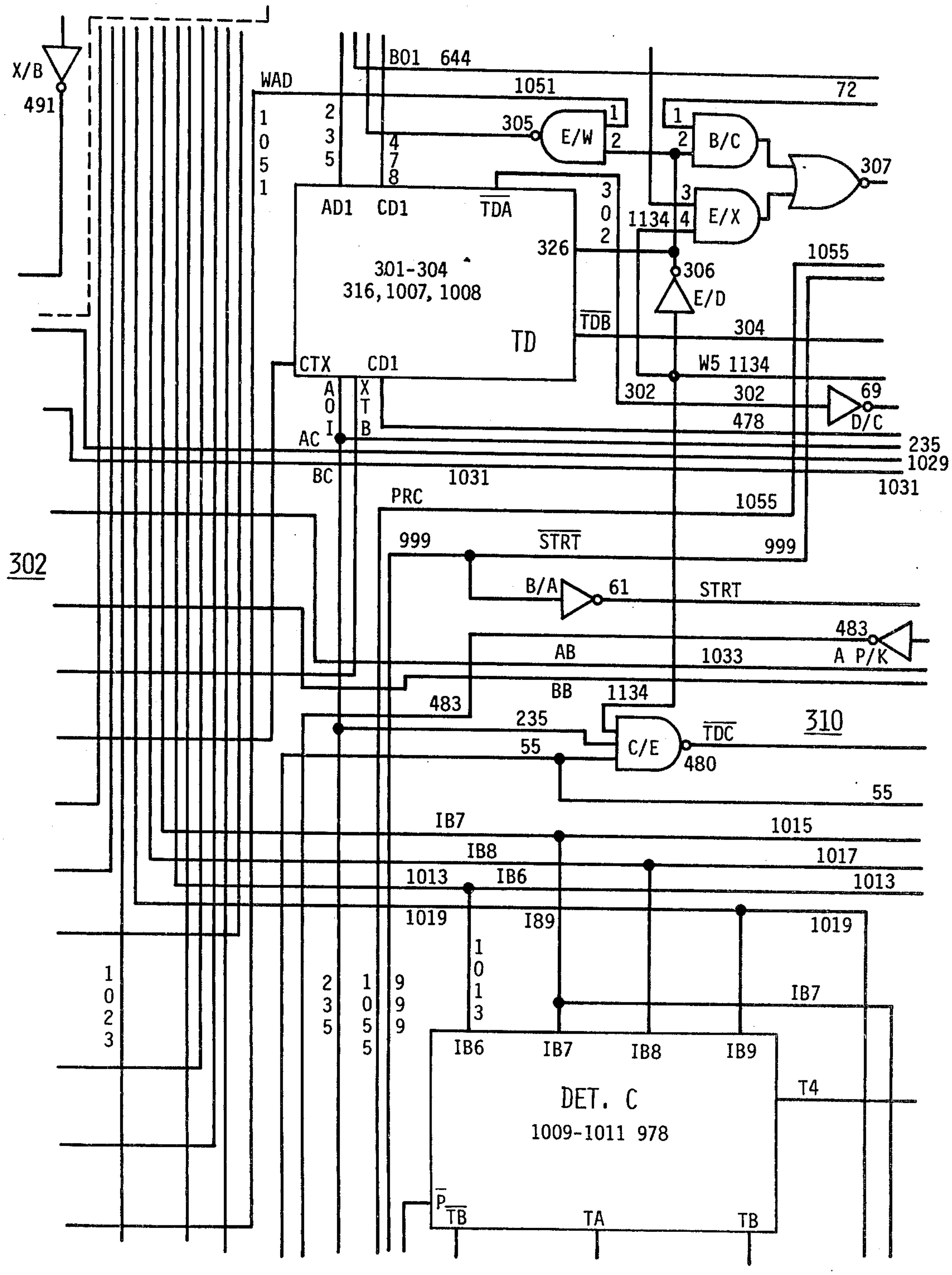
Figure 10G:
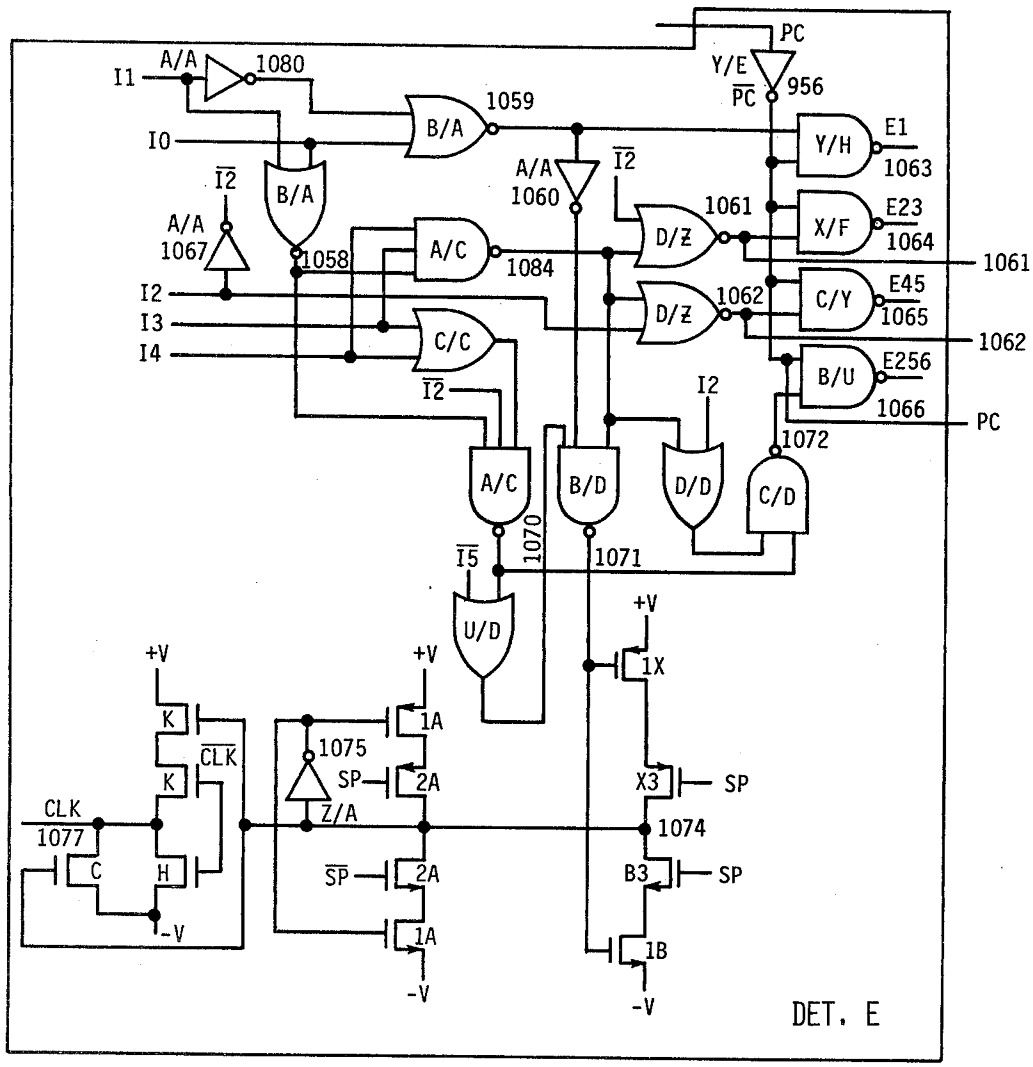
Figure 10H:
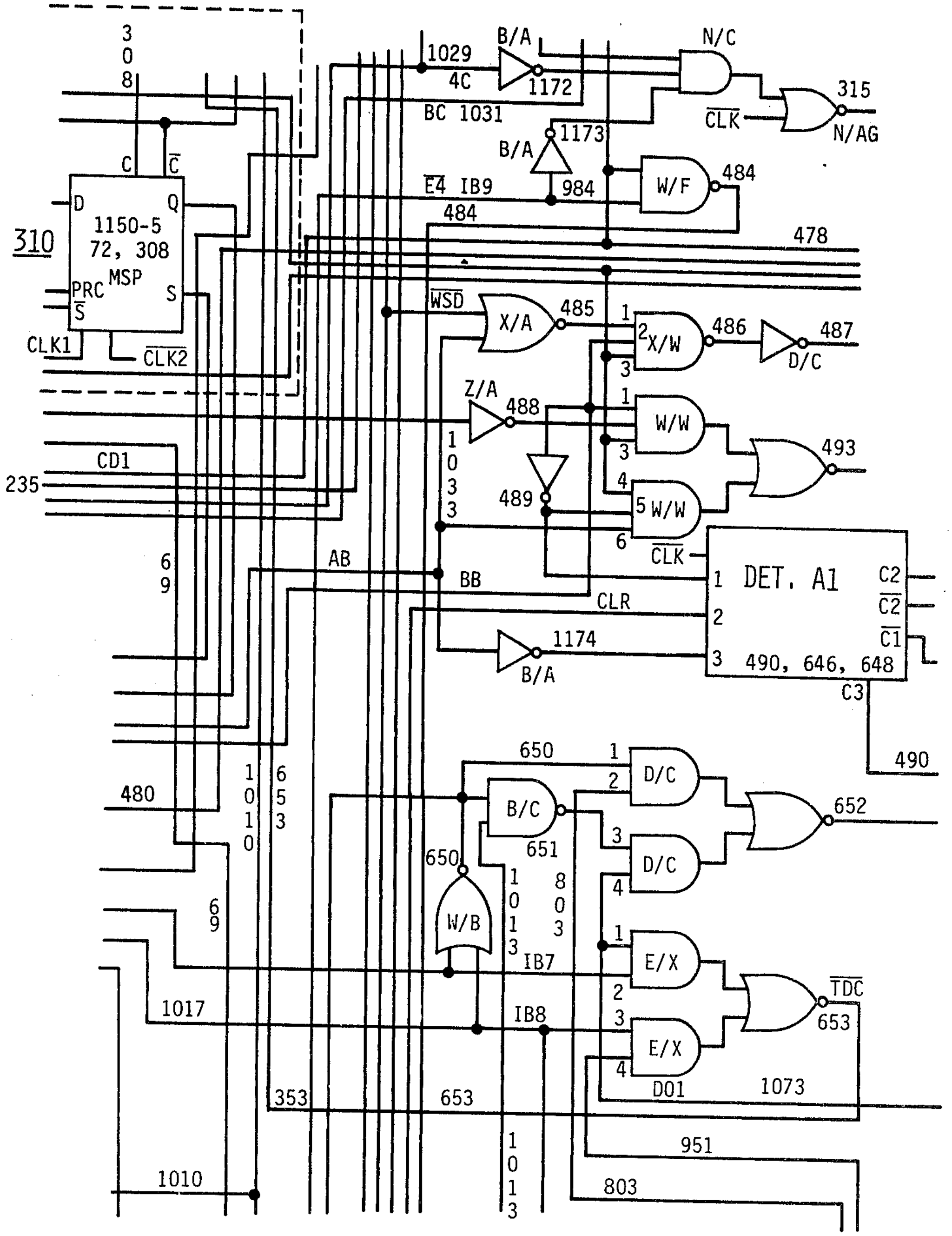
Figure 10H:
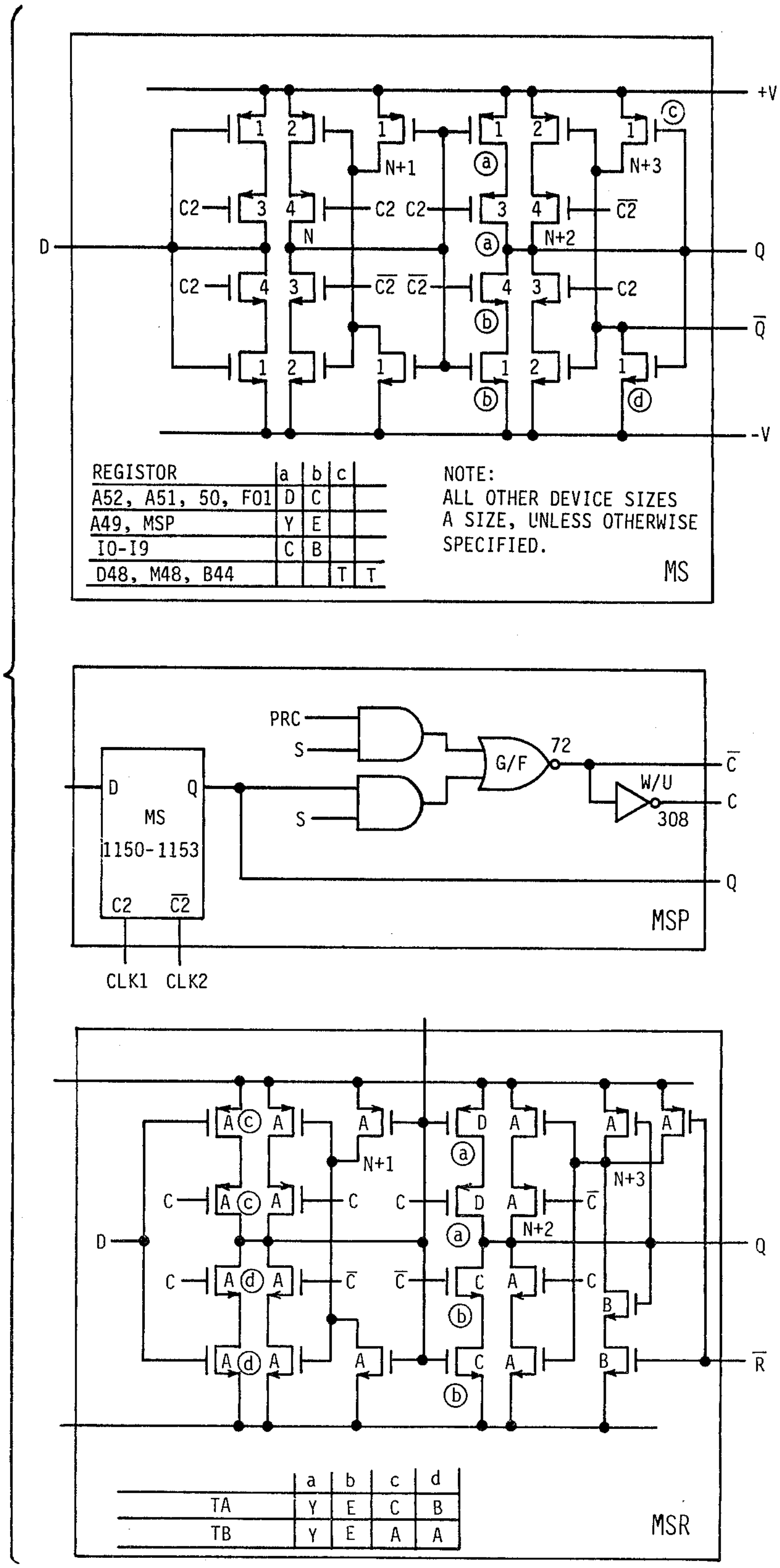
Figure 10I:
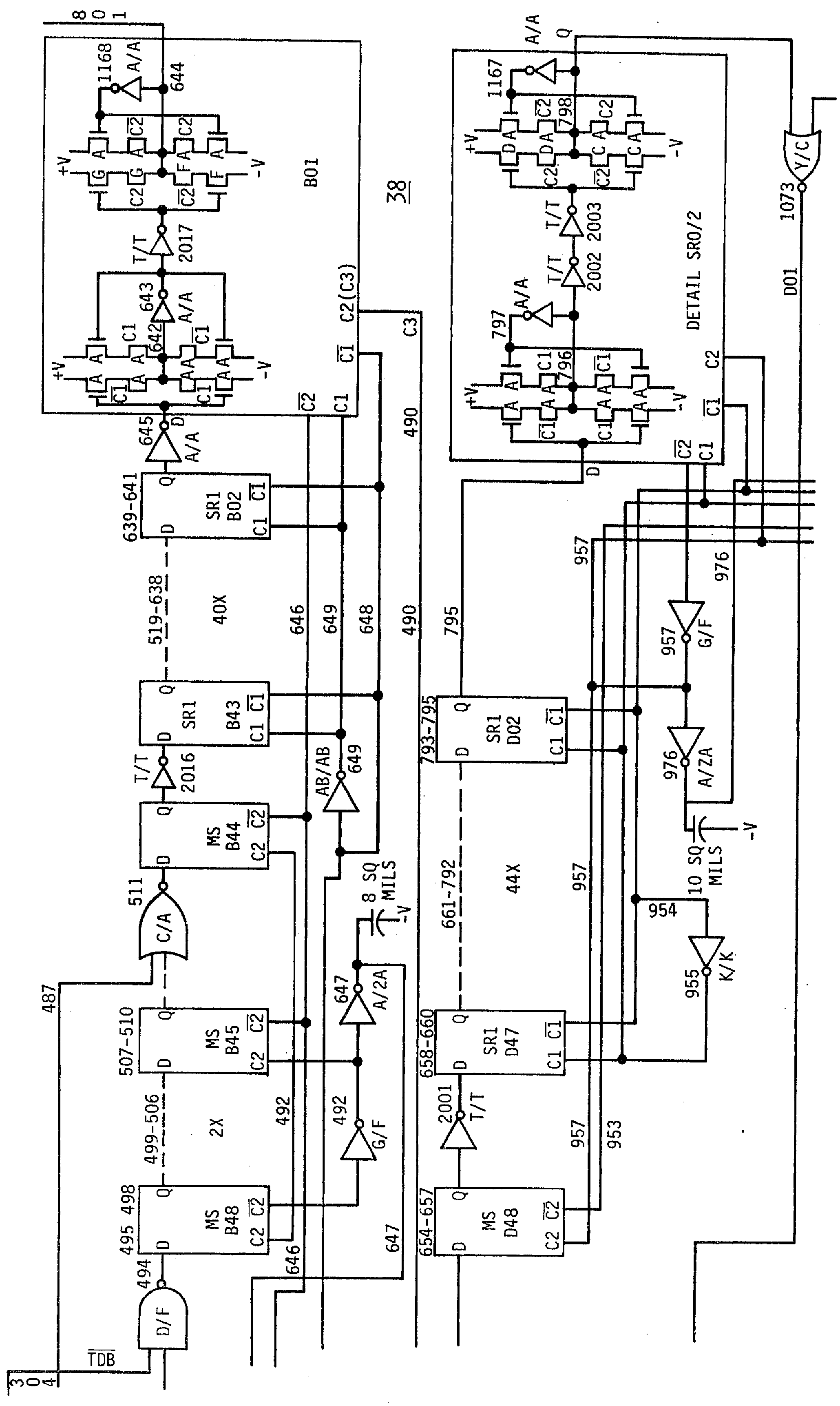
Figure 10:
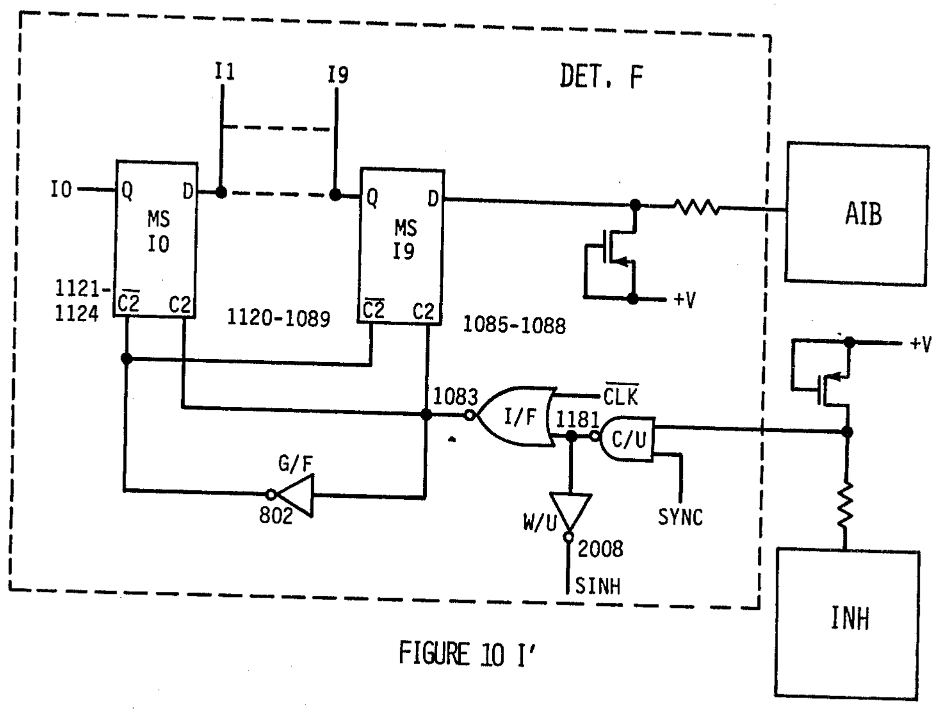
FIG. 10N is a figure map showing how the detailed schematic diagrams of FIGS. 10A through 10M fit together.
Figure 10J:
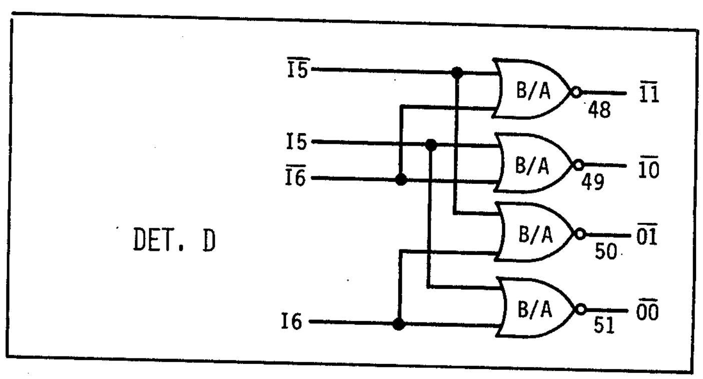
Figure 10K:
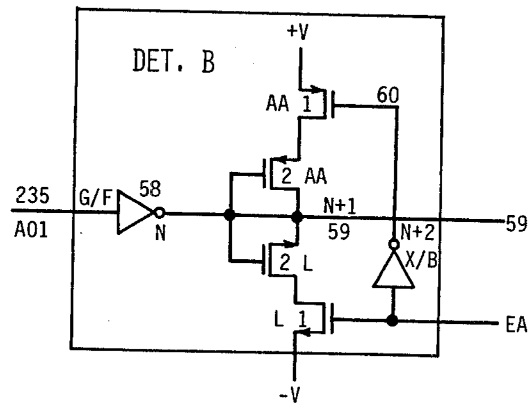
Figure 10J:
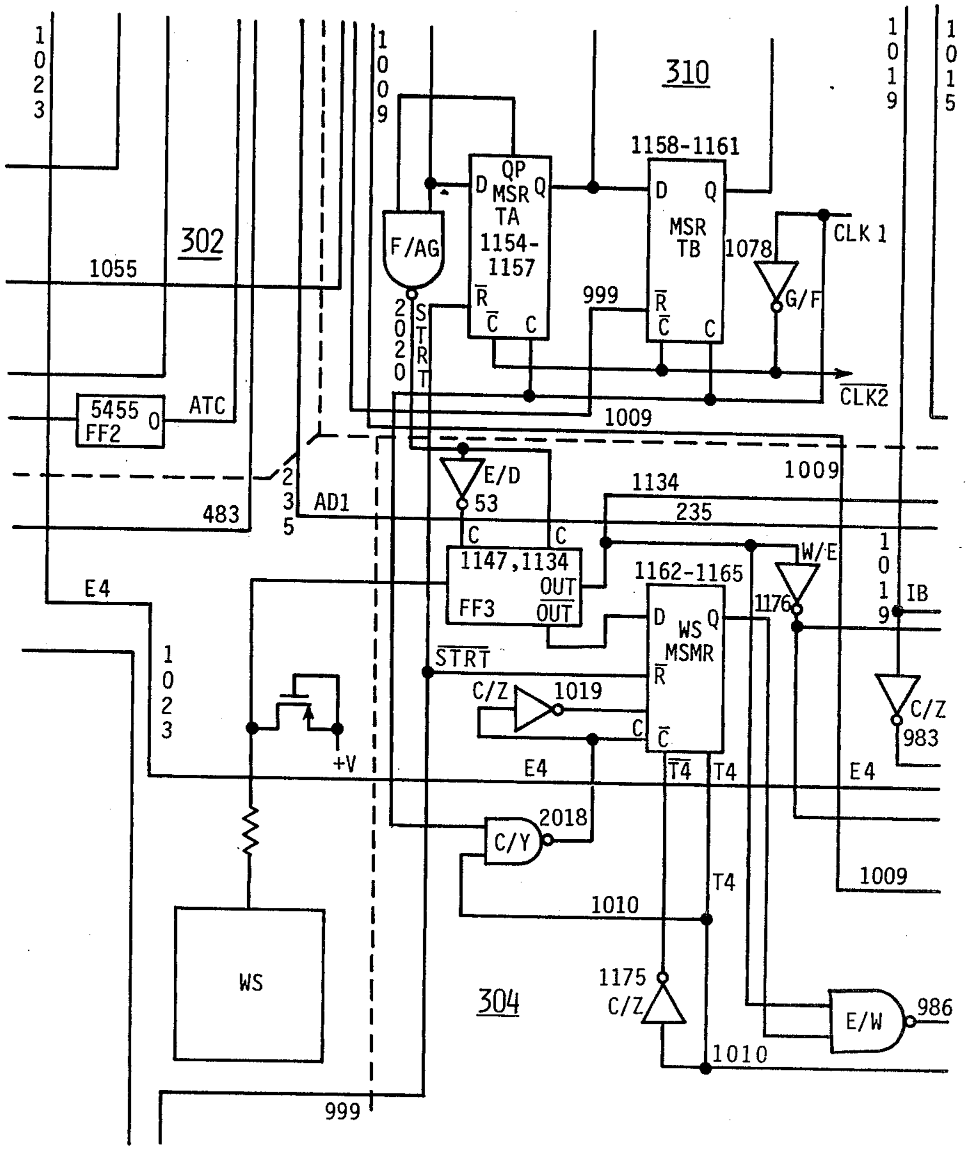
Figure 10K:
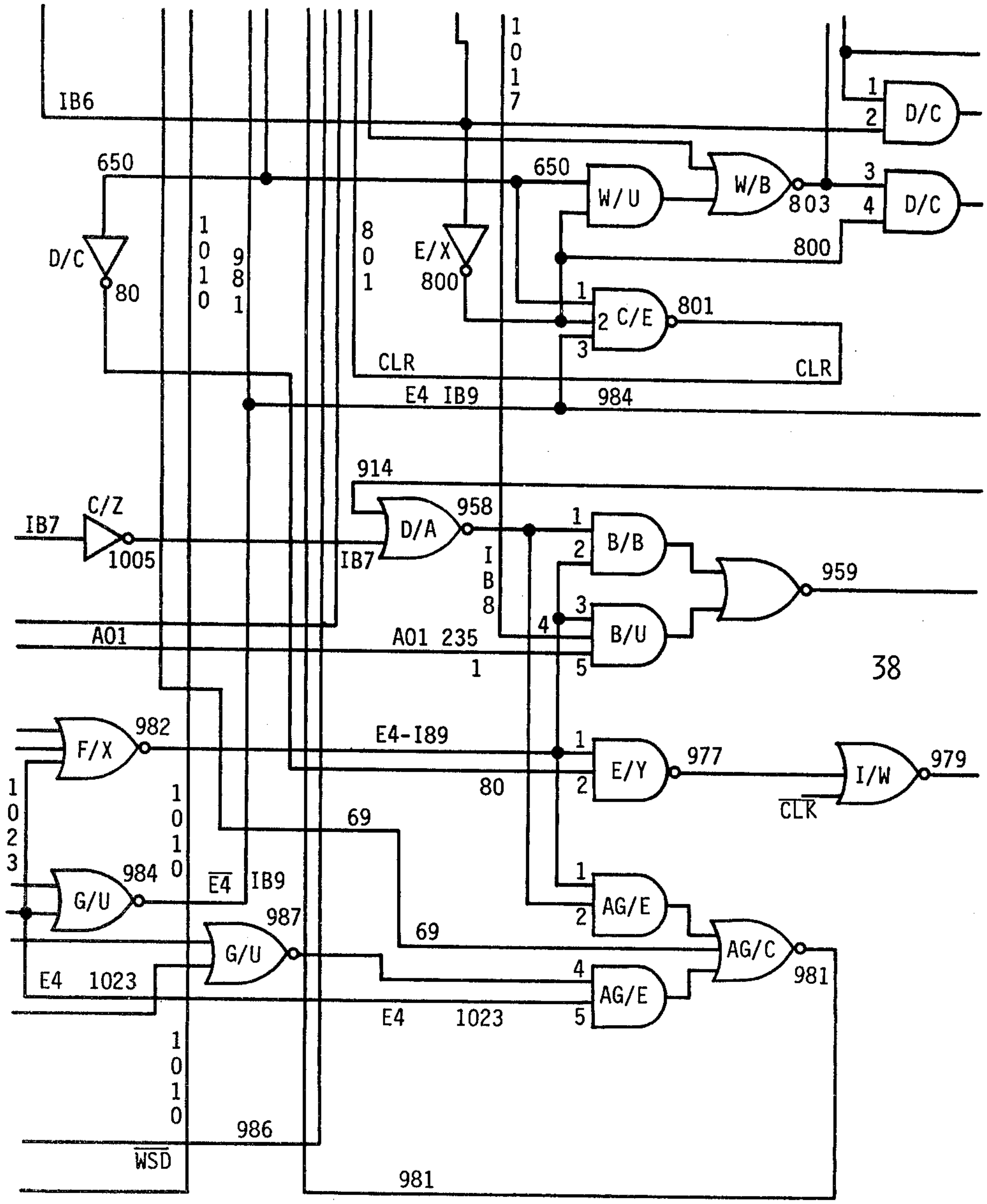
Figure 10L:
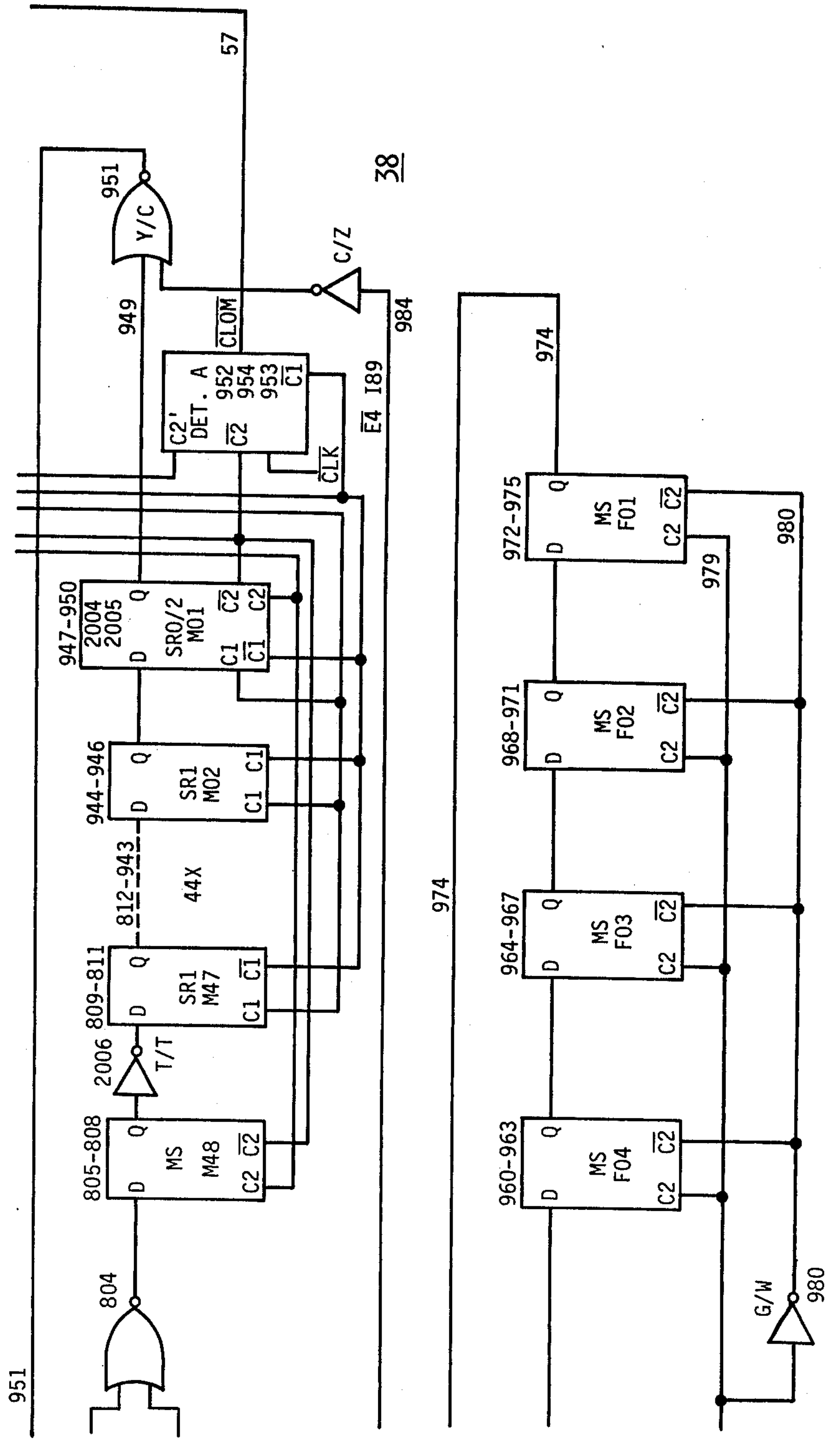
Figure 10L:
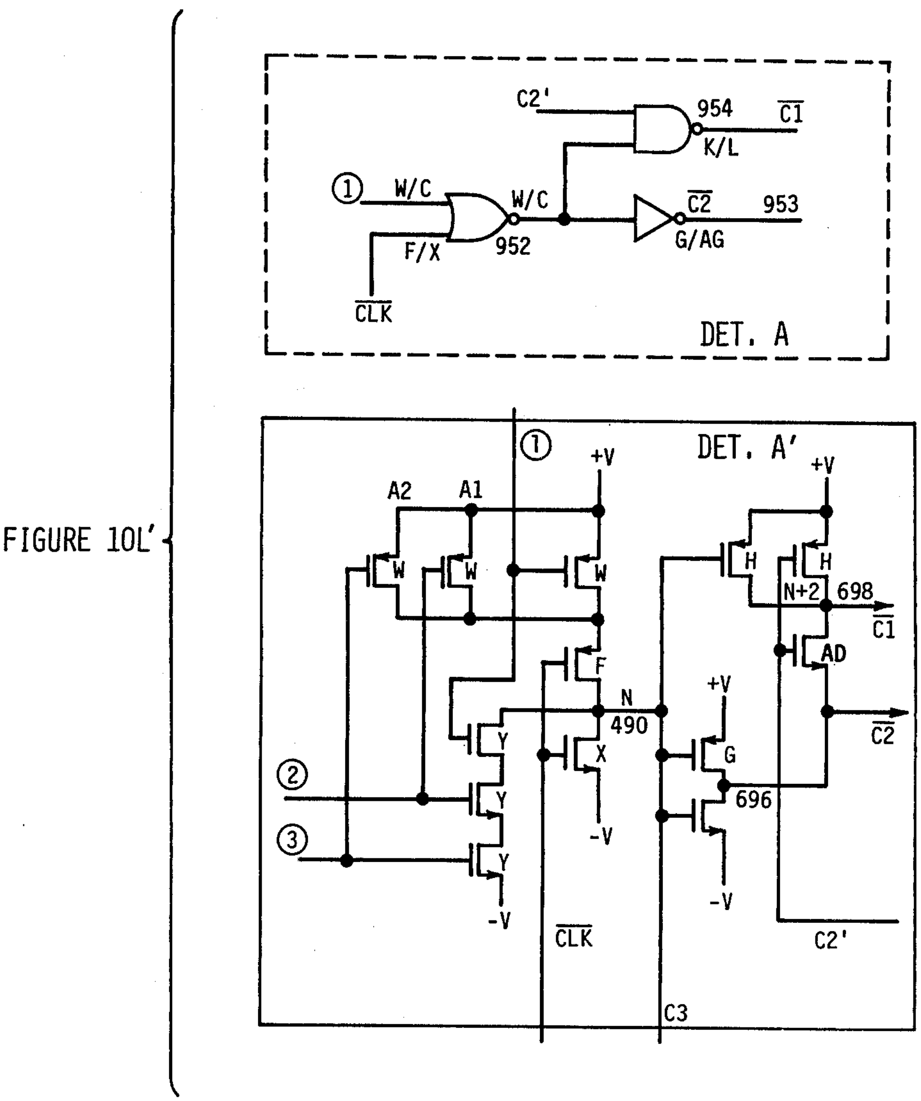
Figure 10M:
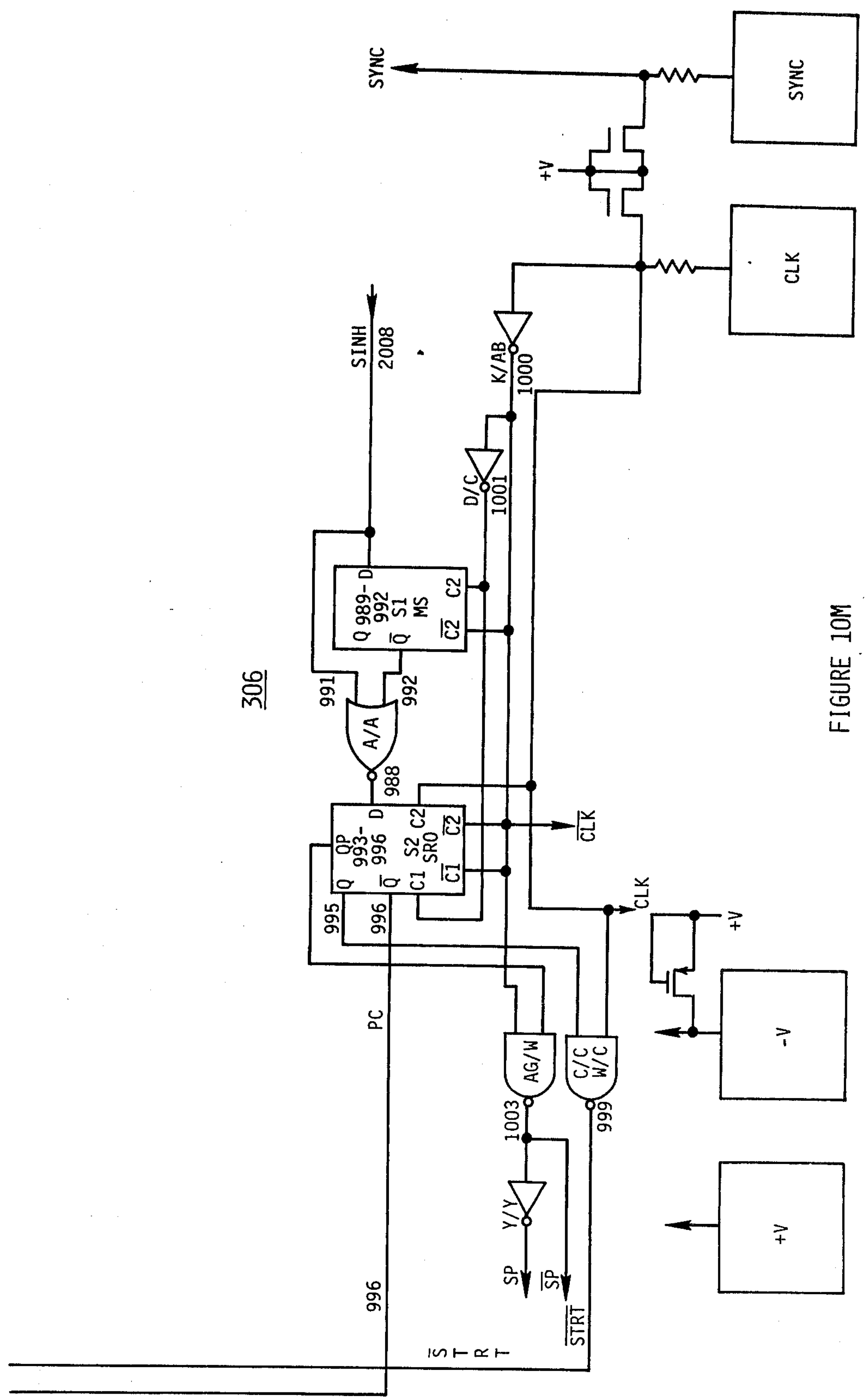
Figure 10N:
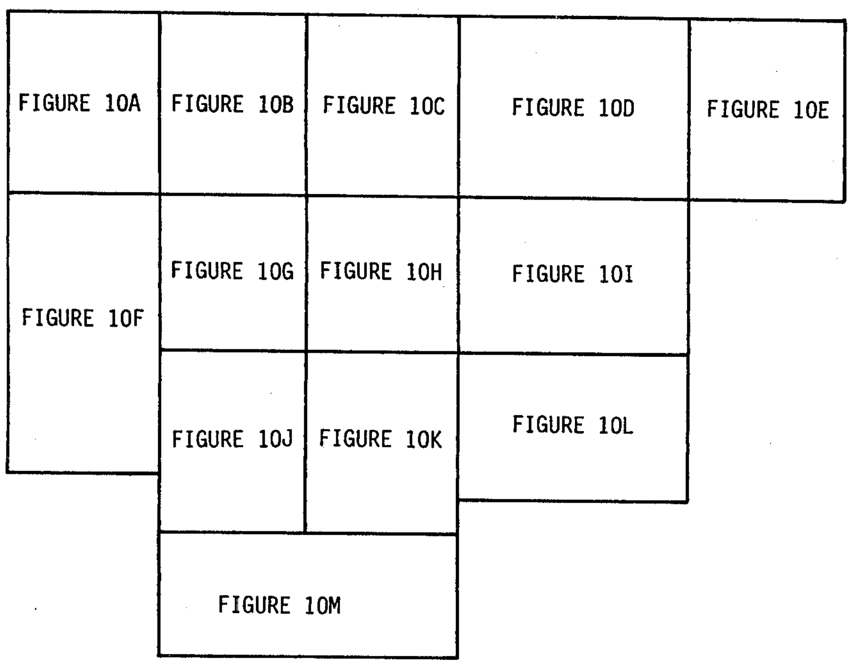

As can be seen in the block diagram of FIGS. 9A and B and the schematic diagrams of FIGS. 10A–N and 10A′–L′, there is an instruction register 300. Instructions come in on the AIB line into the instruction register and are latched there and held stationary for one word time. In fact there are two parts to the instruction register, a dynamic part and a static part. The dynamic part brings in the instruction in serial and then places it in the static part in parallel. This results in having a static instruction for essentially 99% of the word time. A word time is the amount of time for a 48-bit word to circulate around any register once so that it is in the same position as it was one word time earlier.

There are 10 bits of instruction which are put onto lines in an instruction decoder circuit 302 to turn on or off various instruction lines on the righthand side of the instruction decoder. The sort of instructions which are used in this chip are, for example, take the contents of register A and add them to the contents of register B and put the result in A, or take a word off the ABUS and put it into register A. Additional instructions are shown below in Table I which gives the full instruction set for the preferred embodiment.

TABLE I

| | ARITHMETIC INSTRUCTIONS |
|---|---|
| SYMBOL | DESCRIPTION |
| A=0 | Set contents of A register equal to zero. |
| A SR | Shift the contents of A register to the right. |
| A SL | Shift the contents of A register to the left. |
| AB EX | Exchange the contents of the A and B registers. |
| AC EX | Exchange the contents of the A and C registers. |
| A=C | Set contents of A register equal to contents of C register. |
| A=A+1 | Increment contents of A register by one. |
| A=A−1 | Decrement contents of A register by one. |
| A=A+B | Add contents of A register to contents of B register and place result in A register. |
| A=A−B | Subtract contents of B register from contents of A register and place result in A register. |
| A=A+C | Add contents of A register to contents of C register and place result in A register |
| A=A−C | Subtract contents of C register from contents of A register and place result in A register. |
| B SR | Shift contents of B register to the right. |
| B=0 | Set contents of B register equal to zero. |
| BC EX | Exchange contents of A and B registers. |
| B=A | Set contents of B register equal to contents of A register. |
| C=0 | Set contents of C register equal to zero. |
| C SR | Shift contents of C register to the right. |
| C=B | Set contents of C register equal to contents of B register. |
| C=C+1 | Increment contents of C register by one. |
| C=C−1 | Decrement contents of C register by one. |
| C=−C | Change the sign of the contents of C register. |
| C=−C-−1 | Change the sign of the contents of C register and decrement by one. |
| C=C+C | Add the contents of C register to the contents of C register and place result in C register. |
| C=A+C | Add the contents of A register to the contents of C register and place result in C register. |
| C=A−C | Subtract contents of C register from contents of A register and place result in C register. |
| ?A≠0 | Are the contents of A register not equal to zero? |
| ?A>=B | Are the contents of A register greater than or equal to the contents of B register? |
| ?A>=C | Are the contents of A register greater than or equal to the contents of C register? |
| ?B=0 | Are the contents of B register equal to zero? |
| ?C=0 | Are the contents of C register equal to zero? |
| ?C≠0 | Are the contents of C register not equal to zero? |

There are five full-length registers, 48 bits long, the A, B, C, D and M registers and a 4-bit register, the F register. The F register is used to pick up one digit from the A register or put it back in the A register on the pointer. There are 8 word select instructions used on this chip: on pointer, word through pointer, full word, mantissa, mantissa sign, exponent, and exponent sign. They form a pattern which comes in on the WSX line. The word select is used to pick out a particular part of the word so that operations can be performed just on that portion. To accomplish this, the instruction lines are allowed to operate only during that word select. Some of the timing and decoding is done in the multiplexers in front of the registers, to avoid the delay of having to go through the instruction decoder and then through the multiplexers for validating instructions. Thus, the word select validates the instruction and it validates it only for a part of a word in most cases. The word select signal comes through an adder timing circuit 304 onto the WS line and into the multiplexers.

The first two bits of an instruction define whether it is a branch, a jump, an adder instruction or any of the other instructions. Since this is the arithmetic and register chip, it takes the adder instructions, and decodes several other instructions as well. Those instructions that are not decoded are ignored, such as branches and jumps. The 32 adder instructions in Table I are validated by the word select, but the other instructions which this chip recognizes are full word instructions and they do not have to be qualified by the word select signal.

Many instructions have an effect either over the whole word time or at some unimportant time during the word, for instance, a status bit in the C&T chip. For these it is not necessary to know when the status bit is set; it is just necessary to know that it is set at some time during the word and these instructions are designated by an initial 00 code. In the arithmetic instructions, however, the instruction should only work during a particular part of the word, for instance, during the exponent sign time or during the mantissa field. Only one of these is a whole word time long, and their validity is reduced by the amount of time that the word select signal is off.

On the other hand, if it is desired to take a data word off the ABUS, the whole word should be taken. Therefore, there is no necessity to mix a word select signal into the instruction for data transfers. Analogously, transferring data from the A register to the D register or to the M register occurs over a complete word time. The F register, on the other hand, does use the word select, and the data transfers to the F register are not part of the 32 instructions in Table I. However, it has been arranged so that the pointer comes in through word select at times other than during normal arithmetic operations. Thus the pointer is used for transfers between the F and A registers and also for loading constants. When a load constant instruction occurs, a 4-bit field, a digit, is placed into the A register at the pointer position. In the instruction decoder 6 bits are sufficient to determine that it is a load constant instruction. The other 4 bits are the 4 bits which are to be loaded into the A register. At this time they are still in the dynamic part of the instruction register and are picked off at the appropriate time when pointer time comes in through the word select.

There is an ABUS multiplexer 308 which allows the A&R chip either to put data onto the ABUS or to receive data from the ABUS. Three of the registers, A, B and C, are divided into two parts. For each one there is a 44-bit straight shift register and at the beginning of each is a 4-bit shift register which includes decimal correction and multiplexing. An adder/subtracter/correcter circuit 310 takes in the A register bit A01 and the C register bit C01 or the B register bit B01 and does a binary add on them. The destination of the sum or difference will be either the A register or the C register. Therefore there is a sum to the A register via the SAM line and a sum the the C register via the SCM line. For the first three bits of any digit time, there is a binary sum coming out on SAM or SCM, depending on which of these is selected as a destination. Or if an airthmetic test is being performed, there is no destination. When the fourth bit arrives, logic within the adder/subtracter/-correcter block decides whether a decimal correction is necessary. In other words, if the binary sum is greater than 9 for an add or it is less than zero for a subtract, the fourth bit which goes on SAM is the corrected most significant bit, and simultaneously a correction occurs in the 4-bit multiplexers.

The multiplexers also take care of, for instance, exchanging the contents of the A register with those of the D register, exchanging the contents of the M register with those of the A register or making right shifts. The normal calculation of data is for A01 to come into the beginning of the 4bits in the corrrecter shift multiplexer block. However, when a right shift occurs, A01 during the validated part of the instruction is fed right back into the beginning of the 44-bit shift register so that the 4 bits are by-passed by means of one of the multiplexers. In left shifts, on the other hand, A01 goes through a 4-bit register which is in the adder/subtracter/correcter block and then back in through the whole 48-bit shift register. Thus there is a 4-bit register in the adder/subtracter/correcter that performs two functions. One function is just to perform a left shift on the contents of the A register. The other function is to allow the logic to detect whether corrections are necessary, e.g. the most significant bit in a digit weight 8 together either with a weight 4 or a weight 2 or a carry existing at the most significant bit time for a decimal correction in add, etc.

The F register works together with the A register only on pointer time as mentioned above. This allows the insertion of one digit or the copying of one digit from the A register into the F register on the pointer. The F register is essentially a one digit scratch pad, and is used for such purposes as storing the code of an operation to be performed on data in one of the other registers.

The instruction timing is performed by an instruction timing circuit 306. A sync pulse comes into the A&R chip on the SYNC line so that this chip can be synchronized with the C&T and the ROM chips. As mentioned before, the envelope of the sync signal contains the 10-bits of instructions. The sync signal actually occurs half a bit earlier than the instruction to allow some time for the instruction timing circuit to be set up properly and not to miss the first half bit of instruction. The instruction timing circuit is essentially a counter which is synchronized by the sync signal. This counter allows the instruction register to take in data off the AIB line and to dump it at the end of the word into the instruction decoder. The inhibit signal on the INH line stops the instruction register from receiving instructions.

The last line to note on the A&R chip is $\overline{\text{CARRY}}$. The $\overline{\text{CARRY}}$ line is used internally for addition and subtraction. It goes to the C&T chip so if a branch following an arithmetic operation is desired it is necessary to know the state of the carry. Accordingly, there is a branch if there is no carry and no branch if there is a carry. The carry is remembered from one arithmetic operation until the end of the word, and it is used in the next word by the C&T chip to determine whether to branch.

CLOCK AND DISPLAY CIRCUIT

Figure 11A:
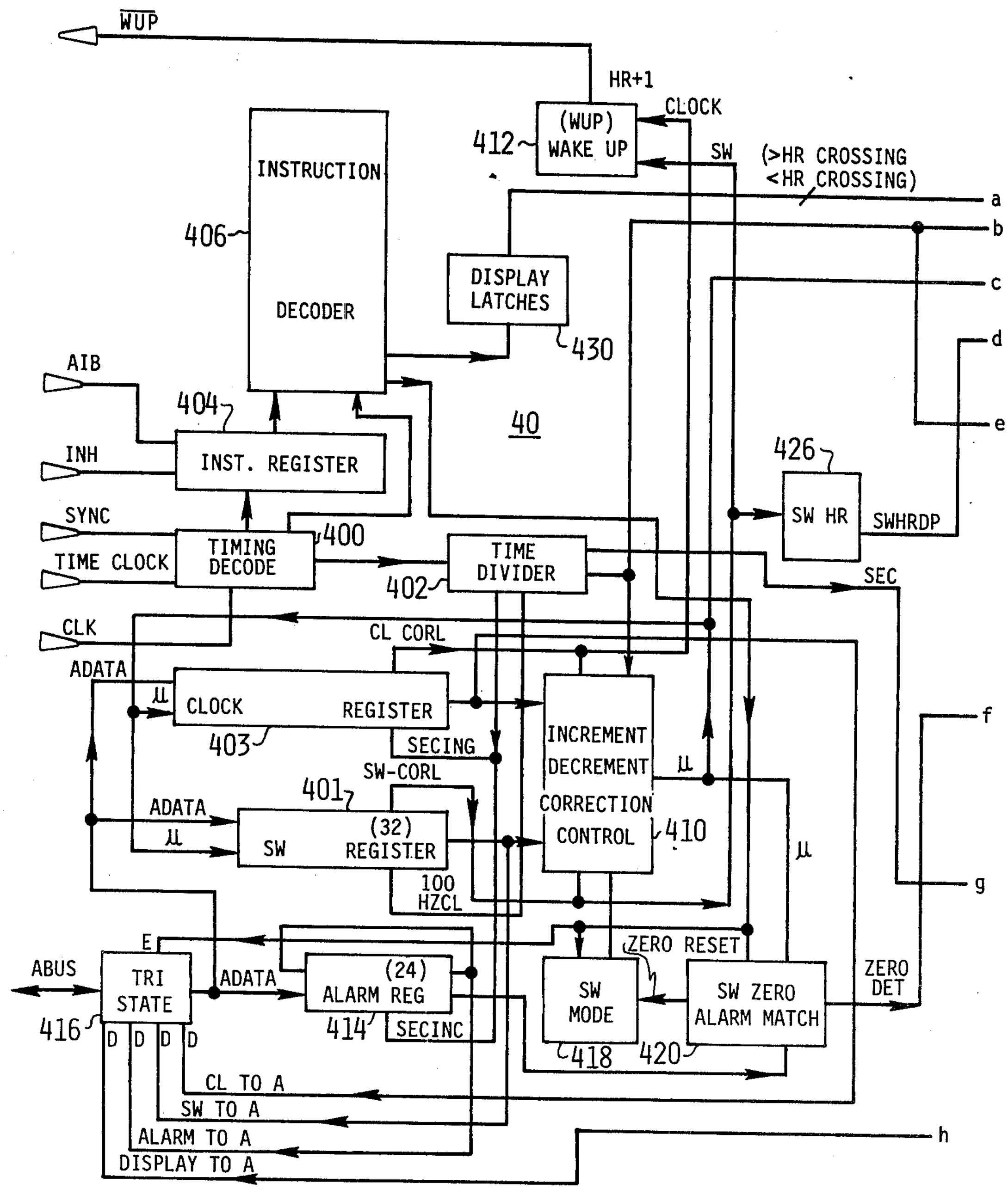
FIGS. 11A and 11B show a block diagram of a clock and display circuit.
Figure 11B:
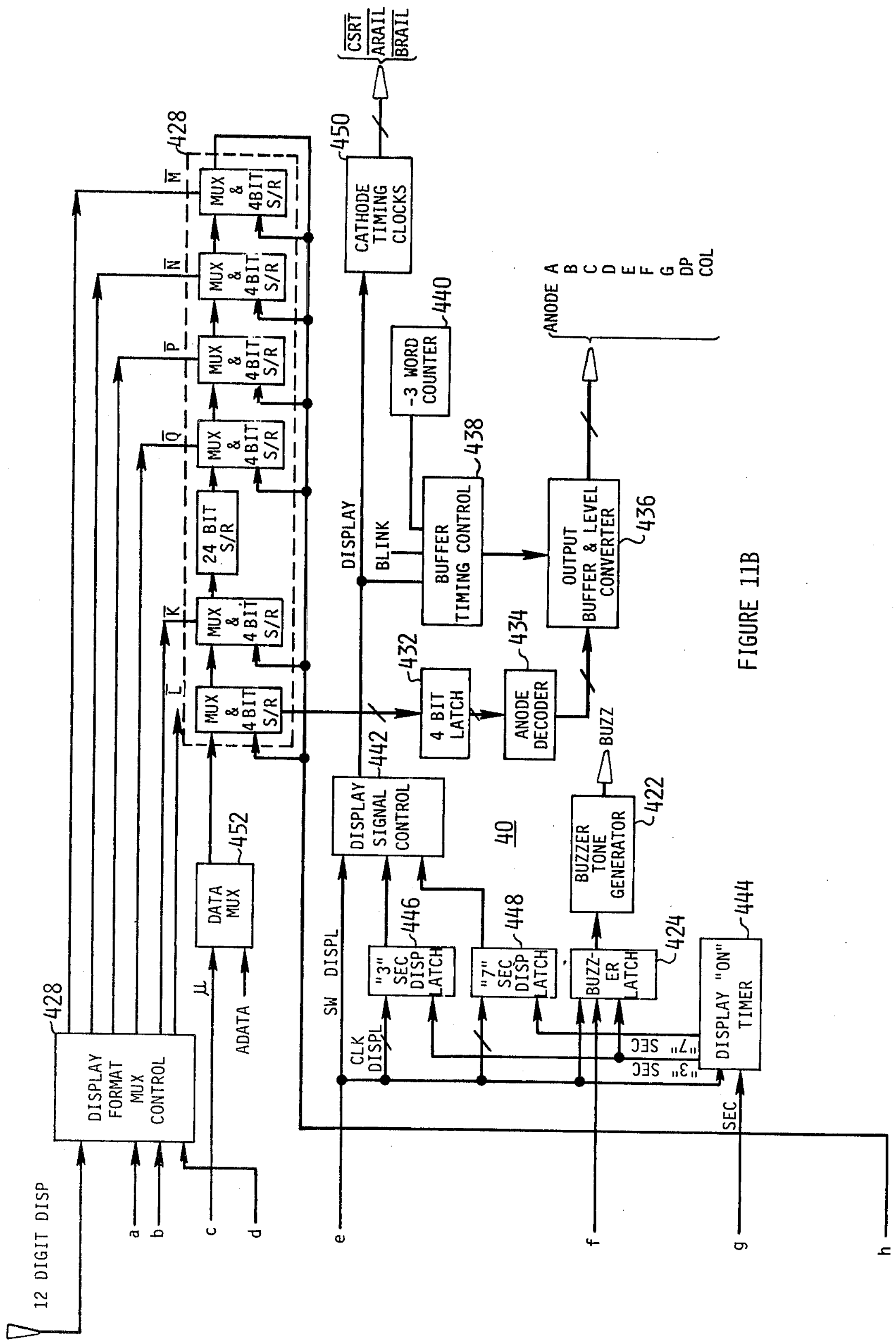
Figure 12A:
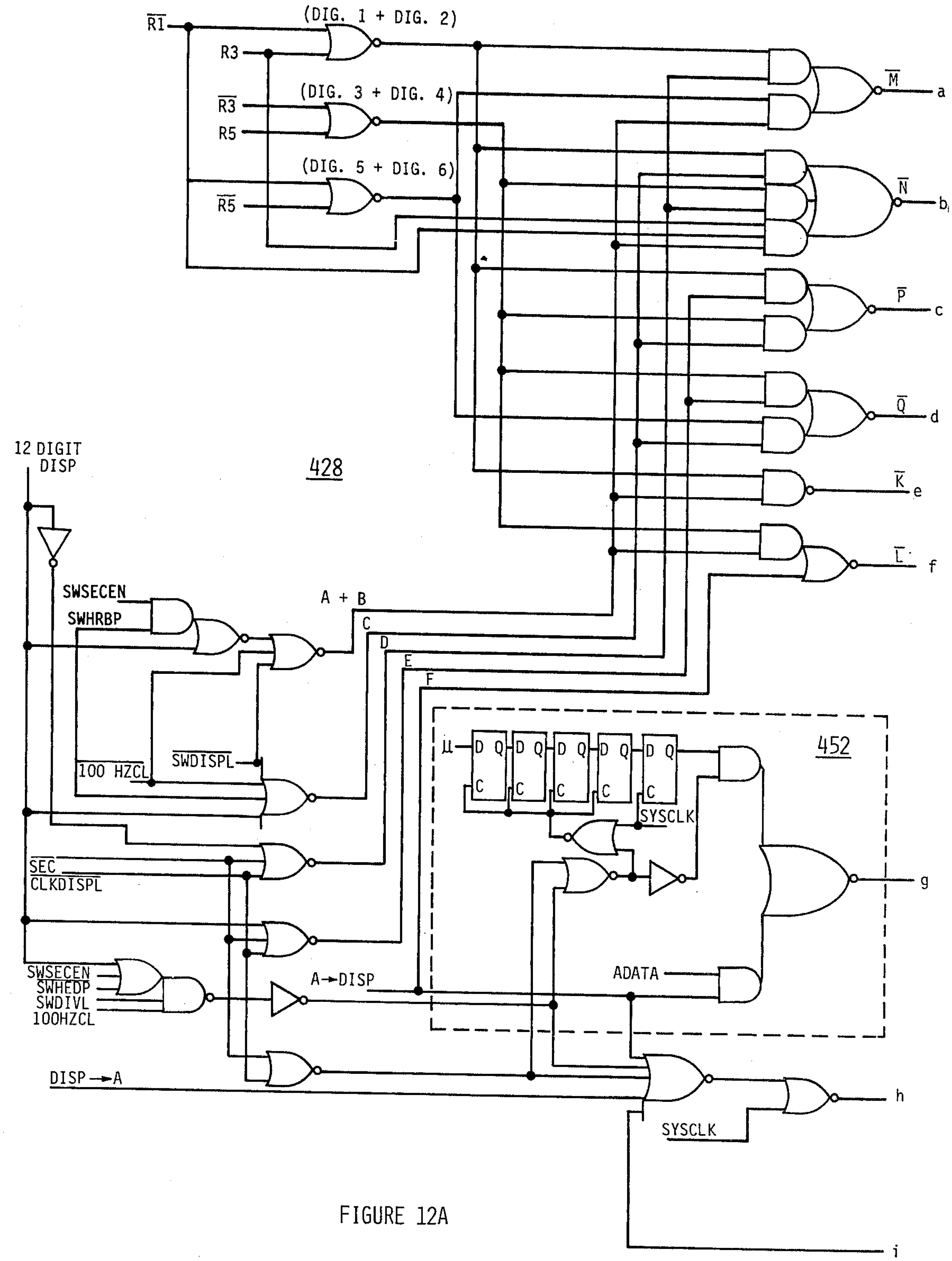
FIGS. 12A through 12G show a detailed schematic diagram of a portion of the circuit of FIGS. 11A and 11B.
Figure 12A:
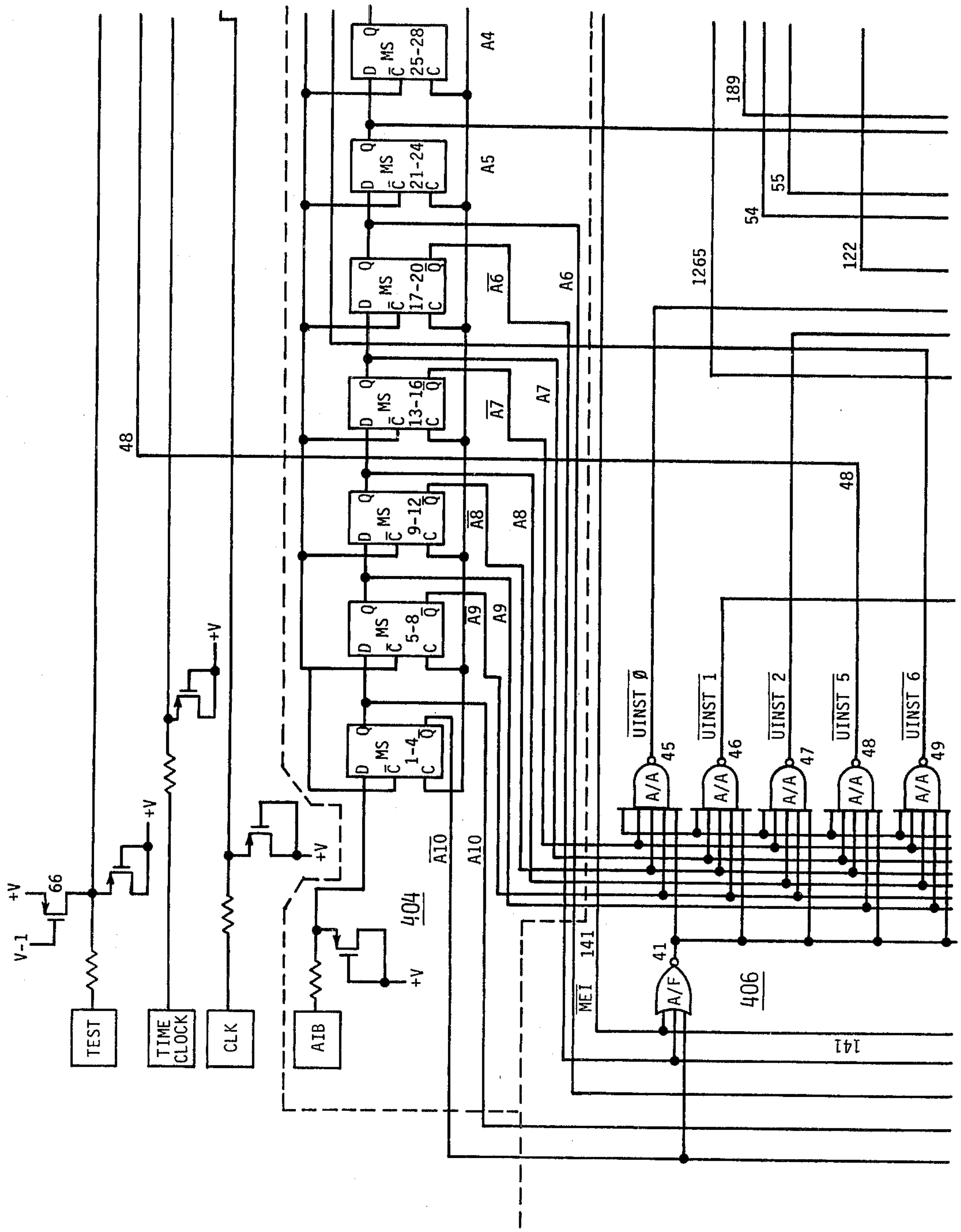
Figure 12B:
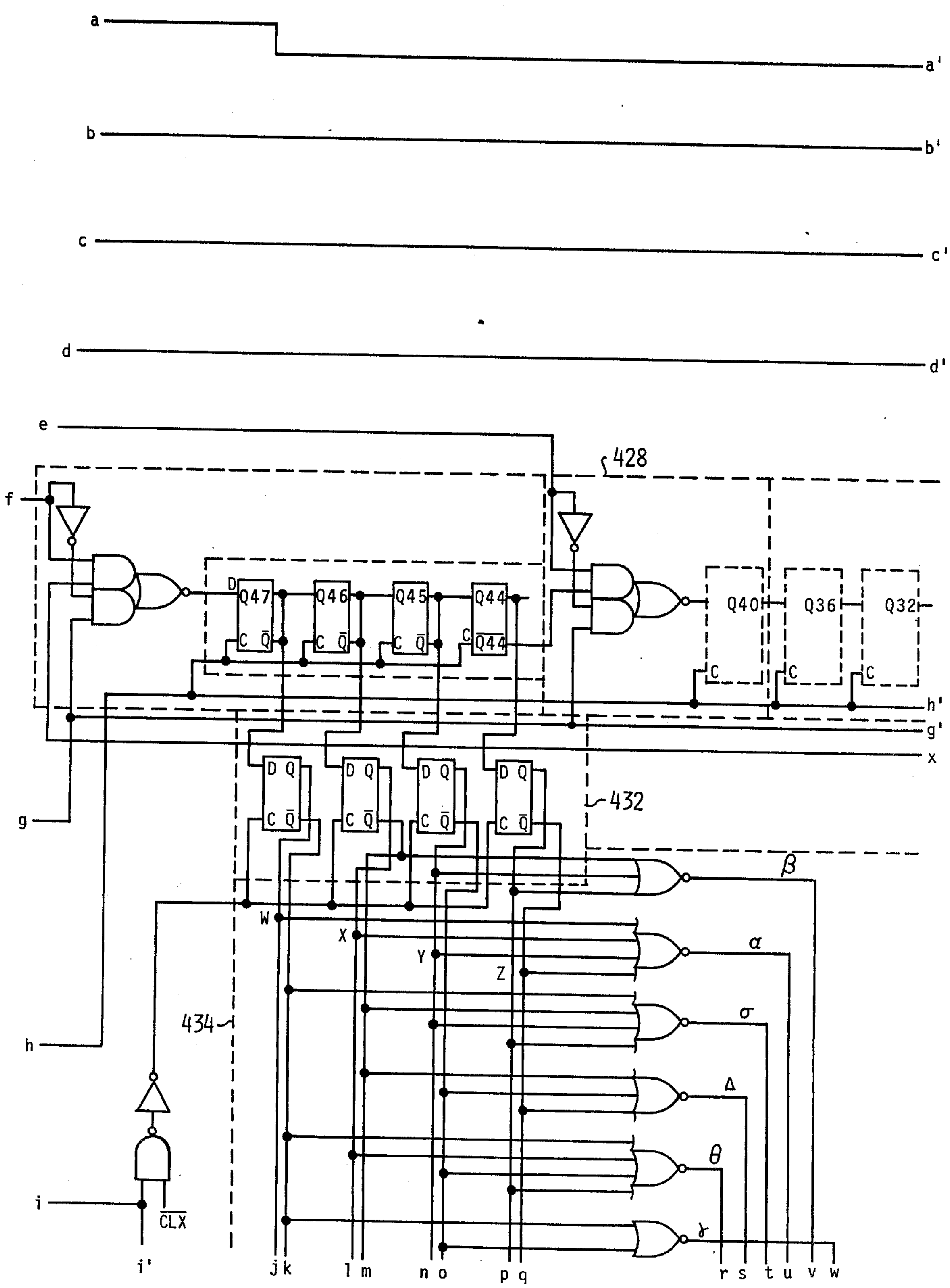
Figure 12B:
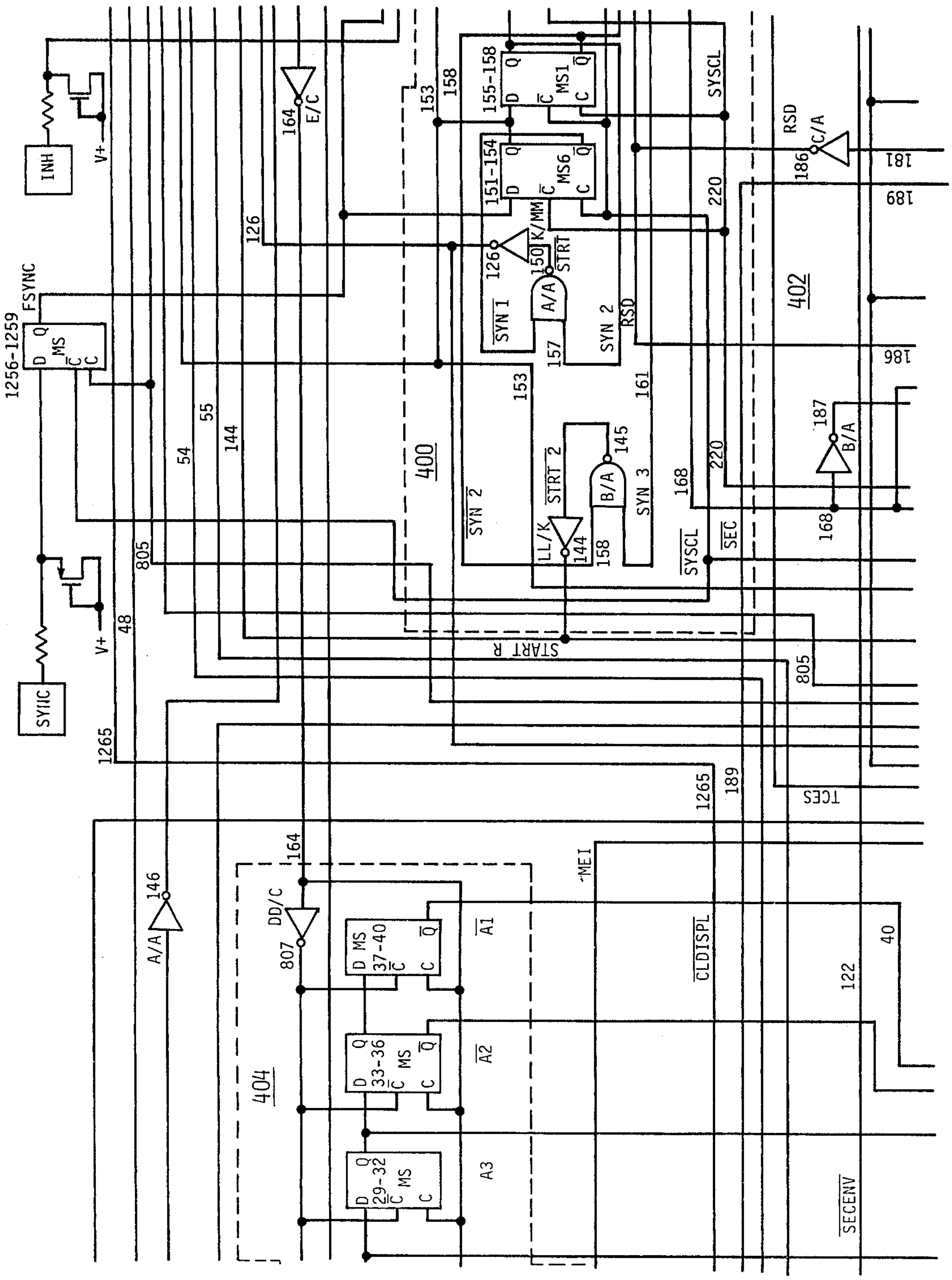
Figure 12C:
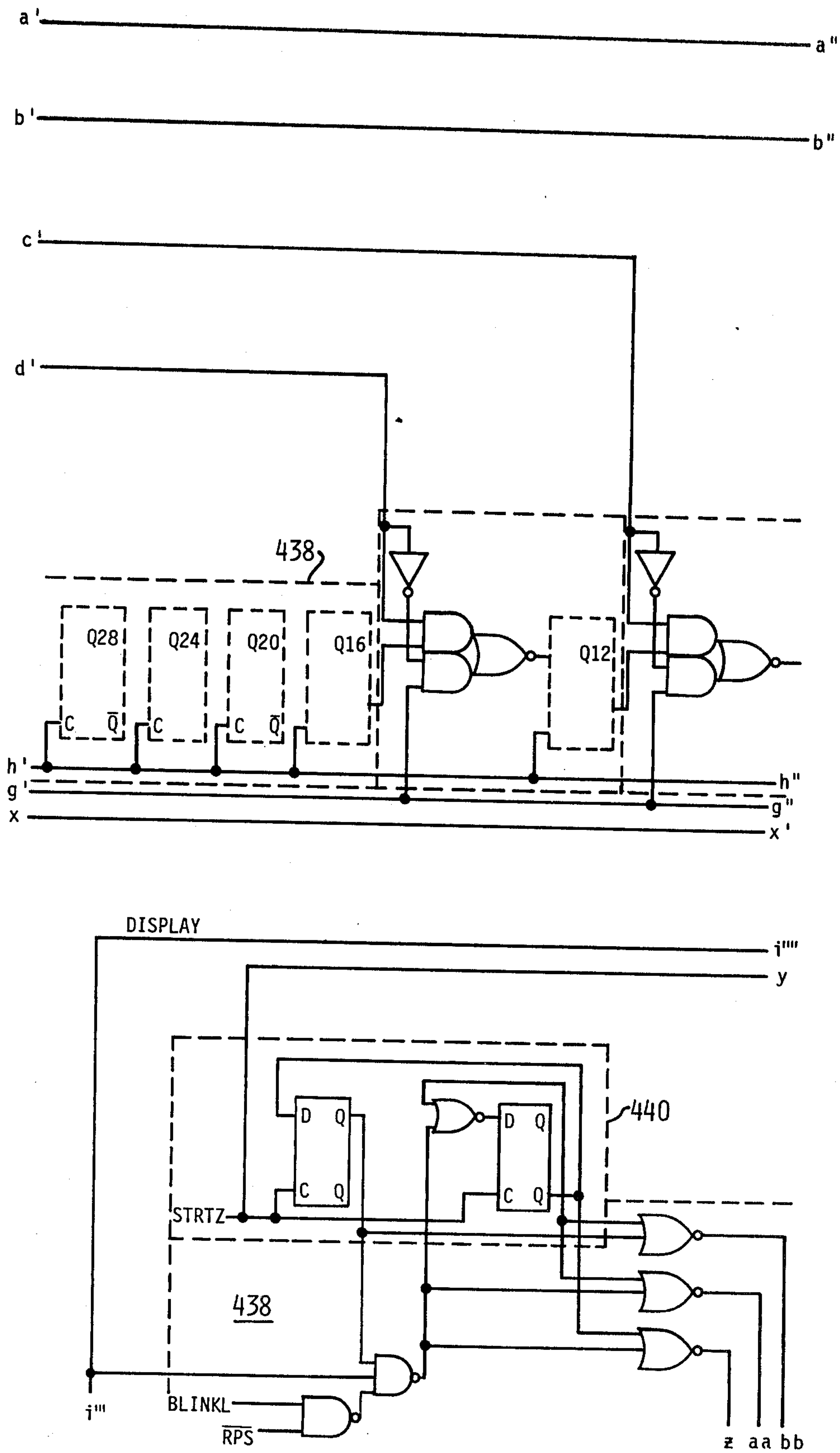
Figure 12C:
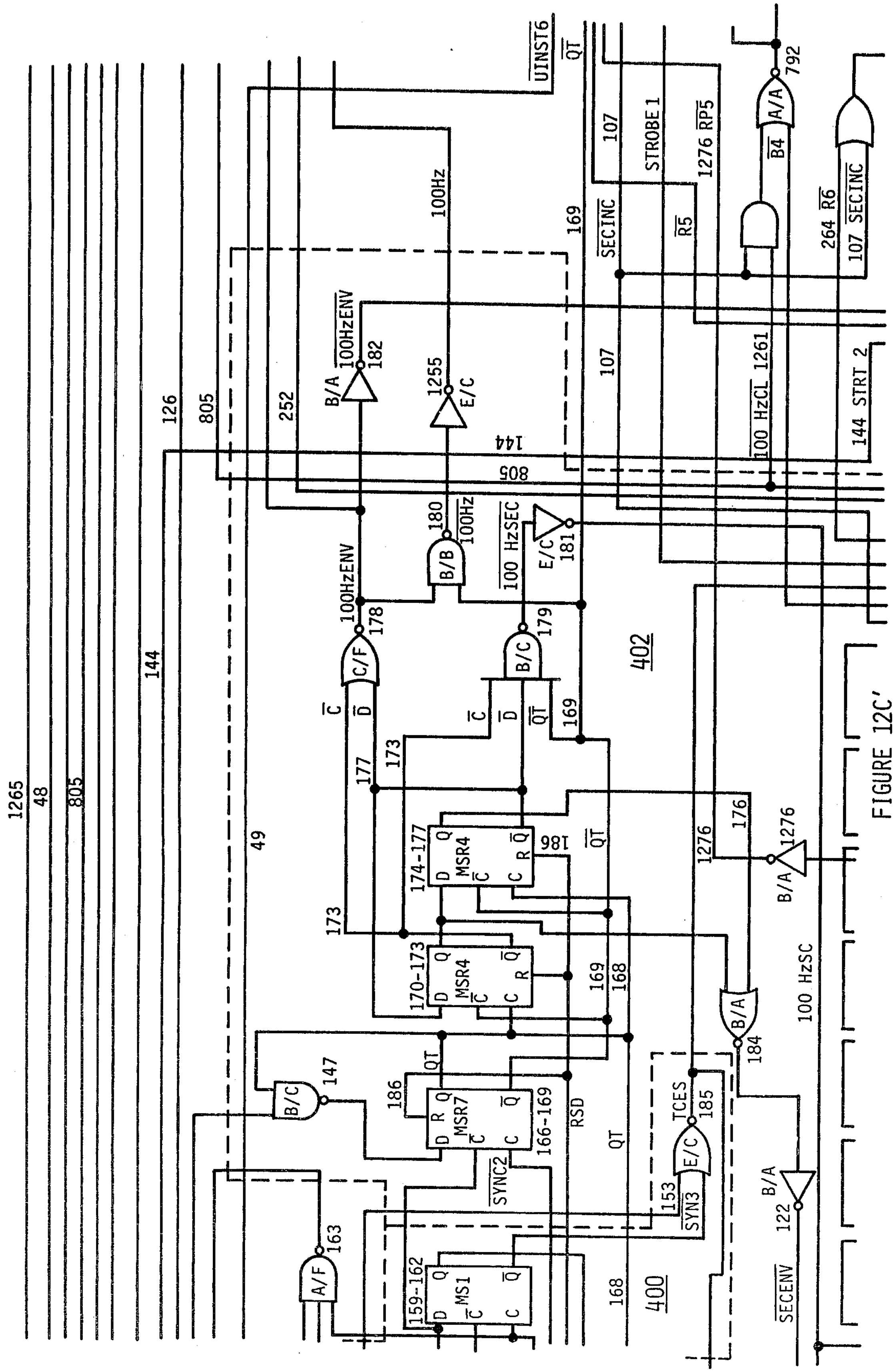
Figure 12D:
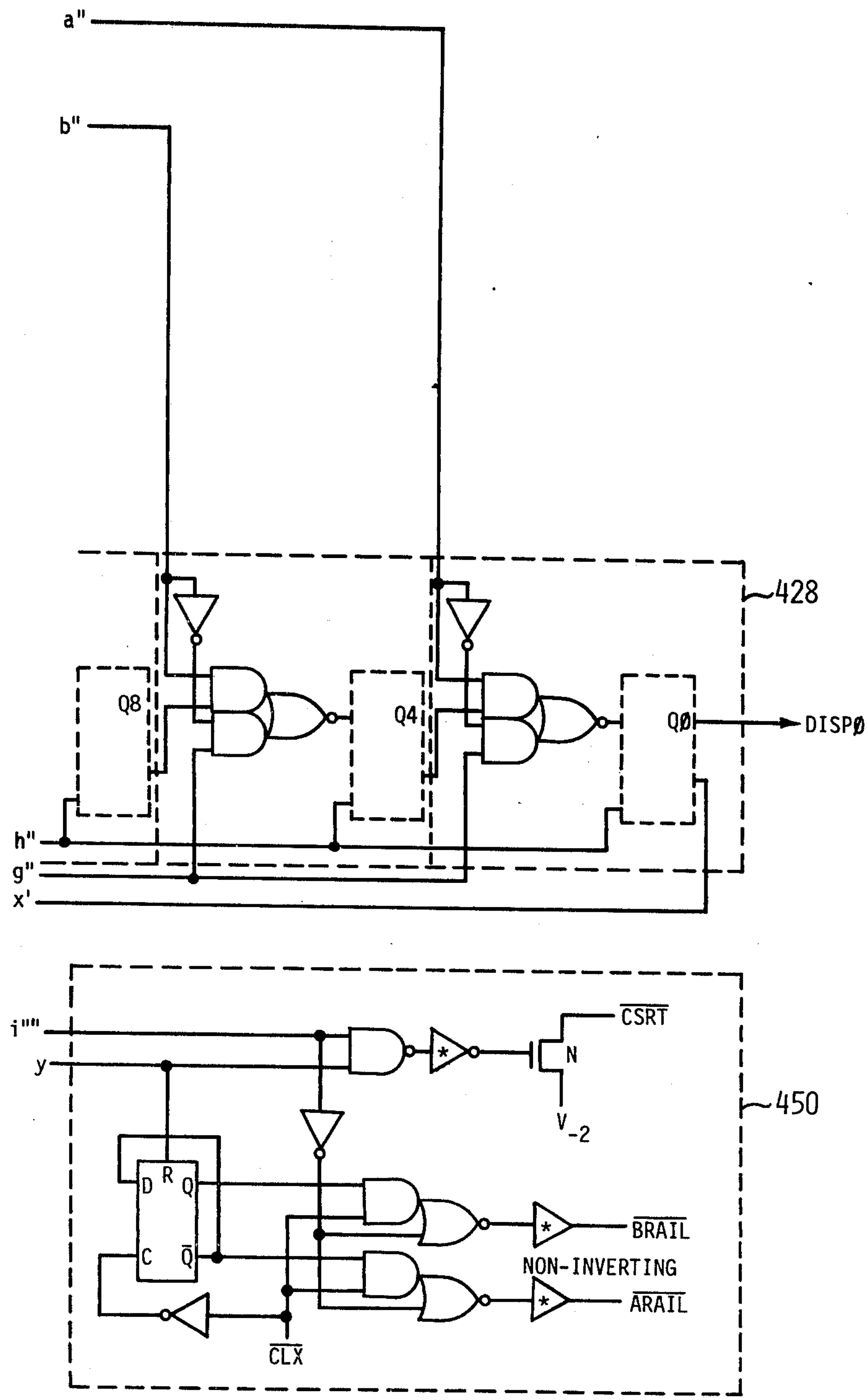
Figure 12D:
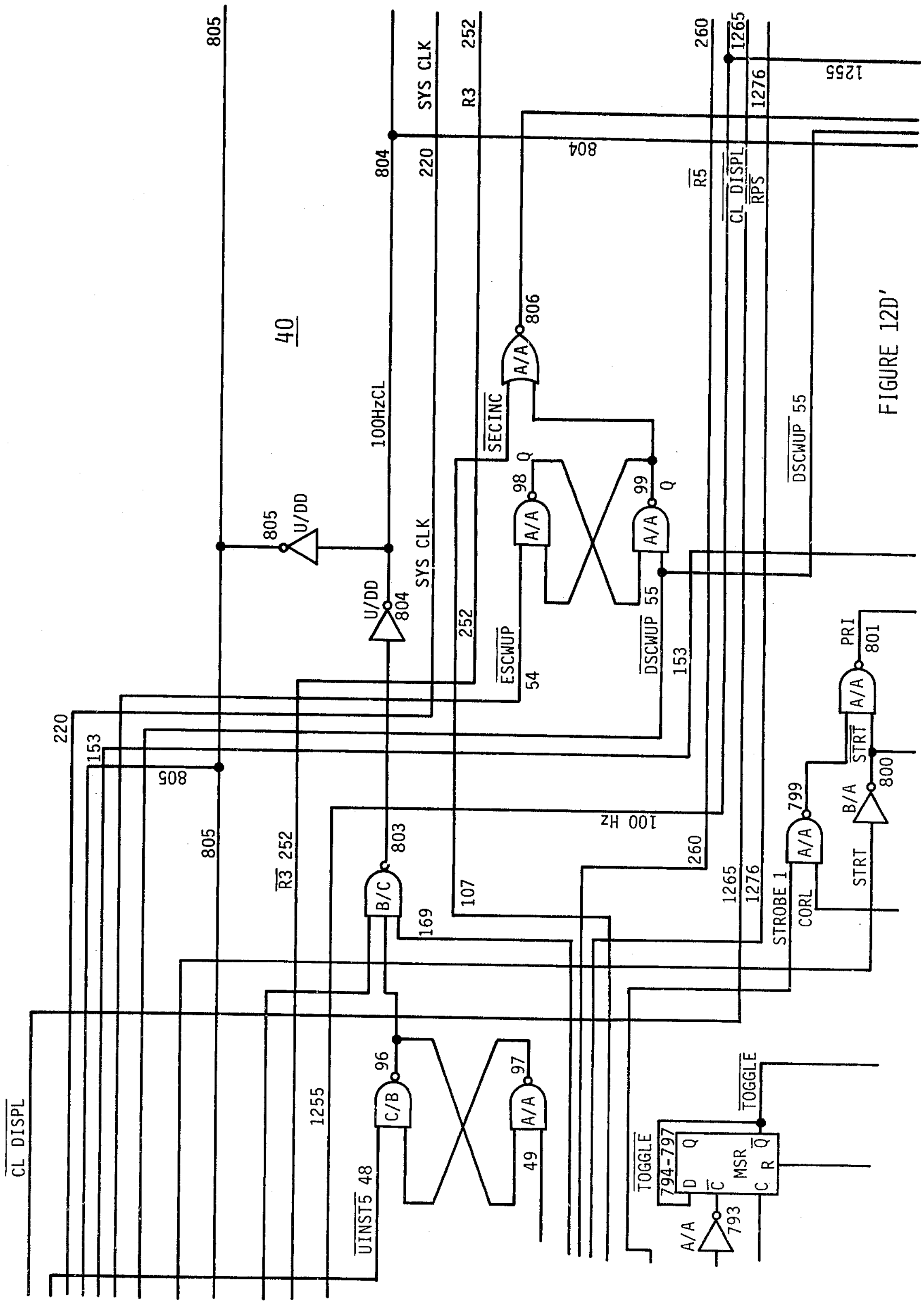
Figure 12E:
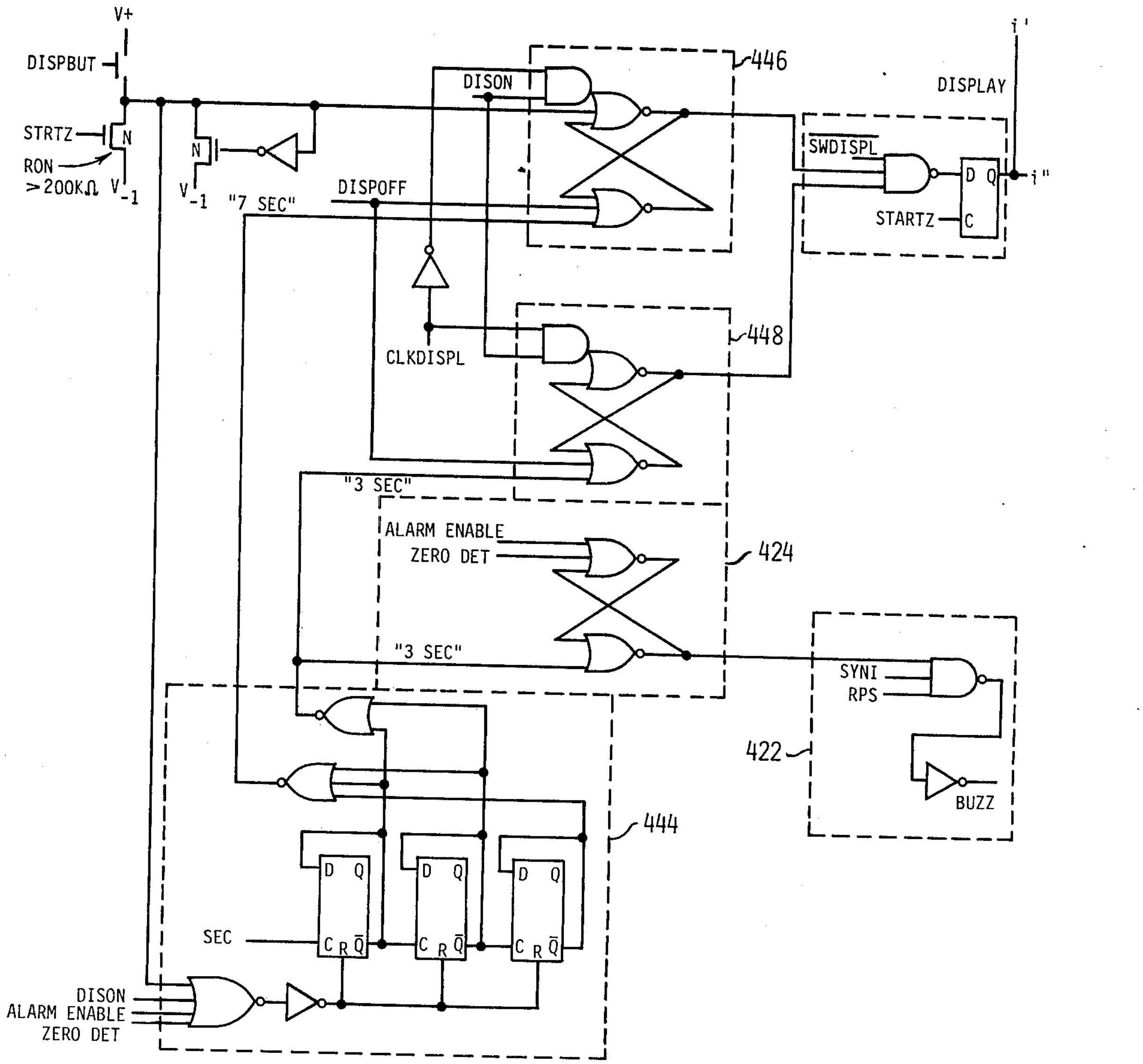
Figure 12E:
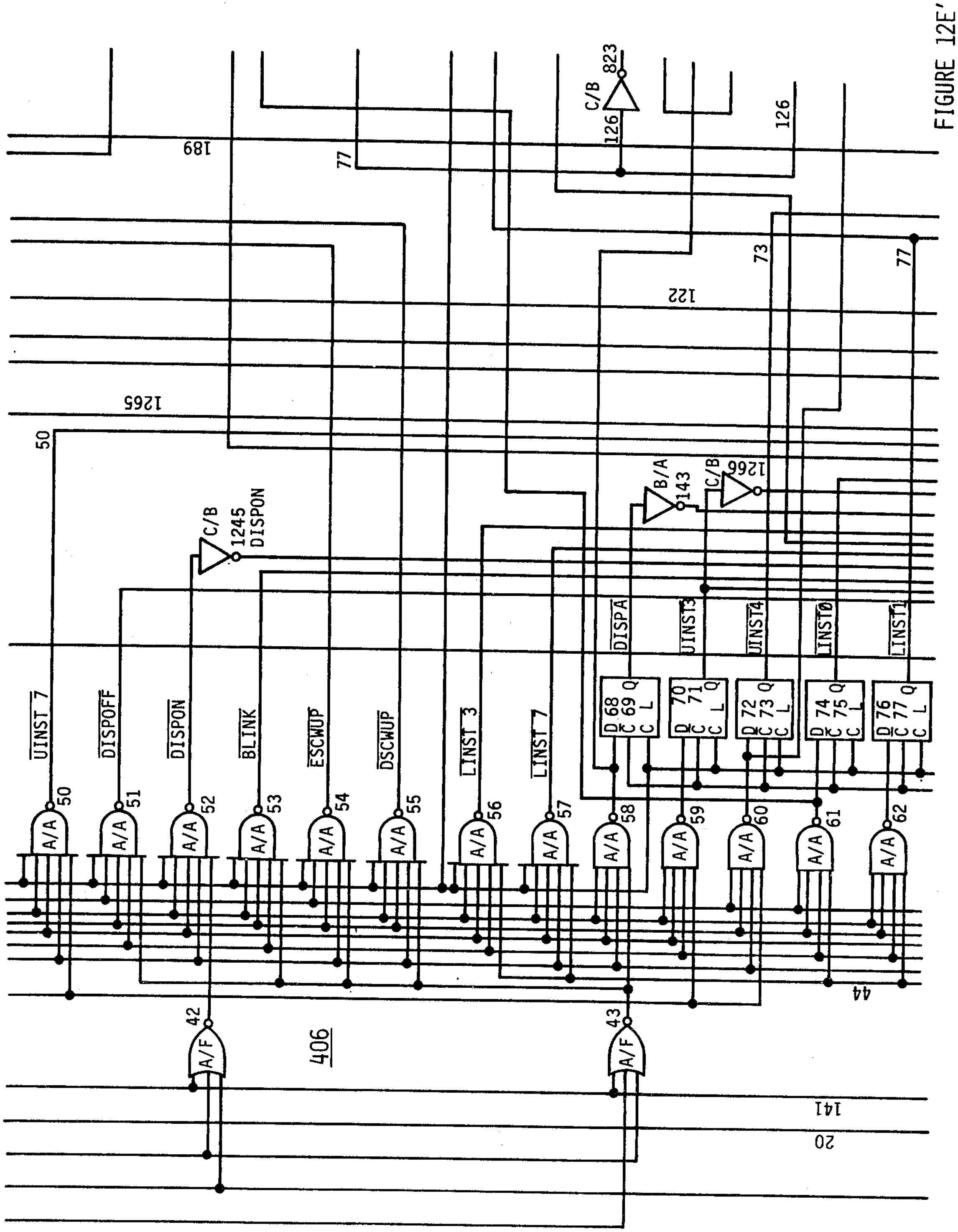
Figure 12F:
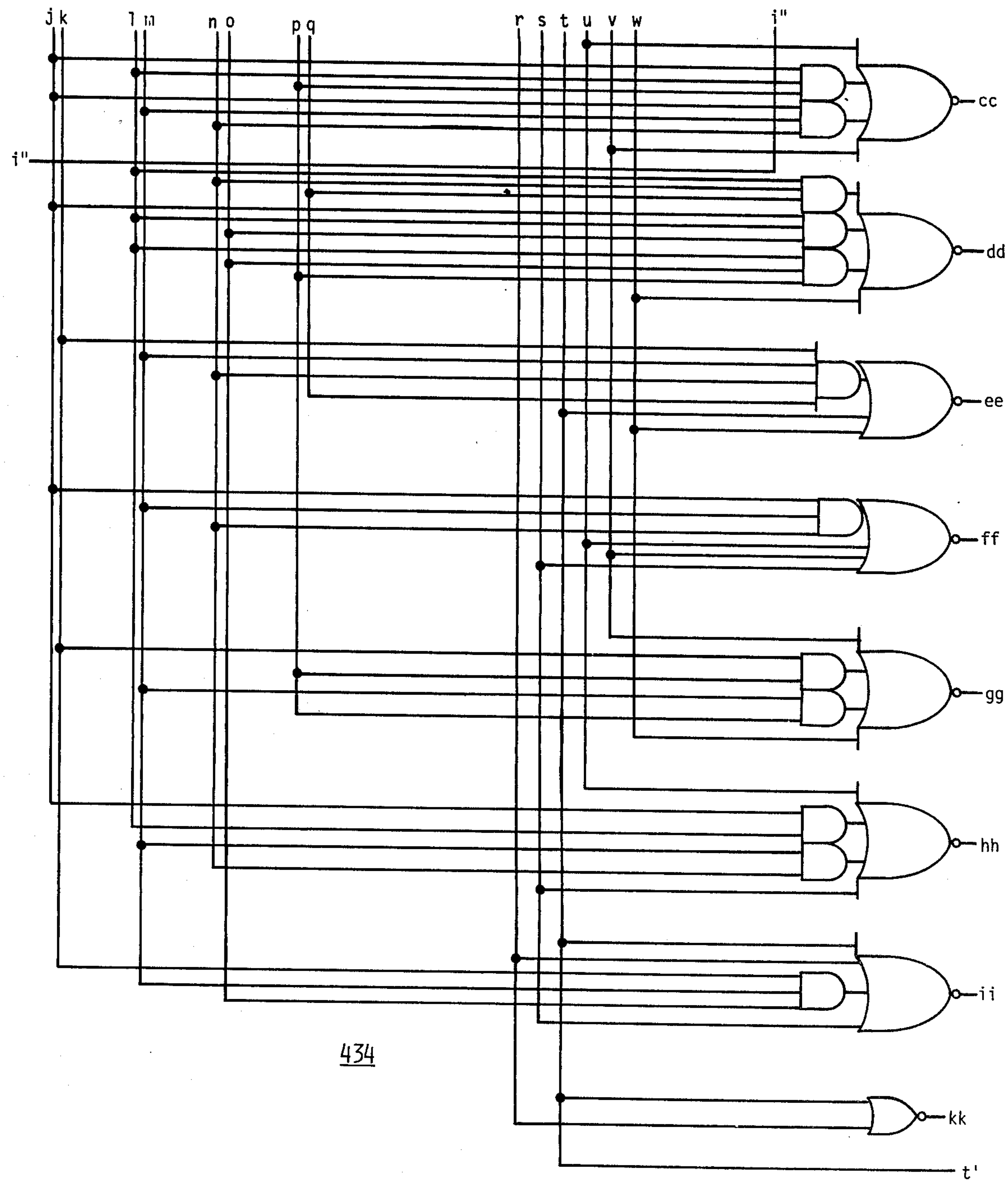
Figure 12F:
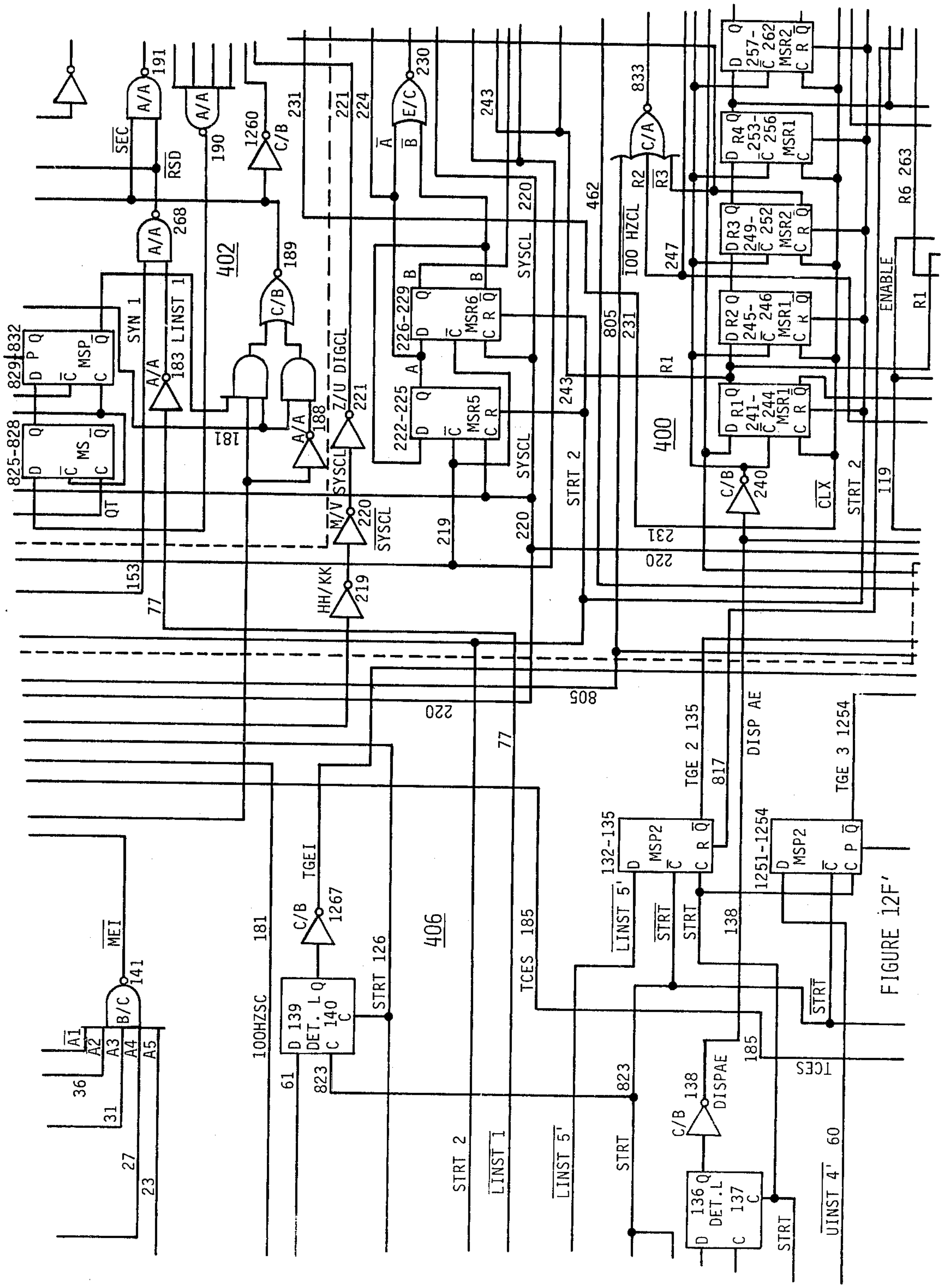
Figure 12G:
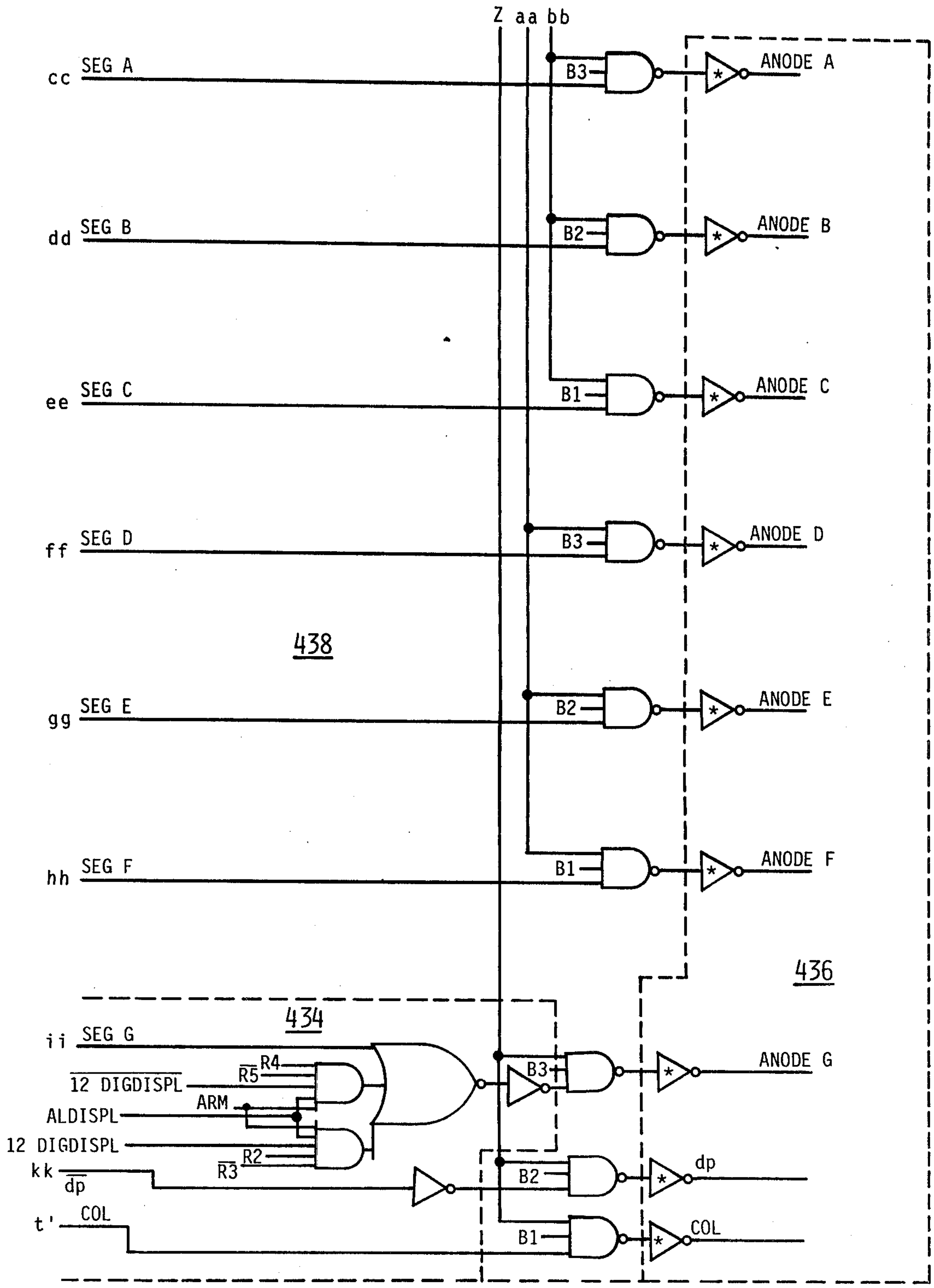
Figure 12G:
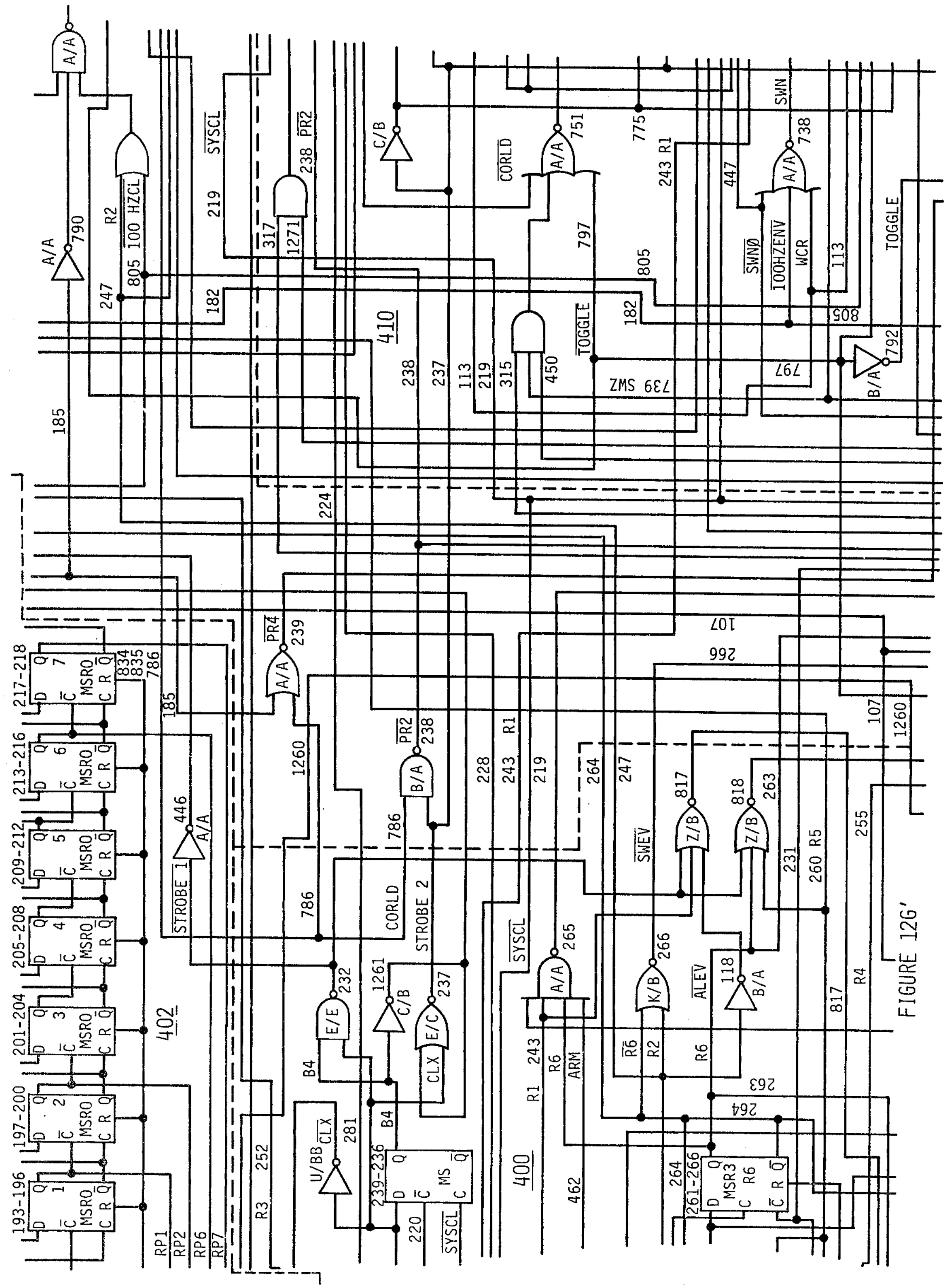
Figure 12H:
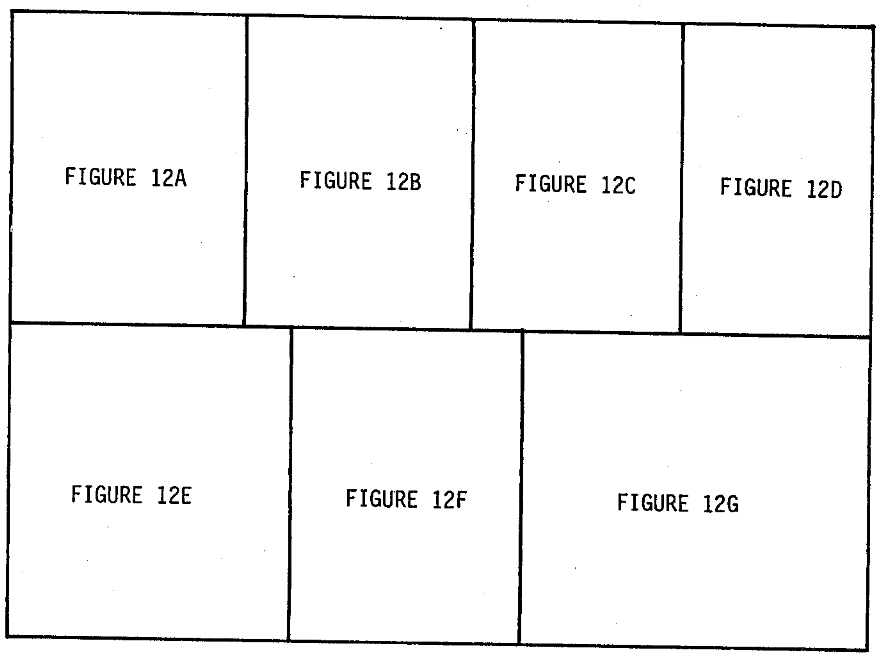
FIG. 12H is a figure map showing how the detailed schematic diagrams of FIGS. 12A through 12G fit together.
Figure 12H:
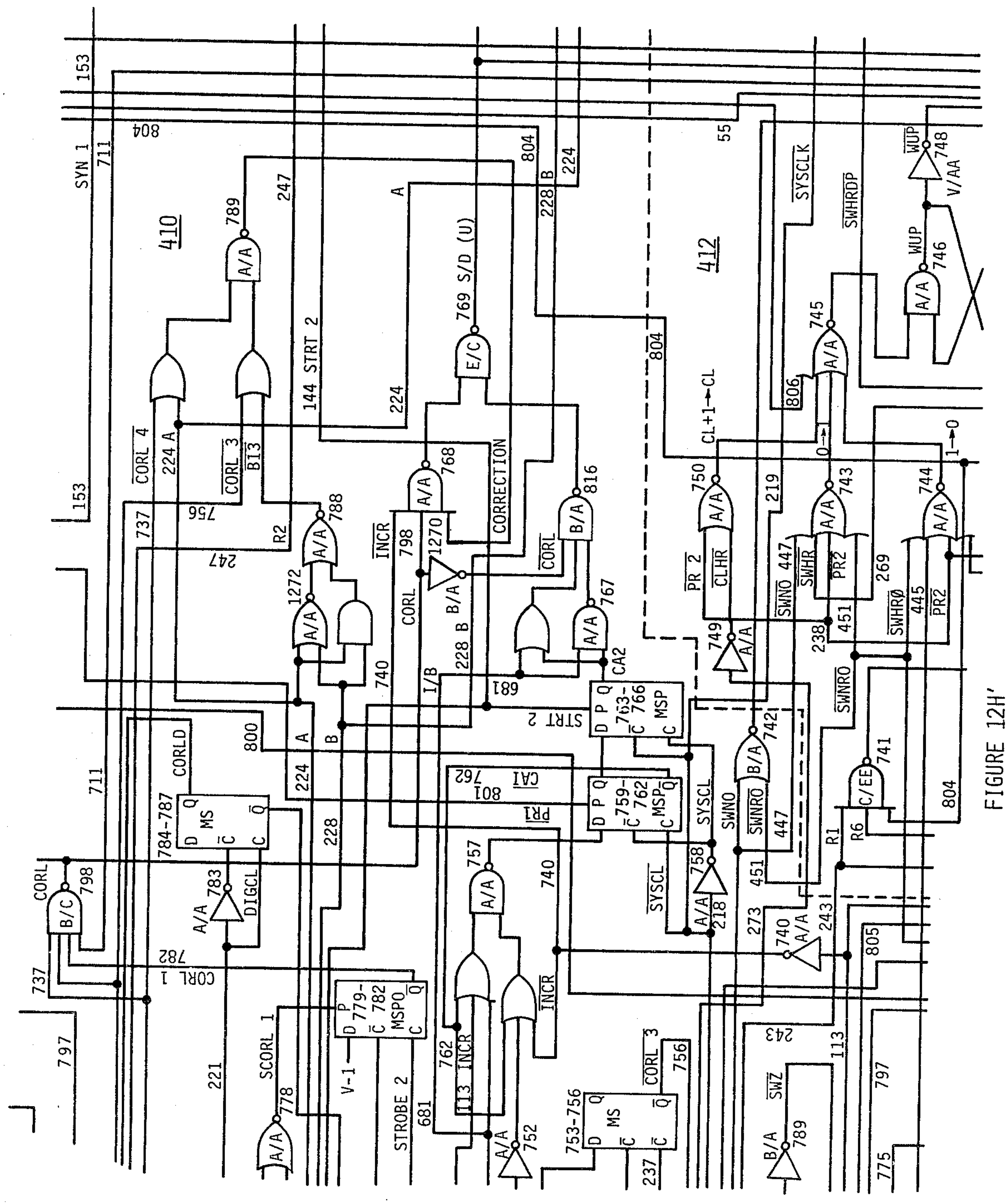
Figure 12I:
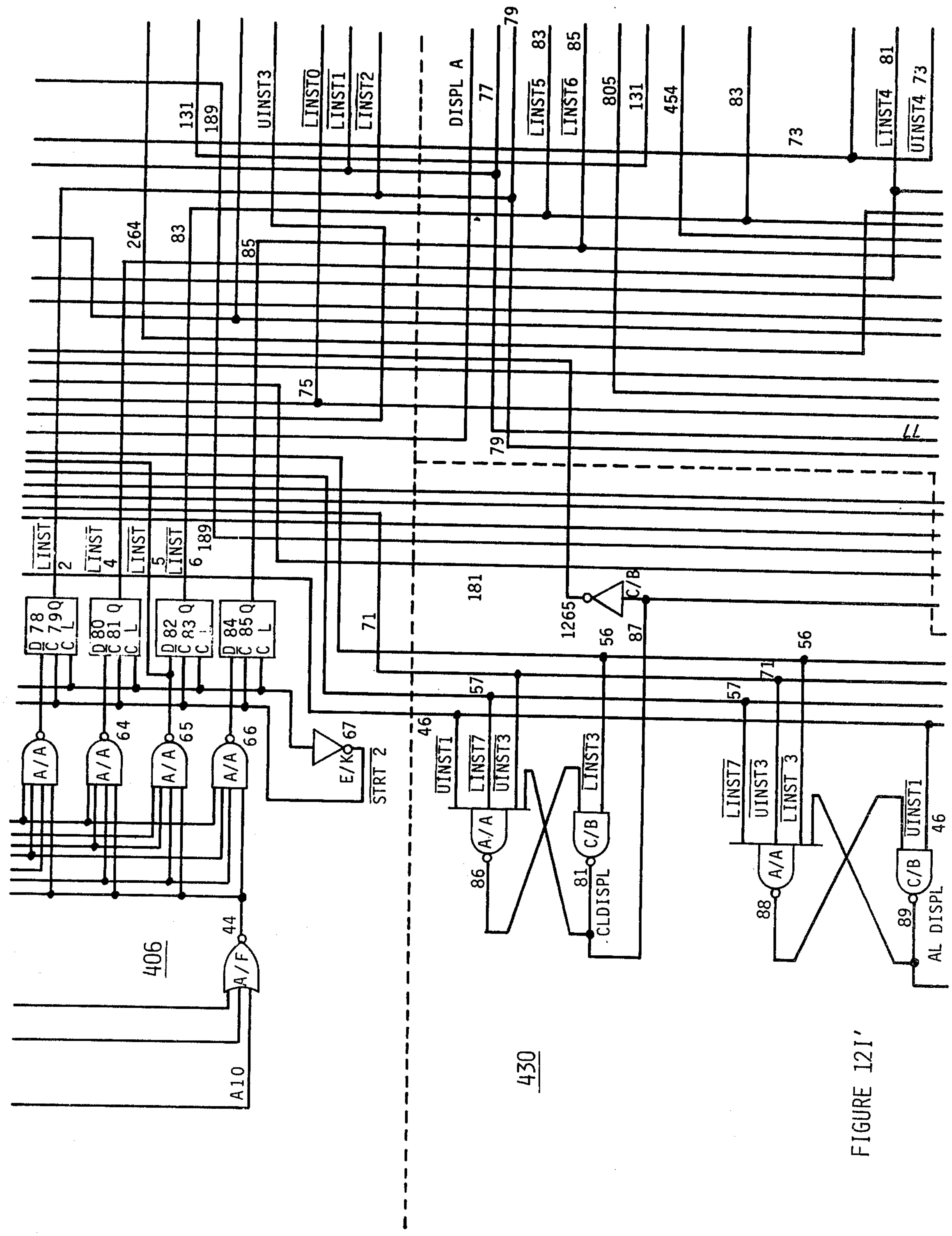
FIG. 12V' is a figure map showing how the detailed schematic diagrams of FIGS. 12A' through 12U' fit together.
Figure 12J:
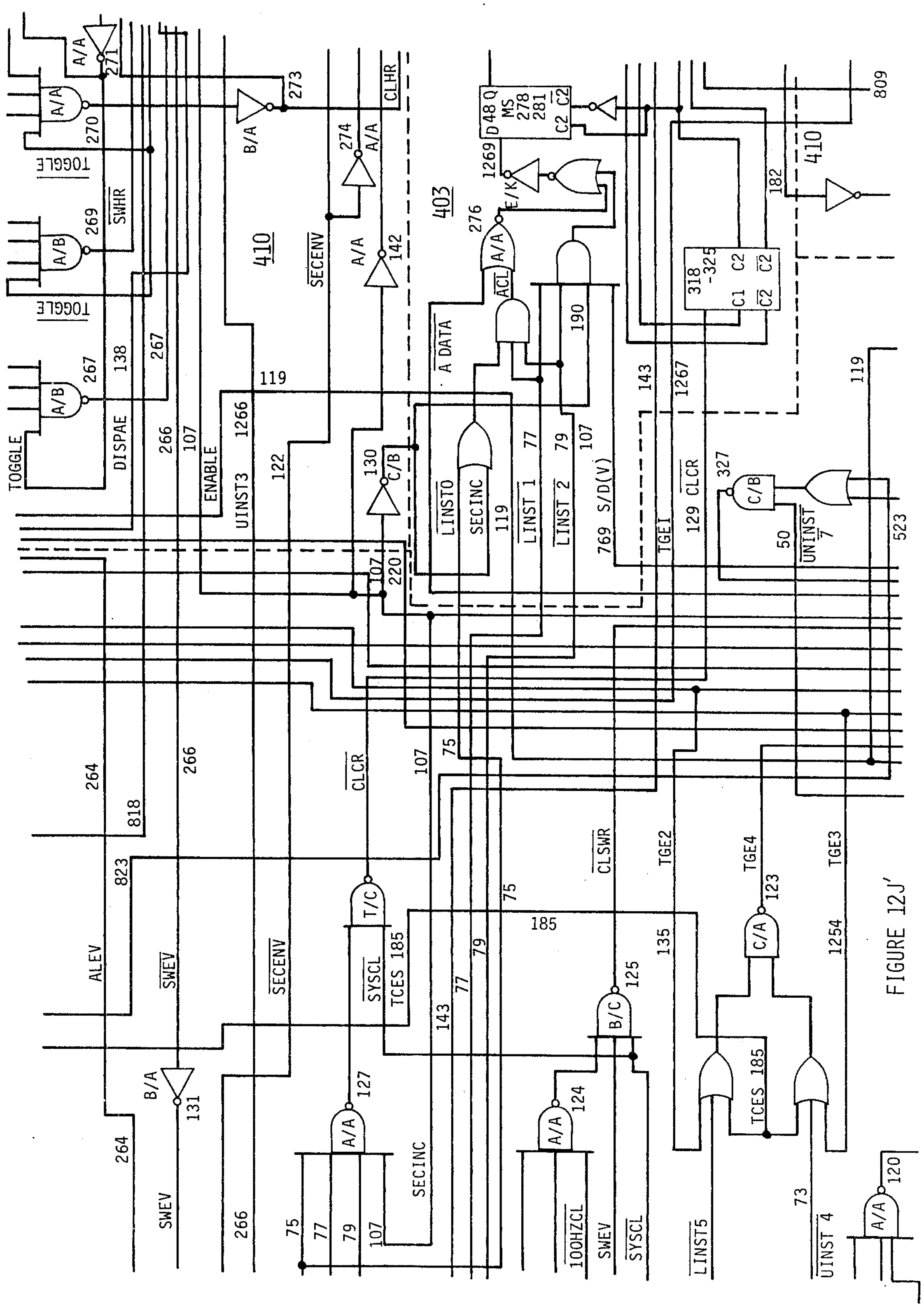
Figure 12K:
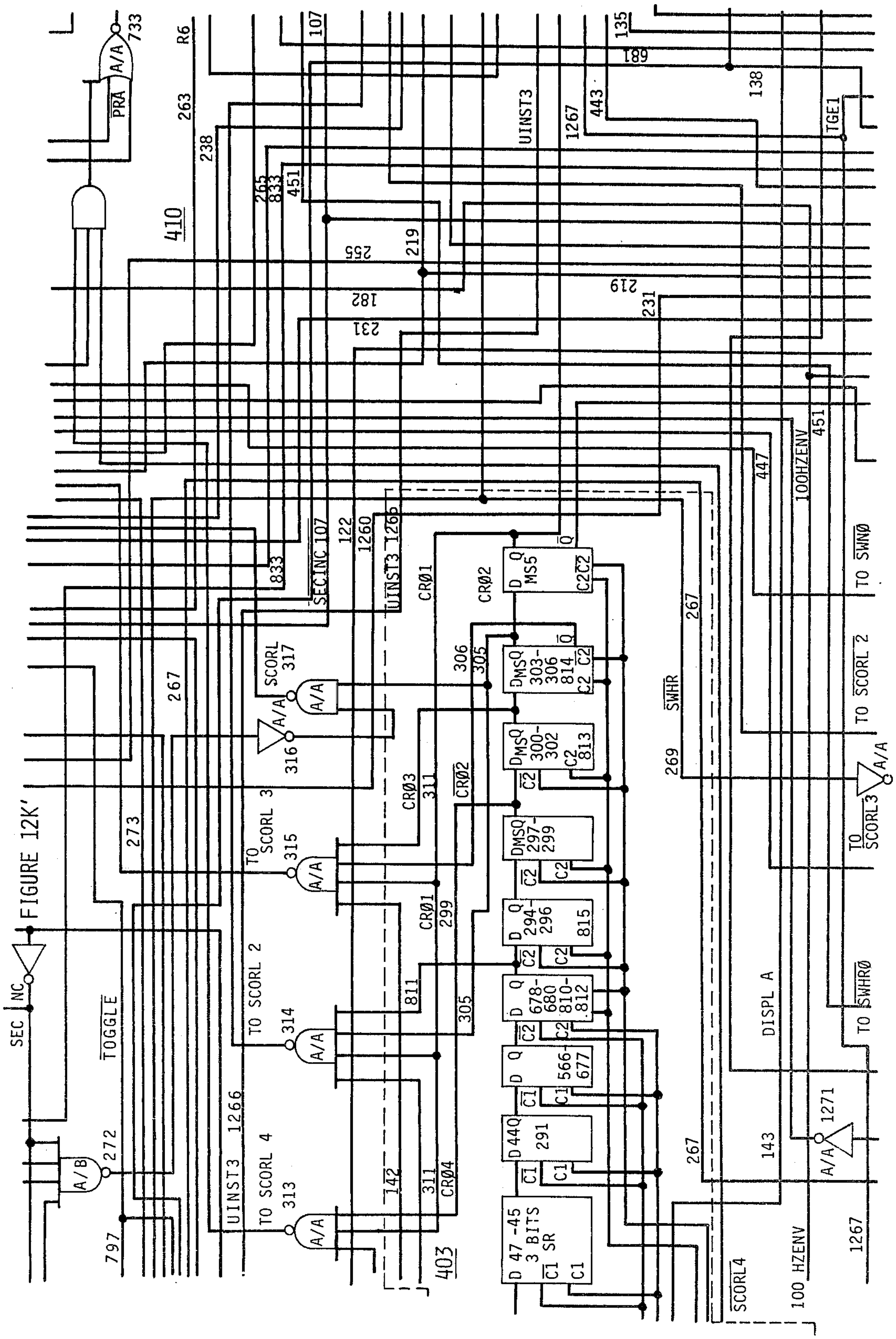
Figure 12L:
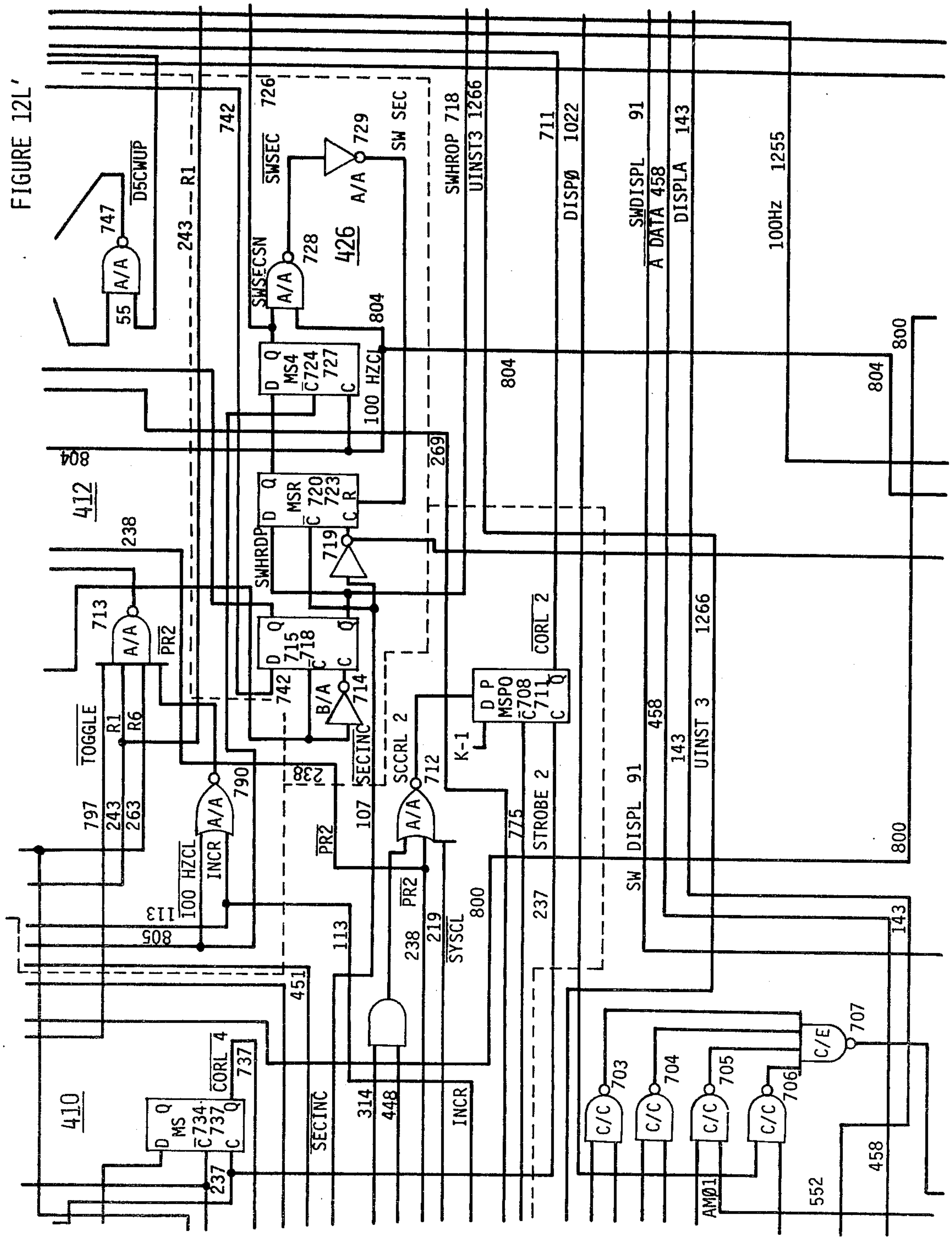
Figure 12M:
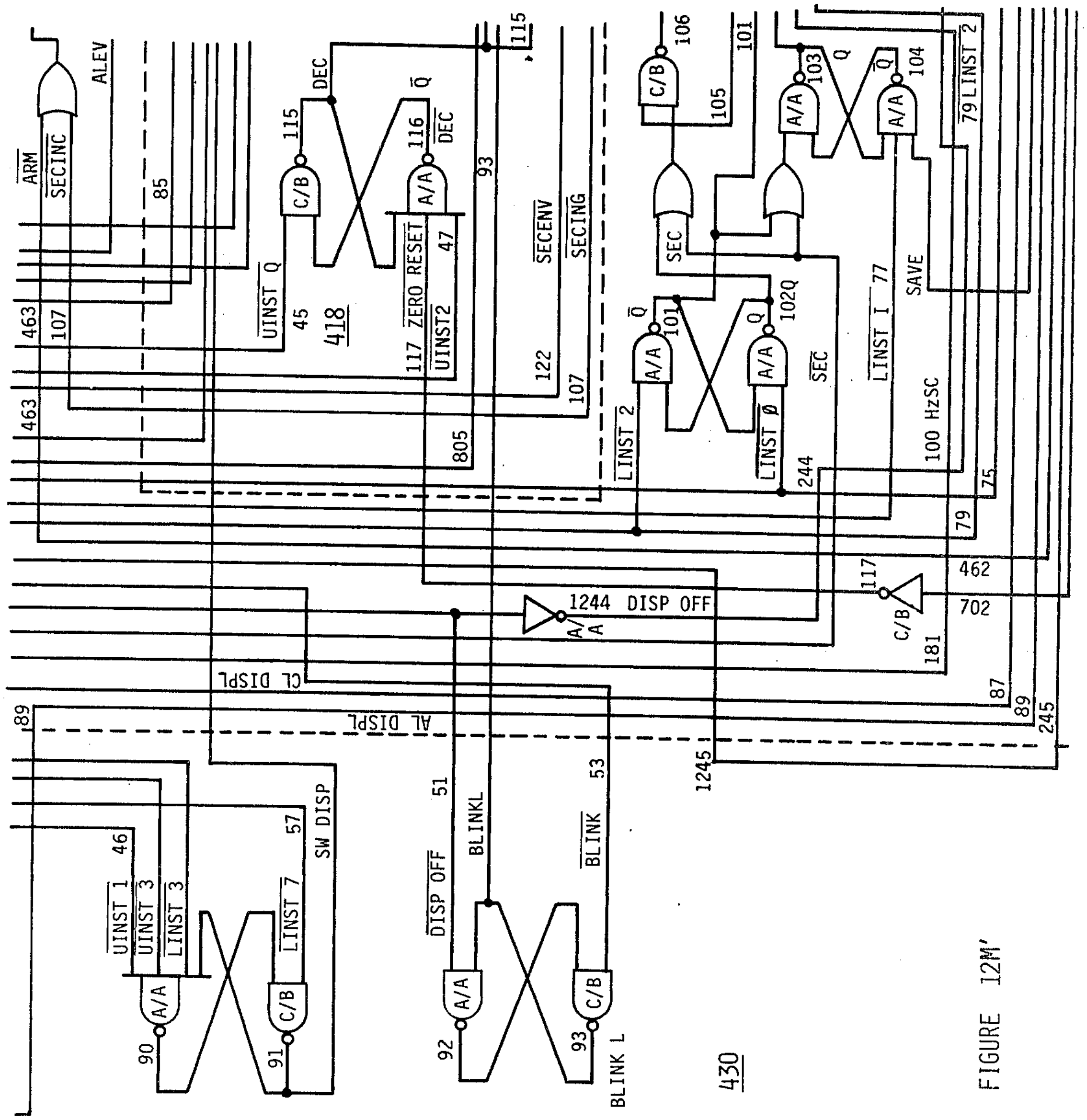
Figure 12N:
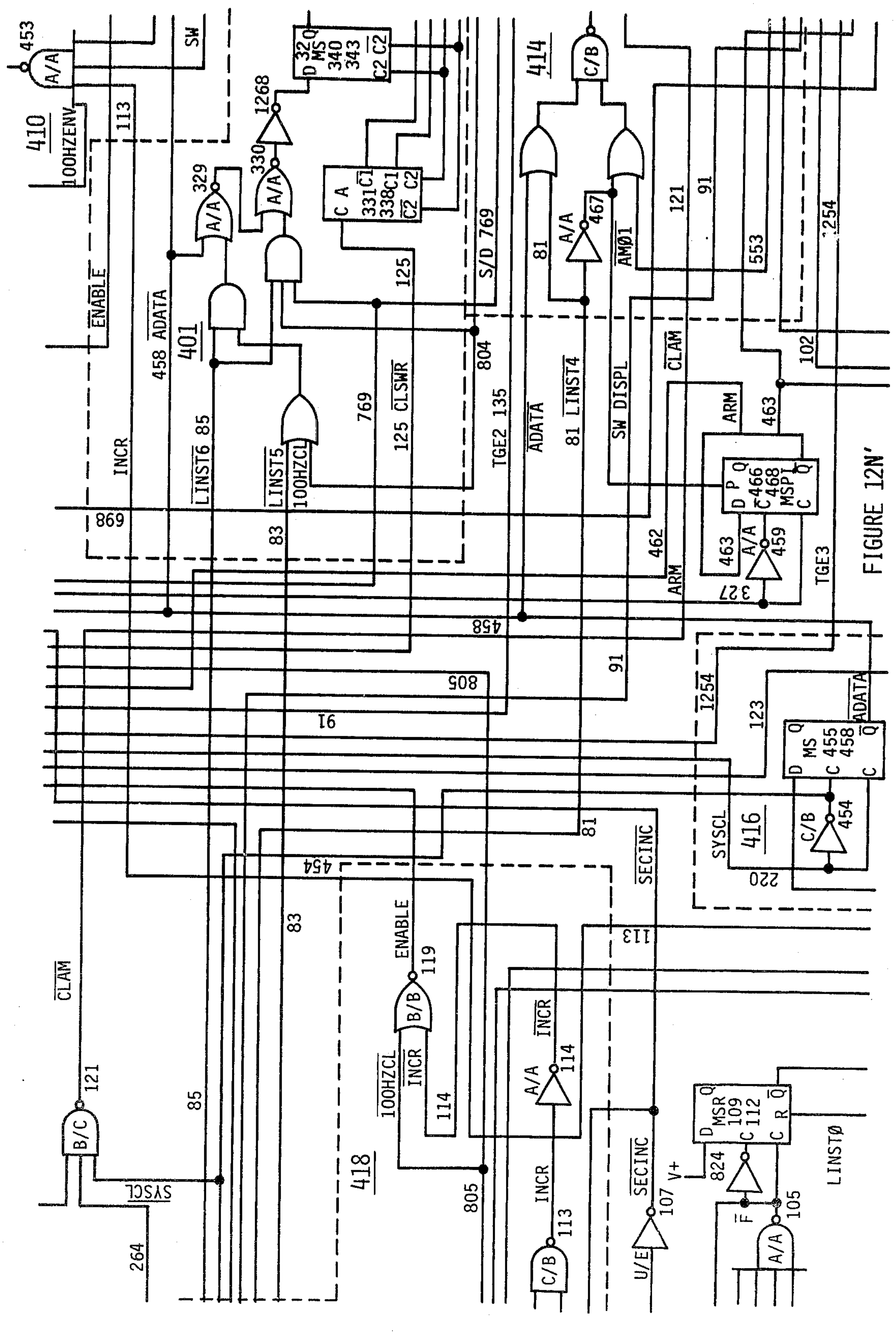
Figure 12P:
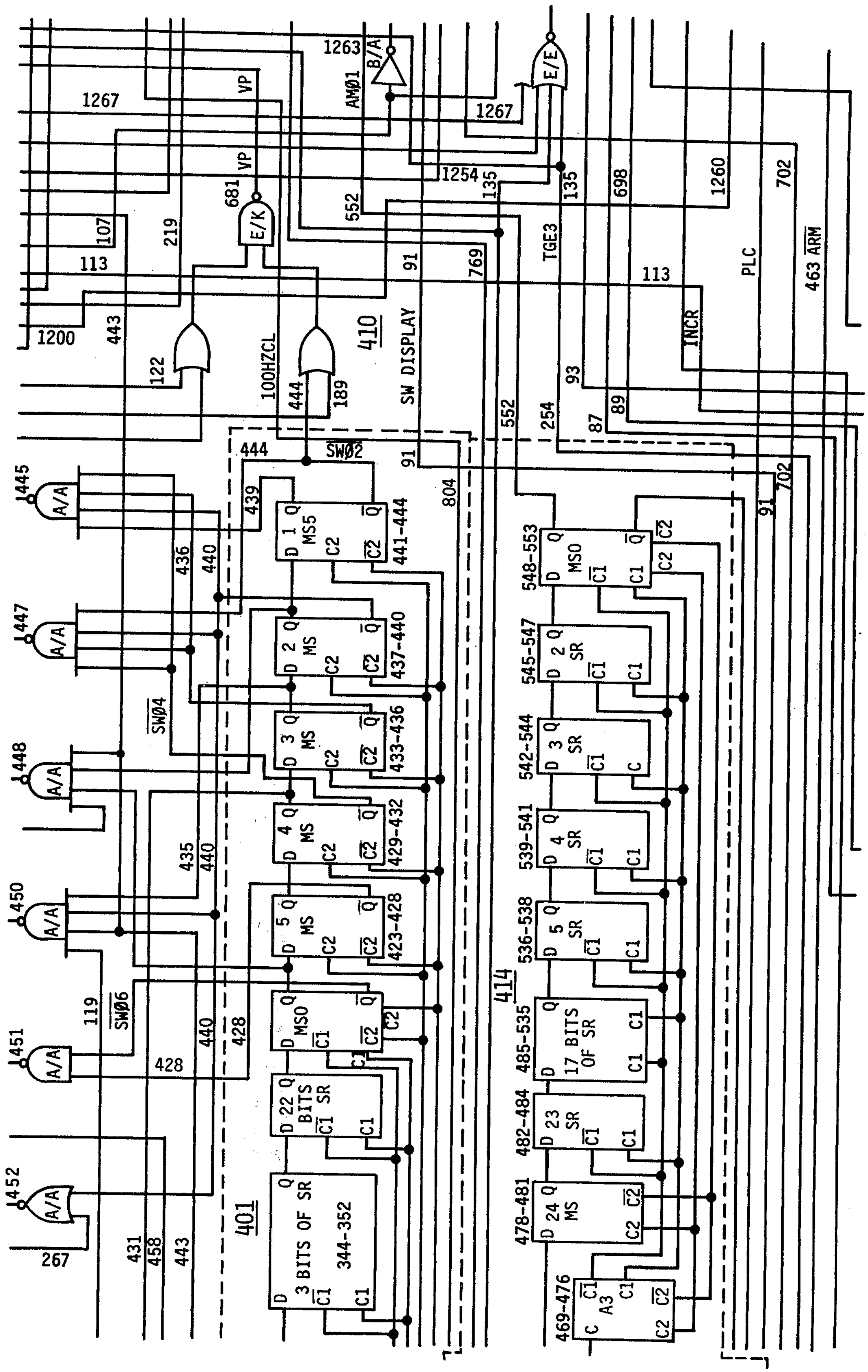
Figure 12R:
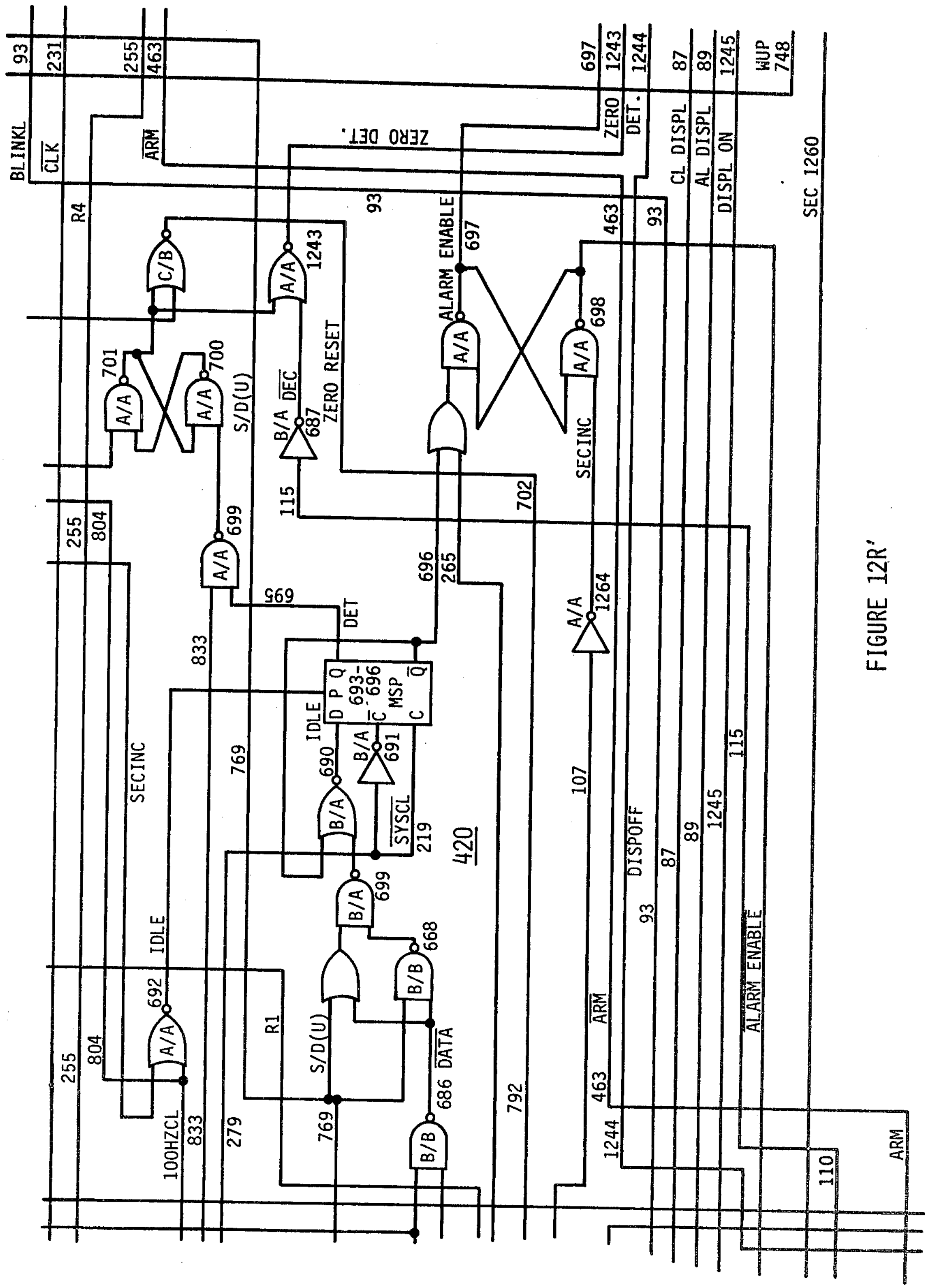
Figure 12S:
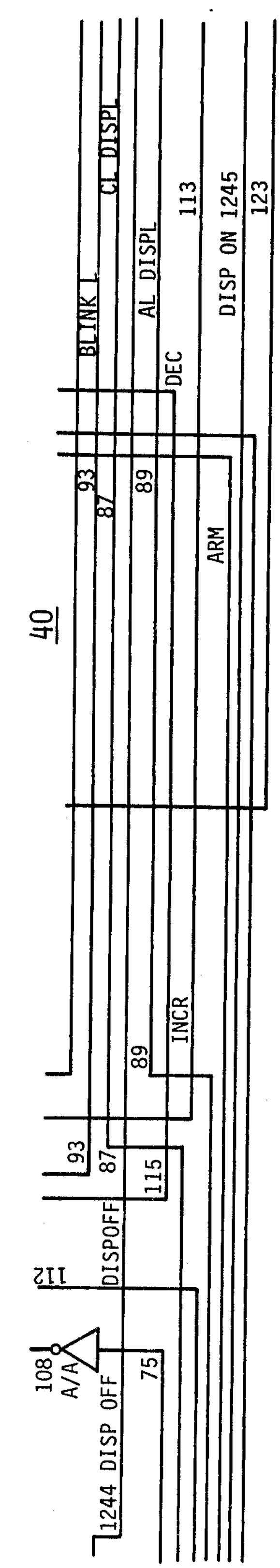
Figure 12T:
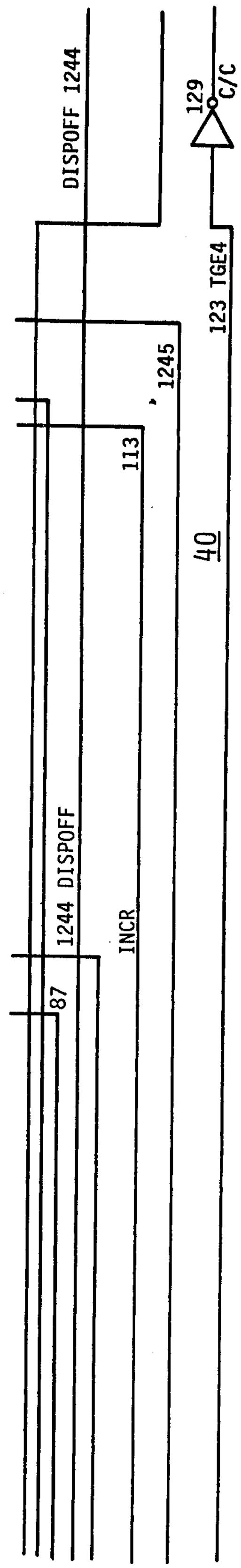
Figure 12U:
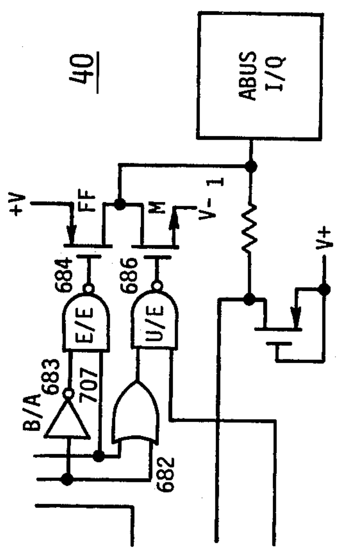

FIGS. 11A and B show a block diagram of the C&D chip and FIGS. 12A–H and 12A′–V′ show a detailed schematic diagram of the circuit. The clock portion of the block diagram is shown in FIG. 11A; and the display portion, in FIG. 11B.

Clock

The C&D chip has a timing decode circuit 400 which is synchronized by the sync pulse from the C&T chip to control the whole chip. A time divider 402 connected to the timing decode divides the sync signal down to generate a hundred Hertz Clock signal and a one Hertz clock signal which are used in a stopwatch register 401 and a clock register 403. The operation of the clock portion of the C&D chip can be illustrated through an example of how the time is set. As described above, the user enters the time on the keyboard and presses the ↑ and T keys. In response to that, the C&D chip will receive instructions from ROM and information from the A&R chip. The first instruction will be to transfer the contents of the A register to the clock register and reset divider. This instruction comes in on the AIB line to an instruction register 404 and from there to an instruction decoder 406. During the execution of this transfer instruction, the decoder will reset the time divider and at the same time gate the data from A&R chip on the ABUS into clock register 403. One second later the clock register will be incremented by an increment/decrement correction control 410 and from this point on the clock is incremented every second by the increment/decrement correction control. The operation of the increment/decrement correction control is described in greater detail in copending U.S. Patent Application Ser. No. 595,655 filed July 14, 1975 by V. Marathe and assigned to the assignor of the instant application, and said Marathe application is hereby incorporated by reference.

Every hour on the hour, when the clock register is incremented, a signal goes to a wake-up circuit 412 to wake up the C&T chip. The wake-up circuit is also controlled by the stopwatch register so that when the time in that register crosses the one hour mark, a wake-up signal is issued.

To set the stopwatch the user actuates the keyboard as described above and the ROM issues an instruction to send the contents of register A to the stopwatch register. The data from the A register goes through the ABUS and is gated into the stopwatch register. Similarly, an alarm register 414 receives data from the A register controlled by the instruction A to Alarm and Arm. The alarm is then reset automatically every time the alarm sounds.

There is a line from each of the clock, stopwatch and alarm registers going to the ABUS via a tri-state gate 416 to supply information about the various registers.

A stopwatch mode logic circuit 418 is controlled by the instruction decoder to command the stopwatch to increment or decrement. At the same time this circuit is controlled by a stopwatch zero and alarm match circuit 420. When the stopwatch reaches zero in a decrement mode then, this circuit causes a reset of the stopwatch from the decrement to the increment mode and causes the buzzer to bé turned on. If the stopwatch is already in incrementing mode when it crosses zero, then the zero reset is ignored.

The zero detect function in circuit 420 is also used to compare the number stored in the alarm register with the time in the clock register. When these two numbers match, the circuit will disarm the alarm and send a signal to a buzzer tone generator 422 and a buzzer latch 424.

Another logic circuit 426 is used to detect whether the stopwatch register contents are greater than one hour. When this condition is detected, this information will be sent to a display format multiplex control 428 so that the proper format will be set in the stopwatch display.

Tri-state gate 146, like the other tri-state gates in the watch/calculator is connected to one of the bidirectional busses, ABUS. A tri-state gate allows one chip to receive information from any other chip or to transmit to another chip. An enable (E) input to the tri-state gate is connected to the time decoder and the instruction decoder, and together they control the tri-state gate.

The tri-state gate operates as follows. When the tri-state gate is active the output will correspond to the data on the inputs labeled "D", i.e. a series of high and low binary signals. In this mode, information is being supplied by one of the registers on the C&D chip. The third state is a high impedance state which prevents essentially an open circuit to the ABUS when the tri-state gate is not enabled. Because the gate presents a high impedance to the bus, it does not load the line and other chips can send information on the line.

When the calculator portion of the watch/calculator is in the sleep mode, the clock display must still be updated with real time information to keep the display accurate. The formating of clock information for the display is performed by the display format multiplex control circuit since the information in the clock register is stored and updated in unformated form. The format control circuit causes the data to skip the colon positions between the hours, minutes and seconds in time and stopwatch information. Then, every second the clock register will be incremented, and the incremented value will be gated into a display register 428 shown in FIG. 11B. Both the seconds and the minutes are updated in this manner. Every hour on the hour the wake-up signal will be sent to the C&T chip which will cause the calculator circuitry to check whether the watch/calculator is in the 24 hour or 12 hour display mode and regenerate the proper time signals on the ABUS for the next hour. Thus the display is reformated once every hour.

Display

The display portion of the C&D chip includes the display register which is a 48-bit shift register broken up into a series of 4-bit shift registers with a multiplexer in front of each one as well as one 24-bit straight shift register without a multiplexer. The multiplexers are used to accommodate the different types of display formats. The different displays for time, date, stopwatch, scalar quantities, etc. are shown in FIG. 2. As explained above, the time information is continually updated in the clock register and is properly formated for the display register by the display format control circuit. Similarly, for the stopwatch the display register gets its information directly through a line labeled $\mu$ from the increment/decrement correction control. Line $\mu$ is the data path from the increment/decrement correction control, and it basically contains the information of the clock and the stopwatch registers as they are incremented so that the display is giving the information directly from the adder. The display format multiplex control gets its information about the current display mode from a display latch circuit 430 for the proper display of information from the clock, the stopwatch or the calculator, The time divider information to the multiplex control is used to govern the frequency of the display update, depending on display mode. Since, in the stopwatch mode, the display may be updated either once a second or once every hundredth of a second, depending upon whether the time is greater or less than on hour, a signal SWHRDP from circuit 426 tells the display format multiplex control how often to update. In addition to receiving information from line $\mu$, the display format multiplexer control also receives data from the ABUS such as information from A&R chip registers. The display shift register multiplexer can be controlled in such a manner that it can also have its data presented back onto the ABUS. For example, there is a display to A instruction which takes the contents of the display register and puts it in the A register on the A&R chip. Thus the display register can be used as a working register when it is not needed for display purposes, such as during a computation.

From the 48-bit display register, the first 4 bits are latched into a 4-bit latch 432, decoded by an anode decoder 434 and buffered by an output buffer and level converter 436. Along with the output buffer and level converter, there is a buffer timing control 438 which is used in multiplexing the anodes of the light-emitting diodes in the display of the preferred embodiment. The buffer timing control is controlled by a divide by 3 word counter 440, by a blink control, and by a display control 442. The display control gives the command to turn on the display. Blink is a similar control, except that it is an on and off signal to blink the display for special conditions. The divide by 3 word counter is used to scan the anodes in the display.

The display signal control is controlled by information from a display-on timer 444. It is desirable to limit the amount of time the display is on to conserve power. The display-on timer has a 3 second output connected to a 3 second display latch 446 and a 7 second output connected to a 7 second display latch 448. The outputs from these two latches control the display time in the watch and calculator modes respectively. A third input to the display signal control is for stopwatch display so that anytime stopwatch information is being displayed, the display will always be on. The display-on timer is reset every time a new display is started, i.e. every time a key is pushed down, a new 3 or 7 second time period is started so that the display will always be on for 3 seconds or 7 seconds from the last button pushed.

The display-on timer also goes to the buzzer latch which has, in addition, an input from the stopwatch zero alarm match and from the display latch. When the alarm register has matched the time register and the alarm is armed, the zero detect will turn on indicating that the buzzer is to be turned on. The buzzer latch is set and activates the buzzer tone generator which is connected to an external buzzer. The buzzer itself is then turned off with the 3 second timer. The display signal control is also connected to cathode timing clocks 450 which interface with the display buffer chip.

DISPLAY BUFFER CIRCUIT

Figure 13A:
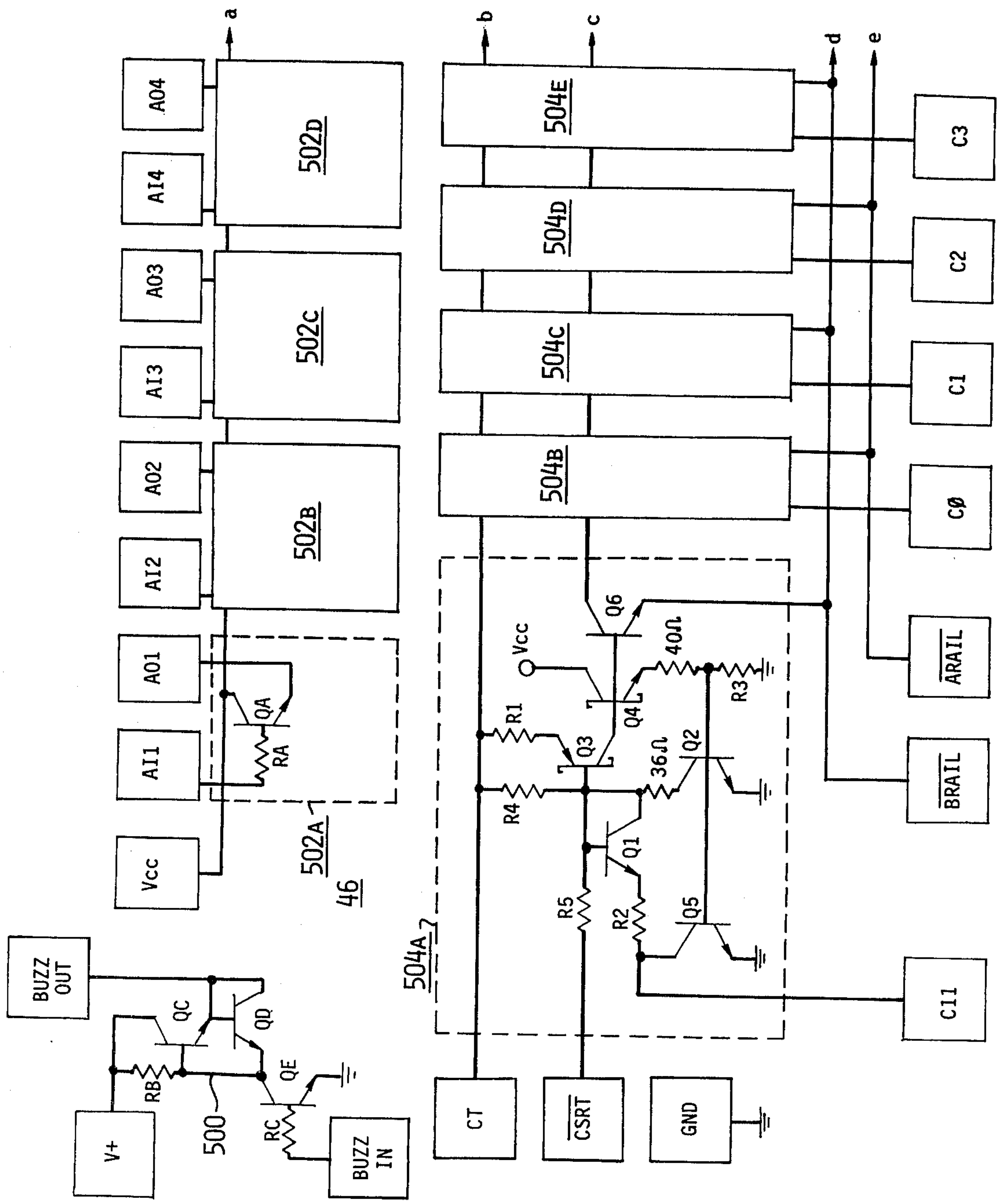
FIGS. 13A and 13B show a combined block and schematic diagram of a display buffer circuit.
Figure 13B:
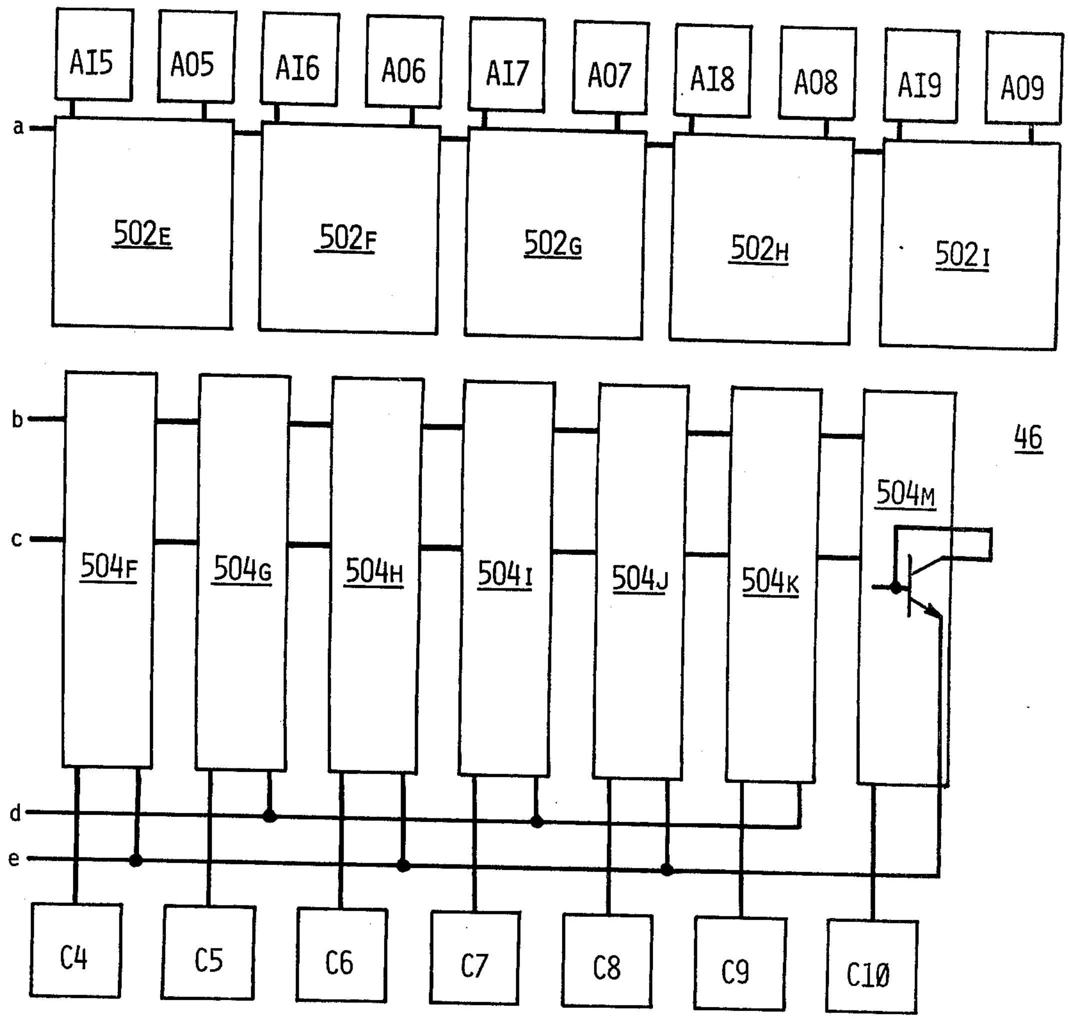

The display buffer circuit shown in FIGS. 13A and B has basically three parts. First is a buzzer buffer 500 which is a push-pull inverting amplifier. An input signal is applied to the buzz-in input in the form of a square wave, and the signal on the buzz-out output is a square wave which can sink or source current up to about 15 milliamps. The buzz-out output is connected to the piezoelectric crystal which acts as the buzzer. The second part is a series of anode buffers 502*a*–502*i*, each of which is a common-emitter follower amplifier connected to the anodes of one LED digit display. The third part is a series of cathode drivers 504*a*–504*m*, each of which is a one-bit stage of a 12-bit shift register. Each shift register stage has transistors Q3 and Q2 in a PNP-NPN latch arrangement connected together with a current mirror comprising transistors Q5 and Q2.

The cathode drivers operate in the following manner. In the shift register, one latch is turned on at a time as determined by signals on $\overline{\text{A RAIL}}$, $\overline{\text{B RAIL}}$ and $\overline{\text{C SRT}}$. These signals are the cathode clocks. For example, the first cathode is started by turning on $\overline{\text{C SRT}}$. The latch in cathode driver 504*a* will turn on and cathode driver output C11 will mirror the current in Q2. Current from a CT input, which has a resistor going to a supply current, is supplied down through the latch. The current in the emitter-base circuit of transistor Q2 is then magnified in transistor Q5 using a standard current mirror technique. Thus the current delivered by output C11, the collector current of transistor Q5, is an amplified version of the emitter current in transistor Q2, and in the preferred embodiment the gain is a factor of 100. Transistor Q4 is a buffer to supply the extra base current that transistor Q5 needs.

The state of each shift register stage is shifted to the next stage via an output transistor Q6 which has an emitter tied to either $\overline{\text{B RAIL}}$ or $\overline{\text{A RAIL}}$. The latch in cathode driver 504*a* is turned on with the signal on $\overline{\text{C SRT}}$ going low which pulls the base of transistor Q3 low, turning on transistor Q3. Transistor Q3 them supplies base current to transistor Q4 which, in turn, supplies base current to transistors Q2 and Q5. These in turn draw collector current and pull more current out of the base of transistor Q3, turning it on. The "on" condition is shifted to the next cathode driver by a low signal on the $\overline{\text{B RAIL}}$ input. The low signal will make the emitter of transistor Q6 low, and since the base of transistor Q6 is already high because driver 504*a* is on, transistor Q6 will pull collector current. That collector current acts in a manner similar to the signal on $\overline{\text{C SRT}}$ for the next stage and the "on" condition thus propagates down the register.

As the emitter of transistor Q6 goes low, not only is the next stage turned on, but because the base follows the emitter by seven tenths of a volt, it will also turn off the previous stage. So as either $\overline{\text{A RAIL}}$ or $\overline{\text{B RAIL}}$ go low, the following stage is turned on and after a certain time the previous stage is turned off. When $\overline{\text{B RAIL}}$ and $\overline{\text{A RAIL}}$ are both low at the same time, that will force all the stages to turn off.

DATA PROCESSING

Figure 14:
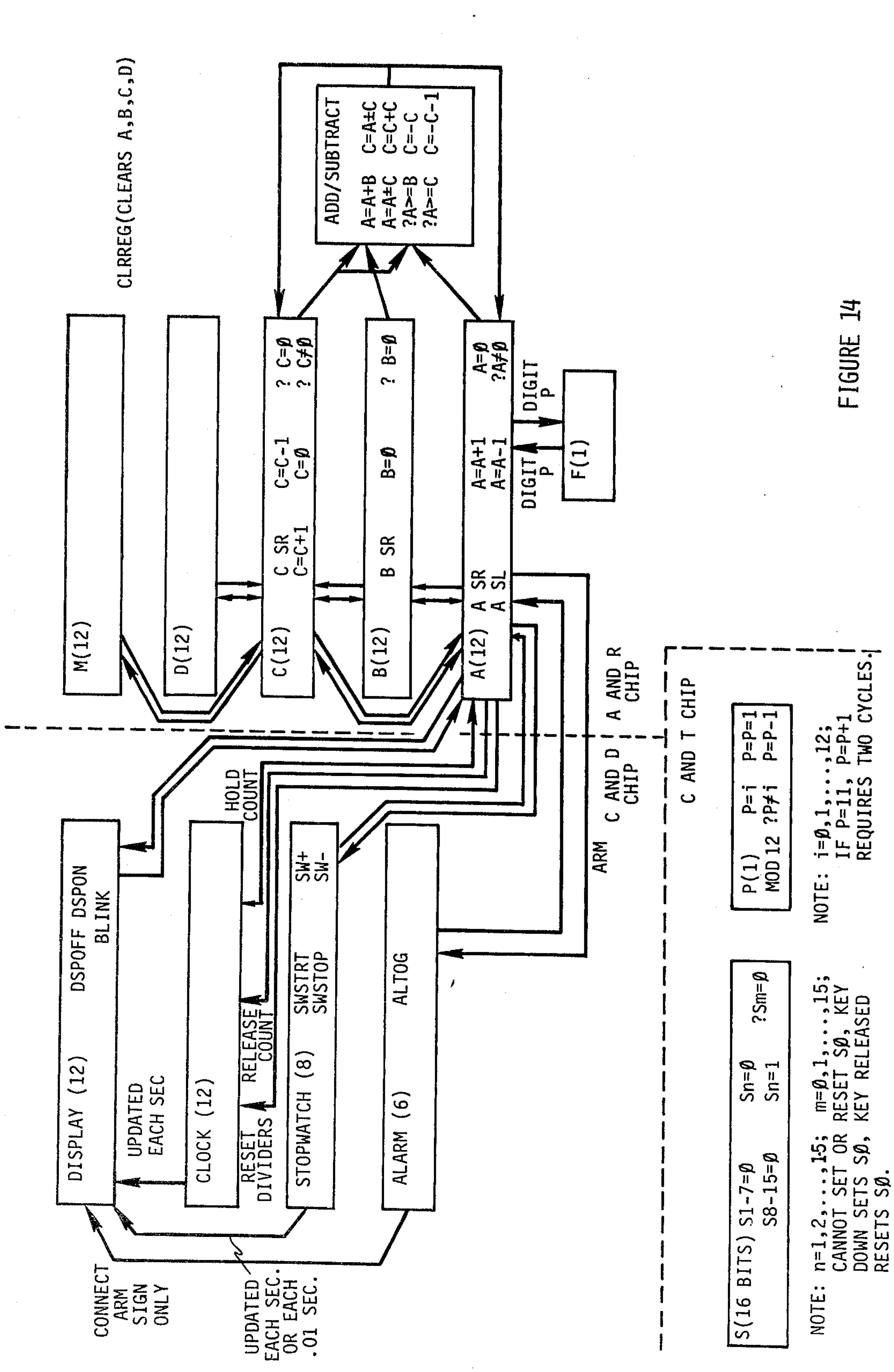
FIG. 14 is a data flow diagram.

FIG. 14 shows a data flow diagram for the various registers in the watch/calculator. The three registers which are used mostly for arithmetic calculations and data manipulation are the 12-digit or 48-bit A, B and C registers on the A&R chip. The other registers operate more in a peripheral manner and do the various input and output operations to and from other devices and the user.

In conjunction with the A register there is the F register which can contain one digit or 4 bits, and which holds an operator such as plus, minus, times or divide. It retains that information until the user hits the equals key or another key that causes an equals operation. Connected to the three main registers, A, B and C is the adder/subtracter (labeled +/−) which performs the arithmetic operations. In conjunction with the C register there is a memory (M) register and a D register which contains one of the operands of the calculation while the other operand is being entered.

In the watch part of the circuitry there is the alarm register (AL) 6 digits long, the stopwatch register (SW) 8 digits long, and the clock register (CL) with 12 digits. In addition, there is also a display register (DISPLAY) with 12 digits.

The various lines with arrows on the diagram show how data passes from register to register. So, for example, between the A register and the display register there is a line with an arrow on both ends, indicating that data can flow back and forth between the DISPLAY and the A register. Inside each of the rectangles representing a register is a list of the possible instructions that can be executed on data in that register. A table of explanations of the arithmetic instructions was given previously in Table I. Likewise where a data transfer performs some peripheral function in addition, that function is listed next to the data line. For example, when an alarm equals the A register instruction is performed, it also automatically arms the alarm, indicated by "ARM" by the data flow path. When a clock to display transfer is performed it is updated once each second and "UPDATED" is written on the line.

The C&T chip has the 16-bit status register (S) and also the pointer register (P) which contains 4 bits to point at one of the 12 digits in the other registers.

Figure 15:
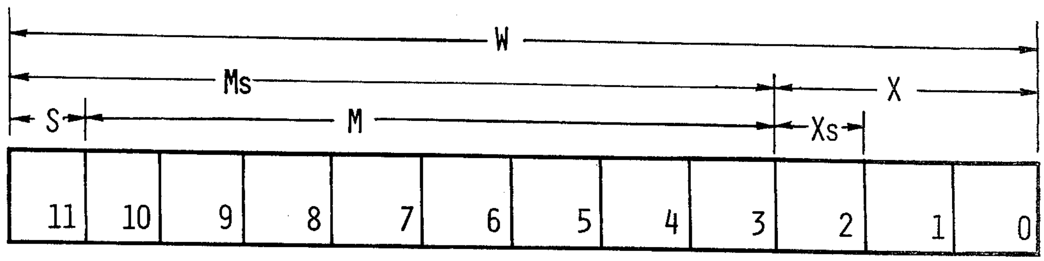
FIG. 15 shows the digit assignments in a data word.

As previously discussed, information in the watch/calculator is transmitted and manipulated in the form of 12 digit, 48 bit, words. Decimal numbers in the calculator portion are represented in scientific notation form. The most significant digit in the word is a zero if the number is positive and nine if it is negative. The next 8 digits in the word comprise the mantissa. Then the last three digits are used as an exponent which tells essentially where the decimal point is. Digit number 2, the most significant exponent digit, is a zero for a positive and a nine for a negative exponent. The last two digits give the exponent in tens complement form where a zero is represented by a zero and one by a one, but minus one is represented by 999. These fields: sign, mantissa, exponent sign and exponent digits have symbolic designations as shown in FIG. 15. The mantissa sign is called S and the mantissa, M. The combintion of those two fields is called MS for mantissa plus sign. The three exponent digits are indicated by X and the most significant of those three, the exponent sign field, is indicated by XS. The entire word is designated in code either by a blank which indicates a default or by a W, for word. The designations of these various fields facilitates operations on the data in the watch/calculator as will be seen below.

Each of the instructions that can be executed on any one of the three main registers A, B and C has a word select option with it that allows the instruction to operate on just part of the word. For example, the A=A+1 instruction (see Table I) is always accompanied by one of the word select options shown in Table II. Often the contents of the entire A register will be incremented and this can be done with a W or blank word select code. However, it is possible also to increment only the exponent sign digit, for example, by modifying the A=A+1 instruction with an XS code. Such use of modifier fields is shown in the program code listings in Appendix 3. What that modified instruction says is increment digit number 2, leaving all the other digits undisturbed. This ability to perform operations on particular fields or digits as opposed to only the entire word gives much greater processing flexibility.

TABLE II

| WORD SELECT (WS) OPTIONS | |
|---|---|
| SYMBOL | DESCRIPTION |
| P | on Pointer |
| WP | Word to Pointer |
| X | Exponent and exponent Sign |
| XS | Exponent Sign |
| M | Mantissa |
| MS | Mantissa and mantissa Sign |
| S | mantissa Sign |
| W | entire Word |

Figure 16:
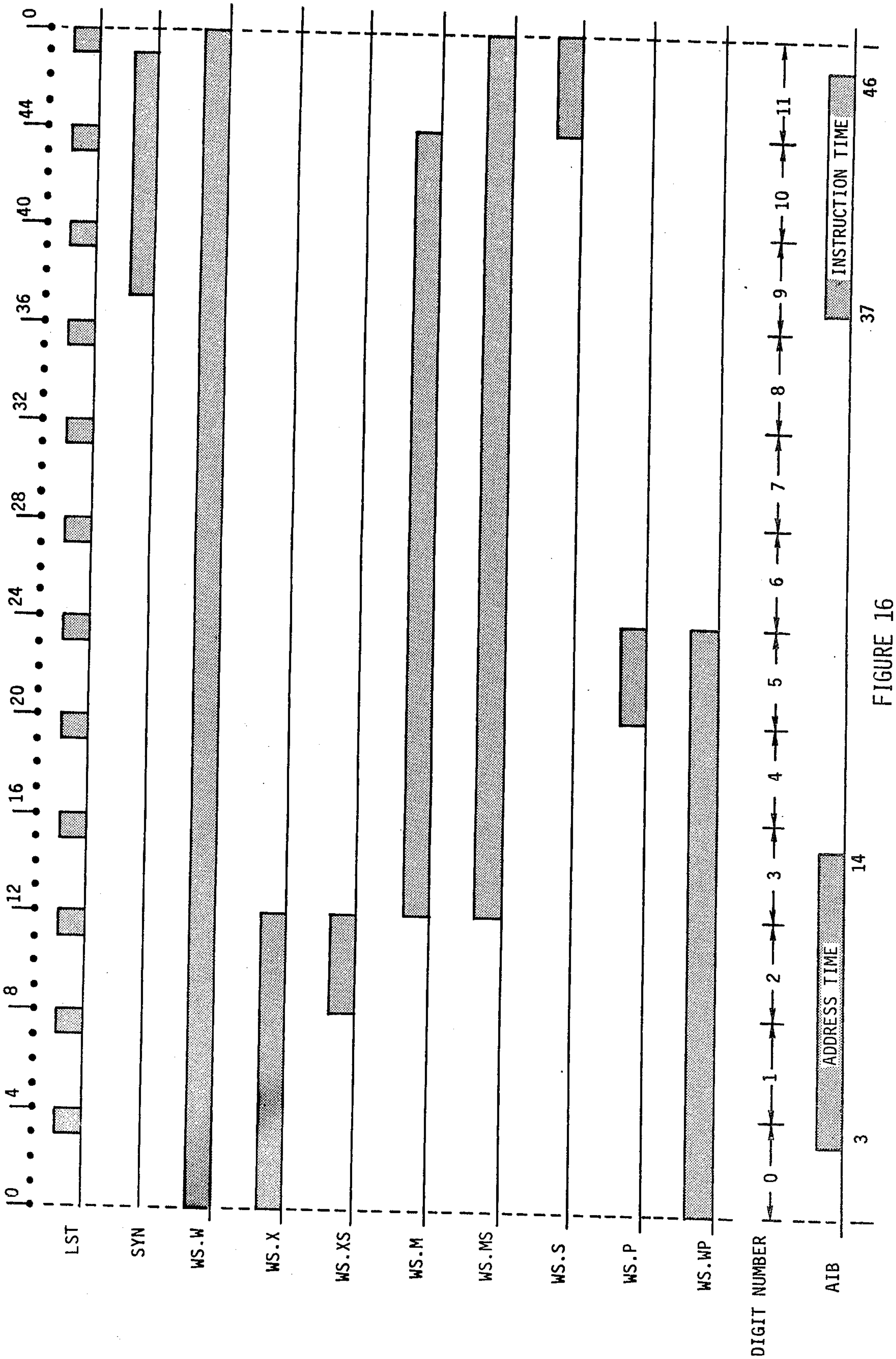
FIG. 16 is a graph of the system timing for the preferred embodiment.

Two other word select options are determined by the pointer, which is maintained in a register on the C&T chip as described above. The 4-bit pointer register can store one digit to point to any of the 12 digits in the other registers. The two word select options involving the pointer are P for pointer digit only and WP, the whole word up to the pointer. So, for example, if it is desired to increment digit number 5 in the A register, the pointer would first be set to 5 ad then the A=A+1 P instruction would be executed. The WP qualifier permits an instruction to be performed on word beginning with the least sigificant digit up to and including the digit which is indicated by the pointer. So, for example, if the pointer were at digit 7 and the instruction were A=A+1, the A register would be incremented beginning at digit zero and any carries which might be generated would propagate up through digit number 7. If an exchange operation between the A and C registers is to be performed only on the exponent field, the three least significant digits of the A and C registers will change places in response to the AC EX X instruction. All the other digits in the two registers will remain as they were before. All of the word select instructions are illustrated in conjunction with the watch/calculator system timing in FIG. 16.

In addition to the 32 arithmetic instructions shown in Table I, there are program control instructions which are listed in the Appendix. The first program control instruction shown is GOSUB which is a jump to a subroutine. A subroutine can be used to perform repetitive operations or operations that are identical in different parts of another program to save space in ROM. With the GOSUB and GOSUBX instructions jumps to two levels of subroutines are possible. This enables a jump from the main program to a subroutine and from the subroutine to another subroutine with a return to the first subroutine and then back to the main program.

The branch instruction, GO TO, is actually a branch on no carry. Each time arithmetic and certain other operations are performed, the carry flip-flop on the A&R chip may be set. If a branch is to be executed immediately after one of these operations, the branch will be taken only if the carry flip-flop is not set. So, to do an unconditional branch, the carry must not be set. For example, if the instruction is to increment the A register sign digit (A=A+1 S) and S is at 9 and it will go to 10, then the A register sign digit would then be a zero but the carry would be set. That condition could be tested by the instruction A=A+1 S plus a branch on no carry instruction to some location. If there were a carry then the program sequence would continue in order. But if there were no carry then, of course, the branch would be taken and a different function performed.

All the branch instructions are branch on no carries but there are several different symbolic codes to indicate different uses. The GOYES instruction is a branch after a decision. For example, with a ?A≠0 instruction the GOYES specifies where to branch to if the condition is met. GOROM and GOROMD (delayed) are the instructions which select a different page of the ROM for the program to execute. A GOROM is an immediate page select, since the next instruction executed will be the next address but in a different page of ROM, the one selected with the GOROM instruction. The delayed ROM select (GOROMD) executes one more instruction on the present page before it goes to another ROM. In addition to the GOSUB instructions there is a subroutine return instruction, RETURN. The SLEEP instruction puts the calculator in its low power or sleep mode as described above and the NOP instruction performs no operation.

An instruction called GOKEYS is used to enable the keyboard to communicate with the C&T chip. When the calculator is in the sleep mode, the C&T chip is continually scanning the keyboard as described above. When the user presses a key, the C&T chip recognizes this, the calculator wakes up and issues the GOKEYS instruction. The calculator then performs an unconditional branch to a selected point in ROM depending upon which key was depressed.

There is a load constant A(P)= instruction which allows the loading of a selected digit into the A register at the pointer position. The pointer control instructions are for setting, incrementing, decrementing and testing the pointer.

The next set of instructions is for the status bits in the status register on the A&R chip to allow setting and testing of the status bits. The status bits can be cleared in banks of eight, that is, bits 1 through 7 and bits 8 through 15 can be cleared with a single instruction. Status bits zero is not directly settable or clearable because it is the flag which indicates that a key is depressed, and is controlled indirectly through the keyboard. All the other status bits can be set to zero or one and tested for zero.

There are several instructions that deal with the C&D chip as well as some of the other registers on other chips such as the M, the D, and the F registers. The blink instruction sets the display blinking as, for example, when the user tries to divide by zero then the blink instruction will be used to indicate an error. DSPOFF and DSPON are used to control the on-off state of the display. A set of instructions is also provided for transfer of information to and from the display register. The A register contents can be transferred to and from the display, the display can be updated with the clock or stopwatch register contents and the alarm register contents can be displayed.

A number of clock register instructions allow transfer of information to and from this register. A wake-up signal can be generated one each second by the ENSCWP instruction which, as far as the calculator is concerned, looks just like a key depression and then comes once each second. The feature can also be disabled by the DSSCWP instruction. The clock register data transfer instructions include the following. A=CL transfers information from the clock register to the A register. Logic is provided on the C&D chip to prevent loss of a second increment (one "tick") when calculations are performed on information in the clock register.

As will be recalled, the time of day and the date are both contained in the clock register with the hours, minutes, seconds being contained in the least significant six digits and the date in the form of a decimal number of days from some base date in the most signficant digits of the register. In this way the date gets updated automatically each time 24 hours rolls over at midnight. The hours, and the minutes, seconds and digits are counted modulo 24 and modulo 60 respectively so that actual hours, minutes, seconds are maintained in the register.

When there is a clock register transfer to the A register, some hold logic is enabled which will catch any seconds "tick" that comes along while the clock data is in the A register so that the "tick" won't be missed. Now, when the contents of the A register are transferred back to the clock register the hold logic will added in a missed "tick" if there was one while the time information was in the A register.

Another instruction which involves the clock register is CLRS=A which performs a clock reset and receives data from the A register. This initializes all the logic and count-down dividers which keep time to reset the clock to start counting from a new time. For the alarm register there are alarm transfers: A=alarm and alarm=A. These are used to load or modify the alarm register. When the alarm register is loaded it is also automatically armed to buzz. There is another instruction called alarm toggle, ALTOG, which toggles the state of the arm/disarm flip-flop, so if the user wants to load it but not arm it, the alarm can be toggled to the unarmed state.

The stopwatch instructions include a stopwatch count up, SW+, instruction and a stopwatch count down, SW−, instruction. In addition, data can be transferred to the stopwatch register with an SW=A instruction as well as data from the stopwatch to the A register with an A=SW instruction. Finally, there are stopwatch start (SWSTRT) and stopwatch stop (SWSTOP) instructions which enable and disable the counting operation of the stopwatch.

Figure 17:
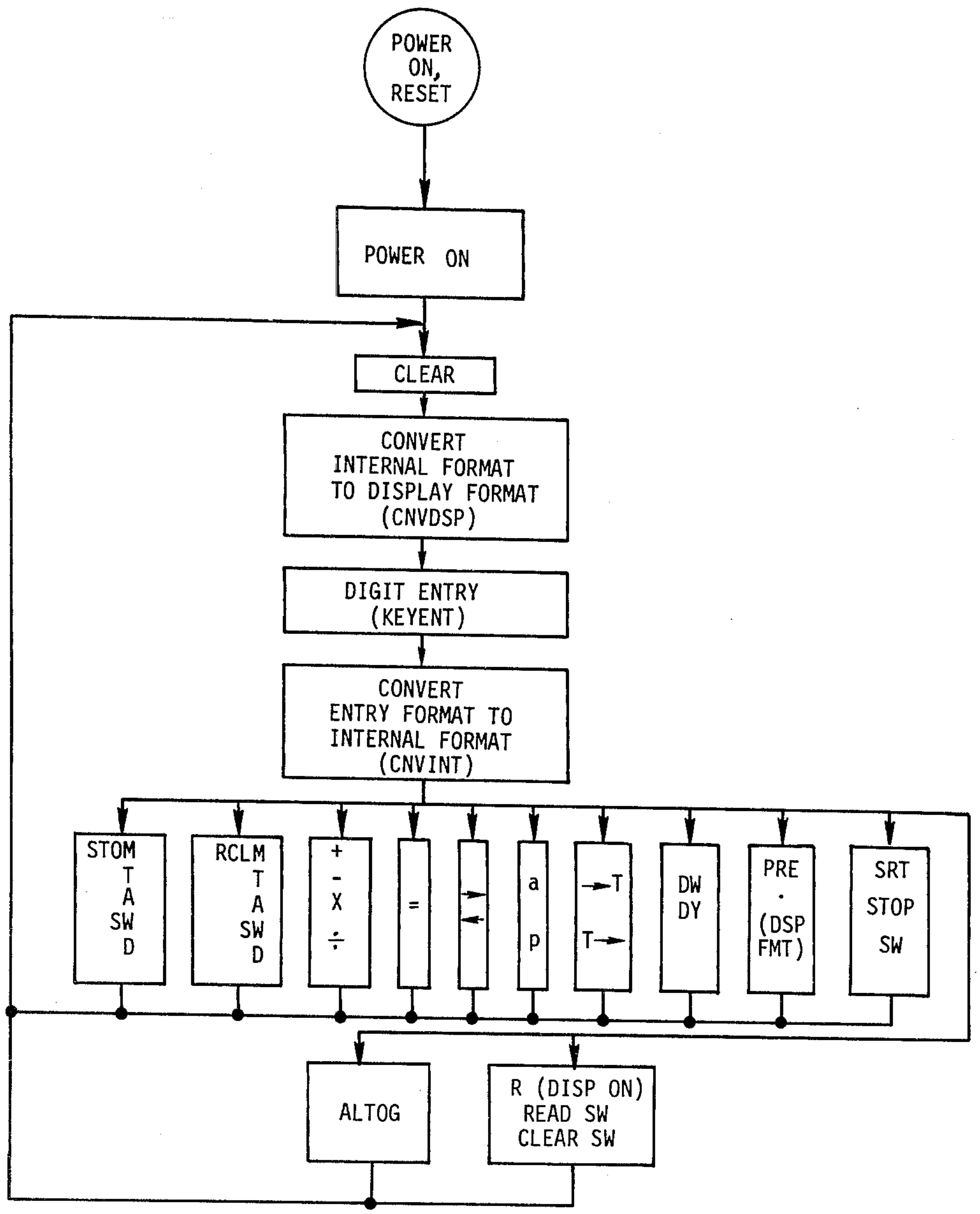
FIG. 17 is an overall flow diagram of the operation of the calculator portion of the preferred embodiment.

FIG. 17 shows an overall flow chart for the program controlled operations in the watch/calculator which are given in greater detail in the listings of the programs in the ROM chips in Appendix 2. When power is applied the entire calculator processor is initialized to a beginning state, all the registers zeroed, time reset to midnight, date reset to the first of January 1900. These steps are performed by a power-on routine when the power-on reset button is pressed. In response to this button the processor will wake up and begin executing instructions at address 0 in ROM where the power-on routine is located. After the power-on routine, the flow chart shows the watch/calculator proceeds to a clear routine which clears all the registers.

After the clear routine, there is a convert to display format routine CNVDSP which takes a number in internal format and converts it to a display format intelligible to a user. For example, a decimal number in internal format, as described previously, has a zero or a nine for the sign position, then eight mantissa digits and three exponent digits. This routine takes that number and converts it to display format that has the proper sign for the number and the decimal point in the right place or the appropriate exponent. Likewise it converts times and dates to the display format. At the end of that block the watch/calculator is in a sleep state where the calculator waits for a key to be depressed. The calculator enters a digit entry routine when a key is depressed and builds up the numbers in the A register as they are keyed into the calculator. The digit entry routine responds to the depression of the keys for the digits 0 through 9, decimal point, colon, slash, change sign, 21st century entry, AM and PM.

Once digit entry is finished the user will press one of the function keys. Each function key has its own subroutine and, for convenience the various functions have been grouped together in the flow diagram in FIG. 17. Since functions are performed on data in internal format a routine is used to convert the data format. The various functions which are symbolically indicated in the flow diagram are: store (STO) into the memory, time, alarm, stopwatch or data register and recall (RCL) from those registers. There are the standard four functions: plus, minus, times and divide, and the equals function and an exchange function (⇄) to exchange information between the operand registers. The "a" and "p" functions are used to indicate AM and PM for time information as described and the T→ and →T functions convert between time format hours, minutes and seconds and decimal format. DW and DY stand for functions called day of the week and day of the year respectively for converting any date in the 200-year calendar stored in the watch/calculator into a corresponding number. The prefix decimal point (↑)(.) is used to change the display format so that the user can change between 12-hour mode time display and 24-hour mode time display, and between month/day/year date format and day/month/year format. Finally, there are the stopwatch start/stop function, alarm toggle function and the functions performed by the R key: turn on the display without modifying the data, stopwatch split and stopwatch clear.

The internal data formating has been referred to before in connection with FIG. 15 and will be discussed in greater detail here. Internally it is necessary to indicate the difference between a decimal number, a date, a time interval, real time and the stopwatch. The table below indicates the meaning of the digit position assignments for each of the types of data handled by the watch/calculator. The sign digit, digit number 11, is used to indicate the type of data, as well as the algebraic sign for those numbers that can have a sign. Although the data in the clock register is represented as a number of days it is not so stored in the rest of the watch/calculator. Instead, it is represented by two day digits, two months digits and then two year digits, with a trailing digit which is either zero for 20Th century or a one for 21st century and the final trailing digits zeroes.

DIGIT POSITION ASSIGNMENTS

| TYPE OF DATA | DIGIT NUMBER 11 | 10 | 9 | 8 | 7 | 6 | 5 | 4 | 3 | 2 | 1 | 0 |
|---|---|---|---|---|---|---|---|---|---|---|---|---|
| Decimal Number | 0=+ 9=− | N | N | N | N | N | N | N | N | =+ 9=− | E | E |
| Time Interval | 1=+ 8=− | H | H | H | H | H | m | m | S | S | C | C |
| Stopwatch Time Interval | 2 | H | H | H | H | H | m | m | S | S | C | C |
| Real Time of Day | 3 | H | H | H | H | H | m | m | S | S | C | C |
| Fixed Time of Day | 4 | H | H | H | H | H | m | m | S | S | C | C |
| Date | 5 | D | D | M | M | Y | Y | | 0=20th century 1—21st century | | | |

KEY TO SYMBOLS
N = Mantissa of digital Number
E = Exponent of digital Number (in tens complement form)
+ = positive sign
− = negative sign
D = Day
M = Month
Y = Year
H = Hours
m = minutes
S = seconds
C = hundredths of seconds The status bits which are used in the processor and stored in the status register on the A&R chip are shown in the table below. A few of the more important status bits are also briefly discussed. Status bit 0 indicates whether or not a user has pressed one of the keys. Status bit 1 indicates whether or not the watch/calculator is in the 24-hour display mode. Status bit 2 indicates the day/month/year display mode. Status bit 3 indicates that the stopwatch is running if it is one and stopped, if it is a zero. Status bit 4 indicates that the previous key depressed was the prefix key (↑). Status bit 5 indicates that although the user did not press a key, the calculator woke up by itself, for example, to update the hours digits of the clock. Status bit 6 indicates that an operator key has been depressed and therefore indicates to the other calculator circuitry what portion of the sequence it is in in an algebraic calculation. Status bit 8 indicates that an entry is in progress. Status bit 10 indicates that the decimal point key has been depressed in digit entry. Status bit 13 indicates the alarm is being displayed or that the number that was entered is a time interval as opposed to a decimal number. Status bit 14 indicates that a date number is being entered. Status bit 15 indicates that a number is in internal format.

STATUS BITS

ϕ KEY DOWN
1 24 HR MODE
2 DMY MODE
3 SW RUNNING
4 PREFIX, SCI OVF, M:S.C, DW/DY, AM/PM, LSB RESULT
5 WAKE UP
6 OPERATOR HIT, LSB OP CODE
7 TIMCHK OK, EQUALS/OPRTRS
8 ENTRY IN PROGRESS, MSB OP CODE
9 RETURN CODE ϕ
1ϕ DECIMAL POINT HIT, MINUS SIGN, PM, MSB RESULT
11 RETURN CODE 1
12 RETURN CODE 2
13 TIME INTERVAL ENTRY, ALARM DISPLAY
14 DATE ENTRY
15 INTERNAL FORMAT

The display decoding is indicated in the table below. The display register device receives the contents of the A register and holds them for display, although only digit numbers 3 through 11 of the data word are displayed in a 9 digit LED display. Digit codes 0 through 9 are displayed as 0 through 9, 10 is displayed as a decimal point, 11 a minus, 12 a colon, 13 a little lower box and 14 three bars. 15 is a blank for blanking leading and trailing zeroes.

DISPLAY DECODING

ϕ–9 ϕ–9
10(A) .(DECIMAL POINT)
11(B) –(DASH, MINUS)
12(C):(COLON)
13(D) □(LOWER BOX)
14(E) ≡(THREE BARS)
15(F) (BLANK)

The function of the colon, slash and decimal point keys in the entry of time interval information can be illustrated by tracing what happens as each key is depressed. The Time Entry Sequence Table in Appendix 4 gives the contents of the A, B, and C registers along with the address of the instruction that was just executed. For the purposes of this example, those instructions are shown which are helpful in understanding the time entry sequence. In this discussion it will be assumed that the display has been cleared to start with and so the first line in the table shows ROM address 0567 which is the A register contents to display instruction. Thus the display shows only a "0.". After the "0". is in the display, the calculator goes into the sleep mode shown at location 0061.

The calculator is now ready for the user to press the first key to enter a time interval number. Assume that the first key depressed is the 1 key. The calculator will wake up at location number 0062 which is the GOKEYS instruction which will find out what key was depressed and then jump to that key's entry point in the ROM. The key 1 entry point is address 0016 and the program at that point builds up the digit by incrementing the exponent sign digit in the A register and since it is a 1 in this case it only increments once. Now the 1 in the exponent sign position is shifted to the left to the first digit position, determined by the pointer, which resides in the B register exponent sign position at this point. Since 8 digits can be entered, the pointer is an 8 to begin with. The 8 gets put up in the C register to be decremented there as the 1 is shifted over in the A register. When the 1 gets to the right place, the pointer stored in the C register exponent sign position has gone to zero. At that point a trailing decimal point is inserted since the calculator assumes the entry is in decimal until told otherwise. After putting in the decimal point, the trailing zeroes in the A register are blanked out. Then there is another A register to display instruction to put the "1." in the display and then the calculator goes to sleep. It should be noted that the pointer in the B register was also decremented by one to indicate that only 7 more digits can be entered.

Next assume the user hits a 2 and once again the calculator wakes up at ROM address 0062. The entry point for a 2 key is ROM address 14 and, as before, the number is built up in the exponent sign position of register A. The remaining steps of shifting the number to the left and decrementing the pointer are not shown this time since they are essentially the same as before. Once the "12". is in the left portion of the A register it is sent to the display and the calculator goes to sleep again.

To indicate that the entry is time information, the user will press the colon key next. Depression of this key causes a jump to a different routine in the entry procedure, starting at ROM address 0067. As before, after the colon key is pressed the calculator wakes up at ROM address 0062. Then it checks the pointer in the B register to see that 6 digits have not been entered already, that the calculator is in a legal time entry mode and that the calculator is in the 2 hours digit mode. When those decisions have been completed at ROM address 1204 the colon is inserted in the A register and the two trailing zeroes are then loaded in the register. In addition, the pointer in the B register must be changed to reflect the fact that the calculator is in time entry and digits go into the second digit position after the colon and not the one immediately following the colon. The C register sign position is also incremented by 1 to indicate the time interval entry mode. At ROM address 1216 the 12:00 is put in the display, and then the calculator goes to sleep.

At this point assume the user presses the 3 key. The calculator will wake up and jump to that point in the ROM which will cause the A exponent sign to increment 3 times. Then, as before, the 3 will be shifted to the left in the A register. At this point there is a difference to note between time entry and decimal entry. The only digit positions that can receive time numbers are either the least significant minutes digit or the last digit in the display, so there is no need to decrement the pointer. A test is simply made to see if the pointer is zero and if it is not, then the calculator knows that it has to enter the digit into the minutes column. So the 3 is shifted to that column and then the trailing blanks are put back in so that 12:03 appears in the A register. This number is sent to the display and the calculator goes to the sleep mode.

If the user now presses the 4 key, the same incrementing and shifting procedure takes place (so it has been omitted from the table) until the 4 gets to the digit position, minus one, where it is supposed to be. Then a slight change is made in the pointer and both digits are shifted over so that the 3 moves over in the tens of minutes column and the 4 moves into the units minutes column. Thus 12:34 appears in the A register and that is sent to the display.

Now assume that instead of pressing the colon key again the user presses another digit key, the 5 key, at this point. This number will be entered into the minutes column, push the 4 into the tens of minutes column and the 3 will disappear. This leaves the number 12:45 in the A register, which is sent to the display.

Assume that the user actually desired to enter 12 minutes, 45 seconds and 67 hundredths of a second. Instead of pressing the colon key he will use the decimal point key. It should be noted that, had the colon key been depressed, the entry of seconds would be identical to the entry of minutes after the first actuation of the colon key. However, since the decimal point key has been pressed, the assumed value of the numbers is changed from hours and minutes to minutes and seconds. After the decimal point key is pressed and the calculator wakes up the decimal point is placed in the exponent sign position of the A register. At this point the calculator also returns to the decimal entry mode so that the hundredths of seconds will be entered in straight sequential order as opposed to the scrolling method of entry that is used for minutes and seconds. As with previous characters the decimal point gets shifted to the left as the pointer in the C register exponent sign gets decremented to zero. After the decimal point is in position the trailing blanks are inserted, leaving 12:45. in the A register. That is sent to the display and the calculator goes to sleep.

Next the user will press the 6 key and the 6 is entered into the A register as described for previous decimal digit entries. Thus after this procedure 12:45.6 appears in the A register and is then sent to the display. Then the 7 key is pressed, and a 7 is likewise entered into the A register and displayed. At this point the pointer is decremented from 1 to 0, indicating that the display is full. The 12:45.67 in the A register now represents 12 minutes, 45.67 seconds, and that is sent to the display.

As mentioned before, the display is now full but for the sake of example, it will be assumed that the user now presses the 8 key to see what happens. The 8 is built up in the A register exponent sign position as before but the pointer in the B register is already zero so the 8 does not get shifted over and is essentially lost. The display receives the same information from the A register as before so that 12:45.67 is displayed. Thus any keys digits pressed when the display is full then will be ignored.

Figure 18:
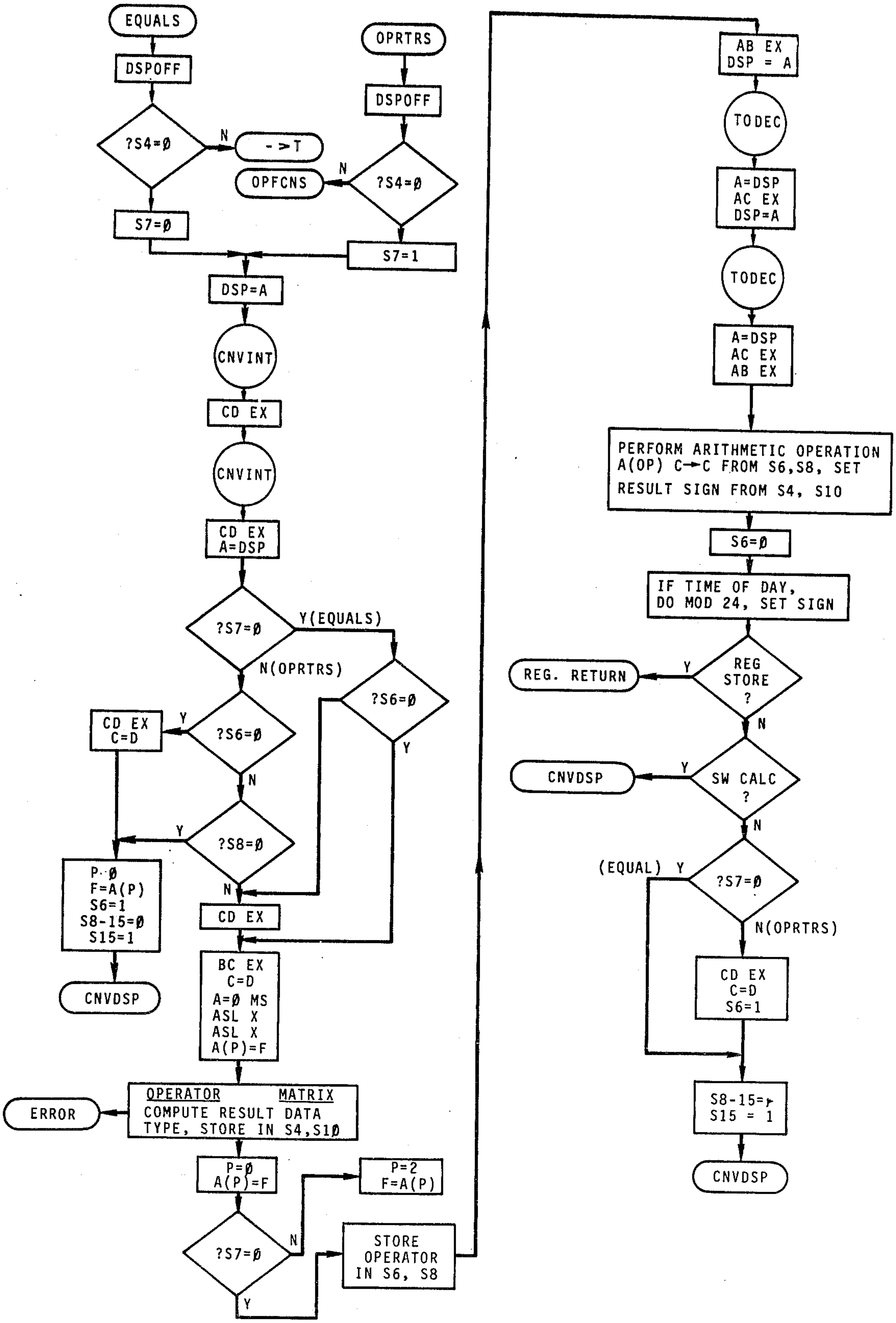
FIG. 18 is a flow diagram of arithmetic operations.

FIG. 18 is a flow diagram of an arithmetic operation performed by the calculator portion of the watch/calculator regardless of the type of the operand: time, date or decimal. The flow diagram starts out with the assumption that a typical number entry sequence has been completed. After a number is entered, the user will press an operator key. The calculator enters the process illustrated in the flow diagram starting with OPRTRS (for operators) when an operator key is actuated. The operator is saved temporarily in the display register while the entry is converted to internal format. Likewise, a second operand is entered and converted to internal format. Then there is a test to see if there is a second operand at OP HIT?. At this point the answer will be "no" because this is the first operand. Therefore there is a branch which causes the data to be switched around so that the first entry goes into the D register to be saved while the second entry is made. Also the operator is put in the F register and the operator hit status bit is set. Then the calculator converts to display format again and waits for the next operand. The second operand may be entered from the keyboard or one of the time registers and after it is entered the user will press the equals key.

When the equals key is pressed, the sequence of codes shown in the lefthand column of the flow diagram are executed. First there is a test to be sure that both operands, if either one is time related, has the most recently updated value. Then there is a test to see if an operator was hit and the answer in this case is "yes". The "no" branch from this decision block is for the automatic constant kind of operations in which an operand from a previous calculation is being used. Next the operands are again switched around so that the first operand is in the C register and the second operand, the one entered most recently, is in the D register. The operator is recalled from the F register. Once this is known, the first operand is manipulated into the B register, and the second operand is manipulated into the C register. The operator code will be put in the A register least significant digit. From the B register and C register sign digits, which tells what type of data are in the registers, and the A register least significant digit, which tells which operation is to be performed, the calculator goes into a routine called matrix which determines the type of the result. This matrix is illustrated in the Operand/Operator Matrix in the Functional Description section. The matrix operation then sets two status bits to indicate the type of the result. Following that, both operands are converted to decimal type if necessary. For example, if an operand is a date it is converted to a decimal number of days since Jan. 1, 1900; time, to a decimal number of hours, etc. Now the actual arithmetic operation is performed. Once the operation is performed, the result is stored and normalized in the C register. A routine called "result" is performed to check the two status bits that tell the type of the result so the C register sign digit can be set properly to tell what kind of data the result is. Then there is a routine to convert the decimal information to the proper form to correspond to the sign digit. After this, some flags are set to say that the equals key has been pressed and the result is converted to the display format and displayed.

Figure 19:
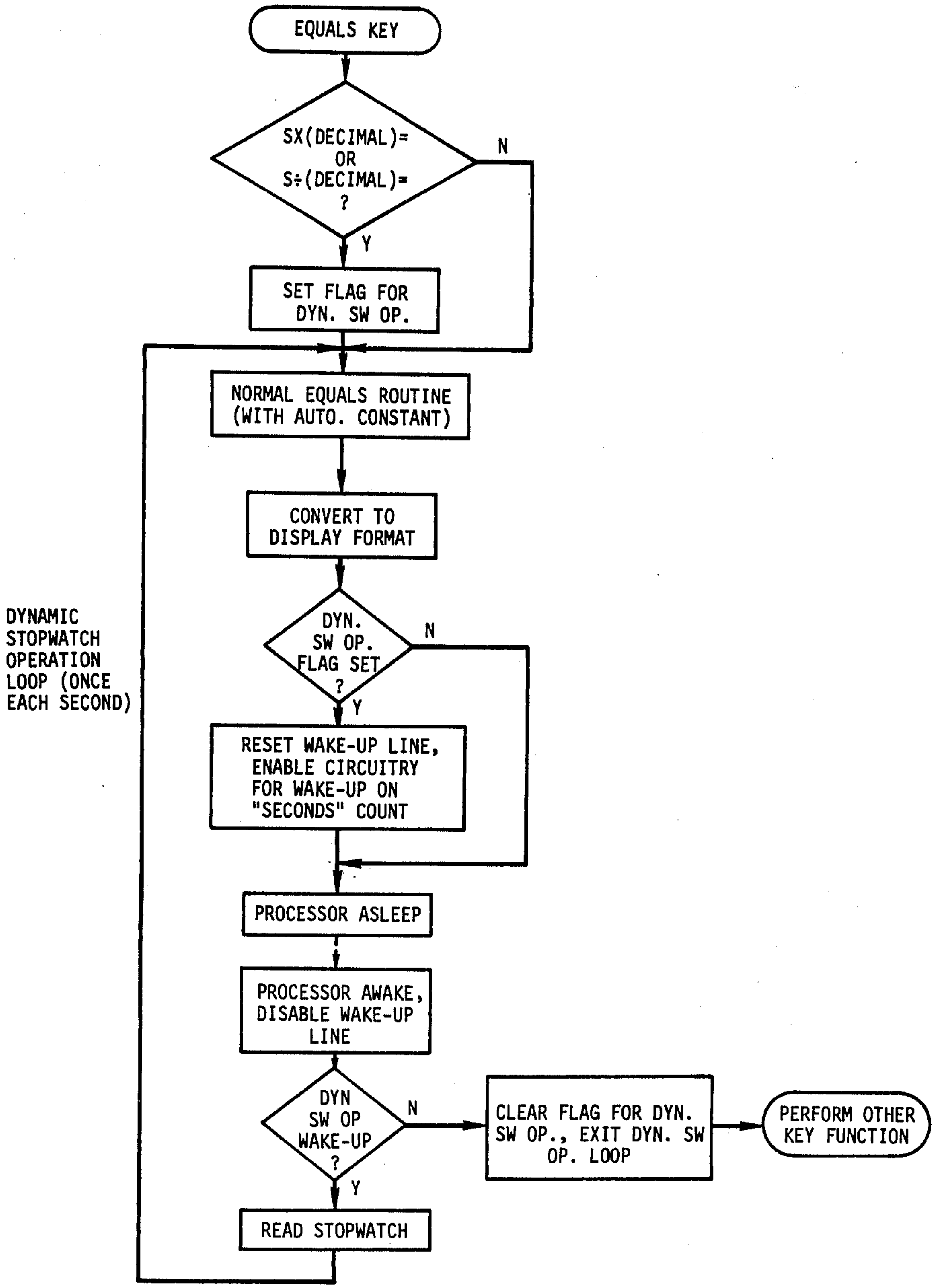
FIG. 19 is a flow diagram of dynamic stopwatch operations.

As discussed above, the arithmetic operations of multiply and divide can be performed with time data in the stopwatch register. FIG. 19 shows a flow chart of the operations performed by the watch/calculator in performing the initial operation and then updating the results once each second so the results are always current. The dynamic stopwatch program in ROM simulates the usual automatic constant operation described earlier in which a newly entered number may be operated upon by a previously entered operator and operand simply by entering the new number and pressing the equals key. In the dynamic stopwatch operation, the newly entered number comes from the stopwatch register and the equals operation is initiated by the calculator circuitry. This mode of operation is terminated by depression of the clear key or another function key.

X-DECODE PROGRAM

| | A5 | A4 | A3 | A2 | A1 | A0 |
|---|---|---|---|---|---|---|
| 0 | 1 | 1 | 1 | 1 | 1 | 1 |
| 1 | 1 | 1 | 1 | 1 | 1 | 0 |
| 2 | 1 | 1 | 1 | 1 | 0 | 1 |
| 3 | 1 | 1 | 1 | 1 | 0 | 0 |
| 4 | 1 | 1 | 1 | 0 | 1 | 1 |
| 5 | 1 | 1 | 1 | 0 | 1 | 0 |
| 6 | 1 | 1 | 1 | 0 | 0 | 1 |
| 7 | 1 | 1 | 1 | 0 | 0 | 0 |
| 8 | 1 | 1 | 0 | 1 | 1 | 1 |
| 9 | 1 | 1 | 0 | 1 | 1 | 0 |
| 10 | 1 | 1 | 0 | 1 | 0 | 1 |
| 11 | 1 | 1 | 0 | 1 | 0 | 0 |
| 12 | 1 | 1 | 0 | 0 | 1 | 1 |
| 13 | 1 | 1 | 0 | 0 | 1 | 0 |
| 14 | 1 | 1 | 0 | 0 | 0 | 1 |
| 15 | 1 | 1 | 0 | 0 | 0 | 0 |
| 16 | 1 | 0 | 1 | 1 | 1 | 1 |
| 17 | 1 | 0 | 1 | 1 | 1 | 0 |
| 18 | 1 | 0 | 1 | 1 | 0 | 1 |
| 19 | 1 | 0 | 1 | 1 | 0 | 0 |
| 20 | 1 | 0 | 1 | 0 | 1 | 1 |
| 21 | 1 | 0 | 1 | 0 | 1 | 0 |
| 22 | 1 | 0 | 1 | 0 | 0 | 1 |
| 23 | 1 | 0 | 1 | 0 | 0 | 0 |
| 24 | 1 | 0 | 0 | 1 | 1 | 1 |
| 25 | 1 | 0 | 0 | 1 | 1 | 0 |
| 26 | 1 | 0 | 0 | 1 | 0 | 1 |
| 27 | 1 | 0 | 0 | 1 | 0 | 0 |
| 28 | 1 | 0 | 0 | 0 | 1 | 1 |
| 29 | 1 | 0 | 0 | 0 | 1 | 0 |
| 30 | 1 | 0 | 0 | 0 | 0 | 1 |
| 31 | 1 | 0 | 0 | 0 | 0 | 0 |
| 32 | 0 | 1 | 1 | 1 | 1 | 1 |
| 33 | 0 | 1 | 1 | 1 | 1 | 0 |
| 34 | 0 | 1 | 1 | 1 | 0 | 1 |
| 35 | 0 | 1 | 1 | 1 | 0 | 0 |
| 36 | 0 | 1 | 1 | 0 | 1 | 1 |
| 37 | 0 | 1 | 1 | 0 | 1 | 0 |
| 38 | 0 | 1 | 1 | 0 | 0 | 1 |
| 39 | 0 | 1 | 1 | 0 | 0 | 0 |
| 40 | 0 | 1 | 0 | 1 | 1 | 1 |
| 41 | 0 | 1 | 0 | 1 | 1 | 0 |
| 42 | 0 | 1 | 0 | 1 | 0 | 1 |
| 43 | 0 | 1 | 0 | 1 | 0 | 0 |
| 44 | 0 | 1 | 0 | 0 | 1 | 1 |
| 45 | 0 | 1 | 0 | 0 | 1 | 0 |
| 46 | 0 | 1 | 0 | 0 | 0 | 1 |
| 47 | 0 | 1 | 0 | 0 | 0 | 0 |
| 48 | 0 | 0 | 1 | 1 | 1 | 1 |
| 49 | 0 | 0 | 1 | 1 | 1 | 0 |
| 50 | 0 | 0 | 1 | 1 | 0 | 1 |
| 51 | 0 | 0 | 1 | 1 | 0 | 0 |
| 52 | 0 | 0 | 1 | 0 | 1 | 1 |
| 53 | 0 | 0 | 1 | 0 | 1 | 0 |
| 54 | 0 | 0 | 1 | 0 | 0 | 1 |
| 55 | 0 | 0 | 1 | 0 | 0 | 0 |
| 56 | 0 | 0 | 0 | 1 | 1 | 1 |
| 57 | 0 | 0 | 0 | 1 | 1 | 0 |
| 58 | 0 | 0 | 0 | 1 | 0 | 1 |
| 59 | 0 | 0 | 0 | 1 | 0 | 0 |
| 60 | 0 | 0 | 0 | 0 | 1 | 1 |
| 61 | 0 | 0 | 0 | 0 | 1 | 0 |
| 62 | 0 | 0 | 0 | 0 | 0 | 1 |
| 63 | 0 | 0 | 0 | 0 | 0 | 0 |

APPENDIX 2

```
ROM FILE - CRI0

                FILE    CRI0

                ENTRY   GETKEY
                ENTRY   PREKEY
                ENTRY   AWAKE
                ENTRY   CNVINT
                ENTRY   CNVEX
                ENTRY   KEYREL

  0 PON     0633 GOTO   PWRON  ( 146)
  1 9       1132 A=A+1  XS
  2         0000 NOP
  3 8       1132 A=A+1  XS
  4 7       1132 A=A+1  XS
  5         0000 NOP
  6 6       1132 A=A+1  XS
  7 5       1132 A=A+1  XS
 10         0000 NOP
 11 4       1132 A=A+1  XS
 12         0000 NOP
 13 3       1132 A=A+1  XS
 14 2       1132 A=A+1  XS
 15         0000 NOP
 16 1       1132 A=A+1  XS
 17 0       1034 DSPOFF
 20 RET     0520 RETURN
 21 MEMORY  0664 GOROMD 6
 22         0003 GOTOX  MEMORY
 23 ALARM   0664 GOROMD 6
 24         0003 GOTOX  ALARM
 25 TIME    0664 GOROMD 6
 26         0003 GOTOX  TIME
 27 PM      0564 GOROMD 5
 30         0003 GOTOX  PM
 31 =       0764 GOROMD 7
 32         0003 GOTOX  EQUALS
 33 %       1112 A=A+1  X
 34 X       1112 A=A+1  X
 35         0000 NOP
 36 -       1112 A=A+1  X
 37 +       0764 GOROMD 7
 40         0003 GOTOX  OPRTRS
 41 C       1034 DSPOFF
 42         0617 GOTO   CLEAR  ( 143)
 43 M       0107 GOTO   MEMORY (  21)
 44 ->      1034 DSPOFF
 45         0267 GOTO   PREFIX (  55)
 46 A       0117 GOTO   ALARM  (  23)
 47 /       0314 P=     0
 50 SPCHK   1034 DSPOFF
 51         0424 ? S4=  0
 52         0103 GOYES  RET    (  20)
 53         0564 GOROMD 5
 54         0003 GOTOX  FCNS
 55 PREFIX  1132 A=A+1  XS
 56         0267 GONC   *-1    (  55)
 57         0404 S4=    1
 60         0473 GOTO   PREKEY ( 116)
 61 READCL  0164 GOROMD 1
 62         0003 GOTOX  READCL
 63 T       0127 GOTO   TIME   (  25)
 64 D       0664 GOROMD 6
 65         0003 GOTOX  DATE
 66 .       1132 A=A+1  XS
 67 :       0714 P=     1
 70         0243 GOTO   SPCHK  (  50)
 71 AM      0564 GOROMD 5
 72         0003 GOTOX  AM
 73 P       0137 GOTO   PM     (  27)
 74 S       0664 GOROMD 6
 75         0003 GOTOX  STWTCH
 76 R       0753 GOTO   RKEY   ( 172)
 77 WAKEUP  0504 S5=    1
100         0476 A=C    S
101         1176 A=A-1  S
102         1176 A=A-1  S
103         1176 A=A-1  S
104         0433 GONC   *+2    ( 106)
105         0743 GOTO   CNVDSP ( 170)
106         1176 A=A-1  S
107         0447 GONC   *+2    ( 111)
110         0743 GOTO   CNVDSP ( 170)
111         0544 S5=    0
112         1064 GOROMD 8
113         0003 GOTOX  SWCALC
114 DSPON   1734 A=DSP
115 GETKEY  0444 S4=    0
116 PREKEY  0734 DSPON
117 AWAKE   1124 ? S9=  0
120         0557 GOYES  KEYREL ( 133)
121         1324 ? S11= 0
122         0557 GOYES  KEYREL ( 133)
123         1424 ? S12= 0
124         0557 GOYES  KEYREL ( 133)
125         1534 DSSCWP
126         0024 ? S0=  0
127         0547 GOYES  *+2    ( 131)
130         0533 GOTO   *-2    ( 126)
131         1434 ENSCWP
132         0573 GOTO   *+4    ( 136)
133 KEYREL  0024 ? S0=  0
134         0573 GOYES  *+2    ( 136)
135         0557 GOTO   *-2    ( 133)
136         1132 A=A+1  XS
137         0573 GONC   *-1    ( 136)
140 SLEEP   0620 SLEEP
141         1534 DSSCWP
142         0220 GOKEYS
143 CLEAR   1024 ? S8=  0
144         0707 GOYES  CLALL  ( 161)
145         0727 GOTO   CLENT  ( 165)
146 PWRON   1534 DSSCWP
147         1674 SWSTOP
150         1274 SW+
151         0020 S1-7=  0
152         0034 CLRREG
153         0474 AL=A
154         0674 SW=A
155         0434 M=C
156         1774 ALTOG
157         0174 CLRS=A
160         0274 CL=A
161 CLALL   1334 F=A(P)
162         0644 S6=    0
163         0056 C=0
164         0134 CD EX
165 CLENT   0056 C=0
166         0120 S8-15= 0
167         1704 S15=   1
170 CNVDSP  0164 GOROMD 1
171         0003 GOTOX  CNVDSP
172 RKEY    0476 A=C    S
173         1176 A=A-1  S
174         1176 A=A-1  S
175         1176 A=A-1  S
```

APPENDIX 2-continued

```
176        0463 GONC    DSPON  ( 114)
177        0664 GOROMD  6
200        0003 GOTOX   SWSPRS
201 CNVINT 0114 P=      11
202        0130 A(P)=   1
203        0576 A=A-C   S
204        1073 GONC    ENTCHK ( 216)
205        1136 A=A+1   S
206        1053 GONC    *+4    ( 212)
207        0574 A=SW
210        0422 AC EX   WP
211        1763 GOTO    CNVEX  ( 374)
212        1136 A=A+1   S
213        1073 GONC    ENTCHK ( 216)
214        0305 GOSUB   READCL (  61)
215        1763 GOTO    CNVEX  ( 374)
216 ENTCHK 1724 ? S15= 0
217        1113 GOYES   ENTRY  ( 222)
220        1763 GOTO    CNVEX  ( 374)
221        0030 A(P)=   0
222 ENTRY  0702 C=A+C   P
223        1133 GONC    *+3    ( 226)
224        0202 ? C#0   P
225        1107 GOYES   *-4    ( 221)
226        1114 P=      2
227 ZRBLNK 1042 A=0     P
230        0320 P=P+1
231        0702 C=A+C   P
232        1167 GONC    *+3    ( 235)
233        0202 ? C#0   P
234        1137 GOYES   ZRBLNK ( 227)
235        0046 C=0     M
236        1524 ? S13= 0
237        1207 GOYES   *+2    ( 241)
240        1217 GOTO    *+3    ( 243)
241        1624 ? S14= 0
242        1653 GOYES   DECINT ( 352)
243 TIMDAT 0414 P=      5
244        0702 C=A+C   P
245        1427 GONC    HMSCHK ( 305)
246        0202 ? C#0   P
247        1427 GOYES   HMSCHK ( 305)
250        1662 A SL    WP
251        0214 P=      8
252        1662 A SL    WP
253        1616 A SR
254        1616 A SR
255 H:M:S  1616 A SR
256        1616 A SR
257        1616 A SR
260 H:M    1614 P=      10
261        0422 AC EX   WP
262        0222 ? C#0   WP
263        1333 GOYES   *+3    ( 266)
264        0076 C=0     S
265        0136 C=C+1   S
266        0414 P=      5
267        1361 GOSUB   TIMCHK ( 274)
270        1314 P=      3
271        1361 GOSUB   TIMCHK ( 274)
272        1544 S13=    0
273        1763 GOTO    CNVEX  ( 374)
274 TIMCHK 0530 A(P)=   5
275        0320 P=P+1
276        0602 ? A>=C P
277        0103 GOYES   RET    (  20)
300 CNVERR 1134 BLINK
301        1734 A=DSP
302        0046 C=0     M
303        0164 GOROMD  1
304        0003 GOTOX   DSPON
305 HMSCHK 1662 A SL    WP
306        0214 P=      8
307        0702 C=A+C   P
310        1303 GONC    H:M    ( 260)
311        1662 A SL    WP
312        1076 A=0     S
313        1624 ? S14= 0
314        1267 GOYES   H:M:S  ( 255)
315 DATEIN 1641 GOSUB   SWAPMD ( 350)
316        1614 P=      10
317        0422 AC EX   WP
320        1056 A=0
321        0330 A(P)=   3
322        0230 A(P)=   2
323        0130 A(P)=   1
324        0330 A(P)=   3
325        0214 P=      8
326        0406 AC EX   M
327        0622 ? A>=C WP
330        1403 GOYES   CNVERR ( 300)
331        0062 C=0     WP
332        0606 ? A>=C M
333        1403 GOYES   CNVERR ( 300)
334        0406 AC EX   M
335        1611 GOSUB   ZRCHK  ( 342)
336        1614 P=      10
337        1611 GOSUB   ZRCHK  ( 342)
340        0464 GOROMD  4
341        0003 GOTOX   DATDEC
342 ZRCHK  0202 ? C#0   P
343        0103 GOYES   RET    (  20)
344        0420 P=P-1
345        0002 ? C=0   P
346        1403 GOYES   CNVERR ( 300)
347        0520 RETURN
350 SWAPMD 0164 GOROMD  1
351        0003 GOTOX   SWAPMD
352 DECINT 1614 P=      10
353        1302 A=A+B   P
354        1737 GONC    POS    ( 367)
355        0646 ? A#0   M
356        1707 GOYES   *+3    ( 361)
357        0056 C=0
360        1763 GOTO    CNVEX  ( 374)
361        0152 C=C-1   X
362        1646 A SL    M
363        0642 ? A#0   P
364        1757 GOYES   DECEX  ( 373)
365        1707 GOTO    *-4    ( 361)
366        0112 C=C+1   X
367 POS    0420 P=P-1
370        1302 A=A+B   P
371        1733 GONC    *-3    ( 366)
372        1662 A SL    WP
373 DECEX  0406 AC EX   M
374 CNVEX  1056 A=0
375        1416 B=0
376        1704 S15=    1
377        0520 RETURN
                END

SYMBOL TABLE

:       67
%       33
+       37
-       36
->      44
```

```
.         66
/         47
0         17
1         16
2         14
3         13
4         11
5          7
6          6
7          4
8          3
9          1
=         31
A         46
ALARM     23   -    46
AM        71
AWAKE    117
C         41
CLALL    161   -   144
CLEAR    143   -    42
CLENT    165   -   145
CNVDSP   170   -   105   110
CNVERR   300   -   330   333   346
CNVEX    374   -   211   215   220   273
                                      360
CNVINT   201
D         64
DATEIN   315
DECEX    373   -   364
DECINT   352   -   242
DSPON    114   -   176
ENTCHK   216   -   204   213
ENTRY    222   -   217
GETKEY   115
H:M      260   -   310
H:M:S    255   -   314
HMSCHK   305   -   245   247
KEYREL   133   -   120   122   124
M         43
MEMORY    21   -    43
P         73
PM        27   -    73
PON        0
POS      367   -   354
PREFIX    55   -    45
PREKEY   116   -    60
PWRON    146   -     0
R         76
READCL    61   -   214
RET       20   -    52   277   343
RKEY     172   -    76
S         74
SLEEP    140
SPCHK     50   -    70
SWAPMD   350   -   315
T         63
TIMCHK   274   -   267   271
TIMDAT   243
TIME      25   -    63
WAKEUP    77
X         34
ZRBLNK   227   -   234
ZRCHK    342   -   335   337
```

ENTRY POINTS

```
AWAKE    117
CNVEX    374
CNVINT   201
GETKEY   115
KEYREL   133
PREKEY   116
```

EXTERNAL REFERENCES

```
ALARM     24
AM        72
CNVDSP   171
DATDEC   341
DATE      65
DSPON    304
EQUALS    32
FCNS      54
MEMORY    22
OPRTRS    40
PM        30
READCL    62
STWTCH    75
SWAPMD   351
SWCALC   113
SWSPRS   200
TIME      26
```

ROM FILE - CRI1

```
                         FILE    CRI1

                         ENTRY   CNVDSP
                         ENTRY   SWAPMD
                         ENTRY   READCL
                         ENTRY   DSPON
                         ENTRY   SIGN

 0 CNVDSP 1056 A=0
 1        1416 B=0
 2        0314 P=      0
 3        0444 S4=     0
 4        1244 S10=    0
 5        0476 A=C     S
 6 DECCHK 1176 A=A-1   S
 7        0507 GONC    INTCHK ( 121)
10 DECDSP 1076 A=0     S
11        0630 A(P)=   6
12        0612 ? A>=C  X
13        0113 GOYES   FIXPT  (  22)
14        1052 A=0     X
15        1152 A=A-1   X
16        0314 P=      0
17        0530 A(P)=   5
20        0552 A=A-C   X
21        0237 GONC    SCOVCK (  47)
22 FIXPT  0446 A=C     M
23        0452 A=C     X
24        0672 ? A#0   XS
25        0147 GOYES   *+4    (  31)
26        1112 A=A+1   X
               LEGAL
27        0157 GOTO    *+4    (  33)
30        1606 A SR    M
31        1112 A=A+1   X
32        0143 GONC    *-2    (  30)
33        1314 P=      3
34        0425 GOSUB   DSPRND ( 105)
35        1614 P=      10
36        0207 GOTO    *+3    (  41)
37        0420 P=P-1
40        1152 A=A-1   X
41        0652 ? A#0   X
```

```
 42         0177 GOYES  *-3     (  37)
 43         1622 A SR   WP
 44         1230 A(P)=  .
 45         1314 P=     3
 46         0377 GOTO   SPRESS (  77)
 47 SCOVCK  0652 ? A#0  X
 50         0253 GOYES  *+2     (  52)
 51         0404 S4=    1
 52 SCI     0446 A=C    M
 53         0452 A=C    X
 54         1514 P=     6
 55         0425 GOSUB  DSPRND ( 105)
 56         0412 AC EX  X
 57         1514 P=     6
 60         0032 ? C=0  XS
 61         0327 GOYES  *+4     (  65)
 62         0312 C=-C   X
 63         1330 A(P)=  -
 64         0333 GOTO   *+2     (  66)
 65         1730 A(P)=  BLANK
 66         0412 AC EX  X
 67         1662 A SL   WP
 70         1662 A SL   WP
 71         1662 A SL   WP
 72         1662 A SL   WP
 73         0614 P=     9
 74         1622 A SR   WP
 75         1230 A(P)=  .
 76         1514 P=     6
 77 SPRESS  0642 ? A#0  P
100         0733 GOYES  SIGNFX ( 166)
101         1730 A(P)=  BLANK
102         0320 P=P+1
103         0320 P=P+1
104         0377 GOTO   SPRESS (  77)
105 DSPRND  1246 AB EX  M
106         0530 A(P)=  5
107         1326 A=A+B  MS
110         1406 B=0    M
111         0676 ? A#0  S
112         0463 GOYES  *+2     ( 114)
113         0520 RETURN
114         1626 A SR   MS
115         1112 A=A+1  X
116         0424 ? S4=  0
117         0457 GOYES  *-4     ( 113)
120         0113 GOTO   FIXPT   (  22)
121 INTCHK  1176 A=A-1  S
122         1133 GONC   SWCHK   ( 226)
123 INTDSP  0456 A=C
124         0414 P=     5
125         1262 AB EX  WP
126         0646 ? A#0  M
127         0617 GOYES  HRS     ( 143)
130         1262 AB EX  WP
131         0404 S4=    1
132         1656 A SL
133         1656 A SL
134         0647 GOTO   HMSSFT ( 151)
135 H:M     1262 AB EX  WP
136         1614 P=     10
137         0642 ? A#0  P
140         0677 GOYES  COLINS ( 157)
141         1730 A(P)=  BLANK
142         0577 GOTO   *-3     ( 137)
143 HRS     1262 AB EX  WP
144         1414 P=     7
145         1262 AB EX  WP
146         0646 ? A#0  M
147         0567 GOYES  H:M     ( 135)
150         1262 AB EX  WP
151 HMSSFT  1656 A SL
152         1656 A SL
153         1656 A SL
154         0214 P=     8
155         1622 A SR   WP
156         1430 A(P)=  :
157 COLINS  0414 P=     5
160         1622 A SR   WP
161         0424 ? S4=  0
162         0727 GOYES  *+3     ( 165)
163         1230 A(P)=  .
164         0733 GOTO   *+2     ( 166)
165         1430 A(P)=  :
166 SIGNFX  1065 GOSUB  SIGN    ( 215)
167 CNDSEX  1374 DSP=A
170         0476 A=C    S
171         1176 A=A-1  S
172         1176 A=A-1  S
173         1176 A=A-1  S
174         0777 GONC   *+3     ( 177)
175         0774 DSP=SW
176         1013 GOTO   *+4     ( 202)
177         1176 A=A-1  S
200         1013 GONC   *+2     ( 202)
201         0374 DSP=CL
202         1734 A=DSP
203         1524 ? S13= 0
204         1033 GOYES  *+2     ( 206)
205         1174 DSP=AL
206         0524 ? S5=  0
207         1047 GOYES  *+2     ( 211)
210         1053 GOTO   *+2     ( 212)
211 DSPON   0734 DSPON
212         0544 S5=    0
213 KEYENT  0264 GOROMD 2
214         0003 GOTOX  KEYENT
215 SIGN    0114 P=     11
216         0530 A(P)=  5
217         0114 P=     11
220         0636 ? A>=C S
221         1123 GOYES  *+3     ( 224)
222         1330 A(P)=  -
223         0520 RETURN
224         1730 A(P)=  BLANK
225         0520 RETURN
226 SWCHK   1176 A=A-1  S
227         1163 GONC   CLKCHK ( 234)
230         0574 A=SW
231         0416 AC EX
232         0436 AC EX  S
233         0517 GOTO   INTDSP ( 123)
234 CLKCHK  1176 A=A-1  S
235         1243 GONC   TIMCHK ( 250)
236         1201 GOSUB  READCL ( 240)
237         1253 GOTO   TIMDSP ( 252)
240 READCL  0074 A=CL
241         0274 CL=A
242         1656 A SL
243         1656 A SL
244         0046 C=0    M
245         1414 P=     7
246         0422 AC EX  WP
247         0520 RETURN
250 TIMCHK  1176 A=A-1  S
251         1533 GONC   DATCHK ( 326)
252 TIMDSP  1056 A=0
253         0414 P=     5
254         0124 ? S1=  0
255         1433 GOYES  12MODE ( 306)
```

```
256          1414 P=      7
257 12RET    0462 A=C     WP
260          1656 A SL
261          1656 A SL
262          1656 A SL
263          1656 A SL
264          0614 P=      9
265          1622 A SR    WP
266          1430 A(P)=   :
267          1514 P=      6
270          1622 A SR    WP
271          1730 A(P)=   BLANK
272          1314 P=      3
273          1224 ? S10=  0
274          1377 GOYES   *+3    ( 277)
275          1230 A(P)=   .
276          1403 GOTO    *+2    ( 300)
277          1730 A(P)=   BLANK
300 LEADZR   0114 P=      11
301          0642 ? A#0   P
302          1423 GOYES   *+2    ( 304)
303          1730 A(P)=   BLANK
304          0314 P=      0
305          0737 GOTO    CNDSEX ( 167)
306 12MODE   0446 A=C     M
307          1246 AB EX   M
310          1422 B=0     WP
311          1414 P=      7
312          0130 A(P)=   1
313          0230 A(P)=   2
314          1256 AB EX
315          1356 A=A-B
316          1523 GONC    PM     ( 324)
317          1316 A=A+B
320 PMRET    0656 ? A#0
321          1277 GOYES   12RET  ( 257)
322          1316 A=A+B
                  LEGAL
323          1277 GOTO    12RET  ( 257)
324 PM       1204 S10=    1
325          1503 GOTO    PMRET  ( 320)
326 DATCHK   1176 A=A-1   S
327          1737 GONC    NEGCHK ( 367)
330          0456 A=C
331          1641 GOSUB   SWAPMD ( 350)
332          1656 A SL
333          0614 P=      9
334          1622 A SR    WP
335          1330 A(P)=   -
336          1514 P=      6
337          1622 A SR    WP
340          1330 A(P)=   -
341          1314 P=      3
342          0642 ? A#0   P
343          1633 GOYES   *+3    ( 346)
344          1730 A(P)=   BLANK
345          1403 GOTO    LEADZR ( 300)
346          1230 A(P)=   .
347          1403 GOTO    LEADZR ( 300)
350 SWAPMD   0224 ? S2=   0
351          1657 GOYES   *+2    ( 353)
352          0520 RETURN
353          0214 P=      8
354          1246 AB EX   M
355          1262 AB EX   WP
356          1414 P=      7
357          1706 B SR    M
360          1646 A SL    M
361          1622 A SR    WP
362          1706 B SR    M
363          1646 A SL    M
364          1622 A SR    WP
365          1306 A=A+B   M
366          0520 RETURN
367 NEGCHK   1176 A=A-1   S
370          1176 A=A-1   S
371          1176 A=A-1   S
372          0043 GONC    DECDSP (  10)
373          0517 GOTO    INTDSP ( 123)
                  FILLTO END
374          0000 NOP
375          0000 NOP
376          0000 NOP
377          0000 NOP
                  END
```

SYMBOL TABLE

```
12MODE  306  -  255
12RET   257  -  321  323
CLKCHK  234  -  227
CNDSEX  167  -  305
CNVDSP    0
COLINS  157  -  140
DATCHK  326  -  251
DECCHK    6
DECDSP   10  -  372
DSPON   211
DSPRND  105  -   34   55
FIXPT    22  -   13  120
H:M     135  -  147
HMSSFT  151  -  134
HRS     143  -  127
INTCHK  121  -    7
INTDSP  123  -  233  373
KEYENT  213
LEADZR  300  -  345  347
NEGCHK  367  -  327
PM      324  -  316
PMRET   320  -  325
READCL  240  -  236
SCI      52
SCOVCK   47  -   21
SIGN    215  -  166
SIGNFX  166  -  100
SPRESS   77  -   46  104
SWAPMD  350  -  331
SWCHK   226  -  122
TIMCHK  250  -  235
TIMDSP  252  -  237
```

ENTRY POINTS

```
CNVDSP    0
DSPON   211
READCL  240
SIGN    215
SWAPMD  350
```

EXTERNAL REFERENCES

```
KEYENT  214
```

ROM FILE - CRI2

```
                 FILE    CRI2

                 ENTRY   KEYENT

  0 KEYENT 1114 P=      2
```

```
     1030 A(P)=   8
     1114 P=      2
     1232 B=A     XS
     1052 A=0     X
     0444 S4=     0
     0311 GOSUB   AWAKE  (  62)
     0120 S8-15=  0
     1004 S8=     1
     1046 A=0     M
     1406 B=0     M
     0056 C=0
     0354 ? P#    0
     0107 GOYES   *+4    (  21)
     0114 P=      11
     1730 A(P)=   BLANK
     0647 GOTO    DATENT ( 151)
     0054 ? P#    1
     0247 GOYES   ZERCHK (  51)
     0114 P=      11
     1730 A(P)=   BLANK
     0672 ? A#0   XS
     0143 GOYES   *+2    (  30)
     0477 GOTO    TIMENT ( 117)
DPHIT  1114 P=      2
     1230 A(P)=   .
     1204 S10=    1
ZERRET 1114 P=      2
DIGITS 1532 C=B     XS
     0032 ? C=0   XS
     0407 GOYES   KEYLP  ( 101)
     0172 C=C-1   XS
     1572 BC EX   XS
     1532 C=B     XS
     0232 ? C#0   XS
     0327 GOYES   SHFTLP (  65)
LSTDIG 1224 ? S10=  0
     0237 GOYES   *+2    (  47)
     0327 GOTO    SHFTLP (  65)
     1204 S10=    1
     0407 GOTO    KEYLP  ( 101)
ZERCHK 0114 P=      11
     1730 A(P)=   BLANK
     0672 ? A#0   XS
     0157 GOYES   ZERRET (  33)
     1704 S15=    1
CNVDSP 0164 GOROMD  1
     0003 GOTOX   CNVDSP
GETKEY 0064 GOROMD  0
     0003 GOTOX   GETKEY
AWAKE  0064 GOROMD  0
     0003 GOTOX   AWAKE
     0172 C=C-1   XS
SHFTLP 0320 P=P+1
     1662 A SL    WP
     0232 ? C#0   XS
     0323 GOYES   *-4    (  64)
     0420 P=P-1
     1224 ? S10=  0
     0367 GOYES   *+2    (  75)
     0373 GOTO    *+2    (  76)
     1230 A(P)=   .
     1730 A(P)=   BLANK
     0054 ? P#    1
     0373 GOYES   *-2    (  76)
KEYLP  1052 A=0     X
     1114 P=      2
     1374 DSP=A
     0301 GOSUB   GETKEY (  60)
     1154 ? P#    2
     0443 GOYES   *+2    ( 110)
     0163 GOTO    DIGITS (  34)
     1224 ? S10=  0
     0457 GOYES   *+2    ( 113)
     0407 GOTO    KEYLP  ( 101)
     0054 ? P#    1
     0647 GOYES   DATENT ( 151)
     0672 ? A#0   XS
     0143 GOYES   DPHIT  (  30)
TIMENT 1114 P=      2
     0230 A(P)=   2
     1032 ? A>=B  XS
     0407 GOYES   KEYLP  ( 101)
     0136 C=C+1   S
     0537 GONC    *+3    ( 127)
     0176 C=C-1   S
     0176 C=C-1   S
     1504 S13=    1
     1114 P=      2
     0530 A(P)=   5
     1032 ? A>=B  XS
     0567 GOYES   *+2    ( 135)
     0723 GOTO    TDFIX  ( 164)
     1114 P=      2
     0230 A(P)=   2
     1372 A=A-B   XS
     1416 B=0
     0627 GOTO    *+4    ( 145)
     1614 P=      10
     1606 A SR    M
     1730 A(P)=   BLANK
     1132 A=A+1   XS
     0613 GONC    *-4    ( 142)
     0414 P=      5
     1027 GOTO    COLON  ( 205)
DATENT 0236 ? C#0   S
     0407 GOYES   KEYLP  ( 101)
     1114 P=      2
     0530 A(P)=   5
     1032 ? A>=B  XS
     0407 GOYES   KEYLP  ( 101)
     0436 AC EX   S
     0114 P=      11
     0530 A(P)=   5
     0436 AC EX   S
     1604 S14=    1
TDFIX  1272 AB EX   XS
     1372 A=A-B   XS
     1172 A=A-1   XS
     0672 ? A#0   XS
     0753 GOYES   *+2    ( 172)
     0777 GOTO    TWODIG ( 177)
     1606 A SR    M
     1624 ? S14=  0
     0777 GOYES   *+3    ( 177)
     1614 P=      10
     1730 A(P)=   BLANK
TWODIG 1114 P=      2
     0330 A(P)=   3
     1272 AB EX   XS
     0214 P=      8
     1524 ? S13=  0
     1037 GOYES   *+3    ( 207)
COLON  1430 A(P)=   :
     1043 GOTO    *+2    ( 210)
DASH   1330 A(P)=   -
     0030 A(P)=   0
     0030 A(P)=   0
DSPFIX 1730 A(P)=   BLANK
     0054 ? P#    1
     1053 GOYES   *-2    ( 212)
```

APPENDIX 2-continued

```
215 TDLOOP 1052 A=0     X
216        1114 P=      2
217        1374 DSP=A
220        0301 GOSUB   GETKEY (  60)
221        1154 ? P#    2
222        1177 GOYES   SPCHAR ( 237)
223        1472 ? B=0   XS
224        1147 GOYES   DSPFUL ( 231)
225        0414 P=      5
226        1662 A SL    WP
227        1662 A SL    WP
230        1662 A SL    WP
231 DSPFUL 0320 P=P+1
232        0320 P=P+1
233        1662 A SL    WP
234        0420 P=P-1
235        0420 P=P-1
236        1053 GOTO    DSPFIX ( 212)
237 SPCHAR 1472 ? B=0   XS
240        1067 GOYES   TDLOOP ( 215)
241        1524 ? S13=  0
242        1253 GOYES   DATSP  ( 252)
243 TIMSP  0054 ? P#    1
244        1067 GOYES   TDLOOP ( 215)
245        0672 ? A#0   XS
246        0143 GOYES   DPHIT  (  30)
247        1416 B=0
250        0414 P=      5
251        1027 GOTO    COLON  ( 205)
252 DATSP  0354 ? P#    0
253        1067 GOYES   TDLOOP ( 215)
254        1416 B=0
255        0414 P=      5
256        1037 GOTO    DASH   ( 207)
                FILLTO  END
```

SYMBOL TABLE

```
AWAKE    62   -    6
CNVDSP   56
COLON   205   -  150  251
DASH    207   -  256
DATENT  151   -   20  114
DATSP   252   -  242
DIGITS   34   -  107
DPHIT    30   -  116  246
DSPFIX  212   -  236
DSPFUL  231   -  224
GETKEY   60   -  104  220
KEYENT    0
KEYLP   101   -   36   50  112  122
                          152  156
LSTDIG   44
SHFTLP   65   -   43   46
SPCHAR  237   -  222
TDFIX   164   -  134
TDLOOP  215   -  240  244  253
TIMENT  117   -   27
TIMSP   243
TWODIG  177   -  171
ZERCHK   51   -   22
ZERRET   33   -   54
```

ENTRY POINTS

```
KEYENT    0
```

EXTERNAL REFERENCES

```
AWAKE    63
CNVDSP   57
GETKEY   61
```

ROM FILE - CRI3

```
          FILE    CRI3

          ENTRY   DECTO
          ENTRY   DECDAT
          ENTRY   DECTIM
          ENTRY   DAY/YR
          ENTRY   INC
          ENTRY   DIVSTP
          ENTRY   THMS

 0 DECTO  0314 P=       0
 1        1056 A=0
 2        0476 A=C      S
 3        0676 ? A#0    S
 4        0033 GOYES    *+2     (   6)
 5        0520 RETURN
 6        1136 A=A+1    S
 7        0047 GONC     *+2     (  11)
10        0520 RETURN
11        1176 A=A-1    S
12        0536 A=A+C    S
13        0676 ? A#0    S
14        0747 GOYES    DECTIM ( 171)
15 DECDAT 0032 ? C=0    XS
16        0107 GOYES    *+3     (  21)
17        0046 C=0      M
20        0052 C=0      X
21        0430 A(P)=    4
22        0530 A(P)=    5
23        0730 A(P)=    7
24        0330 A(P)=    3
25        0030 A(P)=    0
26        0430 A(P)=    4
27        1030 A(P)=    8
30        0612 ? A>=C   X
31        0163 GOYES    *+3     (  34)
32        0207 GOTO     DATOVF (  41)
33        1746 C SR     M
34        0112 C=C+1    X
35        0612 ? A>=C   X
36        0157 GOYES    *-3     (  33)
37        0606 ? A>=C   M
40        0217 GOYES    *+3     (  43)
41 DATOVF 1134 BLINK
42        0416 AC EX
43        0062 C=0      WP
44        1056 A=0
45        0406 AC EX    M
46        1606 A SR     M
47        0665 GOSUB    INC    ( 155)
50        0614 P=       9
51        0625 GOSUB    DAY/YR ( 145)
52        1014 P=       4
53        0715 GOSUB    DIVSTP ( 163)
54        1514 P=       6
55        0715 GOSUB    DIVSTP ( 163)
56        0715 GOSUB    DIVSTP ( 163)
57        0006 ? C=0    M
60        0377 GOYES    NTLPYR (  77)
61        0214 P=       8
62        0665 GOSUB    INC    ( 155)
63        0642 ? A#0    P
64        0377 GOYES    NTLPYR (  77)
65        1256 AB EX
66        1056 A=0
67        0614 P=       9
70        0630 A(P)=    6
71        0614 P=       9
72        1016 ? A>=B
73        0457 GOYES    ADD30  ( 113)
```

```
 74        0330 A(P)=  3
 75        0130 A(P)=  1
 76        0467 GOTO   MONTH  ( 115)
 77 NTLPYR 1062 A=0    WP
100        1256 AB EX
101        1056 A=0
102        0614 P=     9
103        0530 A(P)=  5
104        1130 A(P)=  9
105        0614 P=     9
106        1016 ? A>=B
107        0457 GOYES  ADD30  ( 113)
110        0330 A(P)=  3
111        0230 A(P)=  2
112        0467 GOTO   MONTH  ( 115)
113 ADD30  0330 A(P)=  3
114        0030 A(P)=  0
115 MONTH  1316 A=A+B
116        1614 P=     10
117        1256 AB EX
120        1056 A=0
121        0330 A(P)=  3
122        0030 A(P)=  0
123        0530 A(P)=  5
124        0630 A(P)=  6
125        1256 AB EX
126        0214 P=     8
127        0715 GOSUB  DIVSTP ( 163)
130        0715 GOSUB  DIVSTP ( 163)
131        1614 P=     10
132        0665 GOSUB  INC    ( 155)
133        1616 A SR
134        0214 P=     8
135        0422 AC EX  WP
136        0436 AC EX  S
137        0416 AC EX
140        1624 ? S14= 0
141        0707 GOYES  RET    ( 161)
142        1644 S14=   0
143        0064 GOROMD 0
144        0003 GOTOX  CNVEX
145 DAY/YR 1256 AB EX
146        0330 A(P)=  3
147        0630 A(P)=  6
150        0530 A(P)=  5
151        0230 A(P)=  2
152        0530 A(P)=  5
153        1256 AB EX
154        0520 RETURN
155 INC    1256 AB EX
156        1056 A=0
157        0130 A(P)=  1
160        1316 A=A+B
161 RET    0520 RETURN
162        0102 C=C+1  P
163 DIVSTP 1366 A=A-B  MS
164        0713 GONC   *-2    ( 162)
165        1326 A=A+B  MS
166        0420 P=P-1
167        1666 A SL   MS
170        0520 RETURN
171 DECTIM 0430 A(P)=  4
172        0232 ? C#0  XS
173        1027 GOYES  NOTOVF ( 205)
174        0612 ? A>=C X
175        1027 GOYES  NOTOVF ( 205)
176 TIMOVF 1146 A=A-1  M
177        1314 P=     3
200        1042 A=0    P
201        0436 AC EX  S
202        0416 AC EX
203        0452 A=C    X
204        1134 BLINK
205 NOTOVF 1556 BC EX
206        0056 C=0
207        1352 A=A-B  X
210        1014 P=     4
211        1506 C=B    M
212        1756 C SR
213 PTRLP  1152 A=A-1  X
214        1347 GONC   PTRPOS ( 271)
215        1371 GOSUB  THMS   ( 276)
216        0420 P=P-1
217        0420 P=P-1
220 CNVSEC 1371 GOSUB  THMS   ( 276)
221        1056 A=0
222        0314 P=     0
223        0330 A(P)=  3
224        1352 A=A-B  X
225        0672 ? A#0  XS
226        1143 GOYES  *+2    ( 230)
227        1163 GOTO   XSCHK  ( 234)
230        0416 AC EX
231        1656 A SL
232        0416 AC EX
233        1056 A=0
234 XSCHK  1472 ? B=0  XS
235        1177 GOYES  *+2    ( 237)
236        1152 A=A-1  X
237 ALIGN  1152 A=A-1  X
240        1423 GONC   ALINLP ( 304)
241        0114 P=     11
242        0430 A(P)=  4
243        1376 A=A-B  S
244        0676 ? A#0  S
245        1237 GOYES  *+2    ( 247)
246        1253 GOTO   *+4    ( 252)
247        1136 A=A+1  S
250        1136 A=A+1  S
251        1277 GONC   TODY   ( 257)
252        1056 A=0
253        1472 ? B=0  XS
254        1573 GOYES  HMS1   ( 336)
255        1756 C SR
256        1573 GOTO   HMS1   ( 336)
257 TODY   1056 A=0
260        1472 ? B=0  XS
261        1453 GOYES  HMCHK  ( 312)
262        0314 P=     0
263        0442 A=C    P
264        0716 C=A+C
265        1756 C SR
266 SECRND 1314 P=     3
267        1615 GOSUB  HMSRND ( 343)
270        1537 GOTO   MINRND ( 327)
271 PTRPOS 0320 P=P+1
272        0154 ? P#   11
273        1057 GOYES  PTRLP  ( 213)
274        1371 GOSUB  THMS   ( 276)
275        1103 GOTO   CNVSEC ( 220)
276 THMS   0462 A=C    WP
277        1762 C SR   WP
300        0262 C=C+C  WP
301        0262 C=C+C  WP
302        0762 C=A-C  WP
303        0520 RETURN
304 ALINLP 1756 C SR
305        0216 ? C#0
306        1177 GOYES  ALIGN  ( 237)
307        1543 GOTO   TEXIT  ( 330)
```

APPENDIX 2-continued

```
310 NOHMOV 0062 C=0    WP
311        1543 GOTO   TEXIT  ( 330)
312 HMCHK  1414 P=     7
313        0422 AC EX  WP
314        0016 ? C=0
315        1567 GOYES  HMS    ( 335)
316        0422 AC EX  WP
317        1314 P=     3
320        1056 A=0
321        0330 A(P)=  3
322        0320 P=P+1
323        0602 ? A>=C P
324        1443 GOYES  NOHMOV ( 310)
325        0062 C=0    WP
326        1645 GOSUB  HMSINC ( 351)
327 MINRND 1615 GOSUB  HMSRND ( 343)
330 TEXIT  1576 BC EX  S
331        1476 ? B=0  S
332        0707 GOYES  RET    ( 161)
333        1056 A=0
334        0773 GOTO   TIMOVF ( 176)
335 HMS    0422 AC EX  WP
336 HMS1   0714 P=     1
337        0442 A=C    P
340        0716 C=A+C
341        0062 C=0    WP
342        1333 GOTO   SECRND ( 266)
343 HMSRND 1056 A=0
344        0530 A(P)=  5
345        0320 P=P+1
346        0602 ? A>=C P
347        0707 GOYES  RET    ( 161)
350        0042 C=0    P
351 HMSINC 0320 P=P+1
352        1056 A=0
353        1102 A=A+1  P
354        0716 C=A+C
355        0320 P=P+1
356        0520 RETURN
                FILLTO END
357        0000 NOP
360        0000 NOP
361        0000 NOP
362        0000 NOP
363        0000 NOP
364        0000 NOP
365        0000 NOP
366        0000 NOP
367        0000 NOP
370        0000 NOP
371        0000 NOP
372        0000 NOP
373        0000 NOP
374        0000 NOP
375        0000 NOP
376        0000 NOP
377        0000 NOP
                END
```

SYMBOL TABLE

```
ADD30   113  -   73  107
ALIGN   237  -  306
ALINLP  304  -  240
CNVSEC  220  -  275
DATOVF   41  -   32
DAY/YR  145  -   51
DECDAT   15
DECTIM  171  -   14
DECTO     0
DIVSTP  163  -   53   55   56  127
                              130
HMCHK   312  -  261
HMS     335  -  315
HMS1    336  -  254  256
HMSINC  351  -  326
HMSRND  343  -  267  327
INC     155  -   47   62  132
MINRND  327  -  270
MONTH   115  -   76  112
NOHMOV  310  -  324
NOTOVF  205  -  173  175
NTLPYR   77  -   60   64
PTRLP   213  -  273
PTRPOS  271  -  214
RET     161  -  141  332  347
SECRND  266  -  342
TEXIT   330  -  307  311
THMS    276  -  215  220  274
TIMOVF  176  -  334
TODY    257  -  251
XSCHK   234  -  227
```

ENTRY POINTS

```
DAY/YR  145
DECDAT   15
DECTIM  171
DECTO     0
DIVSTP  163
INC     155
THMS    276
```

EXTERNAL REFERENCES

```
CNVEX   144
```

ROM FILE - CRI4

```
                       FILE    CRI4

                       ENTRY   TODEC
                       ENTRY   DATDEC
                       ENTRY   TIMDEC
                       ENTRY   NORM
                       ENTRY   MLTSTP

  0 TODEC  0476 A=C    S
  1        0676 ? A#0  S
  2        0023 GOYES  *+2    (   4)
  3        0520 RETURN
  4        1136 A=A+1  S
  5        0037 GONC   *+2    (   7)
  6        0520 RETURN
  7        1176 A=A-1  S
 10        0536 A=A+C  S
 11        0563 GONC   TIMDEC ( 134)
 12 DATDEC 1514 P=     6
 13        1762 C SR   WP
 14        1314 P=     3
 15        0002 ? C=0  P
 16        0107 GOYES  *+3    (  21)
 17        1514 P=     6
 20        0102 C=C+1  P
 21        1056 A=0
 22        1414 P=     7
 23        0330 A(P)=  3
 24        1156 A=A-1
 25        0214 P=     8
 26        0622 ? A>=C WP
 27        0173 GOYES  JANFEB (  36)
 30        1056 A=0
```

APPENDIX 2-continued

```
 31        1414 P=     7
 32        0130 A(P)=  1
 33        1014 P=     4
 34        0130 A(P)=  1
 35        0207 GOTO   *+4    (  41)
 36 JANFEB 1056 A=0
 37        0130 A P)=  1
 40        0330 A(P)=  3
 41        0716 C=A+C
 42        1056 A=0
 43        1416 B=0
 44        1614 P=     10
 45        0515 GOSUB  DAY/YR ( 123)
 46        1014 P=     4
 47        0525 GOSUB  MLTSTP ( 125)
 50        0525 GOSUB  MLTSTP ( 125)
 51        0525 GOSUB  MLTSTP ( 125)
 52        0656 ? A#0
 53        0267 GOYES  *+2    (  55)
 54        0303 GOTO   *+4    (  60)
 55        1156 A=A-1
 56        0414 P=     5
 57        1062 A=0    WP
 60        1256 AB EX
 61        1056 A=0
 62        1514 P=     6
 63        0330 A(P)=  3
 64        0030 A(P)=  0
 65        0630 A(P)=  6
 66        1256 AB EX
 67        1414 P=     7
 70        0525 GOSUB  MLTSTP ( 125)
 71        0525 GOSUB  MLTSTP ( 125)
 72        1256 AB EX
 73        1056 A=0
 74        1514 P=     6
 75        0430 A(P)=  4
 76        0230 A(P)=  2
 77        1130 A(P)=  9
100        1256 AB EX
101        1356 A=A-B
102        1656 A SL
103        1656 A SL
104        1746 C SR   M
105        1746 C SR   M
106        1746 C SR   M
107        0414 P=     5
110        1062 A=0    WP
111        0062 C=0    WP
112        0506 A=A+C  M
113        0314 P=     0
114        0430 A(P)=  4
115        0412 AC EX  X
116        1015 GOSUB  NORM   ( 203)
117        1624 ? S14= 0
120        0557 GOYES  RET    ( 133)
121        0364 GOROMD 3
122        0003 GOTOX  DECTO
123 DAY/YR 0364 GOROMD 3
124        0003 GOTOX  DAY/YR
125 MLTSTP 1616 A SR
126        0543 GOTO   *+2    ( 130)
127        1316 A=A+B
130        0142 C=C-1  P
131        0537 GONC   *-2    ( 127)
132        0320 P=P+1
133 RET    0520 RETURN
134 TIMDEC 1614 P=     10
135        0222 ? C#0  WP
136        0603 GOYES  *+2    ( 140)
137        0520 RETURN
140        1062 A=0    WP
141        0314 P=     0
142        0530 A(P)=  5
143        0406 AC EX  M
144        0412 AC EX  X
145        1114 P=     2
146 PTRLP  0320 P=P+1
147        0152 C=C-1  X
150        1656 A SL
151        0676 ? A#0  S
152        0667 GOYES  CNVRT  ( 155)
153        0254 ? P#   8
154        0633 GOYES  PTRLP  ( 146)
155 CNVRT  1616 A SR
156        1552 BC EX  X
157        0406 AC EX  M
160        0052 C=0    X
161        0761 GOSUB  THMS   ( 174)
162        0771 GOSUB  THRS   ( 176)
163        0320 P=P+1
164        0320 P=P+1
165        0722 C=A+C  WP
166        0761 GOSUB  THMS   ( 174)
167        0771 GOSUB  THRS   ( 176)
170        0516 A=A+C
171        1552 BC EX  X
172        1015 GOSUB  NORM   ( 203)
173        0520 RETURN
174 THMS   0364 GOROMD 3
175        0003 GOTOX  THMS
176 THRS   0522 A=A+C  WP
177        1762 C SR   WP
200        0222 ? C#0  WP
201        0773 GOYES  *-3    ( 176)
202        0520 RETURN
203 NORM   1614 P=     10
204        0662 ? A#0  WP
205        1057 GOYES  NORMLP ( 213)
206        0046 C=0    M
207        0052 C=0    X
210        0520 RETURN
211        1656 A SL
212        0152 C=C-1  X
213 NORMLP 0642 ? A#0  P
214        1073 GOYES  *+2    ( 216)
215        1047 GOTO   *-4    ( 211)
216        1416 B=0
217        1076 A=0    S
220        1314 P=     3
221        1222 B=A    WP
222        1316 A=A+B
223        1062 A=0    WP
224        0676 ? A#0  S
225        1137 GOYES  *+2    ( 227)
226        1147 GOTO   *+3    ( 231)
227        1616 A SR
230        0112 C=C+1  X
231        0406 AC EX  M
232        0520 RETURN
                FILLTO END
233        0000 NOP
234        0000 NOP
235        0000 NOP
236        0000 NOP
237        0000 NOP
240        0000 NOP
241        0000 NOP
242        0000 NOP
243        0000 NOP
```

```
 244          0000 NOP
 245          0000 NOP
 246          0000 NOP
 247          0000 NOP
 250          0000 NOP
 251          0000 NOP
 252          0000 NOP

SYMBOL TABLE

CNVRT    155   -   152
DATDEC    12
DAY/YR   123   -    45
JANFEB    36   -    27
MLTSTP   125   -    47   50   51   70
                                  71
NORM     203   -   116  172
NORMLP   213   -   205
PTRLP    146   -   154
RET      133   -   120
THMS     174   -   161  166
THRS     176   -   162  167
TIMDEC   134   -    11
TODEC      0

ENTRY POINTS

DATDEC    12
MLTSTP   125
NORM     203
TIMDEC   134
TODEC      0

EXTERNAL REFERENCES

DAY/YR   124
DECTO    122
THMS     175

ROM FILE - CRI5

                    FILE    CRI5

                    ENTRY   FCNS
                    ENTRY   OPFCNS
                    ENTRY   ->T
                    ENTRY   AM
                    ENTRY   PM
                    ENTRY   EXIT
                    ENTRY   ALEXIT
                    ENTRY   ALIGN

  0 FMTCHG 0476 A=C      S
  1        0536 A=A+C    S
  2        0063 GONC     TMOFDY (  14)
  3        0676 ? A#0    S
  4        0767 GOYES    RSTA   ( 175)
  5 DATCHG 1721 GOSUB    CNVINT ( 364)
  6        0224 ? S2=    0
  7        0053 GOYES    *+3    (  12)
 10        0244 S2=      0
 11        0737 GOTO     CNVDSP ( 167)
 12        0204 S2=      1
 13        0737 GOTO     CNVDSP ( 167)
 14 TMOFDY 0114 P=       11
 15        0230 A(P)=    2
 16        0636 ? A>=C   S
 17        0767 GOYES    RSTA   ( 175)
 20 TIMCHG 0124 ? S1=    0
 21        0123 GOYES    *+3    (  24)
 22        0144 S1=      0
 23        0737 GOTO     CNVDSP ( 167)
 24        0104 S1=      1
 25        0737 GOTO     CNVDSP ( 167)
 26 FCNS   0054 ? P#     1
 27        0433 GOYES    RET    ( 106)
 30        0672 ? A#0    XS
 31        0003 GOYES    FMTCHG (   0)
 32        0404 S4=      1
 33        0177 GOTO     *+4    (  37)
 34 OPFCNS 1152 A=A-1    X
 35        0537 GONC     21CHK  ( 127)
 36        0444 S4=      0
 37        0476 A=C      S
 40        0536 A=A+C    S
 41        0767 GONC     RSTA   ( 175)
 42        0676 ? A#0    S
 43        0767 GOYES    RSTA   ( 175)
 44        1721 GOSUB    CNVINT ( 364)
 45        1641 GOSUB    DATDEC ( 350)
 46        0361 GOSUB    ALIGN  (  74)
 47        1514 P=       6
 50        1631 GOSUB    INC    ( 346)
 51        1614 P=       10
 52        0424 ? S4=    0
 53        0437 GOYES    DY     ( 107)
 54 DW     1256 AB EX
 55        1056 A=0
 56        0730 A(P)=    7
 57        1256 AB EX
 60        1671 GOSUB    DIVSTP ( 356)
 61        1054 ? P#     4
 62        0303 GOYES    *-2    (  60)
 63        1616 A SR
 64        0646 ? A#0    M
 65        0337 GOYES    *+2    (  67)
 66        1316 A=A+B
 67        0416 AC EX
 70 EXIT   0120 S8-15=   0
 71 ALEXIT 1004 S8=      1
 72        1704 S15=     1
 73        0737 GOTO     CNVDSP ( 167)
 74 ALIGN  1056 A=0
 75        0314 P=       0
 76        0430 A(P)=    4
 77        0552 A=A-C    X
100        0446 A=C      M
101        0423 GOTO     *+3    ( 104)
102        1606 A SR     M
103        1152 A=A-1    X
104        0652 ? A#0    X
105        0413 GOYES    *-3    ( 102)
106 RET    0520 RETURN
107 DY     0056 C=0
110        0112 C=C+1    X
111        0112 C=C+1    X
112        1701 GOSUB    DAY/YR ( 360)
113        1671 GOSUB    DIVSTP ( 356)
114        1671 GOSUB    DIVSTP ( 356)
115        1671 GOSUB    DIVSTP ( 356)
116        0214 P=       8
117        1616 A SR
120        0006 ? C=0    M
121        0517 GOYES    *+2    ( 123)
122        1631 GOSUB    INC    ( 346)
123        1414 P=       7
124        1062 A=0      WP
125        1711 GOSUB    NORM   ( 362)
126        0343 GOTO     EXIT   (  70)
```

```
127 21CHK  1152 A=A-1  X
130        0627 GONC   EXCHK  ( 145)
131 21     0476 A=C    S
132        0536 A=A+C  S
133        0767 GONC   RSTA   ( 175)
134        0676 ? A#0  S
135        0767 GOYES  RSTA   ( 175)
136        1724 ? S15= 0
137        0607 GOYES  *+2    ( 141)
140        0767 GOTO   RSTA   ( 175)
141        1721 GOSUB  CNVINT ( 364)
142        1014 P=     4
143        0102 C=C-1  P
                LEGAL
144        0737 GOTO   CNVDSP ( 167)
145 EXCHK  1152 A=A-1  X
146        0653 GONC   CS     ( 152)
147 EXCH   1721 GOSUB  CNVINT ( 364)
150        0134 CD EX
151        0343 GOTO   EXIT   (  70)
152 CS     0114 P=     11
153        0730 A(P)=  7
154        0636 ? A>=C S
155        0747 GOYES  PLUS   ( 171)
156 CHS    1724 ? S15= 0
157        0713 GOYES  *+3    ( 162)
160        0022 ? C=0  WP
161        0717 GOYES  *+2    ( 163)
162        0376 C=-C-1 S
163        1731 GOSUB  SIGN   ( 366)
164        1374 DSP=A
165 MODEX  1724 ? S15= 0
166        0773 GOYES  KEYEX  ( 176)
167 CNVDSP 0164 GOROMD 1
170        0003 GOTOX  CNVDSP
171 PLUS   0114 P=     11
172        0230 A(P)=  2
173        0576 A=A-C  S
174        1013 GONC   SWCHK  ( 202)
175 RSTA   1734 A=DSP
176 KEYEX  1114 P=     2
177        1052 A=0    X
200 GETKEY 0064 GOROMD 0
201        0003 GOTOX  GETKEY
202 SWCHK  0676 ? A#0  S
203        0673 GOYES  CHS    ( 156)
204        0574 A=SW
205        1136 A=A+1  S
206        0416 AC EX
207        0673 GOTO   CHS    ( 156)
210 ->T    0476 A=C    S
211        0536 A=A+C  S
212        1073 GONC   *+4    ( 216)
213        0676 ? A#0  S
214        1073 GOYES  *+2    ( 216)
215        0767 GOTO   RSTA   ( 175)
216        1721 GOSUB  CNVINT ( 364)
217        023C ? C#0  S
220        1117 GOYES  *+3    ( 223)
221        0136 C=C+1  S
                LEGAL
222        1137 GOTO   TOHMS  ( 227)
223        0476 A=C    S
224        1136 A=A+1  S
225        1143 GONC   *+3    ( 230)
226        0176 C=C-1  S
227 TOHMS  1661 GOSUB  DECTO  ( 354)
230        0476 A=C    S
231        0536 A=A+C  S
232        1163 GONC   *+2    ( 234)
233        0343 GOTO   EXIT   (  70)
234        0076 C=0    S
235        0136 C=C+1  S
                LEGAL
236        0343 GOTO   EXIT   (  70)
237 AM     1034 DSPOFF
240        0404 S4=    1
241        1347 GOTO   AP     ( 271)
242 PM     1034 DSPOFF
243        0424 ? S4=  0
244        1347 GOYES  AP     ( 271)
245 T->    0036 ? C=0  S
246        1003 GOYES  GETKEY ( 200)
247        0476 A=C    S
250        1136 A=A+1  S
251        1257 GONC   *+2    ( 253)
252        0767 GOTO   RSTA   ( 175)
253        0476 A=C    S
254        0536 A=A+C  S
255        0676 ? A#0  S
256        1303 GOYES  *+2    ( 260)
257        0767 GOTO   RSTA   ( 175)
260        1721 GOSUB  CNVINT ( 364)
261        1651 GOSUB  TIMDEC ( 352)
262        0476 A=C    S
263        0536 A=A+C  S
264        1337 GONC   *+3    ( 267)
265        0136 C=C+1  S
                LEGAL
266        0343 GOTO   EXIT   (  70)
267        0076 C=0    S
270        0343 GOTO   EXIT   (  70)
271 AP     1611 GOSUB  TIMCHK ( 342)
272        0724 ? S7=  0
273        0767 GOYES  RSTA   ( 175)
274        0124 ? S1=  0
275        1377 GOYES  *+2    ( 277)
276        1407 GOTO   *+3    ( 301)
277        1724 ? S15= 0
300        1417 GOYES  *+3    ( 303)
301        1721 GOSUB  CNVINT ( 364)
302        1517 GOTO   MOD24  ( 323)
303        1721 GOSUB  CNVINT ( 364)
304        0276 C=C+C  S
305        1437 GONC   *+2    ( 307)
306        1517 GOTO   MOD24  ( 323)
307        0076 C=0    S
310        1414 P=     7
311        0130 A(P)=  1
312        0230 A(P)=  2
313        1562 BC EX  WP
314        0424 ? S4=  0
315        1543 GOYES  PMCHK  ( 330)
316 AMCHK  0546 A=A-C  M
317        0646 ? A#0  M
320        1513 GOYES  *+2    ( 322)
321        0046 C=0    M
322 FIXTIM 1562 BC EX  WP
323 MOD24  1621 GOSUB  TIMMOD ( 344)
324        0114 P=     11
325        0430 A(P)=  4
326        0416 AC EX
327        0343 GOTO   EXIT   (  70)
330 PMCHK  0206 ? C#0  M
331        1557 GOYES  *+2    ( 333)
332        1513 GOTO   FIXTIM ( 322)
333        1146 A=A-1  M
334        0606 ? A>=C M
335        1577 GOYES  *+2    ( 337)
336        1513 GOTO   FIXTIM ( 322)
```

APPENDIX 2 -continued

```
337      1106 A=A+1  M
340      0706 C=A+C  M
              LEGAL
341      1513 GOTO   FIXTIM ( 322)
342 TIMCHK 0664 GOROMD 6
343      0003 GOTOX  TIMCHK
344 TIMMOD 0664 GOROMD 6
345      0003 GOTOX  TIMMOD
346 INC  0364 GOROMD 3
347      0003 GOTOX  INC
350 DATDEC 0464 GOROMD 4
351      0003 GOTOX  DATDEC
352 TIMDEC 0464 GOROMD 4
353      0003 GOTOX  TIMDEC
354 DECTO 0364 GOROMD 3
355      0003 GOTOX  DECTO
356 DIVSTP 0364 GOROMD 3
357      0003 GOTOX  DIVSTP
360 DAY/YR 0364 GOROMD 3
361      0003 GOTOX  DAY/YR
362 NORM 0464 GOROMD 4
363      0003 GOTOX  NORM
364 CNVINT 0064 GOROMD 0
365      0003 GOTOX  CNVINT
366 SIGN 0164 GOROMD 1
367      0003 GOTOX  SIGN
              FILLTO END
370      0000 NOP
371      0000 NOP
372      0000 NOP
373      0000 NOP
374      0000 NOP
375      0000 NOP
376      0000 NOP
377      0000 NOP
              END
```

SYMBOL TABLE

```
->T     210
21      131
21CHK   127  -   35
ALEXIT   71
ALIGN    74  -   46
AM      237
AMCHK   316
AP      271  -  241  244
CHS     156  -  203  207
CNVDSP  167  -   11   13   23   25
                 73  144
CNVINT  364  -    5   44  141  147
                216  260  301  303
CS      152  -  146
DATCHG    5
DATDEC  350  -   45
DAY/YR  360  -  112
DECTO   354  -  227
DIVSTP  356  -   60  113  114  115
DW       54
DY      107  -   53
EXCH    147
EXCHK   145  -  130
EXIT     70  -  126  151  233  236
                     266  270  327
FCNS     26
FIXTIM  322  -  332  336  341
FMTCHG    0  -   31
GETKEY  200  -  246
INC     346  -   50  122
KEYEX   176  -  166
MOD24   323  -  302  306
MODEX   165
NORM    362  -  125
OPFCNS   34
PLUS    171  -  155
PM      242
PMCHK   330  -  315
RET     106  -   27
RSTA    175  -    4   17   41   43
                133  135  140  215
                252  257  273
SIGN    366  -  163
SWCHK   202  -  174
T->     245
TIMCHG   20
TIMCHK  342  -  271
TIMDEC  352  -  261
TIMMOD  344  -  323
TMOFDY   14  -    2
TOHMS   227  -  222
```

ENTRY POINTS

```
->T     210
ALEXIT   71
ALIGN    74
AM      237
EXIT     70
FCNS     26
OPFCNS   34
PM      242
```

EXTERNAL REFERENCES

```
CNVDSP  170
CNVINT  365
DATDEC  351
DAY/YR  361
DECTO   355
DIVSTP  357
GETKEY  201
INC     347
NORM    363
SIGN    367
TIMCHK  343
TIMDEC  353
TIMMOD  345
```

ROM FILE - CRI6

```
          FILE   CRI6

          ENTRY  MEMORY
          ENTRY  RETMEM
          ENTRY  STWTCH
          ENTRY  RETSW
          ENTRY  DATE
          ENTRY  RETDAT
          ENTRY  ALARM
          ENTRY  RETAL
          ENTRY  TIME
          ENTRY  RETTIM
          ENTRY  RCLTIM
          ENTRY  TIMMOD
          ENTRY  TIMCHK
          ENTRY  ERROR
          ENTRY  SWSPRS

0 MEMORY 1034 DSPOFF
1        0424 ? S4=  0
2        0127 GOYES  RCLMEM (   25)
```

APPENDIX 2 -continued

```
  3         0624 ? S6=  0
  4         0047 GOYES  STOMEM (  11)
  5         0744 S7=    0
  6         1104 S9=    1
  7 EQOPS   0764 GOROMD 7
 10         0003 GOTOX  EQOPS
 11 STOMEM  1641 GOSUB  CNVINT ( 350)
 12 RETMEM  0476 A=C    S
 13         1176 A=A-1  S
 14         1176 A=A-1  S
 15         1176 A=A-1  S
 16         0107 GONC   *+3    (  21)
 17         0176 C=C-1  S
                 LEGAL
 20         0123 GOTO   *+4    (  24)
 21         1176 A=A-1  S
 22         0123 GONC   *+2    (  24)
 23         0136 C=C+1  S
 24         0434 M=C
 25 RCLMEM  0234 C=M
 26 EXIT    0564 GOROMD 5
 27         0003 GOTOX  EXIT
 30 STWTCH  1034 DSPOFF
 31         0424 ? S4=  0
 32         0403 GOYES  ONCHK  ( 100)
 33         0624 ? S6=  0
 34         0207 GOYES  STOSW  (  41)
 35         0744 S7=    0
 36         1104 S9=    1
 37         1304 S11=   1
 40         0037 GOTO   EQOPS  (   7)
 41 STOSW   1641 GOSUB  CNVINT ( 350)
 42 RETSW   0114 P=     11
 43         0430 A(P)=  4
 44         0636 ? A>=C S
 45         0253 GOYES  TIMINT (  52)
 46 FIXERR  0422 AC EX  WP
 47 ERROR   1134 BLINK
 50 CNVDSP  0164 GOROMD 1
 51         0003 GOTOX  CNVDSP
 52 TIMINT  0016 ? C=0
 53         0273 GOYES  *+3    (  56)
 54         0036 ? C=0  S
 55         0237 GOYES  ERROR  (  47)
 56         1056 A=0
 57         1414 P=     7
 60         0422 AC EX  WP
 61         0206 ? C#0  M
 62         0233 GOYES  FIXERR (  46)
 63         0506 A=A+C  M
 64         1674 SWSTOP
 65         0344 S3=    0
 66         0656 ? A#0
 67         0353 GOYES  *+3    (  72)
 70         1274 SW+
 71         0357 GOTO   *+2    (  73)
 72         1074 SW-
 73         0674 SW=A
 74 SWEX    0076 C=0    S
 75         0136 C=C+1  S
 76         0136 C=C+1  S
                 LEGAL
 77         0133 GOTO   EXIT   (  26)
100 ONCHK   0176 C=C-1  S
101         0176 C=C-1  S
102         0176 C=C-1  S
103         0363 GONC   SWEX   (  74)
104         0324 ? S3=  0
105         0447 GOYES  *+4    ( 111)
106         1674 SWSTOP
```

```
107         0344 S3=    0
110         0363 GOTO   SWEX   (  74)
111         1574 SWSTRT
112         0304 S3=    1
113         0363 GOTO   SWEX   (  74)
114 DATE    1034 DSPOFF
115         0424 ? S4=  0
116         0623 GOYES  RCLDAT ( 144)
117         0624 ? S6=  0
120         0527 GOYES  STODAT ( 125)
121         0744 S7=    0
122         1304 S11=   1
123         1404 S12=   1
124         0037 GOTO   EQOPS  (   7)
125 STODAT  1641 GOSUB  CNVINT ( 350)
126 RETDAT  0114 P=     11
127         0530 A(P)=  5
130         0576 A=A-C  S
131         0676 ? A#0  S
132         0237 GOYES  ERROR  (  47)
133         1651 GOSUB  DATDEC ( 352)
134         1661 GOSUB  ALIGN  ( 354)
135         0416 AC EX
136         0074 A=CL
137         0414 P=     5
140         0416 AC EX
141         0422 AC EX  WP
142         0274 CL=A
143         0000 NOP
144 RCLDAT  1056 A=0
145         0314 P=     0
146         0430 A(P)=  4
147         0530 A(P)=  5
150         0416 AC EX
151         0414 P=     5
152         1644 S14=   0
153         0074 A=CL
154         0274 CL=A
155         1062 A=0    WP
156         0406 AC EX  M
157         1671 GOSUB  DECTO  ( 356)
160         0133 GOTO   EXIT   (  26)
161 ALARM   1034 DSPOFF
162         0424 ? S4=  0
163         1027 GOYES  RCLAL  ( 205)
164         0624 ? S6=  0
165         0747 GOYES  STOAL  ( 171)
166         0744 S7=    0
167         1304 S11=   1
170         0037 GOTO   EQOPS  (   7)
171 STOAL   1641 GOSUB  CNVINT ( 350)
172 RETAL   1515 GOSUB  TIMCHK ( 323)
173         0724 ? S7=  0
174         0237 GOYES  ERROR  (  47)
175         1231 GOSUB  TIMMOD ( 246)
176         1616 A SR
177         1616 A SR
200         1524 ? S13= 0
201         1023 GOYES  *+3    ( 204)
202         1774 ALTOG
203         1027 GOTO   *+2    ( 205)
204         0474 AL=A
205 RCLAL   1474 A=AL
206         1656 A SL
207         1656 A SL
210         0114 P=     11
211         0430 A(P)=  4
212         0416 AC EX
213         0120 S8-15= 0
214         1504 S13=   1
```

APPENDIX 2 -continued

```
215              0564 GOROMD 5
216              0003 GOTOX  ALEXIT
217 TIME         1034 DSPOFF
220              0424 ? S4=  0
221              1213 GOYES  RCLTIM ( 242)
222              0624 ? S6=  0
223              1133 GOYES  STOTIM ( 226)
224              1064 GOROMD 8
225              0003 GOTOX  TUPDAT
226 STOTIM       1641 GOSUB  CNVINT ( 350)
227 RETTIM       1515 GOSUB  TIMCHK ( 323)
230              0724 ? S7=  0
231              0237 GOYES  ERROR  (  47)
232              1231 GOSUB  TIMMOD ( 246)
233              1616 A SR
234              1616 A SR
235              0416 AC EX
236              0414 P=     5
237              0074 A=CL
240              0422 AC EX  WP
241              0174 CLRS=A
242 RCLTIM       0114 P=     11
243              0330 A(P)=  3
244              0436 AC EX  S
245              0133 GOTO   EXIT   (  26)
246 TIMMOD       1056 A=0
247              1416 B=0
250              1556 BC EX
251              1614 P=     10
252              0230 A(P)=  2
253              0430 A(P)=  4
254              1256 AB EX
255              0614 P=     9
256              1303 GOTO   *+2    ( 260)
257              0102 C=C+1  P
260 MODLP        1346 A=A-B  M
261              1277 GONC   *-2    ( 257)
262              1306 A=A+B  M
263              0420 P=P-1
264              1716 B SR
265              0454 ? P#   5
266              1303 GOYES  MODLP  ( 260)
267              1614 P=     10
270              0662 ? A#0  WP
271              1357 GOYES  *+2    ( 273)
272              0520 RETURN
273              1236 B=A    S
274              1336 A=A+B  S
275              1513 GONC   RET    ( 322)
276              1436 B=0    S
277              1076 A=0    S
300              1616 A SR
301              0314 P=     0
302              1042 A=0    P
303              1256 AB EX
304              1014 P=     4
305              1462 ? B=0  WP
306              1477 GOYES  24COMP ( 317)
307              0414 P=     5
310              0330 A(P)=  3
311              0630 A(P)=  6
312              1452 ? B=0  X
313              1477 GOYES  24COMP ( 317)
314              1146 A=A-1  M
315              1114 P=     2
316              0630 A(P)=  6
317 24COMP       1356 A=A-B
320              1656 A SL
321              0356 C=-C-1
322 RET          0520 RETURN
323 TIMCHK       0704 S7=    1
324              0476 A=C    S
325              0536 A=A+C  S
326              0676 ? A#0  S
327              1553 GOYES  *+3    ( 332)
330 NOTIM        0744 S7=    0
331              0520 RETURN
332              0476 A=C    S
333              1136 A=A+1  S
334              1547 GONC   *-3    ( 331)
335              1543 GOTO   NOTIM  ( 330)
336 SWSPRS       0324 ? S3=  0
337              1623 GOYES  *+5    ( 344)
340              0574 A=SW
341              1136 A=A+1  S
342              0416 AC EX
343              0243 GOTO   CNVDSP (  50)
344              1056 A=0
345              0674 SW=A
346              1274 SW+
347              0243 GOTO   CNVDSP (  50)
350 CNVINT       0064 GOROMD 0
351              0003 GOTOX  CNVINT
352 DATDEC       0464 GOROMD 4
353              0003 GOTOX  DATDEC
354 ALIGN        0564 GOROMD 5
355              0003 GOTOX  ALIGN
356 DECTO        0364 GOROMD 3
357              0003 GOTOX  DECTO
                      FILLTO END
360              0000 NOP
361              0000 NOP
362              0000 NOP
363              0000 NOP
364              0000 NOP
365              0000 NOP
366              0000 NOP
367              0000 NOP
370              0000 NOP
371              0000 NOP
372              0000 NOP
373              0000 NOP
374              0000 NOP
375              0000 NOP
376              0000 NOP
377              0000 NOP
                      END
```

SYMBOL TABLE

```
24COMP  317  -  306  313
ALARM   161
ALIGN   354  -  134
CNVDSP   50  -  343  347
CNVINT  350  -   11   41  125  171
                226
DATDEC  352  -  133
DATE    114
DECTO   356  -  157
EQOPS     7  -   40  124  170
ERROR    47  -   55  132  174  231
EXIT     26  -   77  160  245
FIXERR   46  -   62
MEMORY    0
MODLP   260  -  266
NOTIM   330  -  335
ONCHK   100  -   32
RCLAL   205  -  163
RCLDAT  144  -  116
RCLMEM   25  -    2
```

```
RCLTIM  242   -   221
RET     322   -   275
RETAL   172
RETDAT  126
RETMEM   12
RETSW    42
RETTIM  227
STOAL   171   -   165
STODAT  125   -   120
STOMEM   11   -     4
STOSW    41   -    34
STOTIM  226   -   223
STWTCH   30
SWEX     74   -   103  110  113
SWSPRS  336
TIMCHK  323   -   172  227
TIME    217
TIMINT   52   -    45
TIMMOD  246   -   175  232

ENTRY POINTS

ALARM   161
DATE    114
ERROR    47
MEMORY    0
RCLTIM  242
RETAL   172
RETDAT  126
RETMEM   12
RETSW    42
RETTIM  227
STWTCH   30
SWSPRS  336
TIMCHK  323
TIME    217
TIMMOD  246

EXTERNAL REFERENCES

ALEXIT  216
ALIGN   355
CNVDSP   51
CNVINT  351
DATDEC  353
DECTO   357
EQOPS    10
EXIT     27
TUPDAT  225

ROM FILE - CRI7

                FILE   CRI7

                ENTRY  EQUALS
                ENTRY  OPRTRS
                ENTRY  OPRET
                ENTRY  EQOPS
                ENTRY  OPSET

  0 EQUALS 1034 DSPOFF
  1        0424 ? S4=   0
  2        0027 GOYES   *+3     (   5)
  3        0564 GOROMD  5
  4        0003 GOTOX   ->T
  5        0744 S7=     0
  6        0067 GOTO    EQOPS   (  15)
  7 OPRTRS 1034 DSPOFF
 10        0424 ? S4=   0
 11        0063 GOYES   *+3     (  14)
 12        0564 GOROMD  5
 13        0003 GOTOX   OPFCNS
 14        0704 S7=     1
 15 EQOPS  1374 DSP=A
 16        1711 GOSUB   CNVINT  ( 362)
 17        0134 CD EX
 20        1711 GOSUB   CNVINT  ( 362)
 21        0134 CD EX
 22        1734 A=DSP
 23        0724 ? S7=   0
 24        0177 GOYES   EQOP1   (  37)
 25        0624 ? S6=   0
 26        0153 GOYES   *+4     (  32)
 27        1024 ? S8=   0
 30        0163 GOYES   *+4     (  34)
 31        0207 GOTO    EQOP2   (  41)
 32        0134 CD EX
 33        0334 C=D
 34        0314 P=      0
 35        1334 F=A(P)
 36        1543 GOTO    OPEX    ( 330)
 37 EQOP1  0624 ? S6=   0
 40        0213 GOYES   *+2     (  42)
 41 EQOP2  0134 CD EX
 42        1556 BC EX
 43        0334 C=D
 44        1066 A=0     MS
 45        1652 A SL    X
 46        1652 A SL    X
 47        0314 P=      0
 50        1234 A(P)=F
 51        1204 S10=    1
 52        0444 S4=     0
 53 MATLP  0114 P=      11
 54        0476 A=C     S
 55        0536 A=A+C   S
 56        0347 GONC    NOCRY   (  71)
 57        0676 ? A#0   S
 60        0313 GOYES   *+2     (  62)
 61        0407 GOTO    TODDAT  ( 101)
 62        1136 A=A+1   S
 63        1136 A=A+1   S
 64        0337 GONC    TI      (  67)
 65 DEC    0330 A(P)=   3
 66        0413 GOTO    SHIFT   ( 102)
 67 TI     0230 A(P)=   2
 70        0413 GOTO    SHIFT   ( 102)
 71 NOCRY  1176 A=A-1   S
 72        0363 GONC    *+2     (  74)
 73        0327 GOTO    DEC     (  65)
 74        0536 A=A+C   S
 75        0377 GONC    *+2     (  77)
 76        0407 GOTO    TODDAT  ( 101)
 77        0536 A=A+C   S
100        0337 GONC    TI      (  67)
101 TODDAT 1614 P=      10
102 SHIFT  1556 BC EX
103        1224 ? S10=  0
104        0457 GOYES   MAT     ( 113)
105        1244 S10=    0
106        1626 A SR    MS
107        0420 P=P-1
110        1154 ? P#    2
111        0433 GOYES   *-3     ( 106)
112        0257 GOTO    MATLP   (  53)
113 MAT    0314 P=      0
114        1142 A=A-1   P
115        0763 GONC    MINUS   ( 174)
116 PLMICK 1146 A=A-1   M
```

```
117          0557 GONC    TWOTOD  ( 133)
120          0642 ? A#0   P
121          0527 GOYES   *+4     ( 125)
122          1176 A=A-1   S
123          0627 GONC    ERREX   ( 145)
124          1147 GOTO    DECEX   ( 231)
125          1176 A=A-1   S
126          1176 A=A-1   S
127          1176 A=A-1   S
130          1176 A=A-1   S
131          0627 GONC    ERREX   ( 145)
132          1143 GOTO    DATEX   ( 230)
133 TWOTOD   1146 A=A-1   M
134          0663 GONC    ONEDAT  ( 154)
135          1176 A=A-1   S
136          0603 GONC    *+2     ( 140)
137          0627 GOTO    ERREX   ( 145)
140          0642 ? A#0   P
141          0617 GOYES   *+2     ( 143)
142          0753 GOTO    TIEX    ( 172)
143          1176 A=A-1   S
144          0717 GONC    TODEX   ( 163)
145 ERREX    1556 BC EX
146          0624 ? S6=   0
147          0653 GOYES   ERROR   ( 152)
150          0134 CD EX
151          1556 BC EX
152 ERROR    0664 GOROMD  6
153          0003 GOTOX   ERROR
154 ONEDAT   1176 A=A-1   S
155          0707 GONC    *+4     ( 161)
156          1146 A=A-1   M
157          1143 GONC    DATEX   ( 230)
160          0627 GOTO    ERREX   ( 145)
161          1176 A=A-1   S
162          0727 GONC    *+3     ( 165)
163 TODEX    1204 S10=    1
164          0753 GOTO    TIEX    ( 172)
165          1176 A=A-1   S
166          0743 GONC    *+2     ( 170)
167          0753 GOTO    TIEX    ( 172)
170          1146 A=A-1   M
171          1147 GONC    DECEX   ( 231)
172 TIEX     0404 S4=     1
173          1147 GOTO    DECEX   ( 231)
174 MINUS    0642 ? A#0   P
175          0777 GOYES   *+2     ( 177)
176          0473 GOTO    PLMICK  ( 116)
177          0114 P=      11
200 MULDIV   1142 A=A-1   P
201          1017 GONC    *+2     ( 203)
202          0627 GOTO    ERREX   ( 145)
203          1142 A=A-1   P
204          1033 GONC    *+2     ( 206)
205          0627 GOTO    ERREX   ( 145)
206          0154 ? P#    11
207          1053 GOYES   *+3     ( 212)
210          1314 P=      3
211          1003 GOTO    MULDIV  ( 200)
212          0324 ? S3=   0
213          1147 GOYES   DECEX   ( 231)
214          0114 P=      11
215          0230 A(P)=   2
216          1376 A=A-B   S
217          0676 ? A#0   S
220          1147 GOYES   DECEX   ( 231)
221          1146 A=A-1   M
222          1146 A=A-1   M
223          1147 GONC    DECEX   ( 231)
224          1104 S9=     1
225          1304 S11=    1
226          1404 S12=    1
227          1147 GOTO    DECEX   ( 231)
230 DATEX    1204 S10=    1
231 DECEX    1565 GOSUB   OPSET   ( 335)
232          1256 AB EX
233          1374 DSP=A
234          1721 GOSUB   TODEC   ( 364)
235          1734 A=DSP
236          0416 AC EX
237          1374 DSP=A
240          1721 GOSUB   TODEC   ( 364)
241          1734 A=DSP
242          0416 AC EX
243          1256 AB EX
244          1064 GOROMD  8
245          0003 GOTOX   OPERAT
246 OPRET    0644 S6=     0
247          1731 GOSUB   DECTO   ( 366)
250          1224 ? S10=  0
251          1303 GOYES   MODRET  ( 260)
252          0424 ? S4=   0
253          1303 GOYES   MODRET  ( 260)
254          1751 GOSUB   TIMMOD  ( 372)
255          0114 P=      11
256          0430 A(P)=   4
257          0416 AC EX
260 MODRET   1424 ? S12=  0
261          1443 GOYES   NMAS    ( 310)
262          1324 ? S11=  0
263          1347 GOYES   TIMRET  ( 271)
264          1124 ? S9=   0
265          1337 GOYES   *+2     ( 267)
266          1557 GOTO    CNVDSP  ( 333)
267          0664 GOROMD  6
270          0003 GOTOX   RETDAT
271 TIMRET   1124 ? S9=   0
272          1433 GOYES   RETTIM  ( 306)
273          1256 AB EX
274          0074 A=CL
275          0414 P=      5
276          1422 B=0     WP
277          1316 A=A+B
300          1756 C SR
301          1756 C SR
302          0422 AC EX   WP
303          0274 CL=A
                                  FINISH
304          0664 GOROMD  6
305          0003 GOTOX   RCLTIM
306 RETTIM   0664 GOROMD  6
307          0003 GOTOX   RETTIM
310 NMAS     1324 ? S11=  0
311          1503 GOYES   NOMEM   ( 320)
312          1124 ? S9=   0
313          1473 GOYES   *+3     ( 316)
314          0664 GOROMD  6
315          0003 GOTOX   RETSW
316          0664 GOROMD  6
317          0003 GOTOX   RETAL
320 NOMEM    1124 ? S9=   0
321          1523 GOYES   *+3     ( 324)
322          0664 GOROMD  6
323          0003 GOTOX   RETMEM
324 EQOPEX   0724 ? S7=   0
325          1547 GOYES   *+4     ( 331)
326          0134 CD EX
327          0334 C=D
330 OPEX     0604 S6=     1
331          0120 S8-15=  0
```

```
332           1704 S15=     1
333 CNVDSP    0164 GOROMD  1
334           0003 GOTOX   CNVDSP
335 OPSET     0314 P=      0
336           1234 A(P)=F
337           0724 ? S7=   0
340           1617 GOYES   *+3      ( 343)
341           1114 P=      2
342           1334 F=A(P)
343           0314 P=      0
344           0644 S6=     0
345           1044 S8=     0
346           1142 A=A-1   P
347           1647 GONC    *+2      ( 351)
350           0520 RETURN
351           1142 A=A-1   P
352           1663 GONC    *+2      ( 354)
353           1703 GOTO    CTONE    ( 360)
354           1004 S8=     1
355           1142 A=A-1   P
356           1703 GONC    *+2      ( 360)
357           0520 RETURN
360 CTONE     0604 S6=     1
361           0520 RETURN
362 CNVINT    0064 GOROMD  0
363           0003 GOTOX   CNVINT
364 TODEC     0464 GOROMD  4
365           0003 GOTOX   TODEC
366 DECTO     0364 GOROMD  3
367           0003 GOTOX   DECTO
370 NORM      0464 GOROMD  4
371           0003 GOTOX   NORM
372 TIMMOD    0664 GOROMD  6
373           0003 GOTOX   TIMMOD
                   FILLTO  END
374           0000 NOP
375           0000 NOP
376           0000 NOP
377           0000 NOP
                   END
```

SYMBOL TABLE

```
CNVDSP   333  -   266
CNVINT   362  -    16   20
CTONE    360  -   353
DATEX    230  -   132  157
DEC       65  -    73
DECEX    231  -   124  171  173  213
                       220  223  227
DECTO    366  -   247
EQOP1     37  -    24
EQOP2     41  -    31
EQOPEX   324
EQOPS     15  -     6
EQUALS     0
ERREX    145  -   123  131  137  160
                            202  205
ERROR    152  -   147
MAT      113  -   104
MATLP     53  -   112
MINUS    174  -   115
MODRET   260  -   251  253
MULDIV   200  -   211
NMAS     310  -   261
NOCRY     71  -    56
NOMEM    320  -   311
NORM     370
ONEDAT   154  -   134
OPEX     330  -    36
OPRET    246
OPRTRS     7
OPSET    335  -   231
PLMICK   116  -   176
RETTIM   306  -   272
SHIFT    102  -    66   70
TI        67  -    64  100
TIEX     172  -   142  164  167
TIMMOD   372  -   254
TIMRET   271  -   263
TODDAT   101  -    61   76
TODEC    364  -   234  240
TODEX    163  -   144
TWOTOD   133  -   117
```

ENTRY POINTS

```
EQOPS     15
EQUALS     0
OPRET    246
OPRTRS     7
OPSET    335
```

EXTERNAL REFERENCES

```
->T        4
CNVDSP   334
CNVINT   363
DECTO    367
ERROR    153
NORM     371
OPERAT   245
OPFCNS    13
RCLTIM   305
RETAL    317
RETDAT   270
RETMEM   323
RETSW    315
RETTIM   307
TIMMOD   373
TODEC    365
```

ROM FILE - CRI8

```
                   FILE    CRI8

                   ENTRY   OPERAT
                   ENTRY   SWCALC
                   ENTRY   TUPDAT

 0 NOWUP   1734 A=DSP
 1         1534 DSSCWP
 2         0064 GOROMD  0
 3         0003 GOTOX   KEYREL
 4 SWCALC  1124 ? S9=   0
 5         0003 GOYES   NOWUP   (    0)
 6         1324 ? S11=  0
 7         0003 GOYES   NOWUP   (    0)
10         1424 ? S12=  0
11         0003 GOYES   NOWUP   (    0)
12         0574 A=SW
13         1136 A=A+1   S
14         0416 AC EX
15         1655 GOSUB   TODEC   ( 353)
16         1244 S10=    0
17         0444 S4=     0
20         1056 A=0
21         1416 B=0
22         1725 GOSUB   OPSET   ( 365)
```

```
        1556 BC EX
        0334 C=D
OPERAT  0314 P=      0
        1024 ? S8=   0
        0407 GOYES   PLSMIN ( 101)
        0624 ? S6=   0
        0317 GOYES   MUL    (  63)
ZRCHK   0206 ? C#0   M
        0233 GOYES   DIV    (  46)
        0330 A(P)=   3
        0314 P=      0
        1334 F=A(P)
        1556 BC EX
        1665 GOSUB   DECTO  ( 355)
        0134 CD EX
        0604 S6=     1
        1004 S8=     1
ERROR   0664 GOROMD  6
        0003 GOTOX   ERROR
DIV     1151 GOSUB   FIXSGN ( 232)
        0752 C=A-C   X
        0736 C=A+C   S
        0257 GONC    *+2    (  53)
        0076 C=0     S
        1562 BC EX   WP
        1076 A=0     S
        1675 GOSUB   DIVSTP ( 357)
        0354 ? P#    0
        0267 GOYES   *-2    (  55)
        0456 A=C
        1552 BC EX   X
        0627 GOTO    OPEX   ( 145)
MUL     1151 GOSUB   FIXSGN ( 232)
        0712 C=A+C   X
        0736 C=A+C   S
        0343 GONC    *+2    (  70)
        0076 C=0     S
        1314 P=      3
        1246 AB EX   M
        1056 A=0
        1705 GOSUB   MLTSTP ( 361)
        0154 ? P#    11
        0357 GOYES   *-2    (  73)
        0112 C=C+1   X
        1616 A SR
        0627 GOTO    OPEX   ( 145)
PLSMIN  1151 GOSUB   FIXSGN ( 232)
        0624 ? S6=   0
        0427 GOYES   ADD    ( 105)
SUB     0376 C=-C-1  S
ADD     1132 A=A+1   XS
        0132 C=C+1   XS
        0612 ? A>=C  X
        0453 GOYES   *+2    ( 112)
        0416 AC EX
        0406 AC EX   M
        0006 ? C=0   M
        0473 GOYES   *+2    ( 116)
        0416 AC EX
        1546 BC EX   M
EQLEXP  0612 ? A>=C  X
        0533 GOYES   FIXEXP ( 126)
        1716 B SR
        1112 A=A+1   X
        1456 ? B=0
        0533 GOYES   *+2    ( 126)
        0477 GOTO    EQLEXP ( 117)
FIXEXP  0172 C=C-1   XS
        1052 A=0     X
        0576 A=A-C   S
        0676 ? A#0   S
        0577 GOYES   DIFF   ( 137)
        1316 A=A+B
        0112 C=C+1   X
        1616 A SR
        0627 GOTO    OPEX   ( 145)
DIFF    1006 ? A>=B  M
        0617 GOYES   *+3    ( 143)
        0376 C=-C-1  S
        1256 AB EX
        1436 B=0     S
        1356 A=A-B
OPEX    1715 GOSUB   NORM   ( 363)
        0206 ? C#0   M
        0647 GOYES   *+2    ( 151)
        0056 C=0
        1056 A=0
        1114 P=      2
        0530 A(P)=   5
        1152 A=A-1   X
        0612 ? A>=C  X
        0737 GOYES   OFLCHK ( 167)
        1056 A=0
        1172 A=A-1   XS
        0612 ? A>=C  X
        1027 GOYES   ZRRES  ( 205)
        1033 GOTO    RESULT ( 206)
MNTOVF  0606 ? A>=C  M
        1033 GOYES   RESULT ( 206)
        1007 GOTO    OFLOW  ( 201)
OFLCHK  1072 A=0     XS
        1146 A=A-1   M
        1514 P=      6
        0430 A(P)=   4
        1152 A=A-1   X
        0612 ? A>=C  X
        1033 GOYES   RESULT ( 206)
        1112 A=A+1   X
        0612 ? A>=C  X
        0723 GOYES   MNTOVF ( 164)
OFLOW   0412 AC EX   X
        0406 AC EX   M
        1134 BLINK
        1033 GOTO    RESULT ( 206)
ZRRES   0056 C=0
RESULT  1224 ? S10=  0
        1103 GOYES   DECTI  ( 220)
        0114 P=      11
        0530 A(P)=   5
        0436 AC EX   S
        0424 ? S4=   0
        1137 GOYES   OPRET  ( 227)
        0676 ? A#0   S
        1133 GOYES   INC    ( 226)
        1123 GOTO    DEC    ( 224)
DECTI   0424 ? S4=   0
        1137 GOYES   OPRET  ( 227)
        0036 ? C=0   S
        1133 GOYES   *+3    ( 226)
DEC     0176 C=C-1   S
             LEGAL
        1137 GOTO    OPRET  ( 227)
INC     0136 C=C+1   S
OPRET   0764 GOROMD  7
        0003 GOTOX   OPRET
FIXLP   1614 P=      10
FIXSGN  0276 C=C+C   S
        1173 GONC    *+3    ( 236)
        0236 ? C#0   S
```

```
235         1203 GOYES   *+3     ( 240)
236         0076 C=0     S
237         1213 GOTO    *+3     ( 242)
240         0076 C=0     S
241         0176 C=C-1   S
242         1576 BC EX   S
243         1654 ? P#    10
244         1147 GOYES   FIXLP   ( 231)
245         1056 A=0
246         1256 AB EX
247         0520 RETURN
250 TUPDAT  1735 GOSUB   CNVINT  ( 367)
251         0744 S7=     0
252         1327 GOTO    DTLOOP  ( 265)
253 EXCHK   0724 ? S7=   0
254         1317 GOYES   NOEX    ( 263)
255         1277 GOTO    NORMEQ  ( 257)
256 NRMEQ1  0134 CD EX
257 NORMEQ  0744 S7=     0
260         1404 S12=    1
261         0764 GOROMD  7
262         0003 GOTOX   EQOPS
263 NOEX    0704 S7=     1
264         0134 CD EX
265 DTLOOP  0114 P=      11
266         0230 A(P)=   2
267         0636 ? A>=C  S
270         1367 GOYES   YEXIT   ( 275)
271         0114 P=      11
272         0730 A(P)=   7
273         0636 ? A>=C  S
274         1257 GOYES   EXCHK   ( 253)
275 YEXIT   0724 ? S7=   0
276         1407 GOYES   *+3     ( 301)
277         0744 S7=     0
300         0134 CD EX
301         0114 P=      11
302         0330 A(P)=   3
303         0576 A=A-C   S
304         0676 ? A#0   S
305         1567 GOYES   STCHK   ( 335)
306         1234 A(P)=F
307         0642 ? A#0   P
310         1277 GOYES   NORMEQ  ( 257)
311         0134 CD EX
312 CTDEC   1655 GOSUB   TODEC   ( 353)
313         0416 AC EX
314         1374 DSP=A
315         0056 C=0
316         1414 P=      7
317         0074 A=CL            START
320         1656 A SL
321         1656 A SL
322         0422 AC EX   WP
323         1745 GOSUB   TIMDEC  ( 371)
324         1556 BC EX
325         1734 A=DSP
326         0416 AC EX
327         1725 GOSUB   OPSET   ( 365)
330         1204 S10=    1
331         0404 S4=     1
332         1404 S12=    1
333         1104 S9=     1
334         0127 GOTO    OPERAT  (  25)
335 STCHK   0134 CD EX
336         0114 P=      11
337         0330 A(P)=   3
340         0576 A=A-C   S
341         0676 ? A#0   S
342         1273 GOYES   NRMEQ1  ( 256)
343         1234 A(P)=F
344         1142 A=A-1   P
345         1637 GONC    *+2     ( 347)
346         1647 GOTO    *+3     ( 351)
347         1142 A=A-1   P
350         1273 GONC    NRMEQ1  ( 256)
351         0334 C=D
352         1453 GOTO    CTDEC   ( 312)
353 TODEC   0464 GOROMD  4
354         0003 GOTOX   TODEC
355 DECTO   0364 GOROMD  3
356         0003 GOTOX   DECTO
357 DIVSTP  0364 GOROMD  3
360         0003 GOTOX   DIVSTP
361 MLTSTP  0464 GOROMD  4
362         0003 GOTOX   MLTSTP
363 NORM    0464 GOROMD  4
364         0003 GOTOX   NORM
365 OPSET   0764 GOROMD  7
366         0003 GOTOX   OPSET
367 CNVINT  0064 GOROMD  0
370         0003 GOTOX   CNVINT
371 TIMDEC  0464 GOROMD  4
372         0003 GOTOX   TIMDEC
                 FILLTO  END
373         0000 NOP
374         0000 NOP
375         0000 NOP
376         0000 NOP
377         0000 NOP
                 END
```

SYMBOL TABLE

```
ADD      105   -   103
CNVINT   367   -   250
CTDEC    312   -   352
DEC      224   -   217
DECTI    220   -   207
DECTO    355   -    40
DIFF     137   -   132
DIV       46   -    33
DIVSTP   357   -    55
DTLOOP   265   -   252
EQLEXP   117   -   125
ERROR     44
EXCHK    253   -   274
FIXEXP   126   -   120
FIXLP    231   -   244
FIXSGN   232   -    46    63   101
INC      226   -   216
MLTSTP   361   -    73
MNTOVF   164   -   200
MUL       63   -    31
NOEX     263   -   254
NORM     363   -   145
NORMEQ   257   -   255   310
NOWUP      0   -     5     7    11
NRMEQ1   256   -   342   350
OFLCHK   167   -   156
OFLOW    201   -   166
OPERAT    25   -   334
OPEX     145   -    62   100   136
OPRET    227   -   214   221   225
OPSET    365   -    22   327
PLSMIN   101   -    27
RESULT   206   -   163   165   175   204
STCHK    335   -   305
SUB      104
SWCALC     4
TIMDEC   371   -   323
```

APPENDIX 2 -continued

```
TODEC   353   -   15  312
TUPDAT  250
YEXIT   275   -  270
ZRCHK    32
ZRRES   205   -  162

ENTRY POINTS

OPERAT   25
SWCALC    4
TUPDAT  250

EXTERNAL REFERENCES

CNVINT  370
DECTO   356
DIVSTP  360
EQOPS   262
ERROR    45
KEYREL    5
MLTSTP  362
NORM    364
OPRET   230
OPSET   366
TIMDEC  372
TODEC   354
```

APPENDIX 3

```
NOP CODE - 000000

*MOD WS                  WORD SELECT
        000014              DEFAULT: ENTIRE WORD (DIGITS 0 - 11)
W       000014              ENTIRE WORD (DIGITS 0 - 11)
MS      000024              MANTISSA PLUS SIGN (DIGITS 3 - 11)
M       000004              MANTISSA FIELD (DIGITS 3 - 10)
S       000034              MANTISSA SIGN (DIGIT 11)
X       000010              EXPONENT FIELD (DIGITS 0 - 2)
XS      000030              EXPONENT SIGN (DIGIT 2)
WP      000020              WORD TO POINTER (DIGITS 0 - P)
P       000000              POINTER POSITION ONLY (DIGIT P)

*MOD P1                  SET POINTER
0       000300
1       000700
2       001100
3       001300
4       001000
5       000400
6       001500
7       001400
8       000200
9       000600
10      001600
11      000100

*MOD P2                  TEST POINTER
0       000300
1       000000
2       001100
3       001300
4       001000
5       000400
6       001500
7       001400
8       000200
9       000600
```

```
10      001600
11      000100

*MOD N                      LOAD CONSTANT
0       000000
1       000100
2       000200
3       000300
4       000400
5       000500
6       000600
7       000700
8       001000
9       001100
10      001200
.       001200
11      001300
-       001300
12      001400
:       001400
13      001500
14      001600
15      001700
BLANK   001700

*MOD S1                     RESET STATUS BANK, TEST STATUS BIT
0       000000

*MOD S2                     SET, RESET STATUS BIT (NOT S0)
0       000040
1       000000

*MOD I1                     GOROMD BEFORE GOTOX, GOSUBX; NOT BEFORE GOSUB
GOROMD 000064 0 0 6

*MOD I2                     GOYES AFTER TEST
GOYES  000003 0 0 2

*MOD I3                     GOTOX, GOSUBX, GOKEYS AFTER GOROMD
GOTOX  000003 0 0 2
GOSUBX 000001 0 0 2
GOKEYS 000220     10

*MOD I4                     TEST BEFORE GOYES
? S??= 000024 0 0 6
? P#   000054 0 0 6
? A#0  000642 5 5 2
? A>=B 001002 5 5 2
? A>=C 000602 5 5 2
? B=0  001442 5 5 2
? C=0  000002 5 5 2
? C#0  000202 5 5 2

*MOD I5                     GOROMD, TEST NOT BEFORE GONC
GOROMD 000064 0 0 6
? S??= 000024 0 0 6
? P#   000054 0 0 6
? A#0  000642 5 5 2
? A>=B 001002 5 5 2
? A>=C 000602 5 5 2
? B=0  001442 5 5 2
? C=0  000002 5 5 2
? C#0  000202 5 5 2

*MOD I6                     GOROMD, CARRY NOT BEFORE GOTO
GOROMD 000064 0 0 6
? S??= 000024 0 0 6
? P#   000054 0 0 6
? A#0  000642 5 5 2
? A>=B 001002 5 5 2
```

```
? A>=C  000602 5 5 2
? B=0   001442 5 5 2
? C=0   000002 5 5 2
? C#0   000202 5 5 2
A=A+1   001102 5 5 2
A=A-1   001142 5 5 2
A=A+B   001302 5 5 2
A=A-B   001342 5 5 2
A=A+C   000502 5 5 2
A=A-C   000542 5 5 2
C=C+1   000102 5 5 2
C=C-1   000142 5 5 2
C=C+C   000242 5 5 2
C=A+C   000702 5 5 2
C=A-C   000742 5 5 2
C=-C-1  000342 5 5 2
C=-C    000302 5 5 2

*OP

                                  ----- ARITHMETIC -----

A=0     001042 WS
A SR    001602 WS
A SL    001642 WS                 GOES THROUGH THE ADDER
AB EX   001242 WS                 B GOES THROUGH THE ADDER
AC EX   000402 WS
A=C     000442 WS
A=A+1   001102 WS                 CARRY
A=A-1   001142 WS                 CARRY
A=A+B   001302 WS                 CARRY
A=A-B   001342 WS                 CARRY
A=A+C   000502 WS                 CARRY
A=A-C   000542 WS                 CARRY
B SR    001702 WS
B=0     001402 WS
BC EX   001542 WS                 B GOES THROUGH THE ADDER
B=A     001202 WS
C=0     000042 WS
C SR    001742 WS
C=B     001502 WS                 B GOES THROUGH THE ADDER
C=C+1   000102 WS                 CARRY
C=C-1   000142 WS                 CARRY
C=-C    000302 WS                 CARRY
C=-C-1  000342 WS                 CARRY
C=C+C   000242 WS                 CARRY
C=A+C   000702 WS                 CARRY
C=A-C   000742 WS                 CARRY
? A#0   000642 WS       I2=A      CARRY, MUST BE FOLLOWED BY GOYES
? A>=B  001002 WS       I2=A      CARRY, MUST BE FOLLOWED BY GOYES
? A>=C  000602 WS       I2=A      CARRY, MUST BE FOLLOWED BY GOYES
? B=0   001442 WS       I2=A      CARRY, MUST BE FOLLOWED BY GOYES
? C=0   000002 WS       I2=A      CARRY, MUST BE FOLLOWED BY GOYES
? C#0   000202 WS       I2=A      CARRY, MUST BE FOLLOWED BY GOYES

                                  ----- PROGRAM CONTROL -----

GOSUB   000001 M 8 2    I1#B      MUST NOT BE PRECEEDED BY GOROMD
GOSUBX  000001 MX 8 2   I1=B      MUST BE PRECEEDED BY GOROMD, RTN TO SEL ROM
GOTO    000003 M 8 2    I6#B      MUST NOT BE PRECEEDED BY GOROMD, CARRY
GOTOX   000003 MX 8 2   I1=B      MUST BE PRECEEDED BY A GOROMD
GOYES   000003 M 8 2    I4=B      MUST BE PRECEEDED BY TEST
GONC    000003 M 8 2    I5#B      MUST NOT BE PRECEEDED BY GOROMD, TEST
GOROM   000040 C 4 6
GOROMD  000064 C 4 6    I3=A      MUST BE FOLLOWED BY GOTOX, GOSUBX, GOKEYS
GOKEYS  000220
RETURN  000520
SLEEP   000620
NOP     000000
```

```
                                 ----- LOAD CONSTANT -----

A(P)=  000030 N

                                 ----- POINTER -----

P=     000014 P1
P=P+1  000320
P=P-1  000420
? P#   000054 P2      I2=A   CARRY, MUST BE FOLLOWED BY GOYES

                                 ----- STATUS -----

S1-7=  000020 S1
S8-15= 000120 S1
S1=    000104 S2
S2=    000204 S2
S3=    000304 S2
S4=    000404 S2
S5=    000504 S2
S6=    000604 S2
S7=    000704 S2
S8=    001004 S2
S9=    001104 S2
S10=   001204 S2
S11=   001304 S2
S12=   001404 S2
S13=   001504 S2
S14=   001604 S2
S15=   001704 S2
? S0=  000024 S1      I2=A   CARRY, MUST BE FOLLOWED BY GOYES
? S1=  000124 S1      I2=A   CARRY, MUST BE FOLLOWED BY GOYES
? S2=  000224 S1      I2=A   CARRY, MUST BE FOLLOWED BY GOYES
? S3=  000324 S1      I2=A   CARRY, MUST BE FOLLOWED BY GOYES
? S4=  000424 S1      I2=A   CARRY, MUST BE FOLLOWED BY GOYES
? S5=  000524 S1      I2=A   CARRY, MUST BE FOLLOWED BY GOYES
? S6=  000624 S1      I2=A   CARRY, MUST BE FOLLOWED BY GOYES
? S7=  000724 S1      I2=A   CARRY, MUST BE FOLLOWED BY GOYES
? S8=  001024 S1      I2=A   CARRY, MUST BE FOLLOWED BY GOYES
? S9=  001124 S1      I2=A   CARRY, MUST BE FOLLOWED BY GOYES
? S10= 001224 S1      I2=A   CARRY, MUST BE FOLLOWED BY GOYES
? S11= 001324 S1      I2=A   CARRY, MUST BE FOLLOWED BY GOYES
? S12= 001424 S1      I2=A   CARRY, MUST BE FOLLOWED BY GOYES
? S13= 001524 S1      I2=A   CARRY, MUST BE FOLLOWED BY GOYES
? S14= 001624 S1      I2=A   CARRY, MUST BE FOLLOWED BY GOYES
? S15= 001724 S1      I2=A   CARRY, MUST BE FOLLOWED BY GOYES

                                 ----- DISPLAY AND REGISTER -----

CLRREG 000034                CLEARS A, B, C, D ONLY
C=D    000334
CD EX  000134
C=M    000234
M=C    000434
A(P)=F 001234
F=A(P) 001334
BLINK  001134                DSPOFF RESETS BLINK CONDITION
DSPOFF 001034
DSPON  000734
A=DSP  001734
DSP=A  001374
DSP=CL 000374                CONTINUOUSLY UPDATED
DSP=AL 001174                CONNECTS ARMED INDICATOR ONLY
DSP=SW 000774                CONTINUOUSLY UPDATED

                                 ----- CLOCK -----

ENSCWP 001434                ENABLE ONE SECOND WAKE-UPS
```

APPENDIX 3-continued

```
DSSCWP 001534          DISABLE ONE SECOND WAKE-UPS
A=CL   000074          HOLD COUNT
A=AL   001474
A=SW   000574
CL=A   000274          RELEASE COUNT
CLRS=A 000174          RELEASE COUNT, RESET DIVIDER
AL=A   000474          ARMS ALARM
ALTOG  001774
SW=A   000674
SW+    001274          SET STOP WATCH INCREMENT MODE
SW-    001074          SET STOP WATCH DECREMENT MODE
SWSTRT 001574
SWSTOP 001674

                       ----- DATA STORAGE -----

DSAD=A 001160          CHIP ENABLE: CHIP, REG NUMBER IN 'A' REG EXP
A=DR0  000070
A=DR1  000170
A=DR2  000270
A=DR3  000370
A=DR4  000470
A=DR5  000570
A=DR6  000670
A=DR7  000770
A=DR8  001070
A=DR9  001170
A=DR10 001270
A=DR11 001370
A=DR12 001470
A=DR13 001570
A=DR14 001670
A=DR15 001770
DR0=A  000050
DR1=A  000150
DR2=A  000250
DR3=A  000350
DR4=A  000450
DR5=A  000550
DR6=A  000650
DR7=A  000750
DR8=A  001050
DR9=A  001150
DR10=A 001250
DR11=A 001350
DR12=A 001450
DR13=A 001550
DR14=A 001650
DR15=A 001750

*END
```

APPENDIX 4

TIME ENTRY SEQUENCE

| REMARKS | ADDR | A REGISTER | | B REGISTER | | C REGISTER | |
|---|---|---|---|---|---|---|---|
| DSP=A | 0567 | A | 0.  500 | B | 000000000000 | C | 000000000000 |
| SLEEP | 0061 | A | 000000000000 | B | 000000000800 | C | 000000000000 |
| 1 Key | 0062 | A | 000000000000 | B | 000000000800 | C | 000000000000 |
| | 0016 | A | 000000000100 | B | 000000000800 | C | 000000000000 |
| | 0017 | A | 000000000100 | B | 000000000800 | C | 000000000000 |
| | 0020 | A | 000000000100 | B | 000000000800 | C | 000000000000 |
| | 1007 | A | 000000000100 | B | 000000000800 | C | 000000000000 |
| | 1010 | A | 000000000100 | B | 000000000800 | C | 000000000000 |
| | 1011 | A | 000000000100 | B | 000000000800 | C | 000000000000 |
| | 1012 | A | 000000000100 | B | 000000000800 | C | 000000000000 |
| | 1013 | A | 000000000100 | B | 000000000800 | C | 000000000000 |
| | 1014 | A | 000000000100 | B | 000000000800 | C | 000000000000 |

| | | | | | | |
|---|---|---|---|---|---|---|
| 1020 | A | 000000000100 | B | 000000000800 | C | 000000000000 |
| 1021 | A | 000000000100 | B | 000000000800 | C | 000000000000 |
| 1050 | A | 000000000100 | B | 000000000800 | C | 000000000000 |
| 1051 | A | 00000000100 | B | 000000000800 | C | 000000000000 |
| 1052 | A | 00000000100 | B | 000000000800 | C | 000000000000 |
| 1053 | A | 00000000100 | B | 000000000800 | C | 000000000000 |
| 1032 | A | 00000000100 | B | 000000000800 | C | 000000000000 |
| 1033 | A | 00000000100 | B | 000000000800 | C | 000000000300 |
| 1034 | A | 00000000100 | B | 000000000800 | C | 000000000830 |
| 1035 | A | 00000000100 | B | 000000000800 | C | 000000000800 |
| 1036 | A | 00000000100 | B | 000000000800 | C | 000000000700 |
| 1037 | A | 00000000100 | B | 000000000700 | C | 000000000800 |
| 1040 | A | 00000000100 | B | 000000000700 | C | 000000000700 |
| 1041 | A | 00000000100 | B | 000000000700 | C | 000000000700 |
| 1042 | A | 00000000100 | B | 000000000700 | C | 000000000700 |
| 1064 | A | 00000030100 | B | 000000000700 | C | 000000000700 |
| 1065 | A | 00000001000 | B | 000000000700 | C | 000000000700 |
| 1066 | A | 00000001000 | B | 000000000700 | C | 000000000700 |
| 1067 | A | 00000001000 | B | 000000000700 | C | 000000000700 |
| 1063 | A | 00000001000 | B | 000000000700 | C | 000000000600 |
| 1064 | A | 00000001000 | B | 000000000700 | C | 000000000600 |
| 1065 | A | 00000010000 | B | 000000000700 | C | 000000000600 |
| 1066 | A | 00000010000 | B | 000000000700 | C | 000000000600 |
| 1067 | A | 00000010000 | B | 000000000700 | C | 000000000600 |
| 1063 | A | 00000010000 | B | 000000000700 | C | 000000300500 |
| 1064 | A | 00000010000 | B | 000000000700 | C | 000000000500 |
| 1065 | A | 00000100000 | B | 000000000700 | C | 000000000500 |
| 1066 | A | 00000100000 | B | 000000000700 | C | 000000000500 |
| 1067 | A | 00000100000 | B | 000000000700 | C | 000000000500 |
| 1063 | A | 00000100000 | B | 000000000700 | C | 000000000400 |
| 1064 | A | 00000100000 | B | 000000000700 | C | 000000000400 |
| 1065 | A | 00001000000 | B | 000000000700 | C | 000000000400 |
| 1066 | A | 00001000000 | B | 000000000700 | C | 000000000400 |
| 1067 | A | 00001000000 | B | 000000000700 | C | 000000000400 |
| 1063 | A | 00001000000 | B | 000000000700 | C | 000000000300 |
| 1064 | A | 00001000000 | B | 000000000700 | C | 000000000300 |
| 1065 | A | 00010000000 | B | 000000000700 | C | 000000000300 |
| 1066 | A | 00010000000 | B | 000000000700 | C | 000000000300 |
| 1067 | A | 00010000000 | B | .000000000700 | C | 000000000330 |
| 1063 | A | 00010000000 | B | 000000000700 | C | 000000000200 |
| 1064 | A | 00010000000 | B | 000000000700 | C | 000000000200 |
| 1065 | A | 00100000000 | B | 000000000700 | C | 000000000200 |
| 1066 | A | 00100000000 | B | 000000000700 | C | 000000000200 |
| 1067 | A | 00100000000 | B | 000000000700 | C | 000000000200 |
| 1063 | A | 00100000000 | B | 000000000700 | C | 000000000100 |
| 1064 | A | 00100000000 | B | 000000000700 | C | 000000000100 |
| 1065 | A | 01000000000 | B | 000000000700 | C | 000000000100 |
| 1066 | A | 01000000000 | B | 000000000700 | C | 000000000100 |
| 1067 | A | 01000000000 | B | 000000000700 | C | 000000000100 |
| 1063 | A | 01000000000 | B | 000000000700 | C | 000000000000 |
| 1064 | A | 01000000000 | B | 000000000700 | C | 000000000000 |
| 1065 | A | 10000000000 | B | 000000000700 | C | 000000000000 |
| 1066 | A | 10000000000 | B | 000000000700 | C | 000000000000 |
| 1067 | A | 10000000000 | B | 000000000700 | C | 000000000000 |
| 1070 | A | 10000000000 | B | 000000000700 | C | 000000000000 |
| 1071 | A | 10000000000 | B | 000000000700 | C | 000000000000 |
| 1072 | A | 10000000000 | B | 000000000700 | C | 000000000000 |
| 1074 | A | 1.000000000 | B | 000000000700 | C | 000000000000 |
| 1075 | A | 1. 00000000 | B | 000000000700 | C | 000000000000 |
| 1076 | A | 1. 00000000 | B | 000000000700 | C | 000000000000 |
| 1077 | A | 1. 00000000 | B | 000000000700 | C | 000000000000 |
| 1075 | A | 1. 0000000 | B | 000000000700 | C | 000000000000 |
| 1076 | A | 1. 0000000 | B | 000000000700 | C | 000000000000 |
| 1077 | A | 1. 0000000 | B | 000000000700 | C | 000000000000 |
| 1075 | A | 1. 000000 | B | 000000000700 | C | 000000000000 |
| 1076 | A | 1. 000000 | B | 000000000700 | C | 000000000000 |
| 1077 | A | 1. 000000 | B | 000000000700 | C | 000000000000 |
| 1075 | A | 1. 00000 | B | 000000000700 | C | 000000000000 |
| 1076 | A | 1. 00000 | B | 000000000700 | C | 000000000000 |
| 1077 | A | 1. 00000 | B | 000000000700 | C | 000000000000 |

| | | | | | | | | |
|---|---|---|---|---|---|---|---|---|
| | 1075 | A | 1. | 0000 | B | 000000000700 | C | 000000000000 |
| | 1076 | A | 1. | 0000 | B | 000000000700 | C | 000000000000 |
| | 1077 | A | 1. | 0000 | B | 000000000700 | C | 000000000000 |
| | 1075 | A | 1. | 000 | B | 000000000700 | C | 000000000000 |
| | 1076 | A | 1. | 000 | B | 000000000700 | C | 000000000000 |
| | 1077 | A | 1. | 000 | B | 000000000700 | C | 000000000000 |
| | 1075 | A | 1. | 00 | B | 000000000700 | C | 000000000000 |
| | 1076 | A | 1. | 00 | B | 000000000700 | C | 000000000000 |
| | 1077 | A | 1. | 00 | B | 000000000700 | C | 000000000000 |
| | 1100 | A | 1. | 000 | B | 000000000700 | C | 000000000000 |
| | 1101 | A | 1. | 000 | B | 000000000700 | C | 000000000000 |
| DSP=A | 1102 | A | 1. | 000 | B | 000000000700 | C | 000000000000 |
| SLEEP | 0061 | A | 1. | 000 | B | 000000000700 | C | 000000000000 |
| 2 Key | 0021 | A | 1. | 000 | B | 000000000700 | C | 000000000000 |
| | 0014 | A | 1. | 100 | B | 000000000700 | C | 000000000000 |
| | 0015 | A | 1. | 100 | B | 000000000700 | C | 000000000000 |
| | 0016 | A | 1. | 200 | B | 000000000700 | C | 000000000000 |
| | 0017 | A | 1. | 200 | B | 000000000700 | C | 000000000000 |
| | 0020 | A | 1. | 200 | B | 000000000700 | C | 000000000000 |
| DSP=A | 1102 | A | 12. | 000 | B | 000000000600 | C | 000000000000 |
| SLEEP | 0361 | A | 12. | 000 | B | 000000000600 | C | 000000000000 |
| : Key | 0362 | A | 12. | 000 | B | 000000000600 | C | 000000000000 |
| | 0367 | A | 12. | 000 | B | 000000000600 | C | 000000000000 |
| | 0070 | A | 12. | 000 | B | 000000000600 | C | 000000000000 |
| | 0163 | A | 12. | 000 | B | 000000000600 | C | 000000000000 |
| | 0164 | A | 12. | 000 | B | 000000000600 | C | 000000000000 |
| | 0165 | A | 12. | 000 | B | 000000000600 | C | 000000000000 |
| | 0020 | A | 12. | 000 | B | 000000000600 | C | 000000000000 |
| | 1104 | A | 12. | 000 | B | 000000000600 | C | 000000000000 |
| | 1105 | A | 12. | 000 | B | 000000000600 | C | 000000000000 |
| | 1107 | A | 12. | 000 | B | 000000000600 | C | 000000000000 |
| | 1110 | A | 12. | 000 | B | 000000000600 | C | 000000000000 |
| | 1112 | A | 12. | 000 | B | 000000000600 | C | 000000000000 |
| | 1113 | A | 12. | 000 | B | 000000000600 | C | 000000000000 |
| | 1114 | A | 12. | 000 | B | 000000000600 | C | 000000000000 |
| | 1115 | A | 12. | 000 | B | 000000000600 | C | 000000000000 |
| | 1116 | A | 12. | 000 | B | 000000000600 | C | 000000000000 |
| | 1117 | A | 12. | 200 | B | 000000000600 | C | 000000000000 |
| | 1120 | A | 12. | 200 | B | 000000000600 | C | 000000000000 |
| | 1121 | A | 12. | 200 | B | 000000000600 | C | 000000000000 |
| | 1122 | A | 12. | 200 | B | 000000000600 | C | 100000000000 |
| | 1123 | A | 12. | 200 | B | 000000000600 | C | 100000000000 |
| | 1126 | A | 12. | 200 | B | 000000000600 | C | 100000000000 |
| | 1127 | A | 12. | 200 | B | 000000000600 | C | 100000000000 |
| | 1130 | A | 12. | 500 | B | 000000000600 | C | 100000000000 |
| | 1131 | A | 12. | 500 | B | 000000000600 | C | 100000000000 |
| | 1132 | A | 12. | 500 | B | 000000000600 | C | 100000000000 |
| | 1133 | A | 12. | 500 | B | 000000000600 | C | 100000000000 |
| | 1163 | A | 12. | 600 | B | 000000000500 | C | 100000000000 |
| | 1164 | A | 12. | 100 | B | 000000000500 | C | 100000000000 |
| | 1165 | A | 12. | 000 | B | 000000000500 | C | 100000000000 |
| | 1166 | A | 12. | 600 | B | 000000000500 | C | 100000000000 |
| | 1167 | A | 12. | 000 | B | 000000000500 | C | 100000000000 |
| | 1170 | A | 12. | 000 | B | 000000000500 | C | 100000000000 |
| | 1176 | A | 12. | 000 | B | 000000000500 | C | 100000000000 |
| | 1177 | A | 12. | 300 | B | 000000000500 | C | 100000000000 |
| | 1200 | A | 12. | 500 | B | 000000000300 | C | 100000000000 |
| | 1201 | A | 12. | 500 | B | 000000000300 | C | 100000000000 |
| | 1202 | A | 12. | 500 | B | 000000000300 | C | 100000000000 |
| | 1203 | A | 12. | 500 | B | 000000000300 | C | 100000000000 |
| | 1204 | A | 12: | 500 | B | 000000000300 | C | 100000000000 |
| | 1205 | A | 12: | 500 | B | 000000000300 | C | 100000000000 |
| | 1207 | A | 12:0 | 500 | B | 000000000300 | C | 100000000000 |
| | 1210 | A | 12:00 | 500 | B | 000000000300 | C | 100000000000 |
| | 1211 | A | 12:00 | 500 | B | 000000000300 | C | 100000000000 |
| | 1212 | A | 12:00 | 500 | B | 000000000300 | C | 100000000000 |
| | 1213 | A | 12:00 | 500 | B | 000000000300 | C | 100000000000 |
| | 1211 | A | 12:00 | 500 | B | 000000000300 | C | 100000000000 |
| | 1212 | A | 12:00 | 500 | B | 000000000300 | C | 100000000000 |
| | 1213 | A | 12:00 | 500 | B | 000000000300 | C | 100000000000 |

| | | | | | | | |
|---|---|---|---|---|---|---|---|
| | 1211 | A | 12:00 500 | B | 000000000300 | C | 100000000000 |
| | 1212 | A | 12:00 500 | B | 000000000300 | C | 100000000000 |
| | 1213 | A | 12:00 500 | B | 000000000300 | C | 100000000000 |
| | 1211 | A | 12:00 00 | B | 000000000300 | C | 100000000000 |
| | 1212 | A | 12:00 00 | B | 000000000300 | C | 100000000000 |
| | 1213 | A | 12:00 00 | B | 000000000300 | C | 100000000000 |
| | 1214 | A | 12:00 000 | B | 000000000300 | C | 100000000000 |
| | 1215 | A | 12:00 000 | B | 000000000300 | C | 100000000000 |
| DSP=A | 1216 | A | 12:00 000 | B | 000000000300 | C | 100000000000 |
| SLEEP | 0061 | A | 12.00 000 | B | 000000000300 | C | 100000000000 |
| 3 Key | 0062 | A | 12:00 000 | B | 000000000300 | C | 100000000000 |
| | 0013 | A | 12:00 100 | B | 000000000300 | C | 100000000000 |
| | 0014 | A | 12:00 200 | B | 000000000300 | C | 100000000000 |
| | 0015 | A | 12:00 200 | B | 000000000300 | C | 100000000000 |
| | 0016 | A | 12:00 300 | B | 000000000300 | C | 100000000000 |
| | 0017 | A | 12:00 300 | B | 000000000300 | C | 100000000000 |
| | 0020 | A | 12:00 300 | B | 000000000300 | C | 100000000000 |
| | 1220 | A | 12:00 300 | B | 000000000300 | C | 100000000000 |
| | 1221 | A | 12:00 300 | B | 000000000300 | C | 100000000000 |
| | 1222 | A | 12:00 300 | B | 000000000300 | C | 100000000000 |
| | 1223 | A | 12:00 300 | B | 000000000300 | C | 100000000000 |
| | 1224 | A | 12:00 300 | B | 000000000300 | C | 100000000000 |
| | 1225 | A | 12:000 3000 | B | 000000000300 | C | 100000000000 |
| | 1226 | A | 12:00 30000 | B | 000000000300 | C | 100000000000 |
| | 1227 | A | 12:00300000 | B | 000000000300 | C | 100000000000 |
| | 1230 | A | 12:00300000 | B | 000000000300 | C | 100000000000 |
| | 1231 | A | 12:00300000 | B | 000000000300 | C | 100000000000 |
| | 1232 | A | 12:03000000 | B | 000000000300 | C | 100000000000 |
| | 1233 | A | 12:03000000 | B | 000000000300 | C | 100000000000 |
| | 1234 | A | 12:03000000 | B | 000000000300 | C | 100000000000 |
| | 1235 | A | 12:03000000 | B | 000000000300 | C | 100000000000 |
| | 1211 | A | 12:03 00000 | B | 000000000300 | C | 100000000000 |
| | 1212 | A | 12:03 00000 | B | 000000000300 | C | 100000000000 |
| | 1213 | A | 12:03 00000 | B | 000000000300 | C | 100000000000 |
| | 1211 | A | 12:03 0000 | B | 000000000300 | C | 100000000000 |
| | 1212 | A | 12:03 0000 | B | 000000000300 | C | 100000000000 |
| | 1213 | A | 12:03 0000 | B | 000000000300 | C | 100000000000 |
| | 1211 | A | 12:03 000 | B | 000000000300 | C | 100000000000 |
| | 1212 | A | 12:03 000 | B | 000000000300 | C | 100000000000 |
| | 1213 | A | 12:03 000 | B | 000000000300 | C | 100000000000 |
| | 1211 | A | 12:03 00 | B | 000000000300 | C | 100000000000 |
| | 1212 | A | 12:03 00 | B | 000000000300 | C | 100000000000 |
| | 1213 | A | 12:03 00 | B | 000000000300 | C | 100000000000 |
| | 1214 | A | 12:03 000 | B | 000000000300 | C | 100000000000 |
| | 1215 | A | 12:03 000 | B | 000000000300 | C | 100000000000 |
| DSP=A | 1216 | A | 12:03 000 | B | 000000000300 | C | 100000000000 |
| SLEEP | 0061 | A | 12:03 000 | B | 000000000300 | C | 100000000000 |
| 4 Key | 0062 | A | 12:03 000 | B | 000000000300 | C | 100000000000 |
| | 0011 | A | 12:03 100 | B | 000000000300 | C | 100000000000 |
| | 1225 | A | 12:030 4000 | B | 000000000300 | C | 100000000000 |
| | 1226 | A | 12:03 40000 | B | 000000000300 | C | 100000000000 |
| | 1227 | A | 12:03400000 | B | 000000000300 | C | 100000000000 |
| | 1230 | A | 12:03400000 | B | 000000000300 | C | 100000000000 |
| | 1231 | A | 12:03400000 | B | 000000000300 | C | 100000000000 |
| | 1232 | A | 12:34000000 | B | 000000000300 | C | 100000000000 |
| | 1233 | A | 12:34000000 | B | 000000000300 | C | 100000000000 |
| | 1234 | A | 12:34000000 | B | 000000000300 | C | 100000000000 |
| | 1235 | A | 12:34000000 | B | 000000000300 | C | 100000000000 |
| | 1211 | A | 12:34 00000 | B | 000000000300 | C | 100000000000 |
| | 1212 | A | 12:34 00000 | B | 000000000300 | C | 100000000000 |
| | 1213 | A | 12:34 00000 | B | 000000000300 | C | 100000000000 |
| | 1211 | A | 12:34 0000 | B | 000000000300 | C | 100000000000 |
| | 1212 | A | 12:34 0000 | B | 000000000300 | C | 100000000000 |
| | 1213 | A | 12:34 0000 | B | 000000000300 | C | 100000000000 |
| | 1211 | A | 12:34 000 | B | 000000000300 | C | 100000000000 |
| | 1212 | A | 12:34 000 | B | 000000000300 | C | 100000000000 |
| | 1213 | A | 12:34 000 | B | 000000000300 | C | 100000000000 |
| | 1211 | A | 12:34 00 | B | 000000000300 | C | 100000000000 |
| | 1212 | A | 12:34 00 | B | 000000000300 | C | 100000000000 |
| | 1213 | A | 12:34 00 | B | 000000000300 | C | 100000000000 |

| | | | | | | | |
|---|---|---|---|---|---|---|---|
| | 1214 | A | 12:34 000 | B | 000000000300 | C | 100000000000 |
| | 1215 | A | 12:34 000 | B | 000000000300 | C | 100000000000 |
| DSP=A | 1216 | A | 12:34 000 | B | 000000000300 | C | 100000000000 |
| SLEEP | 0061 | A | 12:34 000 | B | 000000000300 | C | 100000000000 |
| 5 Key | 0062 | A | 12:34 000 | B | 000000000300 | C | 100000000000 |
| | 0007 | A | 12:34 100 | B | 000000000300 | C | 100000000000 |
| | 1225 | A | 12:340 5000 | B | 000000000300 | C | 100000000000 |
| | 1226 | A | 12:34 50000 | B | 000000000300 | C | 100000000000 |
| | 1227 | A | 12:34500000 | B | 000000000300 | C | 100000000000 |
| | 1230 | A | 12:34500000 | B | 000000000300 | C | 100000000000 |
| | 1231 | A | 12:34500000 | B | 000000000300 | C | 100000000000 |
| | 1232 | A | 12:45000000 | B | 000000000300 | C | 100000000000 |
| DSP=A | 1216 | A | 12:45 000 | B | 000000000300 | C | 100000000000 |
| SLEEP | 0061 | A | 12:45 000 | B | 000000000300 | C | 100000000000 |
| . Key | 0062 | A | 12:45 000 | B | 000000000300 | C | 100000000000 |
| | 0066 | A | 12:45 100 | B | 000000000300 | C | 100000000000 |
| | 1030 | A | 12:45 .00 | B | 000000000300 | C | 100000000000 |
| | 1065 | A | 12:45.00000 | B | 000000000200 | C | 100000000000 |
| DSP=A | 1102 | A | 12:45. 000 | B | 000000000200 | C | 100000000000 |
| SLEEP | 0061 | A | 12:45. 000 | B | 000000000200 | C | 100000000000 |
| 6 Key | 0062 | A | 12:45. 000 | B | 000000000200 | C | 100000000000 |
| | 0006 | A | 12:45. 100 | B | 000000000200 | C | 100000000000 |
| DSP=A | 1102 | A | 12:45.6 000 | B | 000000000100 | C | 100000000000 |
| SLEEP | 0061 | A | 12:45.6 000 | B | 000000000100 | C | 100000000000 |
| 7 Key | 0062 | A | 12:45.6 000 | B | 000000000100 | C | 100000000000 |
| | 0004 | A | 12:45.6 100 | B | 000000000100 | C | 100000000000 |
| DSP=A | 1102 | A | 12:45.67000 | B | 000000000000 | C | 100000000000 |
| SLEEP | 0061 | A | 12:45.67000 | B | 000000000000 | C | 100000000000 |
| 8 Key | 0062 | A | 12:45.67000 | B | 000000000000 | C | 100000000000 |
| | 0003 | A | 12:45:67100 | B | 000000000000 | C | 100000000000 |
| | 0004 | A | 12:45.67200 | B | 000000000000 | C | 100000000000 |
| | 0005 | A | 12:45.67200 | B | 000000000000 | C | 100000000000 |
| | 0006 | A | 12:45.67300 | B | 000000000000 | C | 100000000000 |
| | 0007 | A | 12:45.67400 | B | 000000000000 | C | 100000000000 |
| | 0010 | A | 12:45.67400 | B | 000000000000 | C | 100000000000 |
| | 0011 | A | 12:45.67500 | B | 000000000000 | C | 100000000000 |
| | 0012 | A | 12:45.67500 | B | 000000000000 | C | 100000000000 |
| | 0013 | A | 12:45.67600 | B | 000000000000 | C | 100000000000 |
| | 0014 | A | 12:45.67700 | B | 000000000000 | C | 100000000000 |
| | 0015 | A | 12:45.67700 | B | 000000000000 | C | 100000000000 |
| | 0016 | A | 12:45.67800 | B | 000000000000 | C | 100000000000 |
| | 0017 | A | 12:45.67800 | B | 000000000000 | C | 100000000000 |
| | 0020 | A | 12:45.67800 | B | 000000000000 | C | 100000000000 |
| | 1104 | A | 12:45.67800 | B | 000000000000 | C | 100000000000 |
| | 1105 | A | 12:45.67800 | B | 000000000000 | C | 100000000000 |
| | 1106 | A | 12:45.67800 | B | 000000000000 | C | 100000000000 |
| | 1033 | A | 12:45.67800 | B | 000000000000 | C | 100000000000 |
| | 1034 | A | 12:45.67800 | B | 000000000000 | C | 100000000000 |
| | 1035 | A | 12:45.67800 | B | 000000000000 | C | 100000000000 |
| | 1100 | A | 12:45.67000 | B | 000000000000 | C | 100000000000 |
| | 1101 | A | 12:45.67000 | B | 000000000000 | C | 100000000000 |
| DSP=A | 1102 | A | 12:45.67000 | B | 000000000000 | C | 100000000000 |
| SLEEP | [illegible] | A | 12:45.67000 | B | 000000000000 | C | 100000000000 |

We claim:

1. A watch/calculator comprising:

a keyboard including numerical keys and arithmetic function keys;

calculator circuit means connected to the keyboard for accepting numerical entries from the keyboard and for performing arithmetic operations on numerical data in response to actuation of arithmetic function keys on the keyboard;

display means connected to the calculator circuit means for displaying numerical data;

watch circuit means connected to the calculator circuit means and the display means for storing and periodically updating data representing time; and a time entry delimiter key on the keyboard for delimiting the entry of portions of time information from the keyboard where each portion has a different unit and for causing the display of a selected character on the display means between adjacent portions of entered time information when the time entry delimiter key is depressed, wherein the time entry delimiter key is depressed after the entry of a first predetermined number of digits from the keyboard to indicate entry of time information having a first unit by causing the display of a selected character after the first predetermined number of digits and to enable entry of time information having a second unit, and the time entry delimiter key is again depressed after the entry of a second predetermined number of digits from the keyboard to indicate entry of time information having the second unit by causing the display of a selected character after the second predetermined number of digits and to enable entry of time information having a third unit.

2. A watch/calculator as in claim 1 wherein the time entry delimiter key is operatively coupled to the calculator circuit means for causing the calculator circuit means to process the second predetermined number of digits from the keyboard as modulo 60 after the first depression of the time entry delimiter key.

3. A watch/calculator as in claim 2 wherein the time entry delimiter key is operatively coupled to the calculator circuit means for causing the calculator circuit means to process entries from the keyboard subsequent to the second predetermined number of digits as modulo 60 after the second depression of the time entry delimiter key.

4. A watch/calculator as in claim 2 further comprising a decimal point key operatively coupled to the calculator circuit for causing the calculator circuit means to process entries from the keyboard subsequent to the second predetermined number of digits as modulo 10 after depression of the decimal point key subsequent to depression of the time entry delimiter key.

5. A watch calculator as in claim 1 further comprising a time entry key for causing the calculator circuit means to transfer numerical data entered from the keyboard into the watch circuit means.

6. A watch/calculator as in claim 1 further comprising a time transfer means for transferring time data from the watch circuit means to the calculator circuit means.

7. A watch/calculator as in claim 6 wherein the calculator circuit means includes circuitry for arithmetically combining data entered from the keyboard with time data from the watch circuit means to produce a new piece of time data.

8. A watch/calculator as in claim 7 wherein the circuitry for arithmetically combining data entered from the keyboard with time data periodically updates the new piece of time data.

9. A watch/calculator as in claim 6 wherein the calculator circuit means includes circuitry for arithmetically combining data entered from the keyboard with time data from the watch circuit means to produce decimal data.

10. A watch/calculator as in claim 1 further comprising a time mode key for converting between twelve hour and twenty-four hour modes of time entry and display.

11. A watch/calculator as in claim 1 further comprising a data entry delimiter key on the keyboard for delimiting the entry of portions of date information from the keyboard where each portion has a different unit and for causing the display of a selected character on the display means between each portion of entered date information wherein the date entry delimiter key is depressed after the entry of a first predetermined number of digits from the keyboard to indicate entry of date information having a first unit and to enable entry of date information having a second unit, and the date entry delimiter key is again depressed after the entry of a second predetermined number of digits from the keyboard to indicate entry of date information having the second unit and to enable entry of date information having a third unit.

12. A watch/calculator as in claim 11 further comprising a date mode key for converting between a day-month-year and a month-day-year mode of date entry and display.

13. A watch/calculator as in claim 11 wherein the date entry delimiter key is operatively coupled to the calculator circuit means for causing the calculator circuit means to process the second predetermined number of digits as an indication of a month of the year after the first depression of the date entry delimiter key following entry of digits indicating day of a month.

14. A watch/calculator as in claim 13 wherein the date entry delimiter key is operatively coupled to the calculator circuit means for causing the calculator circuit means to process entries from the keyboard subsequent to the second predetermined number of digits as an indication of a year.

15. A watch/calculator as in claim 11 wherein the date entry delimiter key is operatively coupled to the calculator circuit means for causing the calculator circuit means to process the second predetermined number of digits as an indication of a day of a month after the first depression of the date entry delimiter key following entry of digits indicating a month of the year.

16. A watch/calculator as in claim 1 further comprising an alarm set key on the keyboard for causing the watch circuit means to store a time quantity entered from the keyboard and to actuate an alarm when the periodically updated time in the watch circuit means coincides with the stored time quantity.

17. A watch/calculator as in claim 1 further comprising:

a stopwatch start/stop key; and stopwatch circuit means in the watch circuit means responsive to the stopwatch key for counting up the amount of time from a predetermined reference upon a first actuation of the stopwatch start/stop key and stopping the counting upon a second actuation of the stopwatch start/stop key.

18. A watch/calculator as in claim 17 wherein the stopwatch circuit means counts up from the predetermined reference when the predetermined reference is zero and counts down from the predetermined reference when the predetermined reference is a positive, non-zero number.

19. A watch/calculator as in claim 17 wherein the stopwatch circuit means actuates an alarm when the count in the stopwatch circuit means reaches zero when the stopwatch circuit means is counting down from a positive, non-zero predetermined reference.

20. A watch/calculator as in claim 1 wherein the time entry delimiter key is a colon (:) key and the selected character displayed on the display means in response to depression of the colon key is a colon.

21. A watch/calculator as in claim 8 wherein:

the watch circuit means includes a clock register for storing updated time data;

the calculator circuit means includes a first data register for receiving data entered from the keyboard and time data from the clock register, a second data register for receiving data from the first data register, and arithmetic means for combining the contents of the first and second data registers and storing the resultant combination in the first data register; and a bidirectional data bus selectively couples the clock register and the first data register.

22. A watch/calculator as in claim 11 wherein the date entry delimiter key is a slash (/) key and the selected character displayed on the display means in response to depression of the slash key is a hyphen (-).

23. A watch/calculator comprising:

a keyboard including numerical keys and arithmetic function keys;

calculator circuit means connected to the keyboard for accepting numerical entries from the keyboard and for performing arithmetic operations on numerical data in response to actuation of arithmetic function keys on the keyboard;

display means connected to the calculator circuit means for displaying numerical data;

watch circuit means connected to the display means for storing and periodically updating data representing time; and time transfer means connected to the calculator circuit means and the watch circuit means for transferring time data from the watch circuit means to the calculator circuit means.

24. A watch/calculator as in claim 23 wherein the calculator circuit means includes circuitry for arithmetically combining data entered from the keyboard with time data from the watch circuit means to produce a new piece of time data.

25. A watch/calculator as in claim 24 wherein the circuitry for arithmetically combining data entered from the keyboard with time data periodically updates the new piece of time data.

26. A watch/calculator as in claim 23 wherein the calculator circuit means includes circuitry for arithmetically combining data entered from the keyboard with time data from the watch circuit means to produce decimal data.

27. A watch/calculator as in claim 24 wherein:

the watch circuit means includes a clock register for storing updated time data;

the calculator circuit means includes a first data register for receiving data entered from the keyboard and time data from the clock register, a second data register for receiving data from the first data register, and arithmetic means for combining the contents of the first and second data registers and storing the resultant combination in the first data register; and a bidirectional data bus selectively couples the clock register and the first data register.

28. A watch/calculator comprising:

a keyboard including numerical keys and arithmetic function keys;

calculator circuit means, including a data register, connected to the keyboard for accepting numerical entries from the keyboard and for performing arithmetic operations on numerical data in response to actuation of arithmetic function keys on the keyboard;

display means connected to the calculator circuit means for displaying numerical data;

watch circuit means, including a clock register, connected to the display means for storing and periodically updating data representing time; and data transfer means connected to the calculator circuit means and the watch circuit means including a bidirectional data bus for transferring data between the calculator circuit means and the watch circuit means and a time entry key for causing the calculator circuit means to transfer numerical data in the data register into the clock register in the watch circuit means via the bidirectional data bus.

29. A watch/calculator as in claim 28 wherein the data transfer means causes the results of arithmetic operations to be transferred to the watch circuit means in response to depression of the time entry key following the performance of an arithmetic operation.

30. A watch/calculator as in claim 28 further comprising:

a stopwatch start/stop key; and stopwatch circuit means in the watch circuit means having a stopwatch register coupled to the bidirectional data bus for receiving data transferred from the data register and responsive to the stopwatch key for counting down from a time value represented by the transferred data upon a first actuation of the stopwatch start/stop key, stopping the counting upon a second actuation of the stopwatch start/stop key and producing an alarm signal when the count in the stopwatch register reaches a predetermined value.

31. A watch/calculator as in claim 29 wherein the calculator circuit means includes a second data storage register and arithmetic means for arithmetically combining data in the first-mentioned data register and the second data register, and for placing the result of that combination in the first-mentioned data register.

32. A watch/calculator as in claim 21 wherein:

the display means includes a display register coupled to the data register and the clock register; and the watch circuit means periodically updates data representing time in the display register.

33. A watch/calculator as in claim 21 wherein:

the display means includes a display register coupled to the data register and the clock register; and the watch circuit means periodically updates data representing time in the display register.

34. A watch/calculator as in claim 27 wherein:

the display means includes a display register coupled to the data register and the clock register; and the watch circuit means periodically updates data representing time in the display register.

35. An electronic timepiece comprising:

a signal source for producing stable, periodic signals;

clock circuit means connected to the signal source for storing and periodically updating data representing time;

display means connected to the clock circuit means for displaying time data;

a keyboard including numerical keys;

data entry means coupling the keyboard to the clock circuit means for accepting data entered from the keyboard and for transferring entered data to the clock circuit means; and a time entry delimiter key on the keyboard for delimiting the entry of portions of time data from the keyboard where each portion has a different unit and for causing the display of a selected character on the display means between adjacent portions of entered time data when the time entry delimiter key is depressed, wherein the time entry delimiter key is depressed after the entry of a first predetermined number of digits from the keyboard to indicate entry of time data having a first unit by causing the display of a selected character after the first predetermined number of digits and to enable entry of time data having a second unit, and the time entry delimiter key is again depressed after the entry of a second predetermined number of digits from the keyboard to indicate entry of time data having the second unit by causing the display of a selected character after the second predetermined number of digits and to enable entry of time data having a third unit.

36. An electronic timepiece as in claim 35 wherein the time entry delimiter key is operatively coupled to the data entry means for causing the data entry means to process the second predetermined number of digits as modulo 60 after the first depression of the time entry delimiter key.

37. An electronic timepiece as in claim 35 wherein the time entry delimiter key is a colon (:) key and the selected character displayed on the display means in response to depression of the colon key is a colon.

38. An electronic timepiece as in claim 36 wherein the time entry delimiter key is operatively coupled to the data entry means for causing the data entry means to process entries from the keyboard subsequent to the second predetermined number of digits as modulo 60 after the second depression of the time entry delimiter key.

39. An electronic timepiece as in claim 36 further comprising a decimal point key operatively coupled to the data entry means for causing the data entry means to process entries from the keyboard subsequent to the second predetermined number of digits as fractional seconds, modulo 10, after depression of the decimal point key subsequent to depression of the time entry delimiter key.

40. An electronic timepiece as in claim 35 further comprising a time entry key for causing the data entry means to transfer numerical data entered from the keyboard into the clock circuit means.

41. An electronic timepiece as in claim 35 further comprising a time mode key on the keyboard for converting between twelve hour and twenty-four hour modes of time entry and display.

42. An electronic timepiece as in claim 35 further comprising a date entry delimiter key on the keyboard for delimiting the entry of portions of date information from the keyboard where each portion has a different unit and for causing the display of a selected character on the display means between each portion of entered date information wherein the date entry delimiter key is depressed after the entry of a first predetermined number of digits from the keyboard to indicate entry of date information having a first unit and to enable entry of date information having a second unit, and the date entry delimiter key is again depressed after the entry of a second predetermined number of digits from the keyboard to indicate entry of date information having the second unit and to enable entry of date information having a third unit.

43. An electronic timepiece as in claim 42 wherein the date entry delimiter key is a slash (/) key and the selected character displayed on the display means in response to depression of the slash key is a hyphen (-).

44. An electronic timepiece as in claim 42 further comprising a date mode key for converting between a day-month-year and a month-day-year mode of date entry and display.

45. An electronic timepiece as in claim 42 wherein the date entry delimiter key is operatively coupled to the data entry means for causing the data entry means to process the second predetermined number of digits as an indication of a month of the year after the first depression of the date entry delimiter key following entry of digits indicating day of a month.

46. An electronic timepiece as in claim 45 wherein the date entry delimiter key is operatively coupled to the data entry means for causing the data entry means to process entries from the keyboard subsequent to the second predetermined number of digits as an indication of a year.

47. An electroic timepiece as in claim 42 wherein the date entry delimiter key is operatively coupled to the data entry means for causing the data entry means to process the second predetermined number of digits as an indication of a day of a month after the first depression of the date entry delimiter key following entry of digits indicating a month of the year.

48. An electronic timepiece as in claim 35 further comprising an alarm set key on the keyboard and an alarm register in the clock circuit means for causing the alarm register to store a time quantity entered from the keyboard and to actuate an alarm when the periodically updated time in the clock circuit means coincides with the time stored in the alarm register.

49. An electronic timepiece as in claim 35 further comprising:

a stopwatch start/stop key; and stopwatch circuit means in the clock circuit means responsive to the stopwatch key for starting counting the amount of time from a predetermined reference upon a first actuation of the stopwatch start/-stop key and stopping the counting upon a second actuation of the stopwatch start/stop key.

50. An electronic timepiece as in claim 49 wherein the stopwatch circuit means counts up from the predetermined reference when the predetermined reference is zero and counts down from the predetermined reference when the predetermined reference is a positive, non-zero number.

51. An electronic timepiece as in claim 49 wherein the stopwatch circuit means actuates an alarm when the count in the stopwatch circuit means reaches zero when the stopwatch circuit means is counting down from a positive, non-zero predetermined reference.

52. An electronic timepiece as in claim 35 further comprising calculator circuit means coupled to the clock circuit means and the data entry means for performing arithmetic operations on data from the keyboard and the clock circuit means.

53. An electronic timepiece as in claim 52 wherein the keyboard includes an arithmetic function key for causing the calculator circuit means to combine data from the keyboard with time data from the clock circuit means to produce a new piece of time data which is periodically updated by the clock circuit means.

54. An electronic timepiece as in claim 53 wherein the clock circuit means includes a clock register in which the updated time data is stored, the calculator circuit means and data entry means includes data registers for storing data from the keyboard and the clock circuit means, and the calculator circuit means includes arithmetic means for arithmetically combining data in the data registers.

55. An electronic timepiece as in claim 54 wherein the display means includes a display register coupled to the clock register and the clock circuit means periodically updates time data in the display register.

56. An electronic timepiece as in claim 36 wherein the time entry delimiter key is operatively coupled to the data entry means for causing, in response to depression of the time entry delimiter key, the data entry means to process and the display means to display subsequently entered digits in a two-digit field in the display means, with each digit being entered into the right-most field and each subsequent digit entry causing the previously entered digit to be shifted to the left-most field and thereby replacing any digit previously in the left-most field.

57. An electronic watch comprising:
electronic time keeping circuitry;
data entry means including a keyboard having numerical keys coupled to the electronic time keeping circuitry for entering numerical data into the electronic time keeping circuitry;
display means coupled to the data entry means and the electronic time keeping circuitry for displaying numerical data;
a first numerical entry delimiter key on the keyboard for delimiting the entry of numerical data representing an integer from numerical data representing a fraction and for causing a first symbol to be displayed on the display means between numerical data representing an integer and numerical data representing a fraction;
a second numerical entry delimiter key on the keyboard for delimiting the entry of numerical data having a first unit from numerical data having a second unit and for causing a second symbol to be displayed on the display means between numerical data having the first unit and numerical data having the second unit;
processing means coupled to the data entry means, the electronic time keeping circuitry and the display means for processing numerical information comprising numerical data having the first unit, numerical data having the second unit, numerical data representing an integer and numerical data representing a fraction and for producing resultant numerical data.

58. An electronic watch as in claim 57 further comprising arithmetic function keys on the keyboard for causing the processing means to perform arithmetic operations on entered information in response to depression of an arithmetic function key.

59. An electronic watch as in claim 58 wherein the performance of an arithmetic operation causes the display means to display the resultant numerical data as numerical data having the first unit and numerical data having the second unit separated by the second symbol, the numerical data having the second unit being comprised of an integer and a fraction separated by the first symbol.

60. An electronic watch as in claim 59 wherein the first unit is minutes and the second unit is seconds.

61. An electrode watch as in claim 58 wherein the depression of an arithmetic function key causes the processing means to arithmetically combine numerical data having the first unit with numerical data representing an integer and numerical data representing a fraction.

62. An electronic apparatus comprising:
data entry means including a keyboard having numerical keys for entering numerical data into the electronic apparatus;
display means coupled to the data entery means for displaying numerical data;
a first numerical entry delimiter key on the keyboard for delimiting the entry of numerical data representing an integer from numerical data representing a fraction and for causing a first symbol to be displayed on the display means between numerical data representing an integer and numerical data representing a fraction;
a second numerical entry delimiter key on the keyboard for delimiting the entry of numerical data having a first unit from numerical data having a second unit and for causing a second symbol to be displayed on the display means between numerical data having the first unit and numerical data having the second unit;
processing means coupled to the data entry means and the display means for processing numerical information comprising numerical data having the first unit, numerical data having the second unit, numerical data representing an integer and numerical data representing a fraction and for producing a numerical result.

63. An electronic apparatus as in claim 62 further comprising arithmetic function keys on the keyboard for causing the processing means to perform arithmetic operations on entered information in response to depression of an arithmetic function key.

64. An electrode apparatus as in claim 63 wherein the performance of an arithmetic operation causes the display means to display the results thereof in terms of numerical data having the first unit and numerical data having the second unit separated by the second symbol, the numerical data having the second unit being comprised of an integer and a fraction separated by the first symbol.

65. An electronic apparatus as in claim 64 wherein the first unit is minutes and the second unit is seconds.

66. An electronic apparatus as in claim 63 wherein the depression of an arithmetic function key causes the processing means to arithmetically combine numerical data having the first unit with numerical data representing an integer and numerical data representing a fraction.

* * * * *

UNITED STATES PATENT AND TRADEMARK OFFICE

CERTIFICATE OF CORRECTION

PATENT NO. : 4,158,285 Page 1 of 2

DATED : June 19, 1979

INVENTOR(S) : Edward A. Heinsen, Andre F. Marion and Thomas E. Osborne

It is certified that error appears in the above-identified patent and that said Letters Patent are hereby corrected as shown below:

Column 3, line 39, "scaler" should read -- scalar --;

Column 7, line 20, "detes" should read -- dates --;

Column 10, line 55, "not" should read -- not --;

Column 11, line 33, "(5:00 00.)" should read -- (5:00 00.); line 48, "entry" should read -- (entry) --; line 54, after "watch" insert -- /calculator --;

Column 13, line 10, "known" should read -- know --; line 13, "data" should read -- date --;

Column 15, line 8, "data" should read -- date --;

Column 16, line 18, "data" should read -- date --;

Column 18, line 46, "LED's" should read -- LEDs --; line 55, "current" should read -- currents --; line 56, "sources" should read -- source --;

Column 22, line 28, "drive" should read -- driver --;

Column 25, line 19, "calculation" should read -- circulation --;

Column 27, line 15, "146" should read -- 416 --;

Column 29, line 41, "them" should read -- then --;

Column 31, line 33, "ad" should read -- and--;

UNITED STATES PATENT AND TRADEMARK OFFICE

CERTIFICATE OF CORRECTION

PATENT NO. : 4,158,285 Page 2 of 2

DATED : June 19, 1979

INVENTOR(S) : Edward A. Heinsen, Adre F. Marion and Thomas E. Osborne

It is certified that error appears in the above-identified patent and that said Letters Patent are hereby corrected as shown below:

Column 32, line 49, "bits" should read -- bit --;

Column 33, line 1, "one" should read -- once --;

Column 34, lines 30 and 61, "data" should read -- date --;

Column 36, line 26, delete "device"; line 55, ""0"." should read -- "0." --;

Column 37, line 24, ""12"." should read -- "12." --; line 34, "digit" should read -- digits --;

Column 99, line 54, "data" should read -- date --;

Column 102, line 26, "21" should read -- 28 --;

Column 106, line 37, "electrode" should read -- electronic--

Signed and Sealed this

*Fifth* Day of *April 1983*

[SEAL]

*Attest:*

GERALD J. MOSSINGHOFF

*Attesting Officer* *Commissioner of Patents and Trademarks*